(12) United States Patent
Skaaksrud

(10) Patent No.: US 10,592,845 B2
(45) Date of Patent: Mar. 17, 2020

(54) METHODS, APPARATUS, AND SYSTEMS FOR TRANSMITTING A CORRECTIVE PICKUP NOTIFICATION FOR A SHIPPED ITEM ACCOMPANYING AN ID NODE MOVING WITH A COURIER AWAY FROM A MASTER NODE

(71) Applicant: FedEx Corporate Services, Inc., Collierville, TN (US)

(72) Inventor: Ole-Petter Skaaksrud, Germantown, TN (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 968 days.

(21) Appl. No.: 14/979,882

(22) Filed: Dec. 28, 2015

(65) Prior Publication Data
US 2016/0232486 A1  Aug. 11, 2016

Related U.S. Application Data

(60) Provisional application No. 62/113,923, filed on Feb. 9, 2015.

(51) Int. Cl.
*G06Q 10/08* (2012.01)
*H04W 4/029* (2018.01)
(Continued)

(52) U.S. Cl.
CPC ....... *G06Q 10/0833* (2013.01); *G06Q 10/087* (2013.01); *G06Q 10/0832* (2013.01);
(Continued)

(58) Field of Classification Search
CPC ............. G06Q 10/083; G06Q 10/0832; G06Q 10/0833; G06Q 10/0836; G06Q 10/0837; H04W 76/10
(Continued)

(56) References Cited

U.S. PATENT DOCUMENTS

| 4,750,197 A | 6/1988 | Denekamp et al. |
| 5,154,228 A | 10/1992 | Gambertoglio et al. |

(Continued)

FOREIGN PATENT DOCUMENTS

| CN | 102325344 A | 1/2012 |
| CN | 103686761 A | 3/2014 |

(Continued)

OTHER PUBLICATIONS

Jung et. al., "Integration of GIS, GPS, and optimization technologies for the effective control of parcel delivery service", Computers & Industrial Engineering 51, 154, '62 (Year: 2006).*

(Continued)

*Primary Examiner* — Kevin H Flynn
*Assistant Examiner* — Emmett K. Walsh
(74) *Attorney, Agent, or Firm* — Withers & Keys, LLC

(57) ABSTRACT

Improved movement-based technical solutions for transmitting a corrective pickup notification for a shipped item are described. For example, a first master node at a first location receives shipping information about the item. That master node identifies an intended pickup master node from the shipping information and identifies the location of an ID node associated with the item over a time period, which may indicate the item is moving away from the first location. After identifying a courier master node accompanying the departing ID node, the first master node automatically senses an adverse pickup condition when the identified courier master node does not correspond to the intended pickup master node and the ID node's detected location over time indicates the item is moving away from the first location. The first master node then transmits the corrective pickup notification to a second logistics devices based on the adverse pickup condition sensed.

28 Claims, 51 Drawing Sheets

(51) Int. Cl.
*H04W 76/10* (2018.01)
*H04L 29/08* (2006.01)

(52) U.S. Cl.
CPC ..... *G06Q 10/0835* (2013.01); *G06Q 10/0836* (2013.01); *H04L 67/10* (2013.01); *H04L 67/12* (2013.01); *H04L 67/18* (2013.01); *H04W 4/029* (2018.02); *H04W 76/10* (2018.02)

(58) Field of Classification Search
USPC ........................................................ 705/333
See application file for complete search history.

(56) References Cited

U.S. PATENT DOCUMENTS

| | | | |
|---|---|---|---|
| 5,223,844 A | 6/1993 | Mansell et al. | |
| 5,400,020 A | 3/1995 | Jones et al. | |
| 5,400,246 A | 3/1995 | Wilson et al. | |
| 5,414,432 A | 5/1995 | Penny, Jr. et al. | |
| 5,430,730 A | 7/1995 | Sepulveda-Garese et al. | |
| 5,491,486 A | 2/1996 | Welles, II et al. | |
| 5,515,419 A | 5/1996 | Sheffer | |
| 5,673,304 A | 9/1997 | Connor et al. | |
| 5,691,980 A | 11/1997 | Welles, II et al. | |
| 5,799,252 A | 8/1998 | Nakagoshi et al. | |
| 5,854,994 A | 12/1998 | Canada et al. | |
| 5,884,216 A | 3/1999 | Shah | |
| 5,907,286 A | 5/1999 | Kuma | |
| 5,917,632 A | 6/1999 | Lesesky | |
| 5,946,612 A | 8/1999 | Johansson | |
| 5,953,650 A | 9/1999 | Villevieille | |
| 5,959,577 A | 9/1999 | Fan et al. | |
| 5,969,673 A | 10/1999 | Bickley et al. | |
| H1815 H | 11/1999 | Campbell et al. | |
| 6,011,510 A | 1/2000 | Yee et al. | |
| 6,052,597 A | 4/2000 | Ekstrom | |
| 6,070,793 A * | 6/2000 | Reichl ..................... G07C 1/10 235/375 | |
| 6,085,090 A | 7/2000 | Yee et al. | |
| 6,148,291 A | 11/2000 | Radican | |
| 6,240,365 B1 | 5/2001 | Bunn | |
| 6,255,989 B1 | 7/2001 | Munson et al. | |
| 6,311,069 B1 | 10/2001 | Havinis et al. | |
| 6,334,047 B1 | 12/2001 | Andersson et al. | |
| 6,360,102 B1 | 3/2002 | Havinis et al. | |
| 6,466,788 B1 | 10/2002 | Carlsson | |
| 6,483,433 B2 | 11/2002 | Moskowitz et al. | |
| 6,505,048 B1 | 1/2003 | Moles | |
| 6,526,335 B1 | 2/2003 | Treyz et al. | |
| 6,574,484 B1 | 6/2003 | Carley | |
| 6,662,016 B1 | 12/2003 | Buckham et al. | |
| 6,674,860 B1 | 1/2004 | Pirila | |
| 6,711,399 B1 | 3/2004 | Granier | |
| 6,748,318 B1 | 6/2004 | Jones | |
| 6,748,320 B2 | 6/2004 | Jones | |
| 6,853,911 B1 | 2/2005 | Sakarya | |
| 6,859,831 B1 | 2/2005 | Gelvin et al. | |
| 6,904,359 B2 | 6/2005 | Jones | |
| 6,970,183 B1 | 11/2005 | Monroe | |
| 6,985,750 B1 | 1/2006 | Vicknair et al. | |
| 7,035,240 B1 | 4/2006 | Balakrishnan et al. | |
| 7,085,629 B1 | 8/2006 | Gotou et al. | |
| 7,165,102 B2 | 1/2007 | Shah et al. | |
| 7,183,924 B1 | 2/2007 | Ku | |
| 7,212,829 B1 | 5/2007 | Lau et al. | |
| 7,221,668 B2 | 5/2007 | Twitchell, Jr. | |
| 7,242,926 B1 | 7/2007 | Murakami et al. | |
| 7,370,079 B2 | 5/2008 | Murata et al. | |
| 7,529,597 B1 | 5/2009 | Hertz et al. | |
| 7,539,622 B1 | 5/2009 | Harris et al. | |
| 7,545,326 B2 | 6/2009 | Caliri et al. | |
| 7,623,033 B2 | 11/2009 | Ainsworth et al. | |
| 7,788,522 B1 | 8/2010 | Abdelaziz et al. | |
| 7,876,239 B2 | 1/2011 | Horstemeyer | |
| 7,969,913 B2 | 6/2011 | Park et al. | |
| 7,978,631 B1 | 7/2011 | Abdelaziz et al. | |
| 8,000,276 B2 | 8/2011 | Scherzer et al. | |
| 8,205,788 B1 * | 6/2012 | Gazdzinski ............ G06Q 10/08 235/375 | |
| 8,207,816 B2 | 6/2012 | Crigger et al. | |
| 8,239,169 B2 | 8/2012 | Gregory et al. | |
| 8,253,557 B2 | 8/2012 | Ani et al. | |
| 8,299,920 B2 | 10/2012 | Hamm et al. | |
| 8,311,952 B1 | 11/2012 | Lundberg et al. | |
| 8,392,275 B2 | 3/2013 | Scipioni | |
| 8,447,882 B2 | 5/2013 | Twitchell, Jr. | |
| 8,560,274 B2 | 10/2013 | Gregory et al. | |
| 8,626,193 B1 | 1/2014 | Crossno et al. | |
| 8,688,101 B1 | 4/2014 | Hayes et al. | |
| 8,725,165 B2 | 5/2014 | Lau et al. | |
| 8,755,823 B2 | 6/2014 | Proietti et al. | |
| 8,766,797 B2 | 7/2014 | Hamm et al. | |
| 8,769,661 B2 | 7/2014 | Wang | |
| 8,989,053 B1 | 3/2015 | Skaaksrud et al. | |
| 8,994,514 B1 | 3/2015 | Juels et al. | |
| 9,163,962 B2 | 10/2015 | Ainsworth et al. | |
| 9,215,075 B1 | 12/2015 | Poltorak | |
| 9,247,396 B2 | 1/2016 | Alexander et al. | |
| 9,256,852 B1 | 2/2016 | Myllymaki | |
| 9,260,244 B1 | 2/2016 | Cohn | |
| 9,350,734 B1 | 5/2016 | Jamshidi et al. | |
| 9,524,648 B1 | 12/2016 | Gopalakrishnan et al. | |
| 9,569,944 B2 | 2/2017 | Barnes et al. | |
| 9,628,502 B2 | 4/2017 | Clark et al. | |
| 9,633,327 B2 | 4/2017 | Hamm et al. | |
| 9,652,990 B2 | 5/2017 | Rhee | |
| 9,674,812 B2 | 6/2017 | Skaaksrud et al. | |
| 9,769,785 B2 | 9/2017 | Skaaksrud et al. | |
| 9,769,786 B2 | 9/2017 | Skaaksrud | |
| 9,854,556 B2 | 9/2017 | Skaaksrud et al. | |
| 9,775,126 B2 | 10/2017 | Skaaksrud | |
| 9,788,297 B2 | 10/2017 | Skaaksrud | |
| 9,984,349 B2 | 2/2018 | Skaaksrud | |
| 9,913,240 B2 | 3/2018 | Skaaksrud | |
| 9,930,635 B2 | 3/2018 | Skaaksrud et al. | |
| 10,033,594 B2 | 3/2018 | Skaaksrud et al. | |
| 9,992,623 B2 | 4/2018 | Skaaksrud | |
| 9,949,228 B2 | 5/2018 | Skaaksrud | |
| 9,958,533 B2 | 5/2018 | Manku | |
| 9,973,391 B2 | 5/2018 | Skaaksrud et al. | |
| 9,974,042 B2 | 5/2018 | Skaaksrud | |
| 9,978,035 B2 | 5/2018 | Skaaksrud et al. | |
| 9,984,348 B2 | 5/2018 | Skaaksrud et al. | |
| 9,984,350 B2 | 5/2018 | Skaaksrud | |
| 9,985,839 B2 | 5/2018 | Skaaksrud et al. | |
| 10,057,133 B2 | 5/2018 | Skaaksrud et al. | |
| 10,078,811 B2 | 5/2018 | Skaaksrud | |
| 10,074,069 B2 | 7/2018 | Skaaksrud | |
| 10,040,628 B1 | 8/2018 | Misra et al. | |
| 10,057,722 B2 | 8/2018 | Skaaksrud | |
| 10,157,363 B2 | 8/2018 | Skaaksrud | |
| 9,974,041 B2 | 10/2018 | Skaaksrud | |
| 10,102,494 B2 | 10/2018 | Skaaksrud | |
| 9,904,902 B2 | 12/2018 | Skaaksrud | |
| 10,187,748 B2 | 1/2019 | Skaaksrud | |
| 10,229,382 B2 | 3/2019 | Skaaksrud | |
| 10,271,165 B2 | 4/2019 | Skaaksrud | |
| 10,271,166 B2 | 4/2019 | Skaaksrud | |
| 10,305,744 B2 | 5/2019 | Skaaksrud et al. | |
| 10,313,199 B2 | 6/2019 | Skaaksrud et al. | |
| 10,484,820 B2 | 11/2019 | Skaaksrud | |
| 10,491,479 B2 | 11/2019 | Skaaksrud et al. | |
| 2001/0022615 A1 | 9/2001 | Fernandez et al. | |
| 2001/0056544 A1 | 12/2001 | Walker | |
| 2002/0000916 A1 | 1/2002 | Richards | |
| 2002/0062388 A1 | 5/2002 | Ogier et al. | |
| 2002/0087375 A1 | 7/2002 | Griffin et al. | |
| 2002/0090063 A1 | 7/2002 | Bach | |
| 2002/0103724 A1 | 8/2002 | Huxter | |
| 2002/0113703 A1 | 8/2002 | Moskowitz et al. | |
| 2002/0143670 A1 | 10/2002 | Cushing et al. | |
| 2002/0156645 A1 | 10/2002 | Hansen | |
| 2002/0163912 A1 | 11/2002 | Carlson | |
| 2002/0178966 A1 | 12/2002 | Forbes | |

(56) References Cited

U.S. PATENT DOCUMENTS

| | | |
|---|---|---|
| 2002/0184497 A1 | 12/2002 | Gage et al. |
| 2003/0018478 A1 | 1/2003 | Mays |
| 2003/0050874 A1* | 3/2003 | Sesek ............... G06Q 10/08 705/29 |
| 2003/0052778 A1 | 3/2003 | Wong |
| 2003/0052786 A1 | 3/2003 | Dickinson |
| 2003/0144971 A1 | 7/2003 | Das et al. |
| 2003/0149599 A1 | 8/2003 | Goodall et al. |
| 2003/0149794 A1 | 8/2003 | Morris et al. |
| 2003/0179073 A1 | 9/2003 | Ghazarian |
| 2003/0184475 A1 | 10/2003 | Williams et al. |
| 2003/0220711 A1 | 11/2003 | Allen |
| 2003/0231112 A1 | 12/2003 | Raju |
| 2004/0002352 A1 | 1/2004 | Sendonariz |
| 2004/0049451 A1 | 3/2004 | Berardi et al. |
| 2004/0143654 A1 | 7/2004 | Poirot et al. |
| 2004/0174259 A1 | 9/2004 | Peel et al. |
| 2004/0215532 A1 | 10/2004 | Boman et al. |
| 2004/0233055 A1 | 11/2004 | Canich et al. |
| 2004/0246130 A1 | 12/2004 | Lambright et al. |
| 2004/0253923 A1 | 12/2004 | Braley et al. |
| 2005/0006452 A1 | 1/2005 | Aupperle et al. |
| 2005/0043594 A1 | 2/2005 | Dinsmoor et al. |
| 2005/0049821 A1 | 3/2005 | Sahinoglu |
| 2005/0052290 A1 | 3/2005 | Naden et al. |
| 2005/0068178 A1 | 3/2005 | Lee et al. |
| 2005/0088284 A1 | 4/2005 | Zai et al. |
| 2005/0141465 A1 | 6/2005 | Kato et al. |
| 2005/0179545 A1 | 8/2005 | Bergman |
| 2005/0192741 A1 | 9/2005 | Nichols et al. |
| 2005/0208959 A1 | 9/2005 | Chen et al. |
| 2005/0222853 A1 | 10/2005 | Black et al. |
| 2005/0236479 A1 | 10/2005 | Schmidtberg et al. |
| 2005/0251330 A1 | 11/2005 | Waterhouse et al. |
| 2005/0285740 A1 | 12/2005 | Kubach et al. |
| 2006/0011721 A1 | 1/2006 | Olsen, III et al. |
| 2006/0018274 A1 | 1/2006 | Twitchell, Jr. |
| 2006/0054705 A1 | 3/2006 | Garton et al. |
| 2006/0055508 A1 | 3/2006 | Kumar et al. |
| 2006/0168644 A1 | 7/2006 | Richter et al. |
| 2006/0171332 A1 | 8/2006 | Barnum |
| 2006/0173749 A1 | 8/2006 | Ward et al. |
| 2006/0187032 A1 | 8/2006 | Kunkel et al. |
| 2006/0192652 A1 | 8/2006 | Mandava et al. |
| 2006/0200560 A1 | 9/2006 | Waugh et al. |
| 2006/0206246 A1 | 9/2006 | Walker |
| 2006/0208899 A1 | 9/2006 | Suzuki et al. |
| 2006/0229895 A1 | 10/2006 | Kodger, Jr. |
| 2006/0244624 A1 | 11/2006 | Wang |
| 2006/0250249 A1 | 11/2006 | Cheng |
| 2006/0253590 A1 | 11/2006 | Nagy et al. |
| 2006/0259377 A1 | 11/2006 | Fedor et al. |
| 2006/0261946 A1 | 11/2006 | Himberger et al. |
| 2007/0005452 A1* | 1/2007 | Klingenberg ........ G06Q 10/08 705/334 |
| 2007/0013481 A1 | 1/2007 | Zhu et al. |
| 2007/0021124 A1 | 1/2007 | Niu et al. |
| 2007/0030151 A1 | 2/2007 | Marrow |
| 2007/0050313 A1 | 3/2007 | Park et al. |
| 2007/0060212 A1 | 3/2007 | Shah |
| 2007/0075833 A1 | 4/2007 | Hunt et al. |
| 2007/0075861 A1 | 4/2007 | Cook et al. |
| 2007/0095904 A1 | 5/2007 | Barta et al. |
| 2007/0096881 A1 | 5/2007 | Pillai |
| 2007/0103303 A1 | 5/2007 | Shoarinejad |
| 2007/0110010 A1 | 5/2007 | Kotola et al. |
| 2007/0130463 A1 | 6/2007 | Law et al. |
| 2007/0138268 A1 | 6/2007 | Tuchman et al. |
| 2007/0171997 A1 | 7/2007 | Weissman et al. |
| 2007/0174136 A1 | 7/2007 | Kwak |
| 2007/0178908 A1 | 8/2007 | Doyle |
| 2007/0238417 A1 | 10/2007 | Bennett |
| 2007/0279222 A1 | 12/2007 | Carrigan |
| 2008/0004994 A1 | 1/2008 | Ainsworth et al. |
| 2008/0015884 A1 | 1/2008 | Jamula |
| 2008/0016537 A1 | 1/2008 | Little et al. |
| 2008/0040242 A1 | 2/2008 | Chang et al. |
| 2008/0040243 A1 | 2/2008 | Chang et al. |
| 2008/0040244 A1 | 2/2008 | Ricciuti et al. |
| 2008/0055068 A1 | 3/2008 | Van Wageningen et al. |
| 2008/0056162 A1 | 3/2008 | Lal |
| 2008/0061963 A1 | 3/2008 | Schnitz et al. |
| 2008/0061966 A1 | 3/2008 | Nelson |
| 2008/0089296 A1 | 4/2008 | Kazmi et al. |
| 2008/0098467 A1 | 4/2008 | Miller et al. |
| 2008/0112378 A1 | 5/2008 | Twitchell |
| 2008/0130536 A1 | 6/2008 | Twitchell |
| 2008/0167897 A1 | 7/2008 | Arroyo et al. |
| 2008/0180935 A1 | 7/2008 | Burdeen et al. |
| 2008/0191877 A1 | 8/2008 | Ferguson et al. |
| 2008/0255758 A1 | 10/2008 | Graham et al. |
| 2008/0255863 A1 | 10/2008 | Mack et al. |
| 2008/0257656 A1 | 10/2008 | Skinner et al. |
| 2008/0267150 A1 | 10/2008 | Rofougaran |
| 2008/0300985 A1 | 12/2008 | Shamp et al. |
| 2008/0303638 A1 | 12/2008 | Nguyen et al. |
| 2009/0018768 A1 | 1/2009 | Jo et al. |
| 2009/0026263 A1 | 1/2009 | Schmid et al. |
| 2009/0037196 A1 | 2/2009 | Chang et al. |
| 2009/0084836 A1 | 4/2009 | Dudley |
| 2009/0091144 A1 | 4/2009 | Debrody et al. |
| 2009/0115600 A1 | 5/2009 | Lee et al. |
| 2009/0123665 A1 | 5/2009 | Zaima |
| 2009/0157420 A1 | 6/2009 | Lou et al. |
| 2009/0201850 A1 | 8/2009 | Davis et al. |
| 2009/0252130 A1 | 10/2009 | Sheth et al. |
| 2009/0252134 A1 | 10/2009 | Schlicht et al. |
| 2009/0287827 A1 | 11/2009 | Horn et al. |
| 2009/0295537 A1 | 12/2009 | Lane et al. |
| 2009/0319078 A1 | 12/2009 | Jackson |
| 2009/0322510 A1 | 12/2009 | Berger et al. |
| 2009/0322551 A1 | 12/2009 | Kanagala et al. |
| 2009/0322890 A1 | 12/2009 | Bocking et al. |
| 2009/0327333 A1 | 12/2009 | Diener et al. |
| 2009/0327391 A1 | 12/2009 | Park et al. |
| 2010/0013635 A1 | 1/2010 | Berger et al. |
| 2010/0029232 A1 | 2/2010 | Kursawe et al. |
| 2010/0036674 A1 | 2/2010 | Johnson |
| 2010/0039284 A1 | 2/2010 | Hall et al. |
| 2010/0060452 A1 | 3/2010 | Schuster et al. |
| 2010/0063847 A1 | 3/2010 | Eisenberg et al. |
| 2010/0076902 A1* | 3/2010 | Kraft ............... G06K 17/0022 705/333 |
| 2010/0105406 A1 | 4/2010 | Luo et al. |
| 2010/0117820 A1 | 5/2010 | Mitschele |
| 2010/0135178 A1 | 6/2010 | Aggarwal et al. |
| 2010/0142448 A1 | 6/2010 | Schlicht et al. |
| 2010/0156651 A1 | 6/2010 | Broer |
| 2010/0157838 A1 | 6/2010 | Vaswani et al. |
| 2010/0195507 A1 | 8/2010 | Marinier et al. |
| 2010/0214074 A1 | 8/2010 | Twitchell, Jr. |
| 2010/0216432 A1 | 8/2010 | Wu |
| 2010/0223127 A1 | 9/2010 | Bettez et al. |
| 2010/0250460 A1 | 9/2010 | Twitchell, Jr. |
| 2010/0253519 A1 | 10/2010 | Brackmann et al. |
| 2010/0267375 A1 | 10/2010 | Lemmon et al. |
| 2010/0295665 A1 | 11/2010 | Landau et al. |
| 2010/0299640 A1 | 11/2010 | Titus |
| 2010/0308967 A1 | 12/2010 | Lauronen |
| 2010/0315197 A1 | 12/2010 | Solomon et al. |
| 2011/0005282 A1 | 1/2011 | Powers et al. |
| 2011/0022533 A1 | 1/2011 | Lau et al. |
| 2011/0050424 A1 | 3/2011 | Cova et al. |
| 2011/0074587 A1 | 3/2011 | Hamm et al. |
| 2011/0077909 A1 | 3/2011 | Gregory et al. |
| 2011/0078089 A1 | 3/2011 | Hamm et al. |
| 2011/0112858 A1 | 5/2011 | Neal |
| 2011/0137775 A1 | 6/2011 | Killian et al. |
| 2011/0153190 A1 | 6/2011 | Rolinski et al. |
| 2011/0258058 A1 | 10/2011 | Carroll et al. |
| 2011/0273294 A1 | 11/2011 | Harwell |
| 2011/0273852 A1 | 11/2011 | Debrody et al. |
| 2011/0295411 A1 | 12/2011 | Rotella et al. |
| 2011/0302014 A1 | 12/2011 | Proctor, Jr. et al. |

(56) References Cited

U.S. PATENT DOCUMENTS

| | | |
|---|---|---|
| 2011/0316674 A1 | 12/2011 | Joy et al. |
| 2011/0316716 A1 | 12/2011 | MacKay et al. |
| 2012/0014309 A1 | 1/2012 | Iizuka et al. |
| 2012/0022907 A1 | 1/2012 | Fidler |
| 2012/0036198 A1 | 2/2012 | Marzencki et al. |
| 2012/0158606 A1* | 6/2012 | Moudy ............... G06Q 10/083 |
| | | 705/332 |
| 2012/0187916 A1 | 7/2012 | Duer et al. |
| 2012/0197810 A1 | 8/2012 | Haarmann et al. |
| 2012/0209730 A1 | 8/2012 | Garrett |
| 2012/0225639 A1 | 9/2012 | Gazdzinski |
| 2012/0235791 A1 | 9/2012 | Donlan et al. |
| 2012/0252418 A1 | 10/2012 | Kandekar et al. |
| 2012/0252488 A1 | 10/2012 | Hartmann et al. |
| 2012/0258669 A1 | 10/2012 | Honkanen et al. |
| 2012/0262277 A1 | 10/2012 | Oliveira |
| 2012/0299721 A1 | 11/2012 | Jones |
| 2012/0317297 A1 | 12/2012 | Bailey |
| 2012/0320790 A1 | 12/2012 | Shaffer et al. |
| 2012/0326847 A1 | 12/2012 | Strauman |
| 2013/0002443 A1 | 1/2013 | Breed et al. |
| 2013/0047233 A1 | 2/2013 | Fisk et al. |
| 2013/0057388 A1 | 3/2013 | Attanasio |
| 2013/0085968 A1 | 4/2013 | Schultz et al. |
| 2013/0094346 A1 | 4/2013 | Beser |
| 2013/0106608 A1 | 5/2013 | Griesmann et al. |
| 2013/0106893 A1 | 5/2013 | Davis et al. |
| 2013/0165149 A1 | 6/2013 | Wilson et al. |
| 2013/0166246 A1 | 6/2013 | Rousu et al. |
| 2013/0174282 A1 | 7/2013 | Cui et al. |
| 2013/0201316 A1 | 8/2013 | Binder et al. |
| 2013/0214906 A1 | 8/2013 | Wojak |
| 2013/0225087 A1 | 8/2013 | Uhm |
| 2013/0241712 A1 | 9/2013 | Motley et al. |
| 2013/0245973 A1 | 9/2013 | Ross et al. |
| 2013/0271280 A1 | 10/2013 | Alnafisah |
| 2013/0273938 A1 | 10/2013 | Ng et al. |
| 2013/0303085 A1 | 11/2013 | Boucher et al. |
| 2013/0324147 A1 | 12/2013 | Ong et al. |
| 2013/0324164 A1 | 12/2013 | Vulcano |
| 2013/0335193 A1 | 12/2013 | Hanson et al. |
| 2013/0335231 A1 | 12/2013 | Caldwell et al. |
| 2013/0346135 A1 | 12/2013 | Siemens et al. |
| 2014/0006206 A1 | 1/2014 | Scrivner |
| 2014/0006943 A1 | 1/2014 | Robbins et al. |
| 2014/0006964 A1 | 1/2014 | Pan |
| 2014/0025746 A1 | 1/2014 | Rhee et al. |
| 2014/0026158 A1 | 1/2014 | Rowe et al. |
| 2014/0052832 A1 | 2/2014 | Dina et al. |
| 2014/0067609 A1 | 3/2014 | Heger |
| 2014/0073262 A1 | 3/2014 | Gutierrez et al. |
| 2014/0074743 A1 | 3/2014 | Rademaker |
| 2014/0099916 A1 | 4/2014 | Mallikarjunan et al. |
| 2014/0112199 A1 | 4/2014 | Beser |
| 2014/0116569 A1 | 5/2014 | Clark et al. |
| 2014/0120910 A1 | 5/2014 | Batada et al. |
| 2014/0129109 A1 | 5/2014 | Meyer et al. |
| 2014/0162702 A1 | 6/2014 | Crawford et al. |
| 2014/0180511 A1 | 6/2014 | Daum |
| 2014/0180959 A1 | 6/2014 | Gillen et al. |
| 2014/0184386 A1 | 7/2014 | Regler et al. |
| 2014/0196140 A1 | 7/2014 | Gong |
| 2014/0211691 A1 | 7/2014 | Emadzadeh et al. |
| 2014/0219091 A1 | 8/2014 | Hellhake et al. |
| 2014/0222711 A1 | 8/2014 | Tibbs et al. |
| 2014/0229399 A1 | 8/2014 | Ranganathan et al. |
| 2014/0244834 A1 | 8/2014 | Guedalia et al. |
| 2014/0253297 A1 | 9/2014 | Kawaguchi et al. |
| 2014/0257748 A1 | 9/2014 | Lundquist et al. |
| 2014/0257877 A1 | 9/2014 | L'Heureux et al. |
| 2014/0257889 A1 | 9/2014 | Ashley, Jr. et al. |
| 2014/0258168 A1 | 9/2014 | Crawford |
| 2014/0279596 A1 | 9/2014 | Waris et al. |
| 2014/0279648 A1 | 9/2014 | Whitehouse |
| 2014/0294821 A1 | 10/2014 | Dumont et al. |
| 2014/0324527 A1 | 10/2014 | Kulkarni et al. |
| 2014/0330603 A1 | 11/2014 | Corder et al. |
| 2014/0335901 A1 | 11/2014 | Lacasse et al. |
| 2014/0341227 A1 | 11/2014 | Redi et al. |
| 2014/0351163 A1 | 11/2014 | Tussy |
| 2014/0355503 A1 | 12/2014 | Kainulainen et al. |
| 2014/0379529 A1 | 12/2014 | Agasti et al. |
| 2015/0012457 A1 | 1/2015 | Gonzalez et al. |
| 2015/0019391 A1 | 1/2015 | Kumar et al. |
| 2015/0039347 A1 | 2/2015 | Sharma |
| 2015/0057497 A1 | 2/2015 | Chiba et al. |
| 2015/0088731 A1 | 3/2015 | Ackerman |
| 2015/0095255 A1 | 4/2015 | Hall et al. |
| 2015/0102903 A1 | 4/2015 | Wilkinson |
| 2015/0120045 A1 | 4/2015 | Tan et al. |
| 2015/0120094 A1 | 4/2015 | Kimchi et al. |
| 2015/0120601 A1 | 4/2015 | Fee |
| 2015/0131479 A1 | 5/2015 | Fukui |
| 2015/0139124 A1 | 5/2015 | Da et al. |
| 2015/0148140 A1 | 5/2015 | Morehouse et al. |
| 2015/0153175 A1 | 6/2015 | Skaaksrud |
| 2015/0154431 A1 | 6/2015 | Skaaksrud et al. |
| 2015/0154531 A1 | 6/2015 | Skaaksrud |
| 2015/0154532 A1 | 6/2015 | Skaaksrud |
| 2015/0154536 A1 | 6/2015 | Skaaksrud et al. |
| 2015/0154539 A1 | 6/2015 | Skaaksrud et al. |
| 2015/0154540 A1 | 6/2015 | Skaaksrud |
| 2015/0154541 A1 | 6/2015 | Skaaksrud |
| 2015/0193731 A1 | 7/2015 | Stevens et al. |
| 2015/0222517 A1 | 8/2015 | McLaughlin et al. |
| 2015/0245179 A1 | 8/2015 | Jarvis et al. |
| 2015/0248801 A1 | 9/2015 | Froitzheim et al. |
| 2015/0301511 A1 | 10/2015 | Zhang |
| 2015/0310381 A1* | 10/2015 | Lyman ............... G06Q 10/083 |
| | | 705/330 |
| 2015/0324745 A1 | 11/2015 | Goodall et al. |
| 2015/0325103 A1 | 11/2015 | Ngyuen et al. |
| 2015/0347959 A1 | 12/2015 | Skaaksrud |
| 2015/0349917 A1 | 12/2015 | Skaaksrud |
| 2015/0351109 A1 | 12/2015 | Naim et al. |
| 2015/0379796 A1 | 12/2015 | Glasgow et al. |
| 2016/0019775 A1 | 1/2016 | Fokkelman |
| 2016/0048796 A1* | 2/2016 | Todasco ............... G06Q 10/083 |
| | | 705/330 |
| 2016/0066012 A1 | 3/2016 | Friedlander et al. |
| 2016/0092704 A1 | 3/2016 | Russell |
| 2016/0094940 A1 | 3/2016 | Vigier et al. |
| 2016/0098678 A1 | 4/2016 | Levy |
| 2016/0127985 A1 | 5/2016 | Kayargadde et al. |
| 2016/0148440 A1* | 5/2016 | Kwak .................. G07C 5/008 |
| | | 701/31.5 |
| 2016/0171439 A1 | 6/2016 | Ladden et al. |
| 2016/0224929 A1 | 8/2016 | Blanchard et al. |
| 2016/0241910 A1 | 8/2016 | Rowe |
| 2016/0260059 A1 | 9/2016 | Benjamin et al. |
| 2016/0292636 A1 | 10/2016 | Moody et al. |
| 2016/0327956 A1 | 11/2016 | Zhang et al. |
| 2017/0012719 A1 | 1/2017 | Skaaksrud |
| 2017/0012720 A1 | 1/2017 | Skaaksrud et al. |
| 2017/0012812 A1 | 1/2017 | Gotoh et al. |
| 2017/0012813 A1 | 1/2017 | Skaaksrud et al. |
| 2017/0012829 A1 | 1/2017 | Skaaksrud et al. |
| 2017/0012830 A1 | 1/2017 | Skaaksrud et al. |
| 2017/0013487 A1 | 1/2017 | Skaaksrud et al. |
| 2017/0013547 A1 | 1/2017 | Skaaksrud et al. |
| 2017/0061171 A1 | 3/2017 | Lombardi et al. |
| 2017/0090794 A1 | 3/2017 | Huang |
| 2017/0164319 A1 | 6/2017 | Skaaksrud et al. |
| 2017/0278061 A1 | 9/2017 | Skaaksrud |
| 2017/0278374 A1 | 9/2017 | Skaaksrud |
| 2017/0279892 A1 | 9/2017 | Skaaksrud |
| 2017/0280289 A1 | 9/2017 | Skaaksrud |
| 2017/0280347 A1 | 9/2017 | Skaaksrud |
| 2017/0280351 A1 | 9/2017 | Skaaksrud |
| 2017/0318011 A1 | 11/2017 | Yoo et al. |
| 2018/0090992 A1 | 3/2018 | Shrivastava et al. |
| 2018/0218185 A1 | 8/2018 | High et al. |

(56) References Cited

U.S. PATENT DOCUMENTS

FOREIGN PATENT DOCUMENTS

| EP | 0936794 | | 8/1999 |
|---|---|---|---|
| JP | H05187167 | A | 7/1993 |
| JP | H08218732 | A | 8/1996 |
| JP | 2002220957 | A | 8/2002 |
| JP | 2005063046 | A | 3/2005 |
| JP | 2005343674 | A | 12/2005 |
| JP | 2011184150 | A | 9/2011 |
| JP | 2012086945 | A | 5/2012 |
| KR | 101396570 | B1 | 5/2014 |
| WO | 2001028274 | | 4/2001 |
| WO | 2001046649 | | 6/2001 |
| WO | 2001060038 | | 8/2001 |
| WO | 2001063318 | | 8/2001 |
| WO | 2005034425 | A1 | 4/2005 |
| WO | 2011096813 | A1 | 8/2011 |
| WO | 2012097356 | A1 | 7/2012 |

OTHER PUBLICATIONS

Ngai et. al., "Mobile Commerce Integrated with RFID Technology in a Container Depot", Decision Support Systems, available online at www.sciencedirect.com Jun. 16, 2005, pp. 62-76, 43, Elsevier.
Cekerevac et al., "Use of RFID Technology for Measurement of Quality of Transport of Postal Parcels", Mechanics Transport Communications Academic Journal, 2011, pp. III-84-III-90, Issue 3, Article No. 0562; available online at http://www.mtc-aj.com/library/562_EN.pdf.
M. Hachman, "Bluetooth 4.1 Prepares Headsets and More to Connect to the 'Net", online publication dated Dec. 4, 2013 (http://www.techhive.com/category/holiday/.
M. Schuster, "The Biggest iPhone 5S Feature Nobody's Talking About", online publication dated Sep. 18, 2013 (http://www.minyanville.com/sectors/technology/articles/The-Biggest-iPhone-5S-Feature-Nobodys/9/18/2013/id/5180#ixzz2fHNaHphq).
E. Betters, "Apple's iBeacons Explained: What it is and Why it Matters". online publication dated Sep. 18, 2013 (http://www.pocket-lint.com/news/123730-apple-s-ibeacons-explained-what-it-is-and-why-it-matters).
P. Pachal, "Bluetooth Devices Are About to Get a Lot Smarter", online publication dated Dec. 5, 2013 (http://mashable.com/2013/12/05/bluetooth-4-1/).
X. Luo et al.. "Comparative Evaluation of Received Signal-Strength Index (RSSI) Based Indoor Localization Techniques for Construction Jobsites", Adv. Eng. Informat. (2010), doi:10.1016/j.aei.2010.09.003.
B. Amutha et al., "Location Update Accuracy in Human Tracking System Using Zigbee Modules", International Journal of Computer Science and Information Security, vol. 6, No. 2, 2009.
"Bluetooth 4.1 Quick Reference Guide", Bluetooth SIG 2013, Nov. 2013.
"Intelligent Transportation System—Wikipedia, the free encyclopedia", online publication dated Oct. 21, 2013 (http://en.wikipedia.org/wiki/Intelligent_transportion_system).
J. Johnson et al., "Ultra-Wideband Aiding of GPS for Quick Deployment of Anchors in a GPS-denied Ad-hoc Sensor Tracking and Communication System", presented at ION GNSS (Portland, OR Sep. 10-23, 2011).
C. Liu et al., "Location Tracking by ZigBee", online publication undated (http://ir.csu.edu.tw/dspace/bitstream/987654321/1288/1/496.pdf).
R. Horblyuk et al., "Out of Control: Little-Used Clinical Assets Are Draining Healthcare Budgets", Healthcare Financial Management, Jul. 2012 issue, p. 68-72
"P410 UWB OEM Modules for Ranging and Communications | Time Domain", online publication dated Apr. 24, 2014 (http://www.timedomain.com/p400.php).
J. Terry et al., "Patient Flow and Access. Unlocking the Capacity of Acute Care Hospitals and Our National Healthcare Infrastructure", undated pun front GE Healthcare.
D. Long et al., "Wasting Away: The Quality, Safely, and Financial Case for Clinical Asset Optimization", undated publication from GE Healthcare.
"Awarepoint Real-time Awareness Solutions", online publication dated Oct. 1, 2013 (http://www.awarepoint.com/solutions).
M. Gheza et al., "Real Time Location System—Case Study: ZigBee System-on-Chip Solution", online publication dated Aug. 22, 2013 (www.slideshare.net/mihaigheza/real-time-location-system-with-zigbee).
Product Brochure for Time Domain's PulsON 410 (P410) Ultra Wideband (UWB) Ranging and Communication Module, undated.
"AutonoNav Scalable Autonomous Navigation System", online publication dated Nov. 21, 2013 (www.torcrobotics.com/products/autononav).
"Locating ZigBee Nodes Using TI's CC2431 Location Engine and Daintree's SNA", Daintree Networks Application Note AN016, Copyright 2008 (http://www.daintree.net_downloads_appnotes_appnote_016_sna_ti_locationing.pdf).
"Wireless ZigBee Networks for Real-Time Location Systems", online publication undated (www.ece.gatech.edu_academic_courses_ece4007_11spring_EDE4007L04_da2_ECE4007TRP_Sheng.pdf).
O. Hernandez et al., "Position Location Monitoring Using IEEE 812.15.4/ZigBee Technology", online publication undated (http://www.freescale.com_files_microcontrollers_doc_broachure_PositionLocationMonitoring.pdf).
"Estimote for Retail", online publication undated (http://www.estimote.com/estimote-for-retail.html).
Online Estimote App for Managing Estimote Beacons, online publication dated Aug. 18, 2014 (https://itunes.apple.com/us/app/estimote-virtual-beacon/id686915066).
"Environmental Cyberinfrastructure Needs for Distributed Sensor Networks", A Report from a National Science Foundation Sponsored Workshop, Scripps Inst. Oceanography, Aug. 12-13, 2003, pp. 1-66.
"A Standard Smart Transducer Interface", IEEE 1451. Sensors Expo, Philadelphia, Oct. 2, 2011, pp. 1-27.
Wolfe, "Electronic Cargo Seals: Context, Technologies and Marketplace", http://ops.fhwa.dot.gov/freight/E-Seal%20WP%final%20Jul%2012.htm. Jul. 12, 2002, pp. 1-47.
Maestas et al., "Demonstration of the Radio Frequency Identification Transportation Security and Safety System", Applied Sci. Laboratory, Oct. 15, 2003. pp. 1-11.
Remote Sensing for Transportation: Report of a Conference. Washington D.C., Dec. 4-5, 2000, pp. 1-59.
Ho et al., "In-Situ Chemiresistor Sensor for Real-Time Detection of Volatile Organic Compounds in Soil and Groundwater", Sensors vol. 2, 2002, pp. 23-34.
"System Planning Corp. Helps Evaluate Seamless Container-Security System", Jrnl. Commerce, May 30, 2005.
Wiczer Ph.D., "Connectivity; Smart Sensors or Smart Interfaces", ISA 2001 Emerging Technologies Conference, Sep. 2001, pp. 1-9.
Natalia Marmasse, "comMotion: A Context-Aware Communication System" Item: Masters Thesis submitted to MIT Libraries, Date: Oct. 1, 1999 the document: http://dspace.mit.edu/bitsrea/handle/1721.1/61841/44869691.pdf?sequence+1.
Marmasse, et al., "Location-Aware Information Delivery with comMotion", HUC 2000 Proceedings, pp. 1-15.
Katz, "E-Mail, Anywhere, in the Palm of Your Hand", Technology Cypertimes, http://partners.nytimes.com/week/091497email.html, Sep. 14, 1997.
Anwar et. al., "Design and Implementation of a Wireless Network System in a Smart Campus", CommIT, Oct. 2007, pp. 127-139vol. 1, No. 2.
White, Ron, "How Computers Work", Oct. 15, 2003, Que Publishing, 7th Ed., p. 4.
PCT/US15/067905 International Search Report and Written Opinion, dated Mar. 3, 2016.

* cited by examiner

- Locations of Master Nodes M1, M2, and M3 are known
- Location of ID Nodes A and B are determined through triangulation across Master Nodes M1, M2 and M3

• Location of ID Node C determined through triangulation across ID Node B and Master Nodes M1 and M2

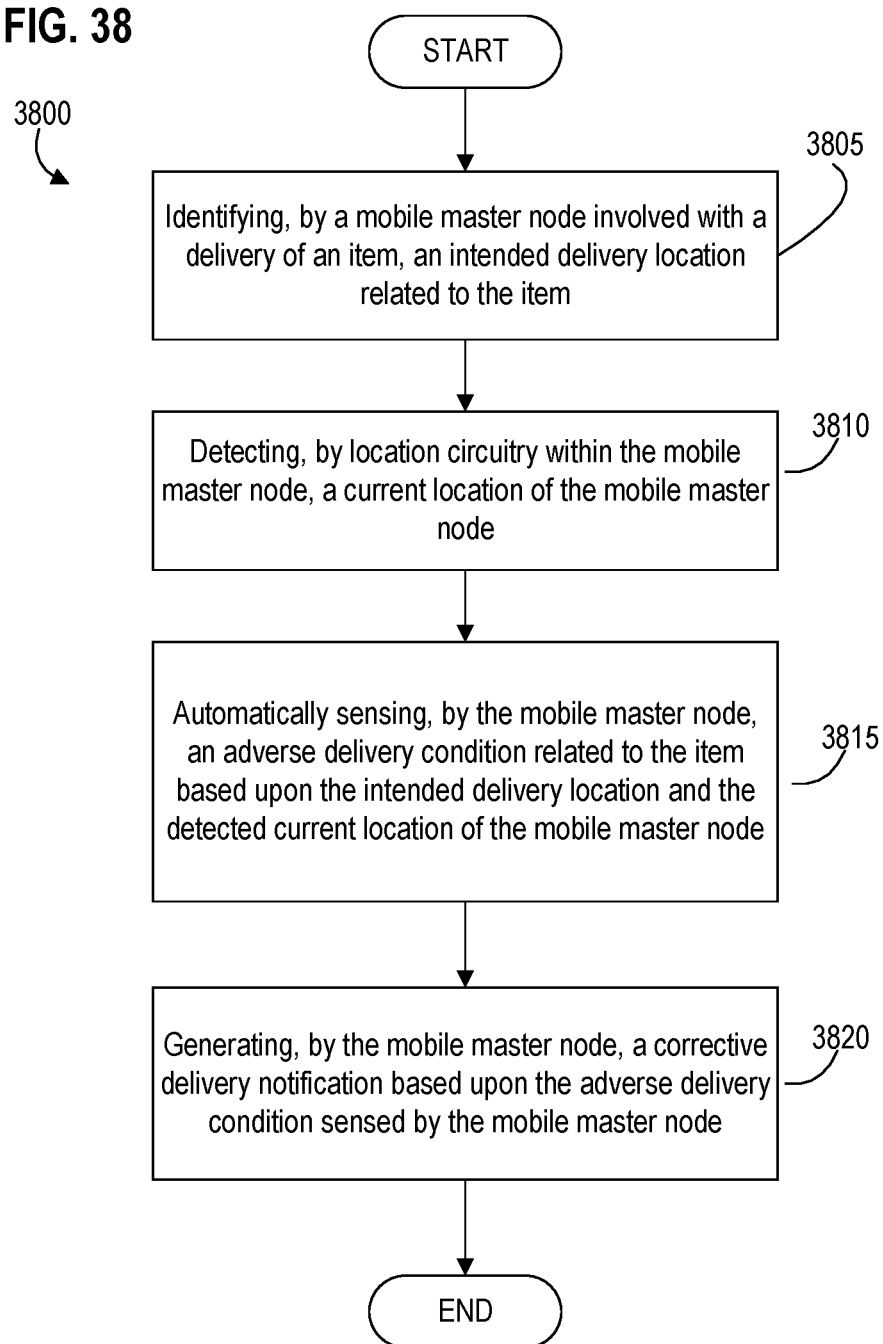

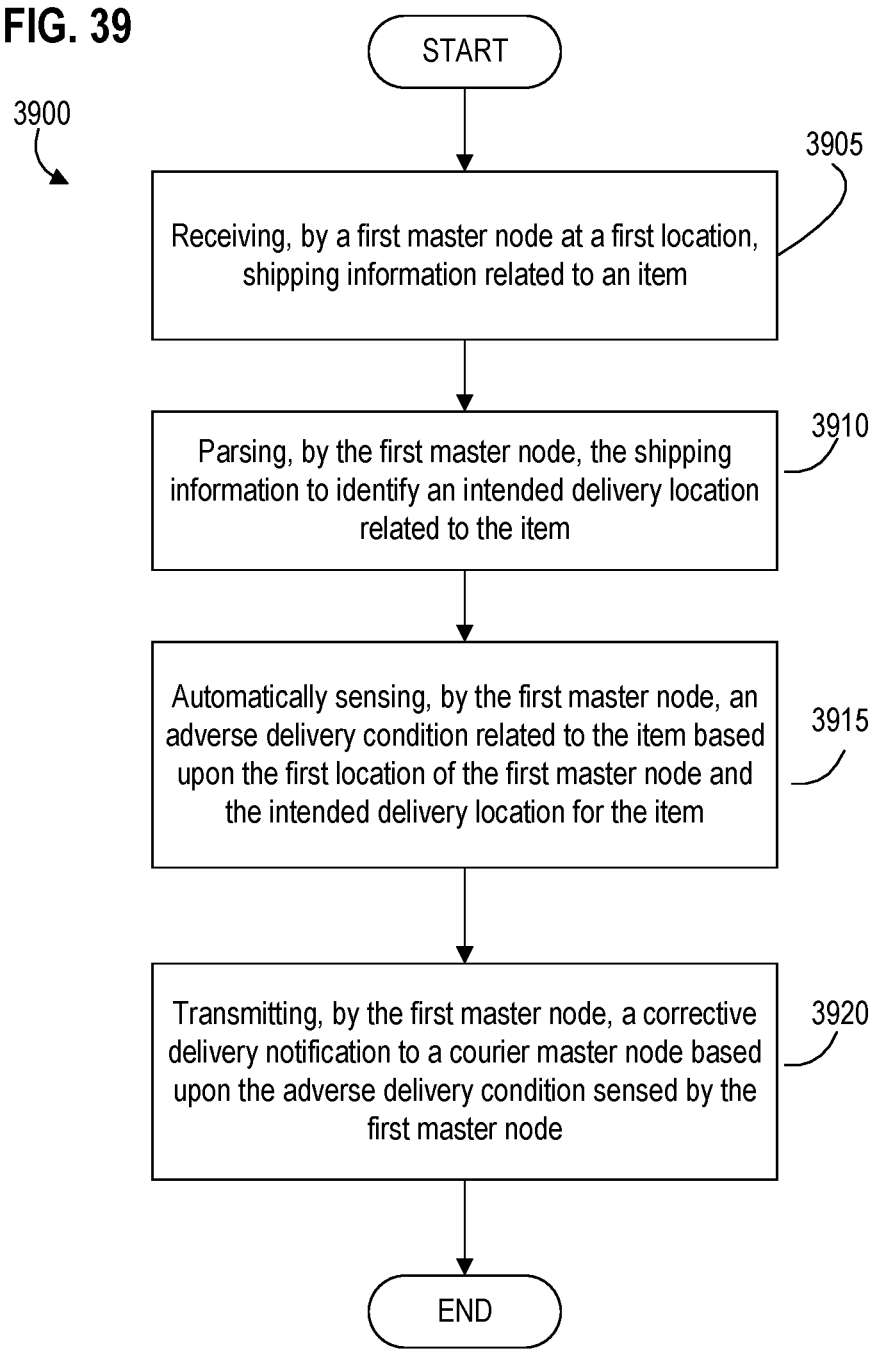

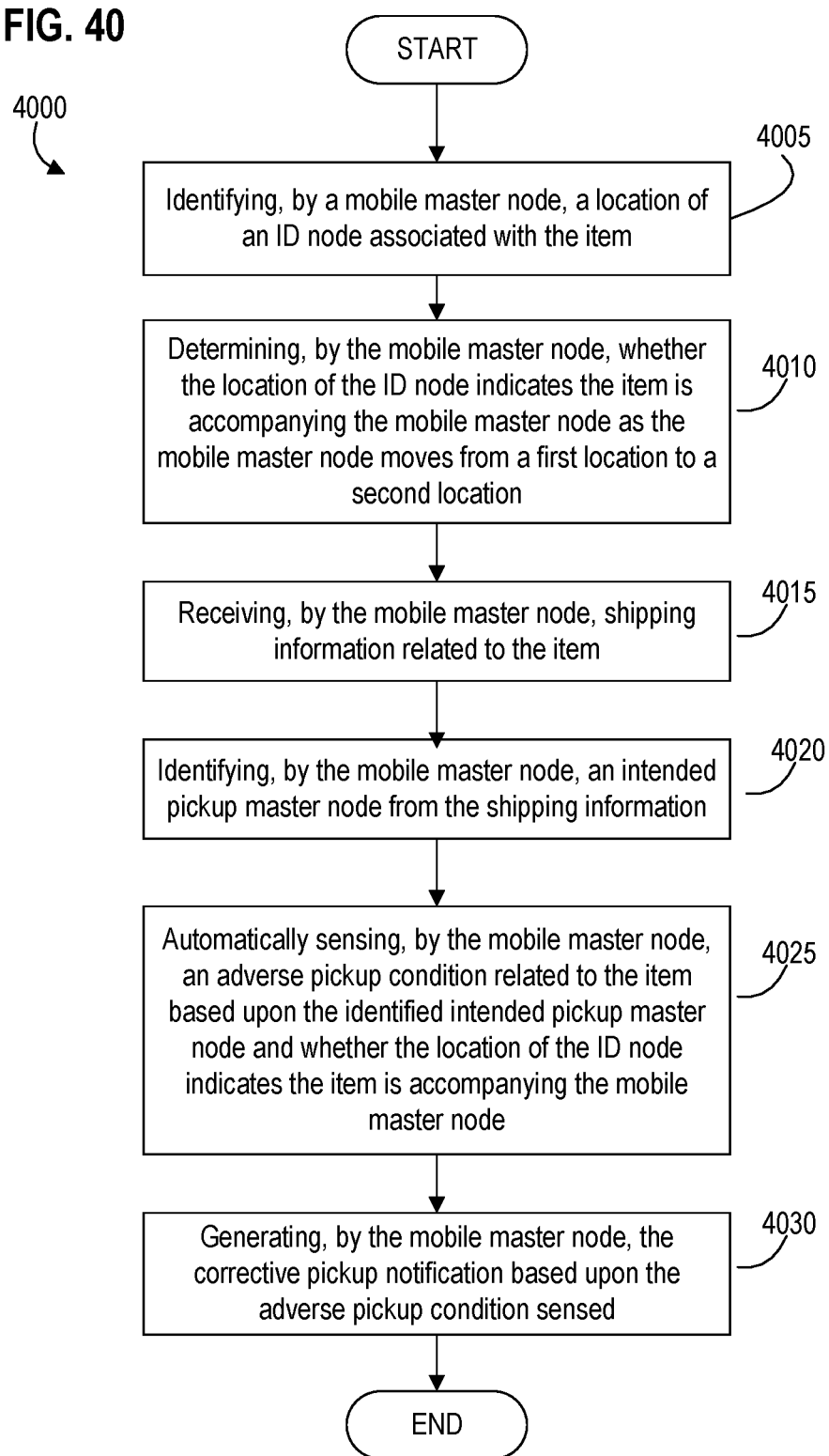

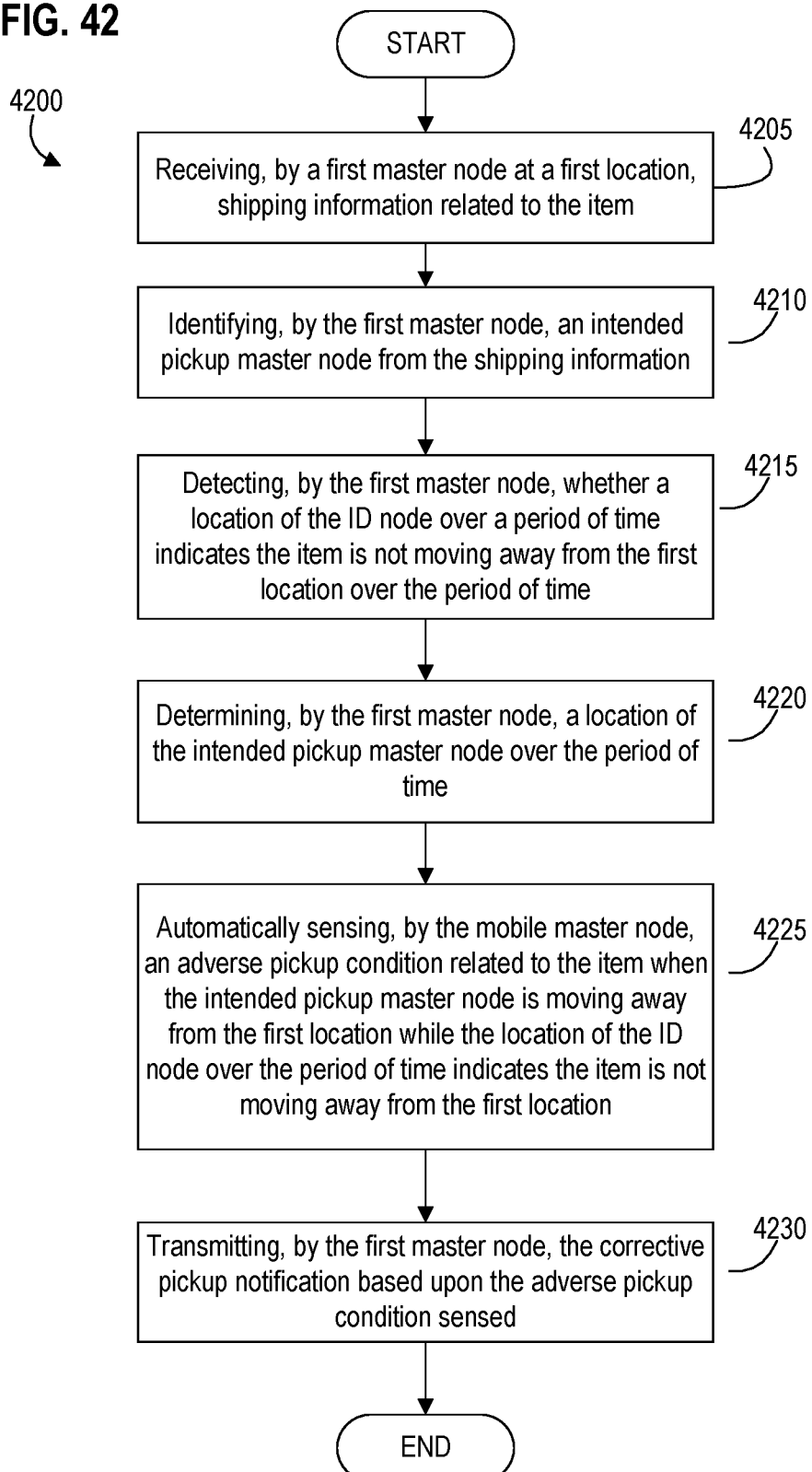

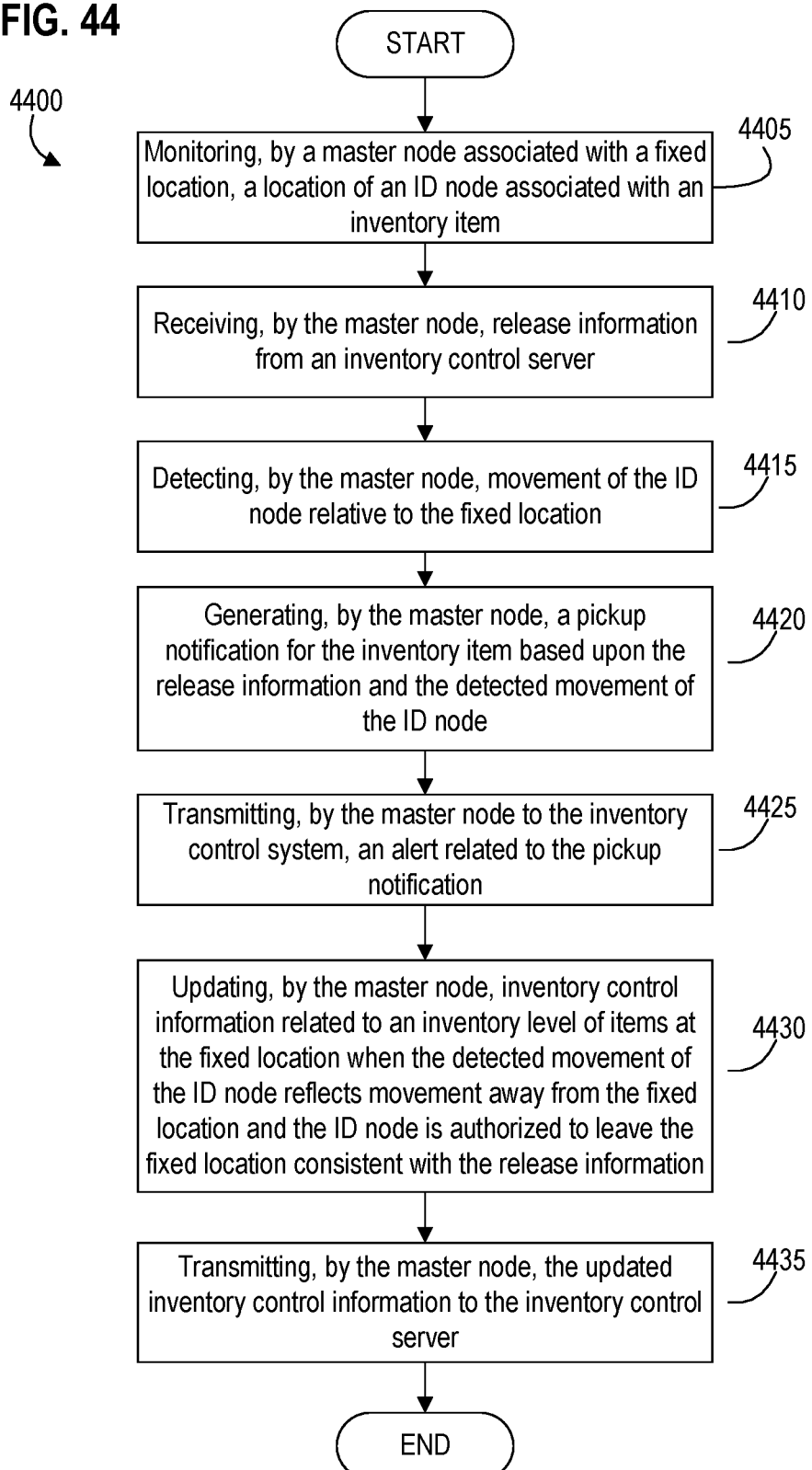

METHODS, APPARATUS, AND SYSTEMS FOR TRANSMITTING A CORRECTIVE PICKUP NOTIFICATION FOR A SHIPPED ITEM ACCOMPANYING AN ID NODE MOVING WITH A COURIER AWAY FROM A MASTER NODE

PRIORITY AND RELATED APPLICATIONS

The present application hereby claims the benefit of priority to related Provisional Patent Application No. 62/113,923 and entitled "Methods, Apparatus, and Systems for Enhanced Delivery and Pickup Management of Items Using Elements of a Wireless Node Network."

The present application is also related in subject matter to the following non-provisional patent applications where each also claims the benefit of priority to the same above-referenced provisional patent application: (1) Non-Provisional patent application Ser. No. 14/979,685 entitled "Enhanced Delivery Management Methods, Apparatus, and Systems for a Shipped Item using a Mobile Node-enabled Logistics Receptacle"; (2) Non-Provisional patent application Ser. No. 14/978,201 entitled "Improved Methods, Apparatus, and Systems for Generating a Corrective Pickup Notification for a Shipped Item Using a Mobile Master Node"; (3) Non-Provisional patent application Ser. No. 14/979,732 entitled "Improved Methods, Apparatus, and Systems for Transmitting a Corrective Pickup Notification for a Shipped Item to a Courier Master Node"; (4) Non-Provisional patent application Ser. No. 14/979,814 entitled "Improved Methods, Apparatus, and Systems for Generating a Corrective Pickup Notification for a Shipped Item Based Upon an Intended Pickup Master Node"; (5) Non-Provisional patent application Ser. No. 14/982,245 entitled "Improved Methods, Apparatus, and Systems for Transmitting a Corrective Pickup Notification for a Shipped Item Accompanying an ID Node Based Upon Intended Pickup Master Node Movement"; and (6) Non-Provisional patent application Ser. No. 14/982,291 entitled "Improved Methods, Apparatus, and Systems for Transmitting a Generating a Pickup Notification Related to an Inventory Item."

FIELD OF THE DISCLOSURE

The present disclosure generally relates to systems, apparatus and methods in the field of tracking items (e.g., an object, a package, a person, a piece of equipment) and, more particularly, to various aspects involving systems, apparatus and methods for enhanced delivery and/or pickup management of an item using one or more elements of an adaptive, context-aware wireless node network as it relates to selective release of the item, corrective delivery/pickup notifications for an item, and pickup notifications related to an inventory item.

BACKGROUND

Asset management has always been an important part of commerce, and the ability to identify an item and locate its whereabouts may be considered core to companies that ship items from one location to another. For example, tracking packages is important to organizations of all kinds, whether it be a company keeping track of inventory to be sold in its stores, or a package delivery provider keeping track of packages being transported through its delivery network. To provide quality service, an organization typically creates and maintains a highly organized network for tracking its items—packages, people, objects, etc. Effective management of such networks allows lower cost, reduced delivery time, and enhanced customer service. And efficient deployment of the network helps manage costs.

In addition to tracking packages, parties that ship and receive packages may also need information regarding the conditions of the packages, such as the temperature and humidity of the package. For example, a customer that has ordered a box of wine may want to monitor the temperature of the contents of the box to determine if the temperature and/or humidity goes above or below a set range. Likewise, the party that ships the package may also want to monitor the conditions of the package to ensure that the content arrives in the proper condition.

Conventionally, this tracking function may be provided by a variety of known mechanisms and systems. Machine-readable barcodes are one way organizations keep track of items. A retailer, for example, may use bar codes on items in its inventory. For example, items to be sold in a retailer's store may each be labeled with a different machine-readable bar code. In order to keep track of inventory, the retailer typically scans or otherwise captures an image of the bar code on each item so that a back-end part of the retailer's operation can keep track of what is coming in and leaving their possession from suppliers. In addition, when an item is sold to a consumer, the bar code for that item is scanned or captured to track sales and inventory levels.

Similarly, a package delivery provider may utilize machine-readable bar codes by associating a bar code with packages to be delivered to a recipient. For example, a package may have a bar code corresponding to a tracking number for that package. Each time the package goes through a transit checkpoint (e.g., the courier taking initial control of the package, the package being temporarily placed in a storage facility while being moved from a pickup point to a delivery location, and the package being delivered to the recipient, etc.), the package's bar code may be scanned. Bar codes, however, have the disadvantage that personnel must manually scan each bar code on each item in order to effectively track the items.

Radio-frequency identification (RFID) tags are another known mechanism for tracking items. In contrast to barcodes, RFID tags do not usually require manual scanning. For example, in a retail context, an RFID tag on an inventory item may be able to communicate with an electronic reader that detects items in a shopping cart and adds the cost of each item to a bill for the consumer. The RFID tag usually transfers a coded number when queried or prompted by the reader. RFID tags have also been used to track items such as livestock, railroad cars, trucks, and even airline baggage. These tags typically only allow for basic tracking, but do not provide a way to improve asset management using information about the environment in which the items are tracked.

Sensor-based tracking systems are also known which can provide more information than RFID systems. Shippers, carriers, recipients, and other parties often wish to know the location, condition, and integrity of shipments before, during, and after transport to satisfy quality control goals, meet regulatory requirements, and optimize business processes. However, such systems are typically expensive given the complexity of the sensors, and may provide extraneous and redundant item information.

Further problems exist with managing delivery of an item to help ensure the item is delivered to the appropriate destination. For example, at times, a courier may gather an item from a logistics receptacle (e.g., a storage area on a delivery van) and unintentionally drop off the item at a location that is not the intended delivery location for the item. Delivery restrictions, requirements, and conditions may inadvertently be violated or unintentionally disregarded at times leading to potential loss of the item for the recipient and/or costs related to replacing the item or making a lengthy special trip to correct the delivery issue long after the issue arose.

To address these requirements, a system is needed that may monitor data regarding objects (such as shipped items, personnel, or equipment) and efficiently extend visibility of such objects as well as manage logistics operations based on monitoring objects and enhance how other logistics elements operate in response. Thus, there remains a need for an improved system that may provide more extensive and robust identification, tracking, and management of objects and do so in a cost effective manner.

SUMMARY

In the following description, certain aspects and embodiments are generally directed to providing a technical solution for a logistics monitoring operation that transmits a corrective pickup notification related to an item being shipped (such as a package or other object being transported between different locations) based upon detected locations and movement of other nodes relative to a first master node that uses onboard hardware and executing programmatic code to automatically sense an issue with delivery of the item being shipped. It should be understood that the aspects and embodiments, in their broadest sense, could be practiced without having one or more features of these aspects and embodiments as described in more detail below. It should also be understood that these aspects and embodiments are merely exemplary.

For example, one aspect of the disclosure focuses on an improved movement-based method for transmitting a corrective pickup notification related to an item being shipped. In general, the method begins with a first master node at a first location receivingshipping information related to the item. The method then has the first master node identifying an intended pickup master node from the shipping information received and identifying a location of an ID node associated with the item over a period of time. The method proceeds with the first master node detecting whether the location of the ID node over that period of time indicates the item is moving away from the first location. The method continues with the first master node identifying a courier master node accompanying the ID node as the ID node moves away from the first location. The method then has the first master node automatically sensing an adverse pickup condition related to the item when the identified courier master node does not correspond to the intended pickup master node and the detected location of the ID node over the period of time indicates the item is moving away from the first location. Thereafter, the method has the first master node transmitting the corrective pickup notification to a second logistics device (e.g., a logistics server, a courier master node, an ID/master node device operated by the customer shipping the item, or an ID/master node device operated by the recipient of the item) based upon the adverse pickup condition sensed.

Another aspect of the disclosure focuses on a master node apparatus disposed at a first logistics location that operative to transmit a corrective pickup notification related to an item being shipped based upon detected movement. The master node apparatus generally includes a node processing unit, a node memory storage, location circuitry, and a communication interface. Each of the node memory storage, location circuitry, and communication interface is operatively coupled to the node processing unit. Further, the node memory storage maintains delivery notification code for execution by the node processing unit. The location circuitry is operative to detect a current location of the master node apparatus and the communication interface is operative to access a first wireless communication path connecting the master node apparatus with at least an ID node associated with the item being shipped. The node processing unit of the master node apparatus, when executing the delivery notification code as maintained on the node memory storage, is programmatically transformed to be unconventionally operative to receive shipping information related to the item; identify an intended pickup master node from the shipping information; identify a location of the ID node associated with the item; detect whether the location of the ID node over a period of time indicates the item is moving away from the first logistics location; identify a courier master node accompanying the ID node as the ID node moves away from the first location; automatically sense an adverse pickup condition related to the item when the identified courier master node does not correspond to the intended pickup master node and the detected location of the ID node over the period of time indicates the item is moving away from the first logistics location; and transmit the corrective pickup notification to a second logistics related device based upon the adverse pickup condition sensed.

In still another aspect of the disclosure, an improved system is described for transmitting a corrective pickup notification related to an item being shipped based upon detected node movement. The system generally includes at least a logistics server in communication with a first master node disposed at a first logistics location (e.g., such as a mail room, package storage area, a delivery address, or the like). The logistics server maintains a copy of shipping information related to the item being shipped and an ID node associated with the item being shipped. The first master node is in communication with the logistics server but also is in communication with the ID node associated with the item being shipped. In more detail, the first master node generally comprises a node processing unit, a node memory storage, location circuitry that can detect a current location of the first master node, and two different communication interfaces. Each of the node memory storage, location circuitry, and the two communication interfaces is operatively coupled to the node processing unit. The node memory storage maintains delivery notification code for execution by the node processing unit. A first of the communication interfaces is operative to access a first wireless communication path connecting the first master node with at least the ID node associated with the item being shipped. A second of the communication interfaces is operative to access a second wireless communication path connecting the first master node with the logistics server, the first wireless communication path being distinct from the second wireless communication path.

In operation, the system's logistics server transmits the shipping information to the first master node using a message transmitted over the second wireless communications path. The node processing unit of the system's first master node, when executing the delivery notification code, is programmatically transformed to become unconventionally operative to receive the shipping information from the logistics server over the second communication interface; identify an intended pickup master node from the shipping information received from the logistics server; identify a location of the ID node over a period of time; detect whether the location of the ID node over the period of time indicates the item is moving away from the first logistics location of the first master node; identify a courier master node accompanying the ID node as the ID node moves away from the first location; automatically sense an adverse pickup condition related to the item when the identified courier master node does not correspond to the intended pickup master node and the detected location of the ID node over the period of time indicates the item is moving away from the first logistics location of the first master node; and transmit the corrective pickup notification to a second logistics related device based upon the adverse pickup condition sensed.

In yet another aspect of the disclosure, another improved system is described for transmitting a corrective pickup notification related to an item being shipped based upon detected node movement. This additional system generally includes a logistics server and a first master node disposed at a first logistics location along a transit path for the item being shipped (e.g., a package sorting facility along a shipment route for the particular item being shipped, etc.). The logistics server maintains a server copy of shipping information related to the item being shipped and an ID node associated with the item being shipped. The first master node is in communication with the logistics server and in communication with the ID node associated with the item being shipped. In more detail, the system's first master node comprises a node processing unit, a node memory storage, location circuitry for detecting a current location of the system's first master node, and two different communication interfaces for accessing respectively different wireless communication paths. Each of the node memory storage, the location circuitry, and the two communication interfaces is operatively coupled to the first master node's node processing unit. The node memory storage maintains delivery notification code for execution by the node processing unit of the first master node and a local copy of the shipping information related to the item being shipped and the ID node associated with the item being shipped. A first of the communication interfaces is operative to access a first wireless communication path connecting the first master node with at least the ID node associated with the item being shipped, while the second of the communication interfaces is operative to access a second wireless communication path connecting the first master node with the logistics server. In this system, the first wireless communication path is distinct from the second wireless communication path.

The system's logistics server is operative to transmit the server copy of the shipping information to the first master node as part of a preloading operation. In response and under the control of the executing delivery notification code, the node processing unit of the first master node is programmatically transformed to become unconventionally operative to receive the server copy of the shipping information from the logistics server over the second communication interface as part of the preloading operation; store the received server copy of the shipping information as the local copy of the shipping information to complete the preloading operation; identify an intended pickup master node from the local copy of the shipping information; incrementally identify a plurality of locations of the ID node over a period of time; detect whether the locations of the ID node over the period of time indicate the item is moving away from the first logistics location of the first master node; identify a courier master node accompanying the ID node as the ID node moves away from the first location; automatically sense an adverse pickup condition related to the item when the identified courier master node does not correspond to the intended pickup master node and the identified locations of the ID node over the period of time indicates the item is moving away from the first logistics location of the first master node; and transmit the corrective pickup notification to a second logistics related device based upon the adverse pickup condition sensed.

Each of these aspects respectively effect improvements to the technology of tracked and monitored items that require delivery and enhancements to better identify delivery issues and proactively avoid delivery issues. Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIG. 38 is a flow diagram illustrating an exemplary method for generating a corrective delivery notification related to an item by a mobile master node involved with delivery of the item in accordance with an embodiment of the invention;

FIG. 39 is a flow diagram illustrating an exemplary method for transmitting a corrective delivery notification related to an item by a master node associated with a location in accordance with an embodiment of the invention;

FIG. 40 is a flow diagram illustrating an exemplary method for generating a corrective pickup notification related to an item by a mobile master node in accordance with an embodiment of the invention;

FIG. 42 is a flow diagram illustrating an alternative exemplary method for transmitting a corrective pickup notification related to an item by a master node associated with a location in accordance with an embodiment of the invention;

FIG. 44 is a flow diagram illustrating an exemplary method for generating a pickup notification related to an inventory item using an exemplary master node associated with a fixed location in accordance with an embodiment of the invention.

DESCRIPTION OF THE EMBODIMENTS

Figure 1:
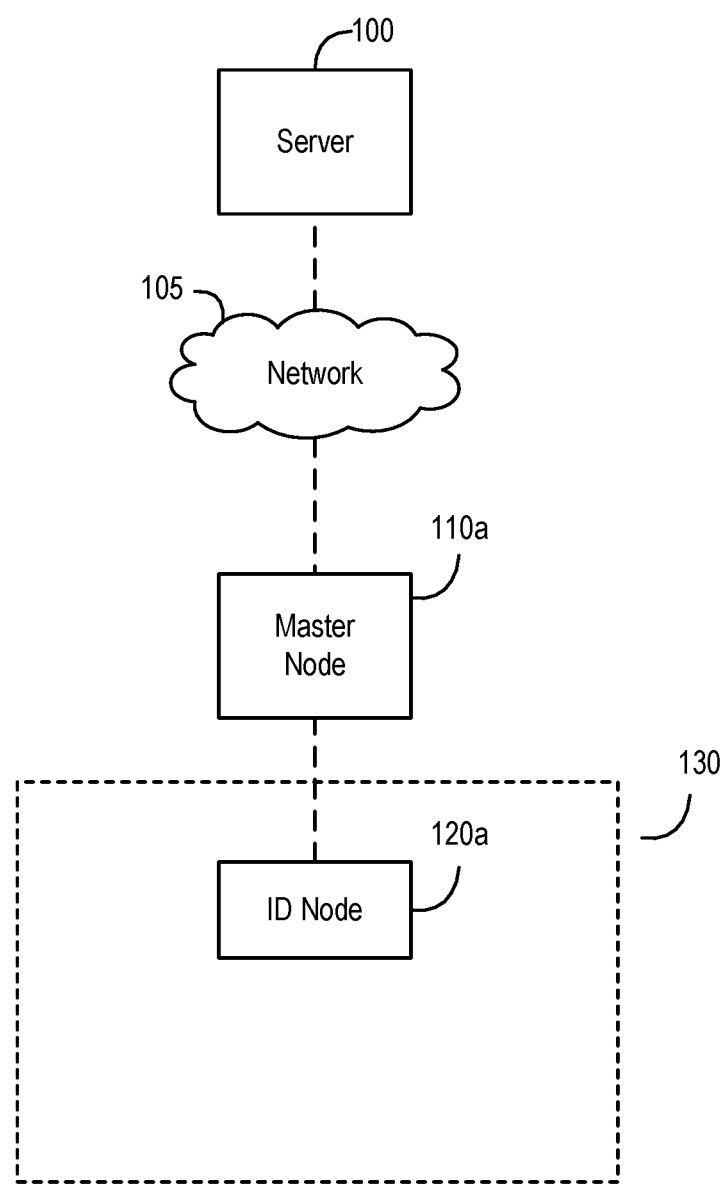
FIG. 1 is a diagram of an exemplary wireless node network in accordance with an embodiment of the invention.

Reference will now be made in detail to exemplary embodiments. Wherever possible, the same reference numbers are used in the drawings and the description to refer to the same or like parts.

In general, the following describes various embodiments of a contextually aware hierarchical wireless node network that may be managed, operated, and applied by principles as set forth herein. In general, embodiments of the wireless node network may include one or more lower level devices or nodes (e.g., an ID node) that rely on shorter-range communication with a higher level device or node (e.g., a master node), which is operative to communicate with a server over a different communication path while the lower level node is unable to communicate directly with the server. Those skilled in the art will appreciate that such a hierarchy of different functional communicating network components (generally referred to as network devices) may be characterized as a network of nodes. Those skilled in the art will appreciate that in some embodiments, the wireless node network may include the server as well as different wireless nodes despite the fact that the server may not be a dedicated wireless component. In other embodiments, the network may include similar types of wireless nodes or different types of wireless nodes.

Further, those skilled in the art will appreciate that each embodiment described herein effects improvements to particular technologies, such as enhanced delivery management that involves selective release of an item for delivery and generating and/or transmitting corrective delivery notifications using an adaptive, context-aware wireless node network of node elements. Each embodiment describes a specific technological application of one or more nodes that operate in such a wireless node network where the specific technological application improves or otherwise enhances such technical fields as explained and supported by the disclosure that follows.

Those skilled in the art will understand through the following detailed description that the nodes may be associated with items (e.g., an object, a package, a person, a piece of equipment) and may be used to identify, locate, track, and manage the items while being dynamically programmed during operation of the network and while the items move along an anticipated path (e.g., a transit path from an origin point to a destination point). The following further describes various embodiments of a wireless node network, exemplary ways to manage components of a wireless node network, exemplary ways to better determine the location of components of a wireless node network, and applications of a wireless node network to enhance logistics operations that rely upon a wireless node network.

Wireless Node Networks

FIG. 1 illustrates a basic diagram of an exemplary wireless node network in accordance with an embodiment of the invention. The exemplary network shown in FIG. 1 comprises a server 100 connected to a network 105, which is also operatively connected to different network components, such as a master node 110a and indirectly to an ID node 120a through master node 110a. Master node 110a is typically connected to an ID node 120a via short-range wireless communications (e.g., Bluetooth® formatted communications). Master node 110a is typically connected to server 100 through network 105 via longer-range wireless communication (e.g., cellular) and/or medium range wireless communication (e.g., wireless local area data networks or Wi-Fi). ID node 120a is typically a low cost device that may be easily placed into a package, be integrated as part of packaging, or otherwise associated with an item to be tracked and located, such as package 130, a person, or object (e.g., vehicle, etc.). Generally, an ID node is capable of communicating directly with a master node but incapable of communicating directly with the server, while a master node is capable of communicating directly with the server and separately and directly communicating with other nodes (such as an ID node or another master node). The ability to deploy a hierarchy of nodes within an exemplary wireless node network to distribute tasks and functions at the different levels in an efficient and economical manner helps to facilitate a wide variety of adaptive locating, tracking, managing, and reporting applications using such a network of nodes as discussed in more detail below.

In general, the lower cost, lower complexity ID node 120a is managed by the higher complexity master node 110a and server 100 as part of keeping track of the location of ID node 120a (and the associated item), thereby providing intelligent, robust, and broad visibility about the location and status of ID node 120a. In a typical embodiment, ID node 120a is first associated with an item (e.g., package 130, a person, or object). As ID node 120a moves with the item, the ID node 120a becomes associated with the master node 110a, and the server 100 is updated with such information. Further movement of the ID node 120a and item may cause the ID node 120a to disassociate with master node 110a and be handed off to become associated another master node (not shown), after which the server 100 is again updated. As such, the server 100 generally operates to coordinate and manage information related to the ID node 120a as the item physically moves from one location to another. Further details of the architecture and functionality of an embodiment of an exemplary ID node and master node as described below in more detail with respect to FIGS. 3 and 4, while exemplary server 100 is described below in more detail with respect to FIG. 5.

While server 100 is shown connecting through network 105, those skilled in the art will appreciate that server 100 may have a more direct or dedicated connections to other components illustrated in FIG. 1, such as master node 110a, depending upon implementation details and desired communication paths. Furthermore, those skilled in the art will appreciate that an exemplary server may contain a collection of information in a database (not shown in FIG. 1), while multiple databases maintained on multiple server platforms or network storage servers may be used in other embodiments to maintain such a collection of information. Furthermore, those skilled in the art will appreciate that a database may be implemented with cloud technology that essentially provides networked storage of collections of information that may be directly accessible to devices, such as master node 110a.

Network 105 may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network that interconnects server 100 and other components shown in FIG. 1 in an embodiment of the present invention.

Master node 110a and ID node 120a are types of nodes. A node is generally an apparatus or device used to perform one or more tasks as part of a network of components. An embodiment of a node may have a unique identifier, such as a Media Access Control (MAC) address or an address assigned to a hardware radio like an Internet Protocol 6 (IPv6) identifier. In some embodiments, the node's unique identifier may be correlated to a shipment identifier (e.g., a shipment tracking number in one example), or may itself be a shipment's tracking reference.

An ID node, such as ID node 120a, is generally a low cost active wireless device. In one embodiment, an exemplary ID node is a transceiver-based processing or logic unit having a short-range radio with variable RF characteristics (e.g., programmable RF output power range, programmable receiver sensitivity), memory accessible by the processing unit, a timer operatively coupled to the processing unit, and a power source (e.g., a battery) that provides power for the circuitry of the ID node. For example, the physical implementation of an exemplary ID node may be small, and, thus, amenable to integration into a package, label, container, or other type of object. In some implementations of an ID node, the node is rechargeable while other implementations do not permit recharging the power source for the ID node. In other implementations, the ID node is environmentally self-contained or sealed so as to enable robust and reliable operations in a variety of environmentally harsh conditions.

A master node, such as master node 110a, generally serves as an intelligent bridge between the ID node 120a and the server 100. Accordingly, a master node is generally more sophisticated than an ID node. In one example embodiment, an exemplary master node is a device having a processing or logic unit, a short-range radio (with may have variable RF characteristics) used for communicating with other nodes (ID nodes and other master nodes), a medium and/or long-range radio for communication with the server 100, memory accessible by the processing unit, a timer operatively coupled to the processing unit, and a power source (e.g., a battery or a wired power supply connection) that provides power for the circuitry of the master node. The exemplary master node, such as master node 110a, may be positioned in a known fixed location or, alternatively, be a mobile unit having dedicated location positioning circuitry (e.g., GPS circuitry) to allow the master node to determine its location by itself.

While the embodiment illustrated in FIG. 1 shows only a single master node and a single ID node, those skilled in the art will appreciate that a wireless network consistent with an embodiment of the invention may include a wide array of similar or different master nodes that each communicate with the server 100 and/or other master nodes, and a wide variety of similar or different ID nodes. Thus, the exemplary network shown in FIG. 1 is a basic embodiment, while the exemplary network shown in FIG. 2 is a more detailed exemplary wireless node network in accordance with another embodiment of the invention.

Figure 2:
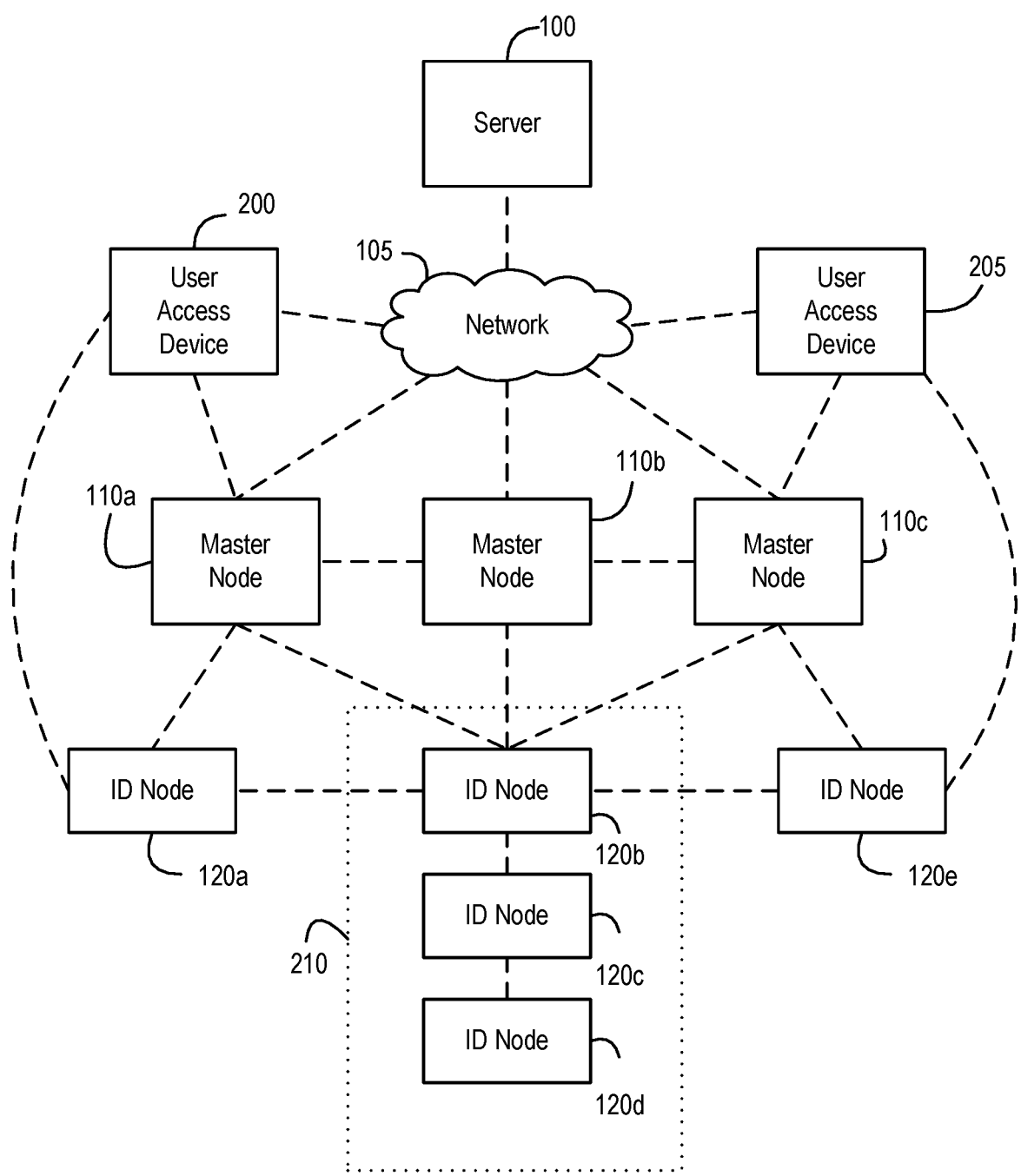
FIG. 2 is a more detailed diagram of an exemplary wireless node network in accordance with an embodiment of the invention.

Referring now to FIG. 2, another exemplary wireless node network is shown including server 100 and network 105. Here, master nodes 110a, 110b, 110c are deployed and connected to network 105 (and by virtue of those respective connections, to server 100) as well as to each other. ID nodes 120a, 120b, 120e are shown as connectable or operative to communicate via different paths to various master nodes. However, ID nodes 120c and 120d are shown in FIG. 2 connected to ID node 120b but not to any of the master nodes. This may be the case if, for example, ID nodes 120b, 120c, 120d are associated with different items (e.g., packages) within a larger container 210 (or grouped together on a pallet). In such an example, only ID node 120b may remain within the wireless communication range of any master node. This may, for example, be because of the positions of the different ID nodes within the container relative to the closest master node, adverse RF shielding caused by the container, adverse RF shielding caused by packaging of the item, or adverse RF shielding caused by other proximate material that interferes with radio transmissions (e.g., several packages of metal items between the ID node and any master node outside the container). Thus, in the illustrated configuration of the exemplary network shown in FIG. 2, ID nodes 120c and 120d may be out of range from the master nodes, yet still have an operative communication path to a master node through ID node 120b.

Indeed, in one example, prior to placement within container 210, ID node 120b may actually be a master node but the changed RF environment when placing it in container 210 may interfere with the master node's ability to locate itself via location signals (e.g., GPS signals) and cause the master node to temporarily operate as an ID node while still providing communications and data sharing with other ID nodes in container 210.

User access devices 200, 205 are also illustrated in FIG. 2 as being able to connect to network 105, master nodes, and ID nodes. Generally, user access devices 200 and 205 allow a user to interact with one or more components of the exemplary wireless node network. In various embodiments, user access devices 200, 205, may be implemented using a desktop computer, a laptop computer, a tablet (such as an Apple iPad® touchscreen tablet), a personal area network device (such as a Bluetooth® device), a smartphone (such as an Apple iPhone®), a smart wearable device (such as a Samsung Galaxy Gear™ smartwatch device, or a Google Glass™ wearable smart optics) or other such devices capable of communicating over network 105 with server 100, over a wired or wireless communication path to master node and ID nodes. Thus, an exemplary user access device may be a mobile type of device intended to be easily moved (such as a tablet or smartphone), and may be a non-mobile type of device intended to be operated from a fixed location (such as a desktop computer).

As shown in FIG. 2, user access devices 200, 205 are coupled and in communication with network 105, but each of them may also be in communication with each other or other network components in a more direct manner (e.g., via near field communication (NFC), over a Bluetooth® wireless connection, over a Wi-Fi network, dedicated wired connection, or other communication path).

In one example, a user access device, such as device 200 or 205, may facilitate associating an ID node (such as ID node 120a) with the tracking number of a package at the start of a shipment process, coordinating with the server 100 to check on the status and/or location of the package and associated ID node during transit, and possibly retrieving data from a master node or ID node related to the shipped package. Thus, those skilled in the art will appreciate that a user access device, such as devices 200, 205, are essentially interactive communication platforms by which a user may initiate shipment of an item, track an item, determine the status and location of an item, and retrieve information about an item.

An exemplary user access device, such as device 200 or 205, may include sufficient hardware and code (e.g., an app or other program code section or sections) to operate as a master node or an ID node in various embodiments as discussed in more detail below. For example, device 200 may be implemented as a mobile smartphone and functionally may operate as an exemplary ID node that broadcasts advertising packet messages to other ID nodes or master nodes for association and sharing data with such nodes. In another example, device 200 is implemented as a mobile smartphone and may operate as an exemplary master node that communicates and associates with ID nodes and other master nodes, as described herein, and communicates with the server 100. Thus, those skilled in the art will appreciate an exemplary ID node in FIG. 3 and an exemplary master node in FIG. 4, and their respective parts, code and program modules, may be implemented with an appropriately programmed user access device, such as device 200 or 205. Thus, the following description of an exemplary ID node in FIG. 3 and an exemplary master node in FIG. 4 will be applicable to a user access device operating as an ID node or a master node, respectively.

ID Node

Figure 3:
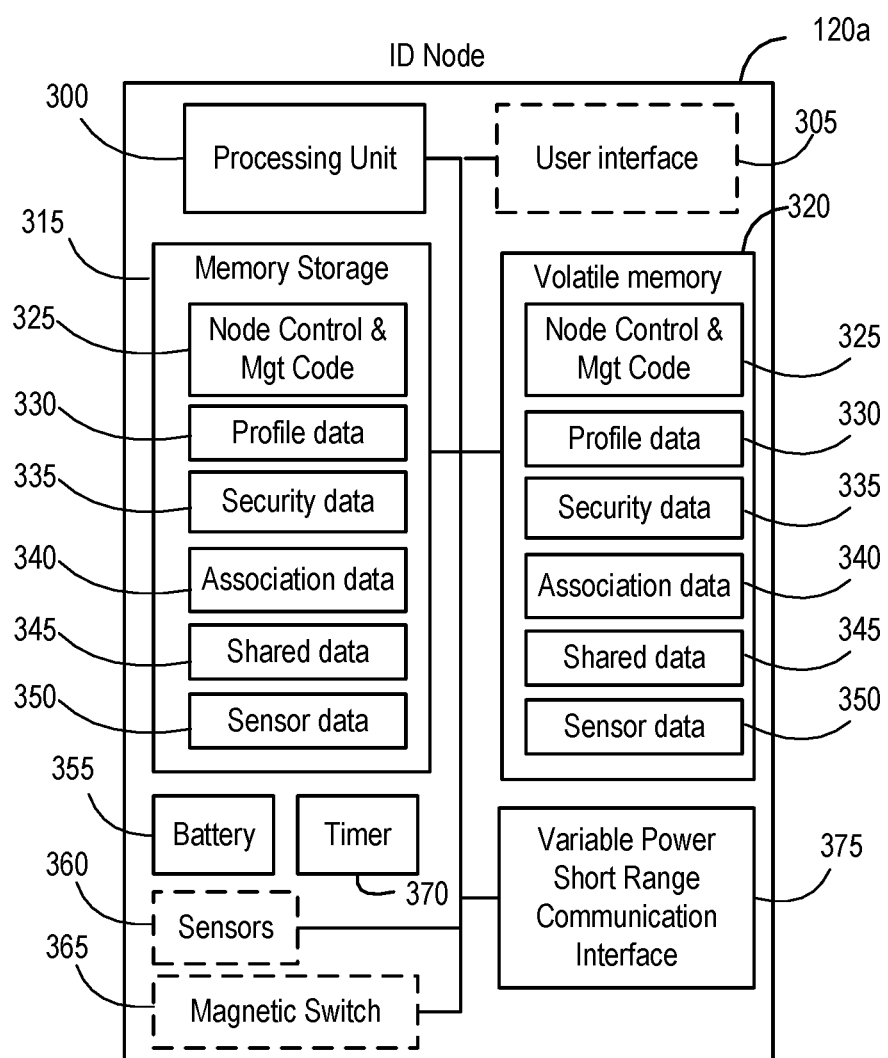
FIG. 3 is a more detailed diagram of an exemplary ID node device in accordance with an embodiment of the invention.

FIG. 3 is a more detailed diagram of an exemplary ID node device in accordance with an embodiment of the invention. As previously described, one embodiment of an ID node includes a transceiver-based processing or logic unit having a short-range radio with variable RF characteristics (e.g., programmable RF output power range, programmable receiver sensitivity), memory accessible by the processing unit, a timer operatively coupled to the processing unit, and a power source (e.g., a battery) that provides power for the circuitry of the ID node. Referring now to the more detailed embodiment of FIG. 3, exemplary ID node 120a is shown to comprise a processing or logic unit 300 coupled to a variable power short-range communication interface 375, memory storage 315, volatile memory 320, timer 370, and battery 355. Those skilled in the art will appreciate that processing unit 300 is logic, such as a low power consumption microcontroller, that generally performs computations on data and executes operational and application program code and other program modules or sections thereof within the ID node 120a. As such, exemplary processing unit 300 operates as a transceiver-based processing core of ID node 120a.

Those skilled in the art will also appreciate that exemplary ID node 120a is a hardware-based component that may be implemented with a single processor or logic unit, such as unit 300. In one embodiment, processing unit 300 may be implemented with an Intel® 8051 CPU Core and associated peripheral circuitry as dictated by the needs of the particular application. Less complex microcontrollers or discrete circuitry may be used to implement processing unit 300 as well as more complex and sophisticated microprocessors. Additionally, exemplary processing unit 300 may be integrated into a single chip transceiver used as a core of ID node 120a.

The variable power short-range communication interface 375 of ID node 120a is generally a programmable radio and an omni-directional antenna coupled to the processing unit 300. In other embodiments, interface 375 may use an antenna with a different antenna profile when directionality may be desired. Examples of variable power short-range communication interface 375 may include other interfacing hardware (not shown) for operatively coupling the device to a specific short-range communication path (e.g., a Bluetooth® Low Energy (BLE) connection path communicating at 2.4 GHz).

In one embodiment, various RF characteristics of the radio's transceiver, such as the RF output power and/or the RF receiver sensitivity may be dynamically and programmatically varied under control of processing unit 300. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal depending upon a desired implementation and anticipated use of ID node 120a. As will be explained in more detail below, some embodiments may use Broadcast Profile having parameters that may be programmatically altered or adjusted. In other words, embodiments of ID node 120a (or any other ID node) may have programmatically adjustable RF characteristics (such as an adjustable RF output signal power, an adjustable RF receiver sensitivity, the ability to switch to a different frequency or frequency band, etc.).

The battery 355 for ID node 120a is a type of power source that generally powers the circuitry implementing ID node 120a. In one embodiment, battery 355 may be a rechargeable power source. In other embodiments, battery 355 may be a non-rechargeable power source intended to be disposed of after use. In some embodiments of an ID node, the power source may involve alternative energy generation, such as a solar cell.

The timer 370 for ID node 120a generally provides one or more timing circuits used in, for example, time delay, pulse generation, and oscillator applications. In an embodiment where ID node 120a conserves power by entering a sleep or dormant state for a predetermined time period as part of overall power conservation techniques, timer 370 assists processing unit 300 in managing timing operations. Additionally, an embodiment may allow an ID node to share data to synchronize different nodes with respect to timer 370 and a common timing reference between nodes and the server.

An embodiment may implement ID node 120a to optionally include a basic user interface (UI) 305 indicating status and allowing basic interaction like start/stop. In one embodiment, the UI 305 may be implemented with status lights, such as multi-mode LEDs. Different colors of the lights may indicate a different status or mode for the ID node 120a (e.g., an advertising mode (broadcasting), a scanning mode (listening), a current power status, a battery level status, an association status, an error, as sensed condition (e.g., exceeding a temperature threshold, exceeding a moisture threshold, and the like)). Other embodiments of an ID node may implement U! 305 in a more sophisticated manner with a graphics display or the like where such status or mode information may be displayed as well as one or more prompts.

In a further embodiment, an exemplary status light used as part of the UI 305 of an ID node may also indicate a shipment state. In more detail, an exemplary shipment state may include a status of the shipped item or a status of the item's current shipment journey from an origin to a destination.

An embodiment may also implement ID node 120a to optionally include one or more sensors 360. In some embodiments, an ID node implemented with one or more sensors 360 may be referred to as a Sensor node. Examples of sensor 360 may include one or more environmental sensors (e.g., pressure, movement, light, temperature, humidity, magnetic field, altitude, attitude, orientation, acceleration, etc.) and dedicated location sensors (e.g., GPS sensor, IR sensor, proximity sensor, etc.). Those skilled in the art will understand that additional types of sensors that measure other characteristics are contemplated for use as sensor 360. Additionally, those skilled in the art will understand that a Sensor node may include additional program features to manage the collection, storage, sharing, and publication of the captured sensor data.

An embodiment may further implement ID node 120a to optionally include one or more magnetic switches 365. A magnetic switch 365, such as a reed switch, generally operates to close or open an electrical path or connection in response to an applied magnetic field. In other words, magnetic switch 365 is actuated by the presence of a magnetic field or the removal of a magnetic field. Various applications, as discussed in embodiments described in more detail below, may involve the operation of ID node 120a having magnetic switch 365.

Consistent with the embodiment shown in FIG. 3, exemplary ID node 120a may be implemented based upon a Texas Instruments CC2540 Bluetooth® Low Energy (BLE) System-on-Chip, which includes various peripherals (e.g., timer circuitry, USB, USART, general-purpose I/O pins, IR interface circuitry, DMA circuitry) to operate as an ID node and, if necessary, to interface with different possible sensors and other circuitry (e.g., additional logic chips, relays, magnetic switches) that make up the ID node.

In additional embodiments, one skilled in the art will appreciate that similar functionality in an ID node may be implemented in other types of hardware. For example, ID node 110a may be implemented with specially optimized hardware (e.g., a particular application specific integrated circuit (ASIC) having the same operational control and functionality as node control and management code, as described below, discrete logic, or a combination of hardware and firmware depending upon requirements of the ID node, such as power, processing speed, level of adjustability for the RF characteristics, number of memory storage units coupled to the processor(s), cost, space, etc.

As noted above, ID node 120a includes memory accessible by the processing unit 300. Memory storage 315 and volatile memory 320 are each operatively coupled to processing unit 300. Both memory components provide programming and data elements used by processing unit 300. In the embodiment shown in FIG. 3, memory storage 315 maintains a variety of program code (e.g., node control and management code 325) and other data elements (e.g., profile data 330, security data 335, association data 340, shared data 345, sensor data 350, and the like). Memory storage 315 is a tangible, non-transient computer readable medium on which information (e.g., executable code/modules, node data, sensor measurements, etc.) may be kept in a non-volatile and non-transitory manner. Examples of such memory storage 315 may include a hard disk drive, ROM, flash memory, or other media structure that allows long term, non-volatile storage of information. In contrast, volatile memory 320 is typically a random access memory (RAM) structure used by processing unit 300 during operation of the ID node 120a. Upon power up of ID node 120a, volatile memory 320 may be populated with an operational program (such as node control and management code 325) or specific program modules that help facilitate particular operations of ID node 120a. And during operation of ID node 120a, volatile memory 320 may also include certain data (e.g., profile data 330, security data 335, association data 340, shared data 345, sensor data 350, and the like) generated as the ID node 120a executes instructions as programmed or loaded from memory storage 315. However, those skilled in the art will appreciate that not all data elements illustrated in FIG. 3 must appear in memory storage 315 and volatile memory 320 at the same time.

Node Control & Management Code

Generally, an embodiment of node control and management code 325 is a collection of software features implemented as programmatic functions or program modules that generally control the behavior of a node, such as ID node 120a. In an embodiment, the functionality of code 325 may be generally similar as implemented in different types of nodes, such as a master node, an ID node, and a sensor node. However, those skilled in the art will appreciate that while some principles of operation are similar between such nodes, other embodiments may implement the functionality with some degree of specialization or in a different manner depending on the desired application and use of the node.

In a general embodiment, exemplary node control and management code 325 may generally comprise several programmatic functions or program modules including (1) a node advertise and query (scan) logic manager (also referred to herein as a node communications manager), which manages how and when a node communicates; (2) an information control and exchange manager, which manages whether and how information may be exchanged between nodes; (3) a node power manager, which manages power consumption and aspects of RF output signal power and/or receiver sensitivity for variable short-range communications; and (4) an association manager focusing on how the node associates with other nodes. What follows is description of various embodiments of these basic program modules used by nodes.

Node Communications Manager—Advertising & Scanning

In an exemplary embodiment, the node advertise and query (scan) logic manager governs how and when a node should advertise (transmit) its address or query (scan) for the address of neighboring nodes. Advertising is generally done with a message, which may have different information in various parts (e.g., headers, fields, flags, etc.). The message may be a single or multiple packets.

In the exemplary embodiment, the "advertise" mode (as opposed to "query" or "scan" mode) is a default mode for an ID Node and has the node broadcasting or transmitting a message with its address and related metadata regarding the node. For example, in one embodiment, exemplary metadata may include information such as the RF output power level, a reference number, a status flag, a battery level, and a manufacturer name for the node.

Figure 6:
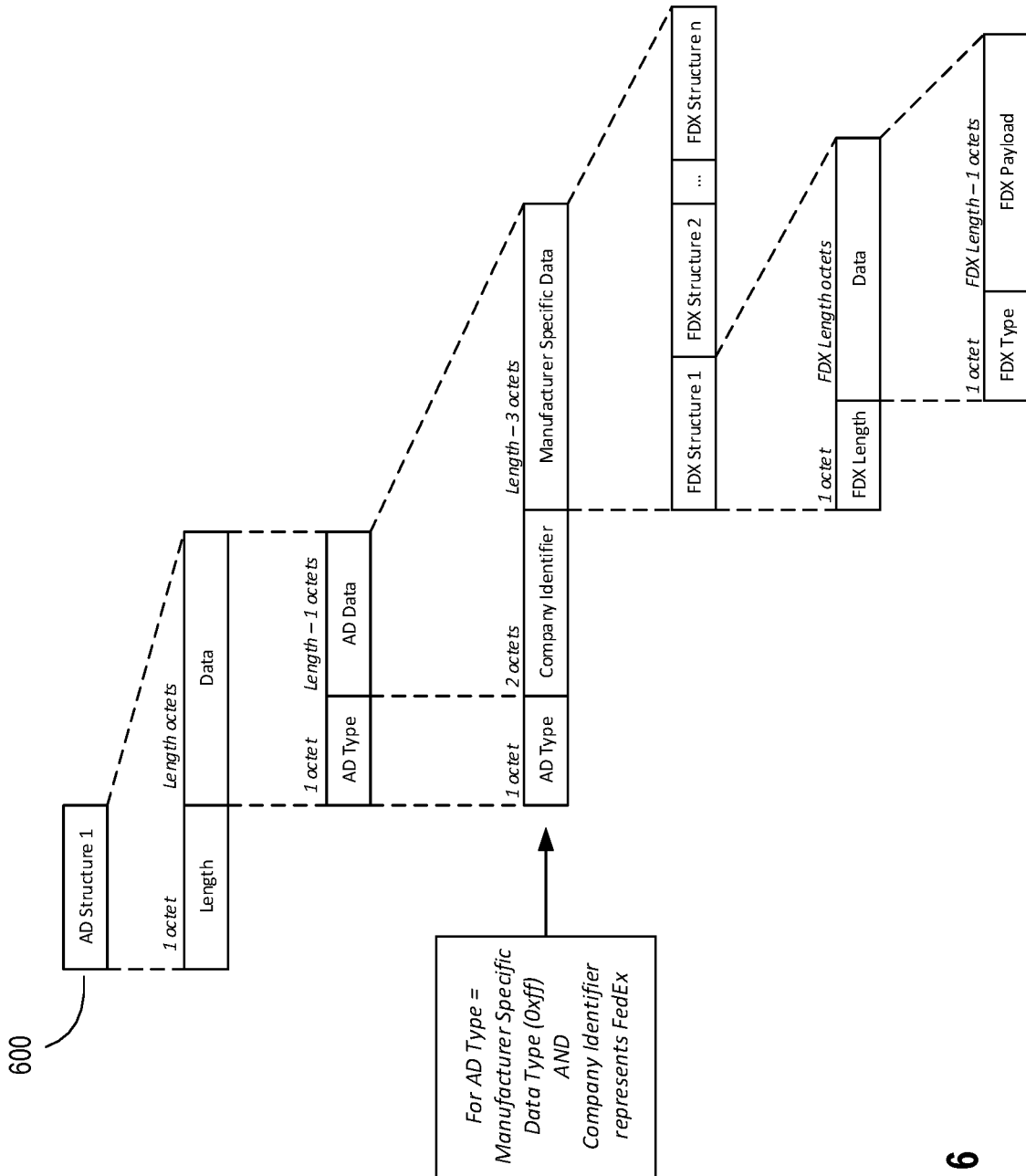
FIG. 6 is a diagram illustrating the structure or format of an exemplary advertisement data packet in accordance with an embodiment of the invention.

FIG. 6 is a diagram illustrating the structure or format of an exemplary advertisement data packet in accordance with a general embodiment of the invention. Referring now to FIG. 6, the structure of an exemplary advertisement data packet 600 broadcast as a signal or message from an ID node, such as ID node 120a, is shown. Packet 600 appears with an increasing level of detail showing exemplary metadata and a format that separately maintains distinct types of metadata in different parts of the packet. Different embodiments may include different types of metadata depending on the deployed application of the ID node.

Figure 7:
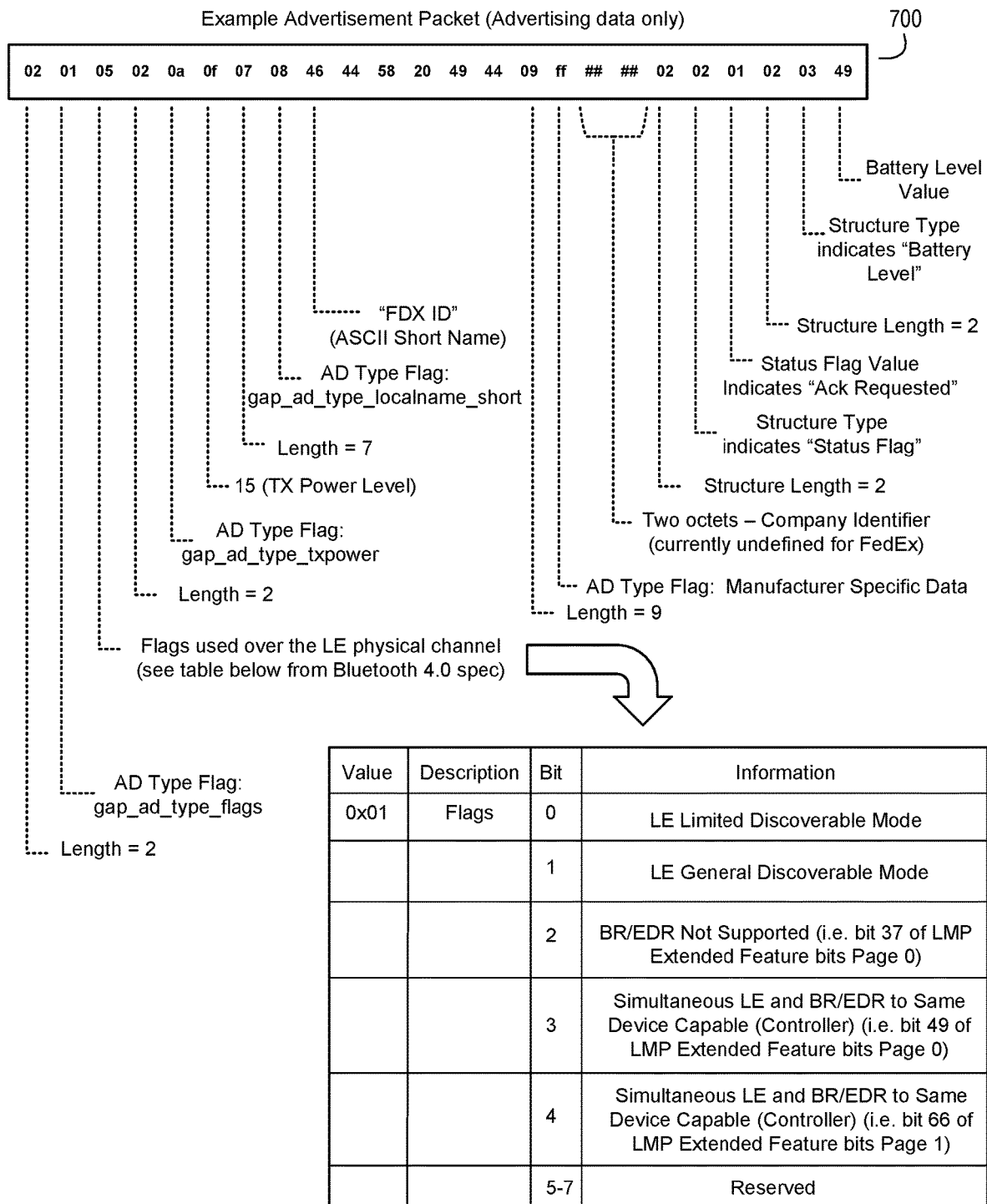
FIG. 7 is a diagram illustrating sample content for an exemplary advertisement data packet in accordance with an embodiment of the invention.

FIG. 7 is a diagram illustrating sample content for an exemplary advertisement data packet in accordance with an embodiment of the invention. Referring now to FIG. 7, an exemplary advertisement data packet 700 is illustrated with exemplary metadata including showing sample information such as the RF Output Power level (e.g., "TX Power Level"), a reference number (e.g., "'FDX ID' (ASCII Short Name)", a status flag (e.g., "Status Flag Value (indicates 'Ack Requested')"), a battery level (e.g., "Battery Level Value (Indicates 73% charge)", and a manufacturer name for the node (e.g., "Company Identifier (currently undefined for FedEx)"). In one embodiment, those skilled in the art will appreciate that the reference number may be omitted or obfuscated for security purposes.

In one embodiment, an exemplary advertising data packet may include the RF Output power level, as noted above in FIG. 7, to enable one way to help identify the type of node doing the broadcasting and the location of the broadcasting node. However, if the broadcast RF output power level is fixed and known by the node type, only the node type need be identifiable from an exemplary advertising data packet, such as packet 700.

Regarding how a node communicates, an exemplary node may be in one of several different communication modes. A node in an advertising (or transmit or broadcast) mode is visible to any other node set in a query (or scan or listen) mode. In an embodiment, the frequency and length of advertising may be application and power dependent. For example, in normal operations, an exemplary node will generally advertise in a periodic manner and expect to make an active connection to another node at certain intervals, which may be dictated by conditions set by server 100. In an embodiment, such conditions may be set individually for a node by the server or a higher level node in the network.

If an exemplary node has not received acknowledgement for an advertising packet within a particular period, it may enter one or more alert stages. For example, if an exemplary node has not received acknowledgement from another node for an advertising packet broadcast by the exemplary node within a particular time period (also generally referred to as an Alert Interval), the exemplary node will enter an Alert Stage 1 status. This prompts the exemplary node to issue a follow-up advertising packet having one or more parts of it altered to indicate the Alert Stage 1 status. In more detail, this exemplary follow-up advertising packet may have a different advertising alert header instructing nearby nodes to send a SCAN_REQ message upon receiving an advertisement packet.

If an exemplary node has not received acknowledgement from a master node for an advertising packet broadcast by the exemplary node within another time period (e.g., a request from the master node to actively connect and a success connection made), it will enter another alert stage, such as an Alert Stage 2 status. This prompts the exemplary node to issue a follow-up advertising packet having one or more parts of it altered to indicate the Alert Stage 2 status. In more detail, this exemplary follow-up advertising packet may have a different advertising alert header instructing nearby master nodes to send a SCAN_REQ message upon receiving an advertisement packet.

If an exemplary node has data to upload to the backend, it may also enter another type of alert stage. In one embodiment, for example, if an exemplary node has sensor data collected by the exemplary node (or received from one or more other nodes that have communicated with the exemplary node), and the data needs to be uploaded to server 100, the exemplary node may enter an update alert stage, such as an Alert Stage 3. This prompts the exemplary node to issue a follow-up advertising packet having one or more parts of it altered to indicate the Alert Stage 3 status. In more detail, this exemplary follow-up advertising packet may have a different advertising alert header instructing nearby master nodes to make a connection with the exemplary node so that the data (e.g., sensor data 350) may be transmitted from the exemplary node (e.g., ID node 120a) to a nearby master node (e.g., master node 110a). The transmitted data may then be stored by the nearby master node as sensor data 450 in either or both of the master node's volatile memory 420 and memory storage 415. Subsequent to that storage operation, the nearby master node will transfer the data (e.g., sensor data 450) to server 100.

As illustrated in FIG. 7 and explained in the above description of alert level stages, a status flag in a header of an exemplary advertising data packet is a field used in the association logic in one or more embodiments. For example, in one embodiment, the existence of a status flag in the advertising data packet allows a first node to communicate its status to a second node, and for the second node to report that status to the backend server, such as server 100, without an active direct connection from the first node to the server. In other words, the status flag helps facilitate passive interactions between nodes (such as passive associations).

In a more detailed embodiment, several exemplary status types are established with respect to communications with other nodes. For example, the exemplary status types may comprise the following:

Alert Level 0—no issue, operating normal;

Alert Level 1—The advertising node is requesting that any available node acknowledge the receipt of its advertisement packet;

Alert Level 2—The advertising node is requesting that any available master node acknowledge the receipt of its advertisement packet;

Alert Level 3—Data for Upload—node has captured data available for upload through a master node; and Synchronize—The advertising node requests to connect with a device or sensor that can synchronize data (such as timer or location information).

By broadcasting the status via, for example, a portion of a header in an advertising data packet, one or more nodes within range of the broadcasting node can determine the node's status and initiate active connections if requested in the status message.

A request for more information from the advertising node may, in some embodiments, come in the form of a SCAN_REQ message. In general, an exemplary SCAN_REQ is a message sent from a scanning (listening) master node to an advertising node requesting additional information from the advertising node. In this example, the alert status bit may indicate to the scanning master node, for example, at an application layer, whether the advertising node is in a mode that will or will not accept a SCAN_REQ. In one embodiment, the non-connectable and discoverable modes of node advertising are in compliance with Bluetooth® Low Energy (BLE) standards.

In another embodiment, a node may have further different modes of operation while scanning or listening for other nodes. For example, a node's query or scanning mode may be active or passive. When a node is scanning while passive, the node will receive advertising data packets, but will not acknowledge and send SCAN_REQ. However, when a node is scanning while active, the node will receive advertising data packets, and will acknowledge receipt by sending a SCAN_REQ. A more detailed embodiment may provide the passive and active modes of scanning or inquiry in compliance with Bluetooth® Low Energy (BLE) standards.

In an embodiment, an exemplary node is scanning as it listens for other wireless nodes broadcasting on the short-range radio. An exemplary scanning node may capture, for example, a MAC address of the advertising node, a signal strength of the RF output signal transmitted from the advertising node, and any other metadata published by the advertising node (e.g., other information in the advertising data packet). Those skilled in the art will appreciate that the scope of "listening" when a node is scanning may vary. For example, the query may be limited. In other words, the scope of what a node is particularly interested in and for which it is listening may be focused or otherwise limited. In such a case, for example, the information collected may be limited to particular information from a targeted population of short-range wireless nodes advertising; but the information collection may be considered "open" where information from any advertising device is collected.

When nodes are advertising or scanning, an embodiment may make further use of status flags and additional modes when advertising or scanning as part of how nodes communicate and may be managed. In one example, when a scanning (listening) node receives an advertising data packet with the status flag indicating an Alert Level 1 or 2 status, and the scanning node is in "Passive" scanning mode, the node will switch to "Active" scanning mode for some interval. However, when the scanning node in this situation is already in an "Active" scanning mode, the node will send the SCAN_REQ message and receive a SCAN_RSP from the advertising node (e.g., a message providing the additional information requested from the advertising node). The scanning node will then switch back to a "Passive" scanning mode.

In another example, when an advertising (broadcasting) node receives a SCAN_REQ from a scanning node, the advertising node will consider that its advertising data packet has been acknowledged. Further, the advertising node will reset its "Alert" status flag back to an Alert Level 0 status. This allows the advertising node to effectively receive an acknowledgement to its advertisement without ever making a connection to the scanning node, which advantageously and significantly saves on power consumption.

In yet another example, when a scanning node receives an advertising data packet with an Alert Level 3 status flag set, the scanning node will attempt to make a connection with the advertising device. Once the connection is made, the advertising device will attempt to upload its data to the connected device Thus, an embodiment of the node advertise and query (scan) logic manager of code 325 may rely upon one or more status flags, advertising modes, scanning modes, as nodes communicate with each other in various advantageous manners.

Node Information Control & Exchange Manager

In an exemplary embodiment, the information control and exchange manager part of node control and management code 325 determines whether and how information may be exchanged between nodes. In the exemplary embodiment, the information control and exchange manager establishes different node operational states where information may be changed according to a desired paradigm for the state. In more detail, an embodiment of information control and exchange manager may establish different levels of information exchange between nodes with a "non-connectable advertising" state or mode of operation, a "discoverable advertising" state or mode, and a "general advertising" state or mode operation. When a node is in the "non-connectable advertising" mode, the node information exchange is limited. For example, the advertising node may broadcast information that is captured by one or more querying (scanning) nodes, but no two-way exchange of information happens.

When a node is in the "discoverable advertising" mode and a scanning node is in "Active" mode, the node information exchange in enabled both ways. For example, the advertising node sends the advertising packet, and in response the scanning node sends the SCAN_REQ packet. After the advertising node receives the SCAN_REQ requesting additional information, the advertising node sends the SCAN_RSP with the requested information. Thus, in the "discoverable advertising" mode there is a two-way exchange of information, but no active connection is made between the two nodes exchanging information.

Finally, for advanced two-way information exchange, an active connection may be used between nodes and information may be exchanged both ways to and from different nodes. In a more detailed embodiment, at this level of two-way information exchange, nodes are first identified and then authenticated as part of establishing the active connection. Once authenticated and thereafter actively connected to each other, the nodes may securely share information back and forth. In one example, a sensor node uploading previously captured environmental information to a master node may be in this mode or state. In another example, an ID node uploading the stored results of a node scanning operation to a master node may be in this mode or state. In yet another example, a master node sharing a timer and/or location information with corresponding nodes may be in this mode or state.

Node Power Manager

In an exemplary embodiment, the node power manager part of node control and management code 325 focuses on managing power consumption and the advantageous use of power (e.g., an adjustable level of RF output signal power) in a node. In general, nodes are either powered by a battery (such as battery 355 in an ID node), or by an interface (such as battery/power interface 470 in a master node) to an external power source. Examples of an external power source may include, in some embodiments, power supplied from an outlet or power connection within a facility, or power generated onboard a conveyance (e.g., automobile, truck, train, aircraft, ship, etc.). Those skilled in the art will appreciate that an interface to an external power source will be generally referred to as a "wired" power connection, and that node power manager may be informed whether a node is wired or powered off a battery, such as battery 355. Further embodiments may implement an interface to an external power source with wireless power transmission, such as via inductive coils.

In one embodiment, a node may manage power used when performing tasks. For example, a node may manage power when determining which node should perform a particular task. In more detail, the collective power consumption of a group of devices may be managed by electing to employ wired nodes, when feasible or desired, to accomplish a particular task, and saving the battery-powered nodes for other less energy burdensome or taxing tasks. In another embodiment, historic data may inform the system of the power needed to accomplish a particular task, and the system may make a determination of which node should accomplish the particular task based upon such historic data. In other embodiments, profile data may also be used to inform the system of the power needed to accomplish a particular task (e.g., a sensor profile that describes power requirements for operation of a sensor node that gathers sensor data over a certain period of time and under certain conditions). The system may also make a determination of which node should accomplish the particular task based upon such profile data.

In another example, the exemplary node power manager may manage power when determining how to best to use and adjust power to more accurately accomplish a particular task. In one embodiment, an RF signal output from a node (such as a short-range RF output signal from an ID node) may periodically move through a range of output power or simply switch between two or more settings that differ in a detectable manner. As disclosed in more detail below, the variability and dynamic adjustment of RF output signal power may allow other nodes (such as one or more master nodes) to see each node at the upper range of the RF output signal power, and only see nodes physically close to the advertising node at the lower range of signal power.

In another example, the exemplary node power manager may cause a change to a characteristic of its RF output signal power when the node has been associated to a physical place or another node by virtue of context data (such as context data 560 and association logic that utilizes that type of information). In one embodiment, the node may be instructed to change how often the node communicates and/or a characteristic of its RF output power to preserve power.

In yet another example, all advertising nodes may have their respective node power managers periodically cause each respective node to broadcast at a maximum RF output signal power level to ensure they still are within range of a scanning ID Node or Master Node. Doing so may increase the chance of being in communication range and allows the individual nodes to be properly located and managed within the network. The broadcast duration may be set or dynamically changed to allow pairing to occur if needed.

Rather than adjust the RF output signal power level, the exemplary node power manager may, in some embodiments, adjust the RF receiver sensitivity of a node. This allows for an adjustable range of reception (as opposed to merely an adjustable range of broadcast), which may similarly be used to manage power and enhance location determinations as discussed herein.

In yet another embodiment, a combination approach may be used in which the node power manager may concurrently and independently adjust more than one RF characteristic of a node. For example, en exemplary node power manager may adjust an RF output signal power level and also adjust the RF receiver sensitivity of a node as the node is located and associated with other nodes. Those skilled in the art will realize that this may be especially useful in an area with an unusually dense concentration of nodes, and a combination of changing RF output signal power levels An embodiment of the exemplary node manager may refer to a power profile (e.g., an exemplary type of profile data 330, 430) when adjusting a node's power characteristics (e.g., consumption of power, use of power, output signal frequency, duty cycle of the output put signal, timing, power levels, etc.).

Node Association Manager

In an exemplary embodiment, the node association manager part of node control and management code 325 focuses on how the nodes associate with other nodes in conjunction and consistent with the server-side association manager in code 525, as discussed in more detail below. Thus, exemplary node association manager, when executing in a node, directs how the node associates (e.g., enters an active connection mode) with one or more other nodes with input from the server.

The exemplary node association manager for a node may indicate through a Status Flag if the node requires an acknowledgement or connection, or if it has information available for upload to the backend. Thus, while a node may not be associated or actively connected yet to another node, a status of the node may be inferred from, for example, the status information in the node's broadcast header.

Regarding connections between nodes, there are generally secure connections and unsecure connections. While an embodiment may allow unsecure connections between one or more sets of nodes, other embodiments rely upon secure connections or authenticate pairings of nodes. In one embodiment, for a node to pair with another node, the exemplary node association manager first identifies the nodes to be associated and transmits an association request to the server. The request may include a specific request to pair the nodes and ask for the corresponding pairing credentials from the server, such as server 100. The server 100 may have staged pairing credentials on particular nodes based on information indicating the nodes would be within wireless proximity and future pairing may occur. Visibility to the node relationship may have been determined through scan-advertising, or $3^{rd}$ party data such as barcode scan information indicating the nodes to be within proximity currently or at a future state.

When connecting or not connecting to exchange information under the exemplary node information exchange modes described above, nodes generally operate in a number of states, which make up an exemplary advertise cycle for an exemplary ID node. Such an exemplary advertise cycle for a node is further explained below with reference to FIG. 8 and in conjunction and consistent with the server-side association manager in code 525, as discussed in more detail below.

Airborne Mode Program Module

In one embodiment, node control and management code 325 may also include an airborne mode program module (not shown). In another embodiment, the airborne mode program module may be implemented as a part of the node power manager program module of code 325. An exemplary airborne mode program module generally operates to manage the output power of the ID node's variable power short-range communication interface 375 when the ID node is operating in an aircraft. Operating a wireless device within an aircraft may, in some circumstances, have an unintentional impact on other electronic systems on the aircraft. In more detail, an embodiment of the airborne mode program module may operate to transition the ID node from different states or modes depending upon particular operations and/or operational conditions of the aircraft. For example, an exemplary airborne mode program module may operate to transition the ID node from one state or mode (e.g., a normal mode prior to takeoff, a disabled mode during takeoff, an airborne mode while aloft, a disabled mode during descent, and a normal mode after landing) based upon detected environmental conditions (e.g., pressure, altitude) and/or flight detail information associated with the aircraft. In this way, an ID node may be allowed to normally operate when onboard an aircraft, be disabled from operating at all in some circumstances, and be able to operate in an airplane mode that allows sensing and sensor data capture, but that may limit transmission of an RF output signal to avoid interference with the aircraft's onboard electronics. Further information related to a method of managing a wireless device (such as an ID node) in an aircraft is disclosed in greater detail in U.S. patent application Ser. No. 12/761,963 entitled "System and Method for Management of Wireless Devices Aboard an Aircraft," which is hereby incorporated by reference.

Node Data

As previously noted, volatile memory 320 may also include certain data (e.g., profile data 330, security data 335, association data 340, shared data 345, sensor data, and the like) generated as the ID node 120*a* executes instructions as programmed or loaded from memory storage 315. In general, data used on a node, such as an ID node, may be received from other nodes or generated by the node during operations.

In one embodiment, profile data 330 is a type of data that defines a general type of behavior for an ID node, such as a Broadcast Profile (discussed in more detail below). In another embodiment where ID node 120*a* is a BLE device, profile data 330 may include a Bluetooth® compatible profile related to battery service (exposing the state of a battery within a device), proximity between BLE devices, or messaging between BLE devices. Thus, exemplary profile data 330 may exist in volatile memory 320 and/or memory storage 315 as a type of data that defines parameters of node behavior.

In one embodiment, it may be desired to allow secured pairings of nodes. As will be explained in more detail below, as part of secure pairing of nodes, a request for pairing credentials is generated and sent to server 100. Thus, exemplary security data 335 (e.g., PIN data, security certificates, keys, etc.) may exist in volatile memory 320 and/or memory storage 315 as a type of data associated with providing secured relationships between nodes, such as the requested security credentials.

Association data, such as association data 340, generally identifies a connected relationship between nodes. For example, ID node 120a may become associated with the master node 110a as the ID node 120a moves within range of the master node 110a and after the server directs the two nodes to associate (with authorization). As a result, information identifying the relationship between ID node 120a and master node 110a may be provided to server 100 and may be provided, as some point, to each of ID node 120a and master node 110a. Thus, exemplary association data 340 may exist in volatile memory 320 and/or memory storage 315 as a type of data identifying associations between nodes.

Shared data 345 may exist in volatile memory 320 and/or memory storage 315 as a type of data exchanged between nodes. For example, context data (such as environmental data) may be a type of shared data 345.

Sensor data 350 may also exist in volatile memory 320 and/or memory storage 315 as a type of data recorded and collected from an onboard sensor or from another node. For example, sensor data 350 may include temperature readings from a temperature sensor onboard an ID node and/or humidity readings from a humidity sensor in another ID node (e.g., from another of the ID nodes within container 210 as shown in FIG. 2).

Thus, an ID node (such as node 120a shown in FIG. 3) is a lower cost wireless node that communicates with other ID nodes and master nodes via a short-range radio with variable RF characteristics, can be associated with other nodes, can broadcast to and scan for other nodes, associated with other nodes, and store/exchange information with other nodes.

Master Node

Figure 4:
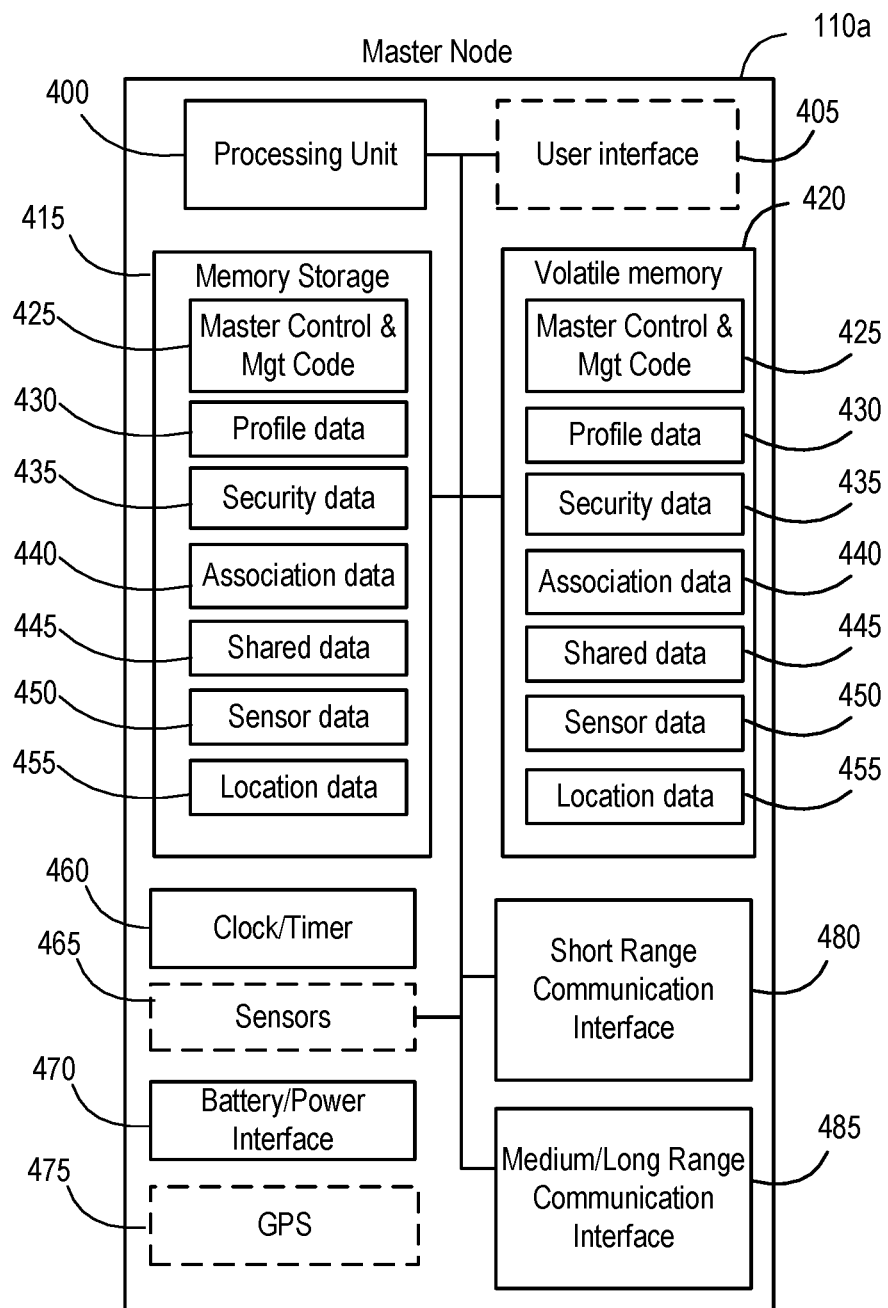
FIG. 4 is a more detailed diagram of an exemplary master node device in accordance with an embodiment of the invention.

A master node, such as master node 110a shown in more detail in FIG. 4, shares many ID node features but generally expands upon them in order to function as a bridge to the server 100. In general, while an ID node is a type of lower level node in an exemplary wireless node network, a master node is a type of higher level node. An exemplary master node may be in a fixed location or otherwise stationary, while other example master nodes may be implemented as movable and mobile devices.

Referring now to FIG. 4, exemplary master node 110a comprises a processing or logic unit 400 coupled to a short-range communication interface 480, memory storage 415, volatile memory 420, clock/timer 460, and battery/power interface 470. In some embodiments, the short-range communication interface 480 may have variable power characteristics, such as receiver sensitivity and RF output power level. Those skilled in the art will appreciate that processing unit 400 is logic, such as a microprocessor or microcontroller, which generally performs computations on data and executes operational and application program code and other program modules within the master node 110a.

In general, those skilled in the art will appreciate that the description of hardware with respect to ID node 110a in FIG. 4 applies to the similar hardware and software features appearing in each type of node, including a master node. Those skilled in the art will appreciate that exemplary master node 110a is a hardware-based component that may implement processor 400 with a single processor or logic unit, a more powerful multi-core processor, or multiple processors depending upon the desired implementation. In one embodiment, processing unit 400 may be implemented with a low power microprocessor and associated peripheral circuitry. Less complex microcontrollers or discrete circuitry may be used to implement processing unit 400 as well as more complex and sophisticated general purpose or dedicated purpose processors.

In yet another embodiment, exemplary processing unit 400 may be implemented by a low power ARM1176JZ-F application processor used as part of a single-board computer, such as the Raspberry Pi Computer Model B-Rev-2. The ARM application processor is embedded within a Broadcom® BCM2835 system-on-chip (SoC) deployed in the Raspberry Pi Computer. In this embodiment, the Raspberry Pi Computer device operates as a core of exemplary master node 110a and includes a Secure Digital memory card slot and flash memory card operating as memory storage 415, a 512 Mbyte RAM memory storage operating as volatile memory 420, an operating system (such as Linux) stored on memory storage 415 and running in volatile memory 420, and peripherals that implement clock/timer 460, and a power supply operating as a power interface 470.

Like short-range interface 375 in ID node 120a, exemplary master node 110a includes a short-range communication interface 480 as a programmable radio and an omni-directional antenna coupled to the processing unit 400. In some embodiments, the short-range communication interface 480 may have variable RF power characteristics, such as receiver sensitivity and/or RF output signal power level. In some embodiments, interface 480 may use an antenna with a different antenna profile when directionality may be desired. Examples of short-range communication interface 480 may include other hardware (not shown) for operatively coupling the device to a specific short-range communication path (e.g., a Bluetooth® Low Energy (BLE) connection path communicating at 2.4 GHz). While BLE is used in one embodiment to enable a short-range communication protocol, variable power short-range interface 480 may be implemented with other low power, short-range communication protocols, such as ultra-low power communication protocols used with ultra-wideband impulse radio communications, ZigBee protocols, IEEE 802.15.4 standard communication protocols, and the like.

In one embodiment, various RF characteristics of the radio's transceiver, such as the RF output power and the RF receiver sensitivity may be dynamically and programmatically varied under control of processing unit 400. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal as needed depending upon a desired implementation and anticipated use of exemplary master node 110a. In other words, embodiments of master node 110a (or any other master node) may have programmatically adjustable RF characteristics (such as an adjustable RF output signal power, an adjustable RF receiver sensitivity, the ability to switch to a different frequency or frequency band, etc.).

In addition to the short-range communication interface 480, exemplary master node 110a includes a medium and/or long-range communication interface 485 to provide a communication path to server 100 via network 105. Those skilled in the art will appreciate that in some embodiments, an exemplary communication interface deployed may be considered to embody a short-range communication interface (such as interface 480) or a medium/long range communication interface (such as interface 485). However, in more general embodiments, reference to a communication interface may include an interface that collectively implements a plurality of different exemplary data communication interfaces while still being generally referenced as "a communication interface" or "wireless communication interface."

In one embodiment, communication interface 485 may be implemented with a medium range radio in the form of an IEEE 802.11g compliant WiFi transceiver. In another embodiment, communication interface 485 may be implemented with a longer range radio in the form of a cellular radio. In yet another embodiment, both a WiFi transceiver and a cellular radio may be used when best available or according to a priority (e.g., first attempt to use the WiFi transceiver if available due to possible lower costs; and if not, then rely on the cellular radio). In other words, an embodiment may rely upon the longer range cellular radio part of interface 485 as an alternative to the medium range WiFi transceiver radio, or when the medium range radio is out of reach from a connecting infrastructure radio within network 105. Thus, in these embodiments, medium and/or long-range communication interface 485 may be used to communicate captured node information (e.g., profile data 430, association data 440, shared data 445, sensor data 450, and location data 455) to server 100.

The battery/power interface 470 for master node 110*a* generally powers the circuitry implementing master node 110*a*. In one embodiment, battery/power interface 470 may be a rechargeable power source. For example, a master node may have a rechargeable power source along with a solar panel that charges the power source in order to help facilitate deployment of the master in a remote location. In another embodiment, battery/power interface 470 may be a non-rechargeable power source intended to be disposed of after use. In yet another embodiment, battery/power interface 470 may be a power interface connector (such as a power cord and internal power supply on master node 110*a*). Thus, when an exemplary master node is in a fixed or stationary configuration, it may be powered by a power cord connected to an electrical outlet, which is coupled to an external power source. However, other mobile master nodes may use an internal power source, such as a battery.

The clock/timer 460 for master node 110*a* generally provides one or more timing circuits used in, for example, time delay, pulse generation, and oscillator applications. In an embodiment where master node 110*a* conserves power by entering a sleep or dormant state for a predetermined time period as part of overall power conservation techniques, clock/timer 460 assists processing unit 400 in managing timing operations.

Optionally, an embodiment may also implement master node 110*a* as including one or more sensors 465 (similar to sensors deployed on ID node based Sensor nodes and described above with respect to FIG. 3). Additionally, an embodiment of master node 110*a* may also provide a user interface 405 to indicate status, allow basic interaction for review of captured node data and interaction with nodes and server 100 (such as viewing of notifications). In one embodiment, user interface 405 may provide a display, interactive buttons or soft keys, and a pointing device to facilitate interaction with the display. A notification or alert may be generated by master node 110*a* and shown on the display, on in other embodiments, the notification or alert may be received by master node 110*a* from another node (e.g., an ID node, another master node, and/or a server) and shown on the display. In a further embodiment, a data entry device may also be used as part of the user interface 405. In other embodiments, user interface 405 may take the form of one or more lights (e.g., status lights), audible input and output devices (e.g., a microphone and speaker), or touchscreen.

As previously noted, an exemplary master node, such as master node 110*a*, may be positioned in a known fixed location or, alternatively, includes dedicated location positioning circuitry 475 (e.g., GPS circuitry) to allow the master node self-determine its location or to determine its location by itself. In other embodiments, alternative circuitry and techniques may be relied upon for location circuitry 475 (rather than GPS), such as location circuitry compatible with other satellite-based systems (e.g., the European Galileo system, the Russian GLONASS system, the Chinese Compass system), terrestrial radio-based positioning systems (e.g., cell phone tower-based or WiFi-based systems), infrared positioning systems, visible light based positioning systems, and ultrasound-based positioning systems).

Regarding memory storage 415 and volatile memory 420, both are operatively coupled to processing unit 400 in exemplary master node 110*a*. Both memory components provide program elements used by processing unit 400 and maintain and store data elements accessible to processing unit 400 (similar to the possible data elements stored in memory storage 315 and volatile memory 320 for exemplary ID node 120*a*).

In the embodiment shown in FIG. 4, memory storage 415 maintains a variety of executable program code (e.g., master control and management code 425), data similar to that kept in an ID node's memory storage 315 (e.g., profile data 430, security data 435, association data 440, shared data 445, sensor data 450, and the like) as well as other data more specific to the operation of master node 110*a* (e.g., location data 455 that is related to the location of a particular node). Like memory storage 315, memory storage 415 is a tangible, non-transient computer readable medium on which information (e.g., executable code/modules, node data, sensor measurements, etc.) may be kept in a non-volatile and non-transitory manner.

Like volatile memory 320 in ID node 120*a*, volatile memory 420 is typically a random access memory (RAM) structure used by processing unit 400 during operation of the master node 110*a*. Upon power up of master node 110*a*, volatile memory 120 may be populated with an operational program (such as master control and management code 425) or specific program modules that help facilitate particular operations of master node 110*a*. And during operation of master 110*a*, volatile memory 420 may also include certain data (e.g., profile data 430, security data 435, association data 440, shared data 445, sensor data 450, and the like) generated as the master node 110*a* executes instructions as programmed or loaded from memory storage 415.

Master Control & Management Code

Generally, an embodiment of master control and management code 425 is a collection of software features implemented as programmatic functions or program modules that generally control the behavior of a master node, such as master node 110*a*. In one embodiment, master control and management code 425 generally comprises several programmatic functions or program modules including (1) a node advertise and query (scan) logic manager, which manages how and when a node communicates; (2) an information control and exchange manager, which manages whether and how information may be exchanged between nodes; (3) a node power manager, which manages power consumption and aspects of RF output signal power and/or receiver sensitivity for variable short-range communications; (4) an association manager focusing on how the node associates with other nodes; (5) a location aware/capture module to determine node location; (6) a delivery release control module; and (7) a delivery notification module.

Master Node Program Modules and ID Node Modules

In an exemplary embodiment, program modules (1)-(4) of master node control and management code 425 generally align with the functionality of similarly named program modules (1)-(4) of node control and management code 325 as described above with respect to FIG. 3. Additionally, as node control and management code 325 may also comprise an airborne mode program module, those skilled in the art will appreciate and understand that master node control and management code 425 may also comprise a similar functionality airborne mode program module in order to allow advantageous operations of a master node while airborne. However, and consistent with examples set forth below, such modules may have some differences when in a master node compared with those controlling an ID node.

Location Aware/Capture Module

In addition to exemplary program modules (1)-(4) of code 425, an exemplary embodiment of master node control and management code 425 will further comprise an exemplary location aware/capture module related to node location (more generally referred to as a location manager module for a master node). In general, the exemplary location aware/capture module deployed in an exemplary master node may determine its own location and, in some embodiments, the location of a connected node. Embodiments of the exemplary location aware/capture module may work in conjunction with location manager program code residing and operating in a server (e.g., as part of server control and management code 525) when determining node locations of other nodes, as discussed in more detail herein.

In one embodiment, a master node may be positioned in a known, fixed location. In such an embodiment, the exemplary location aware/capture module may be aware that the master node location is a known, fixed location, which may be defined in a fixed, preset, or preprogrammed part of memory storage 415 (e.g., information in the location data 455 maintained in memory storage 415). Examples of such location information may include conventional location coordinates or other descriptive specifics that identify the location of the master node. In another embodiment where the master node may not be inherently known or a fixed location at all times (e.g., for a mobile master node), the exemplary location aware/capture module may communicate with location circuitry, such as GPS circuitry 475 on a master node, to determine the current location of the master node.

In an embodiment, the location of the master node may be communicated to the server, which may use this location information as part of managing and tracking nodes in the wireless node network. For example, if an exemplary master node is mobile and has determined a new current location using location circuitry 475, the master node may provide that new current location for the master node to the server. Additionally, when the master node's exemplary location aware/capture module determines the location of a node associated with the master node, the master node may also provide the location of that node associated with the master node to the server.

An exemplary embodiment of master node control and management code 425 may also comprise an exemplary delivery release control module that enhances delivery management with certain types of master nodes. For example, as explained in more detail below, an embodiment of a master node maybe part of an exemplary logistics receptacle that stores an item that may be shipped. Such a logistics receptacle may maintain the item within its storage area in a secure manner and execute the delivery release control module to help manage delivery to selectively release the item under certain conditions to make sure the item is properly delivered and help avoid unintentional deliveries to an incorrect location. Embodiments of the exemplary delivery release control module may work in conjunction with the location aware/capture module and location manager program code residing and operating in a server (e.g., as part of server control and management code 525) when determining node locations of other nodes, as discussed in more detail herein.

In a further embodiment, master node control and management code 425 may also comprise an exemplary delivery notification module that, in general, generates a corrective delivery or pickup notification with certain types of master nodes to help proactively notify relevant logistics personnel about a delivery or pickup, respectively. As explained in more detail below, an embodiment of a mobile master node (such as a courier master node) may automatically sense an adverse delivery/pickup condition as, for example, a sensed incorrect location for delivery/pickup of an item, movement away from an intended delivery/pickup location for the item, or a time-based factor (e.g., a desired delivery window) combined with the intended delivery location. In another embodiment, an exemplary master node associated with a location (as opposed to a mobile courier master node) may automatically sense such an adverse delivery/pickup condition and transmit a corrective delivery/pickup notification to the courier master node as a way of proactively rectifying the delivery/pickup situation involving the sensed adverse delivery/pickup condition (such as when the item is dropped off at an incorrect location, an item is not dropped off and is heading away from the intended delivery location, the wrong item is pickup up, the item is not picked up, and messaging with the courier master node may help quickly resolve such issues). Embodiments of the exemplary delivery notification module may work in conjunction with the location aware/capture module and location manager program code residing and operating in a server (e.g., as part of server control and management code 525) when determining node locations of other nodes (such as an ID node associated with an item delivered at or picked up from a master node's location or heading away from the master node's location), as discussed in more detail herein.

In a further embodiment, master node control and management code 425 may also comprise an exemplary pickup notification module that, in general, generates a pickup notification related to an inventory item as part of monitoring the item as it is within inventory and, in some instances, as the item is authorized for release and entry into a shipment operation. As explained in more detail below, an embodiment of an exemplary master node associated with a particular location (such as warehouse or, more generally, a storage facility) may generate the pickup notification when the inventory item should not be leaving the location. Embodiments of the exemplary pickup notification module may also work in conjunction with the location aware/capture module and location manager program code residing and operating in a server (e.g., as part of server control and management code 525) when determining node locations of other nodes (such as an ID node associated with an inventory item maintained as part of the location's inventory), as discussed in more detail herein.

Server

Figure 5:
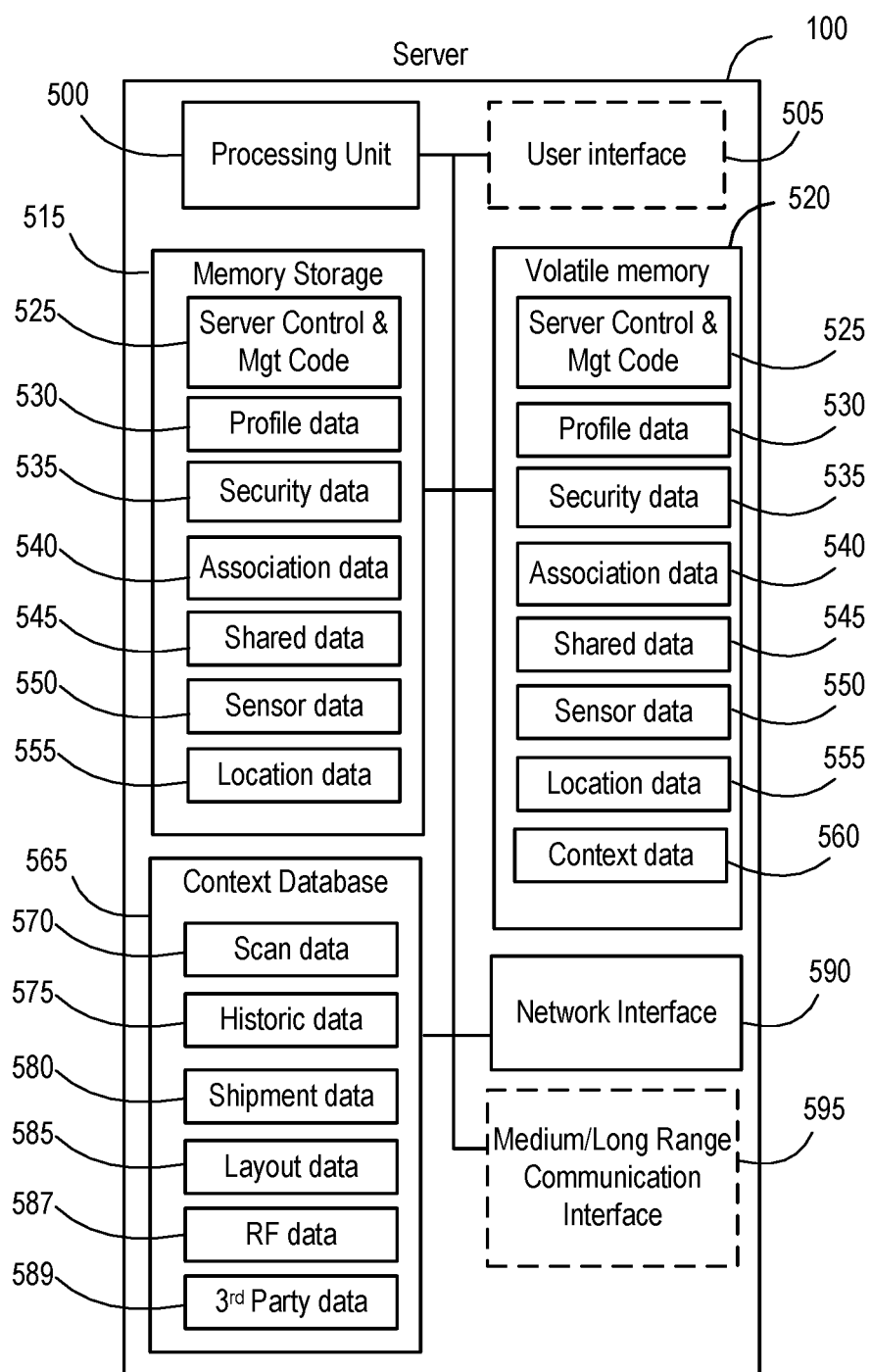
FIG. 5 is a more detailed diagram of an exemplary server in accordance with an embodiment of the invention.

While FIGS. 3 and 4 illustrate details of hardware and software aspects of an exemplary ID node and exemplary master node, respectively, FIG. 5 provides a more detailed diagram of an exemplary server that may operate as part of an exemplary wireless node network in accordance with an embodiment of the invention. In an exemplary embodiment, server 100 may be referred to as an Association and Data Management Server (ADMS) that manages the nodes, collects information from the nodes, stores the collected information from the nodes, maintains or has access to context data related to the environment in which the nodes are operating, and may provide information about the nodes (e.g., status, sensor information, etc.) to requesting entities. Further details on various embodiments that take advantage of this functionality are explained below. Those skilled in the art will appreciate that node density, geographic installation characterization, and network connectively are all types of examples of factors that may impact a final architecture desired for an embodiment of a wireless node network.

Referring now to FIG. 5, exemplary server 100 is shown as a networked computing platform capable of connecting to and interacting with at least the wireless master nodes. In other embodiments, exemplary server 100 is also capable of connecting to and interacting with one or more user access devices. Those skilled in the art will appreciate that exemplary server 100 is a hardware-based component that may be implemented in a wide variety of ways. For example, server 100 may use a single processor or may be implemented as one or more part of a multi-processor component that communicates with devices (such as user access devices 200, 205) and wireless nodes (such as master node 110a).

In general, those skilled in the art will further appreciate that server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), or a server farm that logically allows multiple distinct components to function as one server computing platform device from the perspective of a client device (e.g., devices 200, 205 or master node 110a). In some regional deployments, an exemplary server may include servers dedicated for specific geographic regions as information collected within different regions may include and be subject to different regulatory controls and requirements implemented on respective regional servers.

Likewise, while the embodiment shown in FIG. 5 illustrates a single memory storage 515, exemplary server 100 may deploy more than one memory storage media. And memory storage media may be in differing non-transitory forms (e.g., conventional hard disk drives, solid state memory such as flash memory, optical drives, RAID systems, cloud storage configured memory, network storage appliances, etc.).

At its core, exemplary server 100 shown in FIG. 5 comprises a processing or logic unit 500 coupled to a network interface 590, which facilitates and enables operative connections and communications through network 105 with one or more master nodes as well as, in some embodiments, user access devices, such as devices 200, 205. In one embodiment, server 100 may include a medium and/or long-range communication interface 595 with which to more directly communicate with one or more master nodes. Using these communication paths as well as program code or program modules (such as server control and management code 525), the server 100 generally operates to coordinate and manage information related to an ID node as an item associated with the ID node physically moves from one location to another.

As a computing platform, the processing unit 500 of exemplary server 100 is operatively coupled to memory storage 515 and volatile memory 520, which collectively store and provide a variety of executable program code (e.g., server control and management code 525), data similar to that kept in a master or ID node's respective memory storage (e.g., profile data 530, security data 535, association data 540, shared data 545, sensor data 550, location data 555) and context data 560 related to the environment in which the nodes are operating (e.g., information generated from within the wireless node network and information created external to the wireless node network).

Like memory storage 315 and storage 415, memory storage 515 is a tangible, non-transient computer readable medium on which information (e.g., executable code/modules (e.g., server control and management code 525), node-related data (e.g., profile data 530, security data 535, association data 540, location data 555, etc.), measurement information (e.g., a type of shared data 545, sensor data 550, etc.), and information on the contextual environment for the nodes (e.g., context data 560) may be kept in a non-volatile and non-transitory manner.

Those skilled in the art will appreciate that the above identification of particular program code and data are not exhaustive and that embodiments may include further executable program code or modules as well as other data relevant to operations of a processing-based device, such as an ID node, a master node, and a server.

Context Data

As noted above, server 100 may access context data 560 as part of managing nodes in the wireless node network. The exemplary server 100 may contain a collection of such context data 560 in a context database 565 according to an embodiment. As illustrated in FIG. 5, exemplary context database 565 is a single database accessible by processing unit 500 internal to server 100. Those skilled in the art will readily understand that other configurations that provide an accessible collection of context data 560 are possible and contemplated within the scope and principles of embodiments of the invention. For example, context database 565 may be an externally accessible database (or multiple databases), such as an accessible storage maintained outside the server 100 via a dedicated interface or a network storage device (or network attached storage (NAS) unit). In yet another embodiment, the context database may be separately maintained by an external database server (not shown) that is distinct from server 100, but accessible through a communication path from server 100 to a separate database server (e.g., via network 105). Furthermore, those skilled in the art will appreciate that context database 565 may be implemented with cloud technology that essentially provides a distributed networked storage of collections of information (such as context data 560, sensor data 550, shared data 545, etc.) accessible to server 100.

Within context database 565, an exemplary embodiment of the collection of context data 560 may be maintained that generally relates to an environment in which the nodes are operating or anticipated to be operating. In more detail, the context data 560 may generally relate to what a similar node has experienced in a similar environment to what a given node is presently experiencing or is anticipated to experience as the given node moves.

Figure 22A:
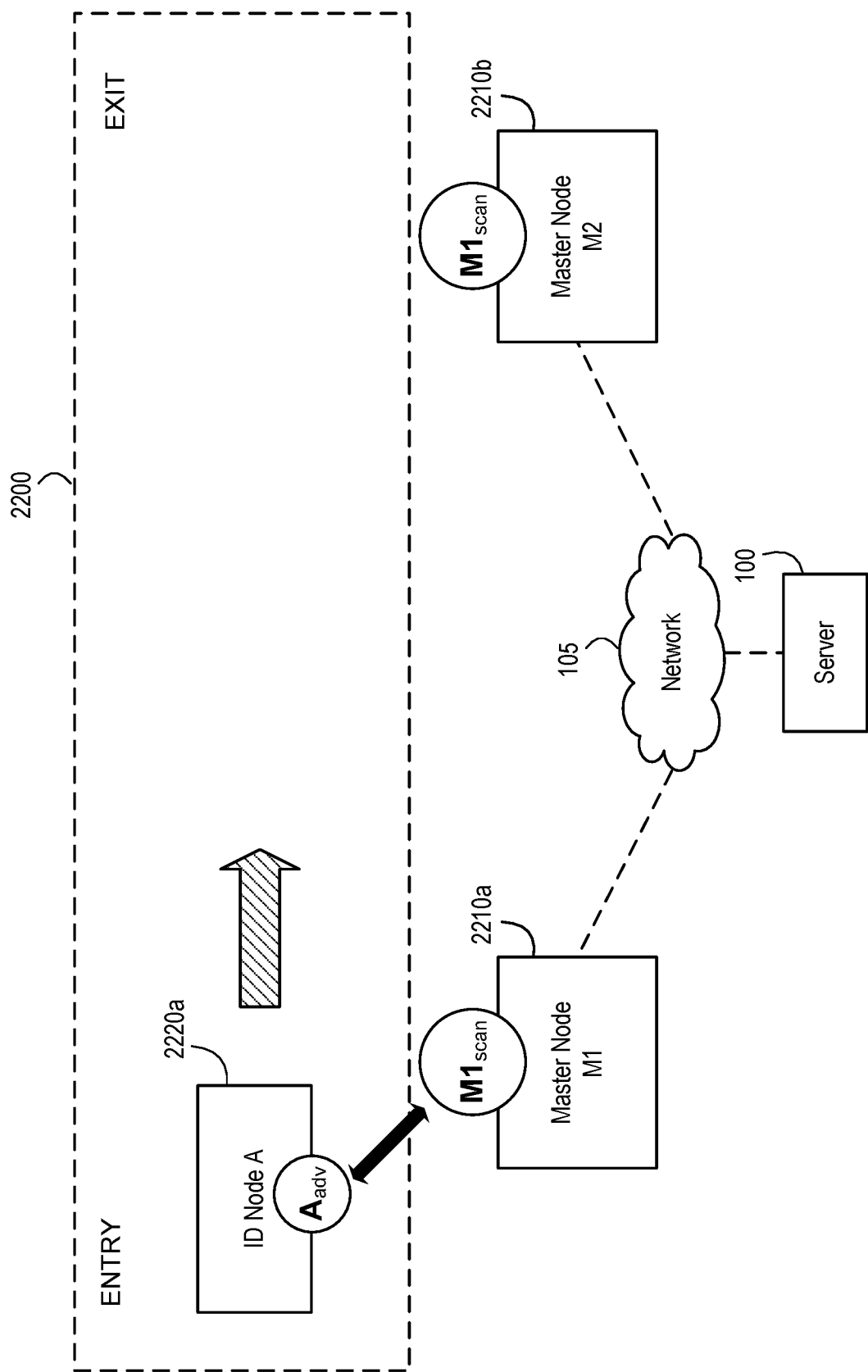
FIGS. 22A-22C are diagrams illustrating exemplary stages of an ID node moving through part of an exemplary transit path while associating with different master nodes in accordance with an embodiment of the invention.

In a general example, an environment in which a node may be actually or anticipated to be operating may include different types of environments—for example, an electronic communication environment (e.g., an RF environment that may be cluttered with signals or include materials or structure that may impede or otherwise shield RF communications), a physical environment of an anticipated path along with the identified node moves (e.g., temperature, humidity, security, and other physical characteristics), a conveyance environment related to how a node may move or be anticipated to be moving (e.g., speed and other parameters of a truck, airplane, conveyor system), and a density environment related to the density of nodes within an area near a particular node (e.g., how many nodes are anticipated to occupy a corridor, such as structure 2200 shown in FIG. 22A, or a storage facility through which a particular ID node is anticipated to transit on its shipping path).

In light of these different aspects of a node's operating environment, exemplary context data 560 may provide information related to different structures and conditions related to movement of an item (e.g., a particular type of courier device, vehicle, facility, transportation container, etc.). Such information may be generated by an entity operating the wireless node network, such as a shipping company. Additionally, exemplary context data 560 may include third party data generated external to the wireless node network. Thus, context data, such as data 560, may include a wide variety of data that generally relates to the environment in which the nodes are operating and may be used to advantageously provide enhanced node management capabilities in accordance with embodiments of the present invention.

In general, FIG. 5 illustrates exemplary types of context data 560 being maintained in database 565 and in volatile memory 520. Those skilled in the art will appreciate that context data 560 may also be maintained in other data structures, in addition to or instead of maintaining such information in a database. As illustrated in FIG. 5, exemplary types of context data 560 may include but are not limited to scan data 570, historic data 575, shipment data 580, layout data 585, RF data 587, and $3^{rd}$ party data.

Scan data 570 is generally data collected for a particular item related to an event. For example, when an item is placed in a package (such as package 130), a label may be generated and placed on the exterior of the package. The label may include a visual identifier that, when scanned by an appropriate scanning device capable of capturing, identifies the package. The information generated in response to scanning the identifier (a type of event), may be considered a type of scan data. Other scan data 570 may include, for example, general inventory data generated upon manual entry of information related to the package; captured package custodial control data; and bar code scan data.

Historic data 575 is generally data previously collected and/or analyzed related to a common characteristic. Historic data 575 embodies operational knowledge and know-how for a particular characteristic relevant to operations of the wireless node network. For example, the common characteristic may be a particular event (e.g., movement of an item from an open air environment to within a particular closed environment, such as a building), a type of item (e.g., a type of package, a type of content being shipped, a location, a shipment path, etc.), a success rate with a particular item (e.g., successful shipment), and the like. Another example of historic data 575 may include processing information associated with how an item has been historically processed as it is moved from one location to another (e.g., when moving within a particular facility, processing information may indicate the item is on a particular conveyor and may include information about the conveyor (such as speed and how long it is anticipated the item will be on the conveyor)).

Shipment data 580 is generally data related to an item being moved from one location to another location. In one embodiment, shipment data 580 may comprise a tracking number, content information for an item being shipped, address information related to an origin and destination locations, and other characteristics of the item being moved.

Layout data 585 is generally data related to the physical area of one or more parts of an anticipated path. For example, an embodiment of layout data 585 may include building schematics and physical dimensions of portions of a building in which a node may be transiting. An embodiment may further include density information associated with physical areas to be transited and anticipated numbers of potential nodes in those areas as types of layout data. In another example, an embodiment of layout data may include a configuration of how a group of packages may be assembled on a pallet, placed into a shipping container (e.g., a unit load device (ULD)) that helps move a collection of items on various forms with single mode or intermodal transport.

RF data 587 is generally signal degradation information about a signal path environment for a particular type of node and may relate to particular adverse RF conditions that may cause signal fluctuations, interference, or other degradation from the otherwise optimal signal path environment for that type of node. For example, RF data may include shielding effects when using a particular packaging or location, shielding effects when the package is within a particular type of container or assembled as part of a palletized shipment, shielding effects when particular content is shipped, and other physical and electronic interference factors.

Third party data 589 is an additional type of context data 560 that generally includes data generated outside the network. For example, third party data may include weather information associated with particular areas to be transited as the item is moved along an anticipated path from one location to another. Those skilled in the art will appreciate other types of third party data that relate to physical and environmental conditions to be faced by an item being moved from one location to another may also be considered context data 560.

The use of context data, such as context data 560 described above, advantageously helps server 100 better manage movement of items, provide better location determination, enhance intelligent operation and management of different levels of the wireless node network, and provide enhanced visibility to the current location and status of the item during operation of the wireless node network. In one embodiment, server control and management code 525 may provide such functionality that enables the wireless node network to be contextually aware and responsive.

Server Control & Management Code

Generally, server control and management code 525 controls operations of exemplary server 100. In an embodiment, server control and management code 525 is a collection of software features implemented as programmatic functions in code or separate program modules that generally control the behavior of server 100. Thus, exemplary server control and management code 525 may be implemented with several programmatic functions or program modules including, but not limited to, (1) a server-side association manager, which provides a framework for more robust and intelligent management of nodes in the wireless node network; (2) a context-based node manager, which enhances management of nodes in the wireless node network based upon context data; (3) a security manager, which manages secure pairing aspects of node management; (4) a node update manager, which provides updated or different programming for a particular node and shares information with nodes; (5) a location manager for determining and tracking the location of nodes in the network; and (6) an information update manager, which services requests for information related to the current status of a node or generally providing information about a node or collected from a node.

Server-Side Association Manager

The server-side association manager (also referred to as a server-side association management function) is generally a program module in exemplary code 525 that is responsible for intelligently managing the nodes in the wireless node network using a secure information framework. In an embodiment, this framework may be implemented to be a context-driven, learning sensor platform. The framework may also enable a way for information (such as RF scan, location, date/time, and sensor data) to be securely shared across nodes, a way to change the behavior of a node, and for a node to know it is considered "missing." The framework established during operation of the server-side association manager allows the network of nodes to be managed as a system with enhanced and optimized accuracy of determining the physical location of each ID Node. Further information regarding particular embodiments of such an association management framework and methods are explained below in more detail.

Context-Based Association Manager

The context-based node manager is generally a program module in exemplary code 525 that is responsible for incorporating context data as part of management operations to provide an enhanced data foundation upon which visibility of the nodes may be provided. In some embodiments, the context-based node manager may be implemented as part of the server-side association manager while other embodiments may implement the context-based node manager as a separate program module.

In one embodiment, the enhanced data foundation relies upon context data, such as context data 560 (e.g., scan data 570, historic data 575, shipment data 580, layout data 585, and other third party contextual data providing information regarding the conditions and environment surrounding an item and ID node moving from one location to another. Such context data (e.g., the network know-how, building layouts, and operational knowledge of nodes and shipping paths used with the wireless node network) may provide the enhanced building blocks that allow the server 100 to manage tracking and locating of nodes in a robustly enriched contextual environment. In an embodiment, context-based management provides visibility to the system through data analysis for when and how associations should be expected as the nodes travel through the wireless node network. In other embodiments, it may provide the foundation for better understanding RF signal degradation, which can be caused by the operating environment, packaging, package content, and/or other packages related to an item and its ID node.

Security Manager

The security manager module, which may be implemented separately or as part of the association manager module in exemplary server control and management code 525, helps with associating two nodes in the wireless node network by managing aspects of secure pairing of the nodes. In one embodiment, security manager module provides the appropriate pairing credentials to allow a node to securely connect to another node. Thus, when a node desires to connect to another node, an embodiment requires appropriate pairing credentials be generated by the server, provided to the nodes, and observed within the nodes to allow for a successful connection or association of nodes.

In operation, a node (such as master node 110a) identifies the address of the node (such as ID node 120a) to whom it desires to connect. With this address, the node prepares a pairing request and sends the request to the server 110. The server 100 operates under the control of the security manager module of the association manager, and determines whether the requesting node should be connected or otherwise associated with the other node. If not, the server does not issue the requested security credentials. If so and in accordance with the desired association management paradigm set by the association manager of code 525, server provides the requested credentials necessary for a successful wireless pairing and the establishment of secure communications between the associated nodes.

Node Update Manager

The exemplary server control and management code 525 may include a node update manager module that provides updated programming information to nodes within the wireless node network and collects information from such nodes (e.g., shared data 545, sensor data 550). The node update module may be implemented separately or as part of the association manager module in exemplary server control and management code 525.

Providing an update to a node's programming may facilitate and enable distribution of node functions to save power and better manage the nodes as a system. For example, one embodiment may alter the functional responsibility of different nodes depending on the context or association situation by temporarily offloading responsibility for a particular function from one node to another node. Typically, the server directs other nodes to change functional responsibility. However, in some embodiments, a master node may direct other nodes to alter functional responsibility.

Sharing information between nodes and with server (e.g., via an exemplary node update manager) facilitates collecting information from a node and sharing information with other nodes as part of an association management function of server 100. For example, one embodiment may collect and share RF scan data (a type of shared data 545), information about a node's location (a type of location data 555), system information about date/time (another type of shared data 545), and sensor measurements collected from sensor nodes (a type of sensor data 550).

Location Manager

The exemplary server control and management code 525 may include a location manager module that helps determine and track node locations. In a general embodiment, the location of a node may be determined by the node itself (e.g., a master node's ability to determine its own location via location circuitry 475), by a node associated with that node (e.g., where a master node may determine the location of an ID node), by the server itself (e.g., using location information determined by one or more techniques implemented as part of code 525), and by a combined effort of a master node and the server.

In general, an exemplary ID node may be directly or indirectly dependent on a master node to determine its actual physical location. Embodiments may use one or more methodologies to determine node location. For example and as more specifically described below, possible methods for determining node location may relate to controlling an RF characteristic of a node (e.g., an RF output signal level and/or RF receiver sensitivity level), determining relative proximity, considering association information, considering location adjustments for context information and an RF environment, chaining triangulation, as well as hierarchical and adaptive methods that combine various location methodologies. Further information and examples of how an exemplary location manager module may determine a node's location in accordance with such exemplary techniques are provided in more detail below.

Additionally, those skilled in the art will appreciate that it may also be possible to determine what constitutes an actionable location versus actual location based upon contextual information about the item being tracked. For example, a larger item may require relatively less location accuracy than a small item such that operational decisions and status updates may be easier implemented with knowledge of context. If the size of the item is known, the location accuracy can be tuned accordingly. Thus, if a larger item is to be tracked, or if the system's contextual awareness of it is such that lower location accuracy can be used, a stronger signal and thus wider area of scanning may be employed, which may help in situations where RF interference or shielding is an issue.

Information Update Manager

The exemplary server control and management code 525 may include an information update manager module that provides information related to operations of the wireless node network and status of nodes. Such information may be provided in response to a request from a device outside the wireless node network (such as user access device 200). For example, someone shipping an item may inquire about the current status of the item via their laptop or smartphone (types of user access devices), which would connect to server 100 and request such information. In response, the information update manager module may service such a request by determining which node is associated with the item, gathering status information related to the item (e.g., location data, etc.), and provide the requested information in a form that is targeted, timely, and useful to the inquiring entity.

In another example, a user access device may connect to server 100 and request particular sensor data from a particular node. In response, information update manager may coordinate with node update manager, and provide the gathered sensor data 545 as requested to the user access device.

Node Filtering Manager

An embodiment of exemplary server control and management code 525 may optionally comprise a node filtering manager, which helps manage the traffic of nodes with a multi-level filtering mechanism. The filtering essentially sets up rules that limit potential associations and communications. An example of such a node filtering management may define different levels or modes of filtering for a master node (e.g., which ID nodes can be managed by a master node as a way of limiting the communication and management burdens on a master node).

In one example, a "local" mode may be defined where the ID node only communicates and is managed by the assigned master node at the location where the last wireless node contact back to server 100 and/or where third party data indicates the assigned master node and ID node are in physical and wireless proximity. Thus, for the "local" mode of traffic filtering, only the assigned master node communicates and processes information from a proximately close and assigned ID node.

Moving up to a less restrictive filtering mode, a "regional" mode of filtering may be defined where the ID node may communicate and be managed by any master node at the location last reported back to server 100 and/or where third party data indicates the ID node is located. Thus, for the "regional" mode of traffic filtering, any master node near the ID node may communicate and process information from that ID node. This may be useful, for example, when desiring to implement a limit on associations and pairings to within a particular facility.

At the least restrictive filtering mode, a "global" mode of filtering may be defined as essentially system-wide communication where the ID node may be allowed to communicate and be managed by any master node. In other words, the "global" mode of traffic filtering allows any ID node within the wireless node network to communicate information through a particular master node near the ID node may communicate and process information from that ID node.

Thus, with such exemplary filtering modes, an ID node in a certain condition (e.g., distress, adverse environmental conditions, adverse conditions of the node, etc.) may signal the need to bypass any filtering mechanism in place that helps manage communications and association by using the "Alert" Status Flag. In such an example, this would operate to override any filtering rules set at the Master Node level in order to allow an ID node to be "found" and connect to another node.

Thus, exemplary server 100 is operative, when executing code 525 and having access to the types of data described above, to manage the nodes, collect information from the nodes, store the collected information from the nodes, maintain or have access to context data related to the environment in which the nodes are operating, and provide information about the nodes (e.g., status, sensor information, etc.) to a requesting entity.

Node Communication & Association Examples

Figure 22B:
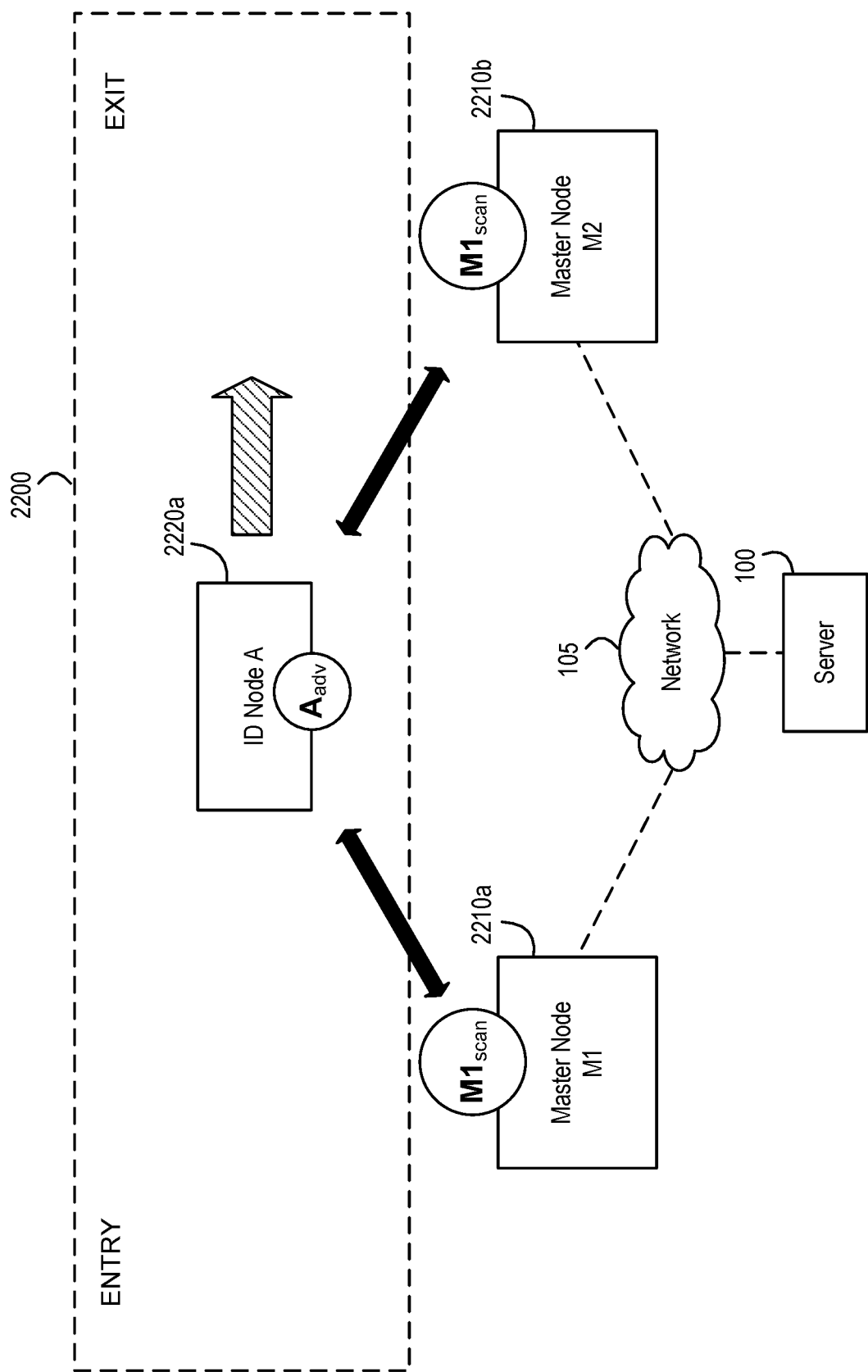
Figure 22C:
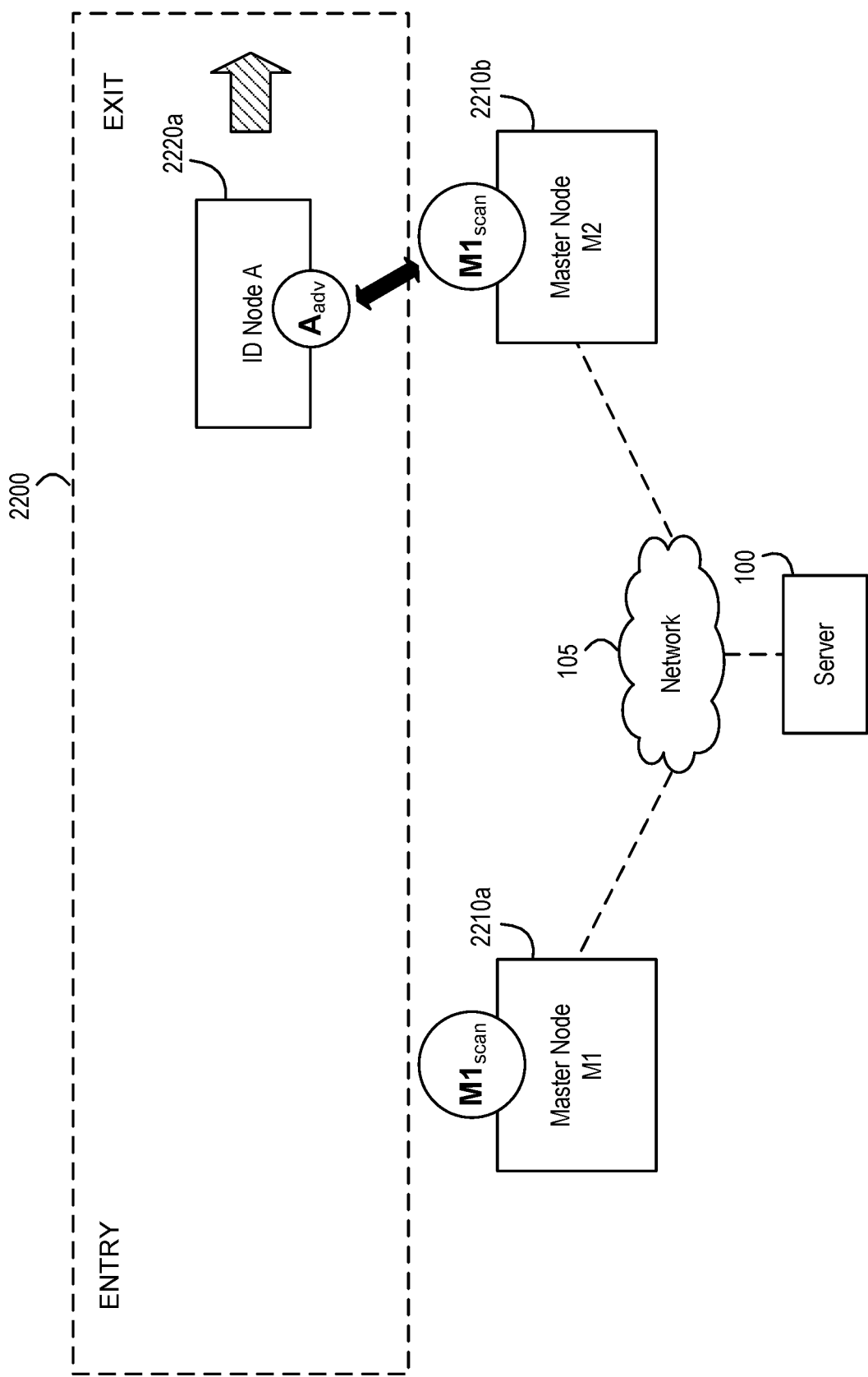

To better illustrate how exemplary management and communication principles may be implemented within an exemplary wireless node network, FIGS. 8-12 provide several examples of how exemplary components of the wireless node network may generally communicate (advertising & scanning), associate, and exchange information during different types of operations in various embodiments. FIGS. 22A-C also provide a more detailed application of such exemplary association and communication activities when an exemplary ID node moves along a transit path (e.g., through a corridor) and is tracked and managed by different master nodes and a server in an embodiment.

Node Advertising Cycle Example

As generally explained above, a node may have several different types of advertising states in which the node may be connectable with other nodes and may communicate with other nodes. And as a node moves within a wireless node network, the node's state of advertising and connection may change as the node disassociates with a previously connected node, associates with a new node, or finds itself not associated with other nodes. In some situations, a node may be fine and in normal operation not be connected or associated with another node. However, in other situations, a node may raise an issue with potentially being lost if it has not connected with any other node in a very long period of time. As such, a node may go through different types of advertising states in these different operational situations.

Generally, a node may be in a state where it is not connectable with other nodes for a certain period of time (also referred to as a non-connectable interval). But later, in another state, the node may want to be connected and advertises as such for a defined connectable period (also referred to as a connectable interval). As the node advertises to be connected, the node may expect to be connected at some point. In other words, there may be a selectable time period within which a node expects to be connected to another node. However, if the node is not connected to another node within that period of time (referred to as an Alert Interval), the node may need to take specific or urgent action depending upon the circumstances. For example, if a node has not been connected to another node for 30 minutes (e.g., an example alert interval), the node may change operation internally to look "harder" for other nodes with which to connect. More specifically, the node may change its status flag from an Alert Level 0 (no issue, operating normal) to Alert Level 2 in order to request that any available master node acknowledge receipt of the advertisement packet broadcasted by the node seeking a connection.

Figure 8:
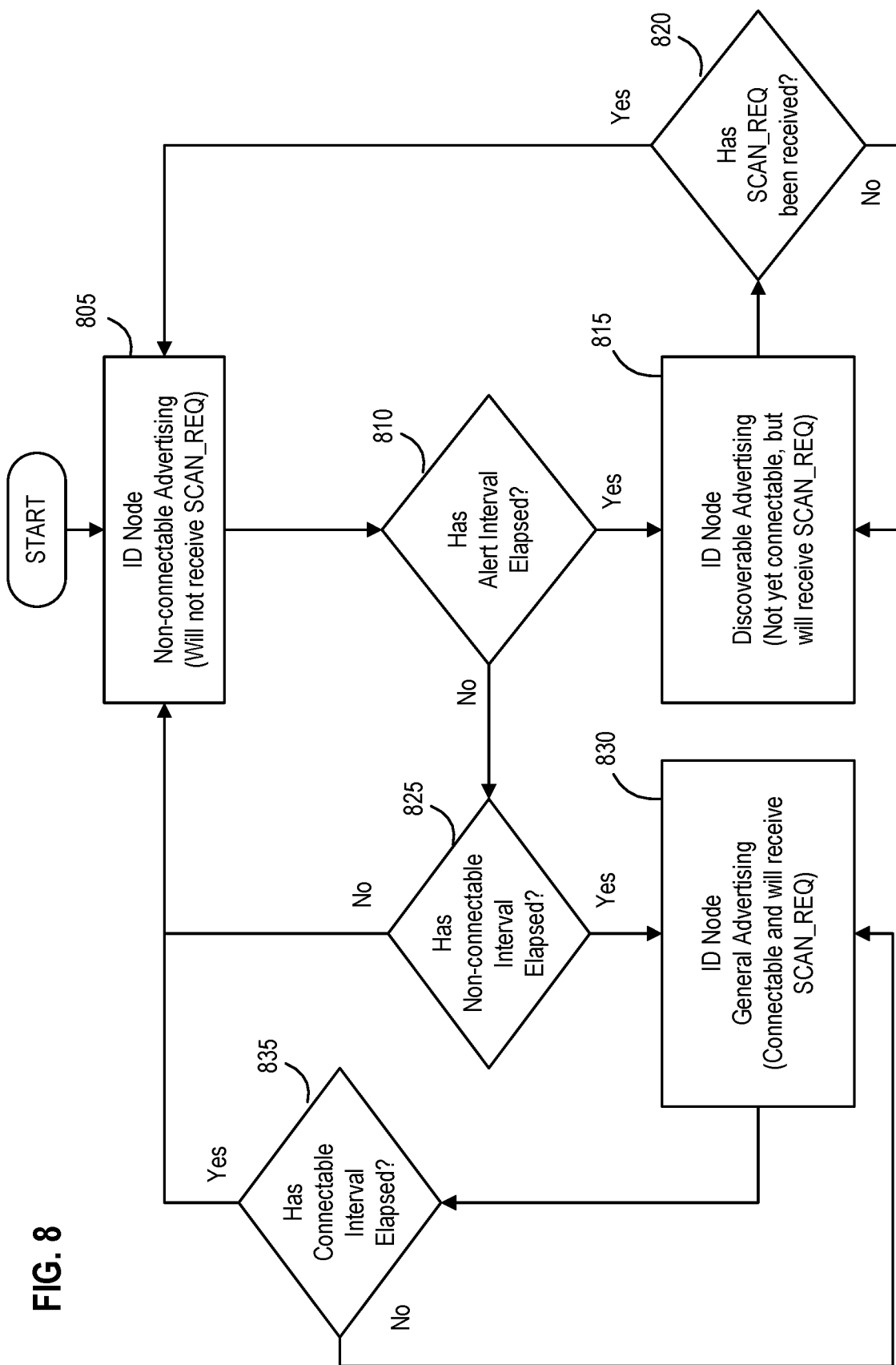
FIG. 8 is a state diagram illustrating exemplary states and transitions between the states as part of operations by an exemplary node in a wireless node network in accordance with an embodiment of the invention.

FIG. 8 is a diagram illustrating exemplary advertising states (or information exchange and node connectability states) and factors involved in transitions between the states by an exemplary ID node in a wireless node network in accordance with an embodiment of the invention. Referring now to FIG. 8, three exemplary states for a node are illustrated as part of an exemplary advertising cycle for the node—namely, an ID Node Non-Connectable Advertising state 805, an ID Node Discoverable Advertising state 815, and an ID Node General Advertising state 830. Transitions between these states will depend on factors related to expirations of the types of intervals described above. In an embodiment, the duration of each of these intervals will depend upon the system implementation and the contextual environment within which the ID node is operating. Such time intervals may, for example, be set by server 100 as part of data (e.g., profile data, association data, context data) provided to the node when updating the node and managing operations of the node.

Referring to the example illustrated in FIG. 8, an exemplary ID node may have an alert interval set at, for example, 30 minutes, and be in ID Node Non-Connectable Advertising state 805 with a non-connectable interval set at 5 minutes. In state 805, the ID node may broadcast or advertise, but is not connectable and will not receive a SCAN_REQ message (a type of request for more information sent to the advertising node from another node). Thus, the ID node in state 805 in this example may advertise in a non-connectable manner for at least 5 minutes but expects to be connected within 30 minutes.

If the alert interval has not yet elapsed (factor 810) and the non-connectable interval is still running (factor 825), the ID node simply stays in state 805. However, if the alert interval has not elapsed (factor 810) and the non-connectable interval elapses (factor 825), the ID node will enter a mode where it wants to try to connect to another node for a period of time (e.g., a 1 minute connectable interval) and will move to the ID Node General Advertising state 830 in the exemplary advertising cycle of FIG. 8. In state 830, as long as the connectable interval is running, the ID node will stay in this state where it is connectable to another node and will receive SCAN_REQ types of requests from other nodes in response to the advertising packets the ID node is broadcasting. However, when the connectable interval (e.g., the 1 min period) elapses or expires (factor 835), the ID node returns back to the Non-connectable Advertising state 805 for either the next time the non-connectable interval elapses (and the ID node again tries to connect in state 830) or the alert interval finally elapses (and the ID node finds itself in a situation where it has not connected to another node despite its efforts to connect in state 830).

When the alert interval finally elapses (factor 810), the ID node moves to the ID Node Discoverable Advertising state 815. Here, the ID node is not yet connectable but will receive a SCAN_REQ type of request from other nodes in response to advertising packets the ID node is broadcasting. In this state 815, the exemplary ID node may alter its status flag to indicate and reflect that its alert interval has expired and that the node is now no longer in normal operation. In other words, the ID node may change the status flag to a type of alert status being broadcasted to indicate the ID node urgently needs to connect with another node. For example, the status flag of the advertising packet broadcast by the ID node may be changed to one of the higher Alert Levels depending on whether the node needs to upload data (e.g., Alert Level 3 status) or synchronize timer or other data with another node (e.g., Synchronize status). With this change in status flag, and the ID node in state 815 broadcasting, the ID node awaits to receive a request from another node that has received the broadcast and requested more information via a SCAN_REQ message (factor 820) sent to the ID node from that other node. Once a SCAN_REQ message has been received by the ID node (factor 820), the ID node that went into the alert mode because it had not connected with another node within the alert interval can connect with that other node, upload or share data as needed, and then shift back to state 805 and restart the alert interval and non-connectable intervals.

Master Node to ID Node Association Example

Advertising (broadcasting) and scanning (listening) are ways nodes may communicate during association operations. FIGS. 9-12 provide examples of how network elements of a wireless node network (e.g., ID nodes, master nodes, and a server) may communicate and operate when connecting and associating as part of several exemplary wireless node network operations.

Figure 9:
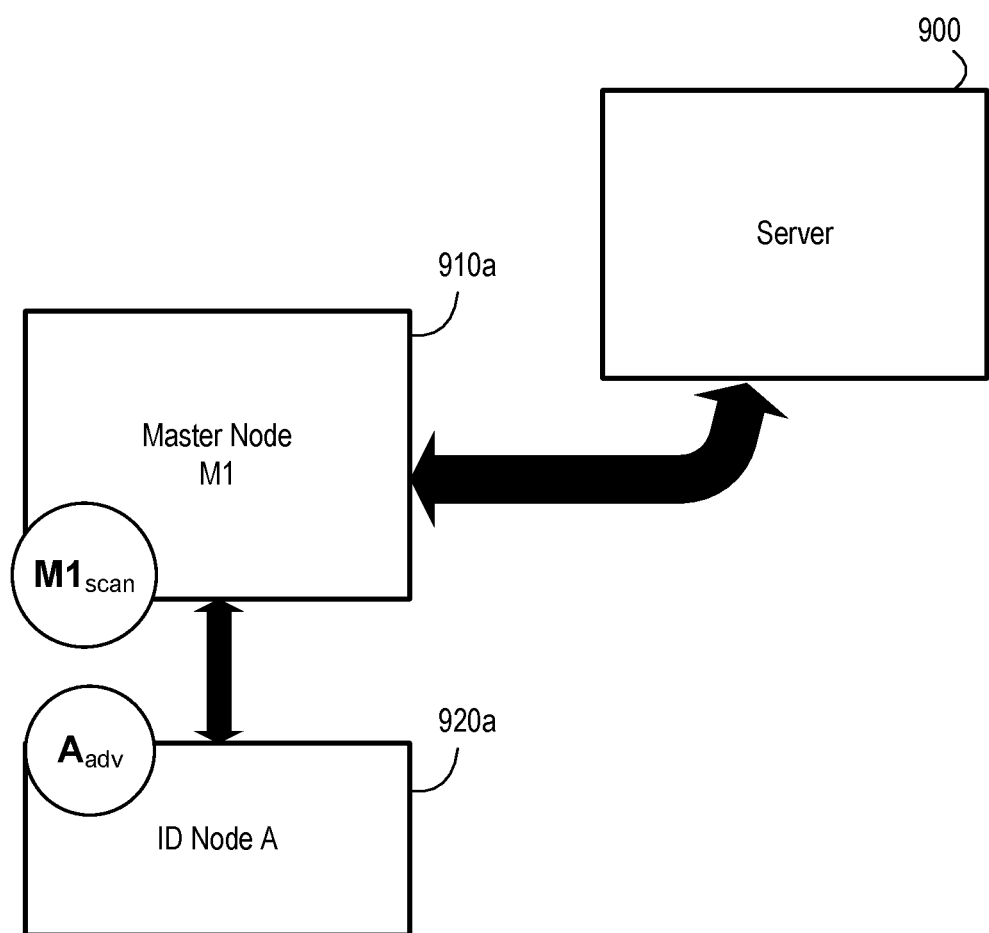
FIG. 9 is a diagram illustrating exemplary components of a wireless node network during an exemplary master-to-ID node association in accordance with an embodiment of the invention.

FIG. 9 is a diagram illustrating exemplary components of a wireless node network during an exemplary master-to-ID node association in accordance with an embodiment. Referring now to FIG. 9, exemplary master node M1 910a is illustrated within communication range of exemplary ID node A 920a. Master node M1 910a also has a communication path back to server 900. As shown, master node M1 910a is in a scanning or listening mode (e.g., indicated by the "M1$_{scan}$" label) while ID node A 920a is in an advertising or broadcasting mode (e.g., indicated by the "A$_{adv}$" label). In this example, M1 master node 910a has captured the address of ID node A 920a through A's advertising of at least one advertising data packet, and has reported it to the server 900. In this manner, the capturing and reporting operations effectively create a "passive" association between the nodes and proximity-based custodial control. Such an association may be recorded in the server, such as server 900, as part of association data, such as association data 540.

In another embodiment, passive association between a master node and ID node may be extended to an "active" association or connection. For example, with reference to the embodiment shown in FIG. 9, server 900 may instruct master node M1 910a to associate, connect, or otherwise pair with ID node A 920a, and forwards the required security information (e.g., PIN credentials, security certificates, keys) to master node M1 910a. Depending on the advertising state of ID node A 920a, ID node A 910a may only be visible (discoverable) but not connectable. In such a situation, the master node M1 910a must wait until ID node A 920a is in a connectable state (e.g., the ID Node General Advertising state) and can be paired. As discussed above with reference to FIG. 8, each ID node has a certain time window during each time period where it can be paired or connected.

In this example, when the ID node A 920a is successfully paired with master node M1 910a, ID node A 920a may no longer advertise its address. By default, only an unassociated device will advertise its address. A paired or associated node will only advertise its address if instructed to do so.

ID Node to ID Node Association Example

Figure 10:
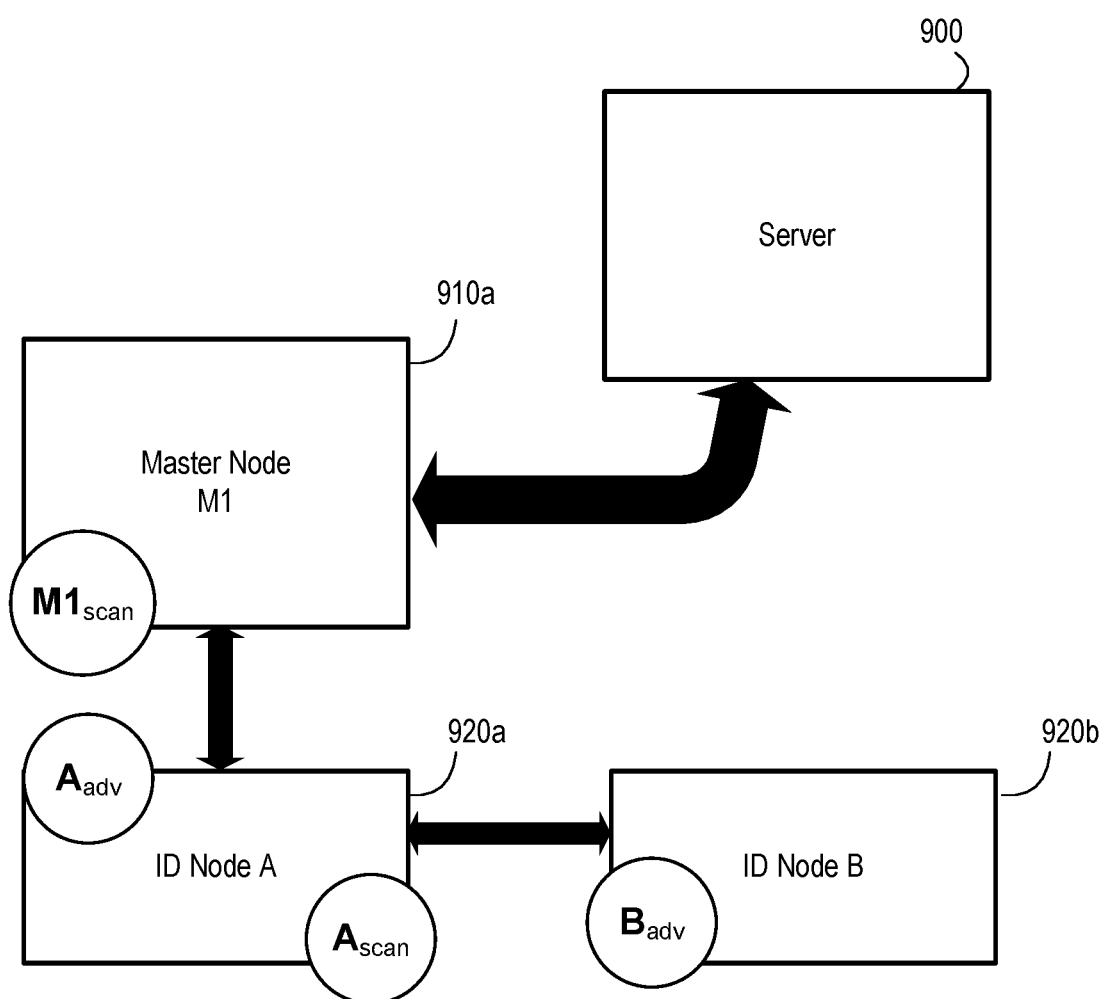
FIG. 10 is a diagram illustrating exemplary components of a wireless node network during an exemplary ID-to-ID node association in accordance with an embodiment of the invention.

In various embodiments, an ID node may associate with or connect to other ID nodes. FIG. 10 is a diagram illustrating exemplary components of a wireless node network during an exemplary ID-to-ID node association in accordance with an embodiment of the invention. Referring now to FIG. 10, exemplary master node M1 910a, ID node A 920a, and server 900 are similarly disposed as shown in FIG. 9, but with the addition of ID node B 920b, which is within communication range of ID node A 920a. In this example, ID node A 920a is running in query (scan) mode (e.g., $A_{scan}$) listening for ID node B 920b. When ID node A 910a detects ID node B 920b advertising (e.g., $B_{adv}$) with one or more advertising data packets as part of an advertised message from ID node B 920b, ID node A 920a identifies a status flag from the message indicating ID node B 920b has, for example, data (e.g., sensor data 350) for upload. As a result, ID node A 920a logs the scan result (e.g., as a type of association data 340) and, when next connected to master node M1 910a, ID node A 920a uploads the captured scan log information to the server 900. In this manner, the ID node scanning, capturing, and reporting operations effectively create a "passive" association between the different ID nodes. Such a passive association may be recorded in the server 900 as part of association data 540.

In another embodiment, passive association between two ID nodes may be extended to an "active" association or connection. For example, with reference to the embodiment shown in FIG. 10, based upon the captured status flag and uploaded information about ID node B 920b under that mode, the server 900 may issue a request to ID node A 920a through master node M1 910a to actively connect or pair with ID node B 920b for the purpose of downloading information from ID node B 920b. In one example, security credentials that authorize the active connection between ID node A 920a and ID node B 920b are downloaded to ID node A 920a from master node M1 910a, which received them from server 900. In another example, the requisite security credentials may have been pre-staged at ID node A 920a. And rather than rely upon an ID node to ID node connection, master node M1 may have connected directly with ID node B 920b if M1 was within communication range of ID node B 920b.

Information Query ID Node to Master Node Example

Figure 11:
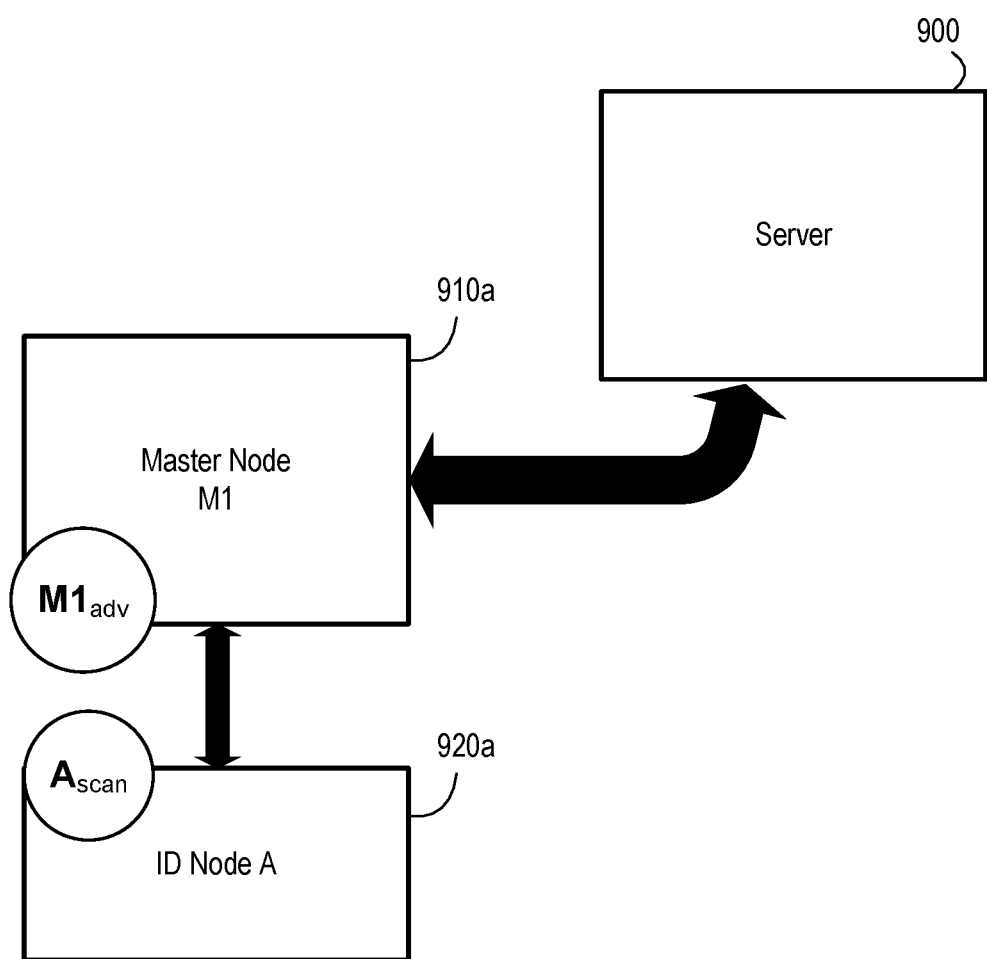
FIG. 11 is a diagram illustrating exemplary components of a wireless node network during an exemplary ID-to-master node query in accordance with an embodiment of the invention.

An exemplary ID Node may also issue queries to other nodes, both master nodes and ID nodes. FIG. 11 is a diagram illustrating exemplary components of a wireless node network during an exemplary ID-to-master node query in accordance with an embodiment of the invention. Referring now to FIG. 11, a similar group of nodes as shown in FIG. 9 appears, except that exemplary master node M1 910a is in an advertising or broadcasting mode (e.g., $M1_{adv}$) while ID node A 920a is in a scanning mode (e.g., $A_{scan}$). In this configuration, ID node A 920a may query master node M1 910a for information. In one embodiment, the query may be initiated through the ID node setting its status flag. The requested information may be information to be shared, such as a current time, location, or environmental information held by the master node M1 910a.

In a passive association example, ID node A 920a in $A_{scan}$ mode may have captured the address of master node M1 910a. However, since an ID node cannot directly connect to the server 900 to request pairing security credentials (e.g., security pin information that authorizes an active connection between ID node A 920a and master node M1 910a), a passive association and corresponding pairing will have been initiated from the master node. In another example, it may be possible for ID node A 920a to have the pairing credentials stored as security data 335 from a previous connection. This would allow ID node A 920a then to initiate the active association with master node M1 910a after a passive association.

Alert Level Advertising Example

Figure 12:
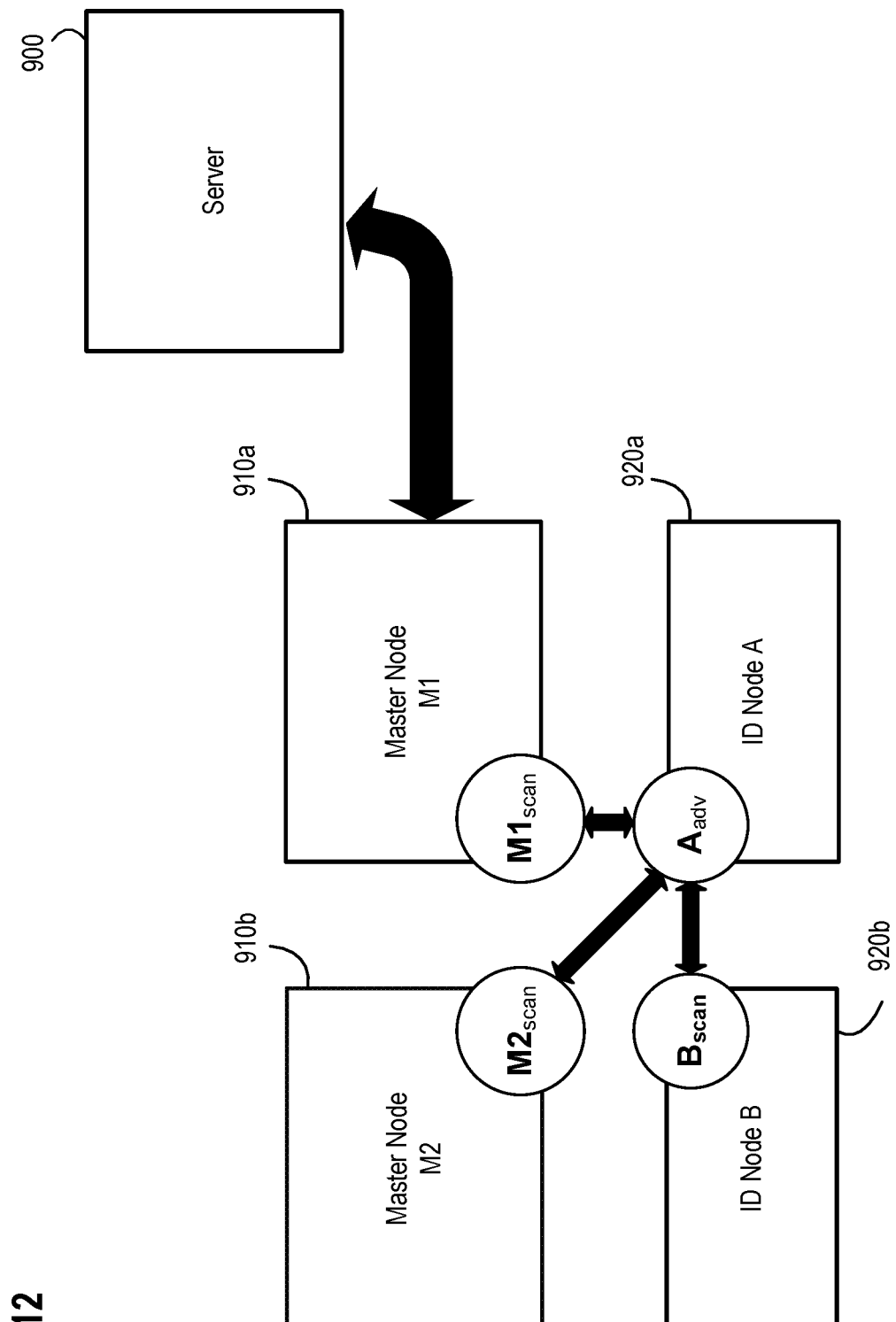
FIG. 12 is a diagram illustrating exemplary components of a wireless node network during an exemplary alert advertising mode in accordance with an embodiment of the invention.

As previously noted, a node may enter an alert stage or level in one or more embodiments. For example, if a node has not received an acknowledgement from a master node for an advertising packet within a set period (e.g., an Alert Interval as described in some embodiments), the node will enter a particular alert stage for more specialized advertising so that it may be "found" or pass along information. FIG. 12 is a diagram illustrating exemplary components of a wireless node network during an exemplary alert advertising mode in accordance with an embodiment of the invention. Referring now to FIG. 12, a similar group of nodes as shown in FIG. 9 appears, with the addition of another master node (master node M2 910b) and another ID node (ID node B 920b). Exemplary ID node A 920a is in an advertising or broadcasting mode (e.g., $A_{adv}$) while nodes M1, M2, and B are each in scanning mode (e.g., $M1_{scan}$, $M2_{scan}$, and $B_{scan}$). In this example and configuration as shown in FIG. 12, the status flag in an advertising message from ID node A 920a has been set to a particular alert level (e.g., Alert Level 2) in the header of the message, requesting any nearby master node to acknowledge it. In one example, this mode may be entered if ID node A 920a has not connected with another node for a set period or time. In another example, ID node A 920a may enter this specialized advertising mode upon received instructions (e.g., from server 900 or another nearby node) or a triggered condition (other than time), such as when a sensor input (such as light) is detected or otherwise registered and the node issues continuous updates of its address as a security feature. The ID node A 920a set at this alert level and in this specialized advertising mode is thus set in an active pairing mode, waiting for pairing credentials.

From a passive association perspective, any node in scanning mode can passively associate with such an advertising node (e.g., ID node A 920a in this alert mode). Thus, in an embodiment, the Alert Level 2 status flag in the advertising header broadcast by ID node A 920a indicates that urgent and active intervention is requested, rather than merely passively associate without an active connection.

From an active association perspective, any node that uploads the special advertising header of ID node A 920a may be forwarded the security credentials from the server 900. This would allow for the node receiving such credentials to actively associate or pair with ID node A 920a.

While FIG. 8 provides examples of how a node may advertise, and FIGS. 9-12 provide examples of how different exemplary devices (e.g., ID nodes, master nodes, and a server) may advertise and associate in different ways, FIGS.

22A-C provide a progressive set of illustrations that expand upon how associating and disassociating may be applied within an exemplary wireless node network. More specifically, FIGS. 22A-C show how associations and disassociations may occur when an exemplary ID node is tracked and managed by a server and different master nodes as the ID node moves through an exemplary transit path in accordance with an exemplary embodiment of the invention.

Referring now to FIG. 22A, a structure 2200 is shown having an entry and exit point. In one example, the structure 2200 may be a corridor or another part of a building or facility. In another example, structure 2200 may be a conveyor system that transports an item and its ID node from the entry point to the exit point. Master node M1 2210a is located near the entry point of structure 2200 while master node M2 2210b is located near the exit point. Those skilled in the art will appreciate that other master nodes may be disposed at additional points in structure 2200, but are not shown for sake of convenience and to simplify the association hand-off explanation that follows. Server 100 is operatively connected to each of master node M1 2210a and master node M2 2210b via network 105.

In one embodiment, server 100 has access to context data 560 related to the structure 2200, such as layout data 585 on dimensions and materials making up structure 2200. Context data 560 may include historic data 575 on how an ID node has operated and successfully been tracked as it traverses structure 2200 from the entry point to the exist point. For example, server 100 may have context data indicating structure 2200 is a conveyor that can transport an item and its ID node from the entry point to the exit point over a distance of 800 feet. The context data may further indicate typical items are moved at a certain speed on the conveyor of structure 2200 and a nominal time from the entry point to the exit point may be about 5 minutes. Thus, the server 100 has access to context data about the environment within with an ID node is operating and may leverage this to better and more accurately manage the ID node.

In FIG. 22A, ID node A 2220a is shown entering the structure 2200 at the entry point. Here, ID node A 2220a may be advertising in hopes of connecting with a master node as it enters structure 2200 with, for example, a non-connectable interval of 10 seconds with a connectable interval of 5 seconds. In this example, the server 100 knows that ID node A 2220a is located near the entry point and anticipates that ID node A 2220a should be coming near to master node M1 2210a at the entry point. Thus, server 100 may set the connectable and non-connectable intervals accordingly so as to provide a sufficient opportunity for ID node A 2220a to connect to the next master node along the predicted path of the ID node and in accordance with the speed of travel.

Additionally, server 100 may set the alert interval to 1 minute in this context. Here, if ID node A 2220a is not connected to another node within 1 minute, ID node A 2220a may broadcast or advertise with a message having a changed status flag that indicates an alert status so that ID node A 2220a can connect to a broader range of other nodes that see it is urgent for ID node A 2220a to connect and, essentially, be found. Depending on the context (e.g., the type of conveyor, the speed of the conveyor, the density of nodes near the entry point, etc.), those skilled in the art will appreciate that the server 100 can adjust the advertising cycle intervals to better accommodate the ID node's current environment.

When master node M1 2210a is scanning (listening), it may initially detect an advertising packet from ID node A 2220a during node A's non-connectable interval. But when ID node A 2220a changes advertising states and broadcasts as a connectable node in the general advertising state (i.e., during the connectable interval), master node M1 2210a may respond with a SCAN_REQ that acknowledge receipt of the broadcasted message and asks for further information from ID node A 2220a. Master node M1 2210a receives the requested information from ID node A 2220a, and then communicates with the server 100 to notify the server of its passive association with ID node A 2220a. Server 100 determines if active association is desired, and may authorize the active association between master node M1 2210a and ID node A 2220a by sending security credentials to master node M1 2210a, which allow the nodes to securely connect and share information. And master node M1 2210a may determine the location of ID node A 2220a (or server 100 may do so by directing master node M1 and/or ID node A), and provide the location of ID node A 2220a to server 100. Thus, server 100 is able to manage and track the location of ID node A 2220a as it enters structure 2220 via at least association.

In FIG. 22B, ID node A 2220a has traversed down part of the transit path through structure 2200 while remaining associated with master node M1 2210a. However, at some point master node M1 2210a and ID node A 2220a are disassociated at the direction of server 100 (or when they can no longer communicate). In one example where ID node A 2220a is on the conveyor within structure 2200, server 100 may instruct ID node A 2220a to go to a low power mode for a particular period of time in order to, for example, conserve ID node power. In another example, the low power mode may also provide better location accuracy. As the server 100 has access to the context data, the server 100 may know that ID node A 2220a was associated with master node M1 2210a near the entry point at a given time, and determine that ID node A 2220a will not be near the exit point until the end of the particular period of time. With the ID node A 2220a programmed this way, once the particular period elapses, the ID node A 2220a should be near the exit point and may again be placed into a normal operation mode so that it can seek to connect with master node M2 2210b.

Similar to the association process discussed with respect to ID node A and master node M1, ID node A 2220a and master node M2 2210b may be associated as ID node A 2220a approaches master node M2 2210b near the exit point. Once connected, the node locations and association data are updated on the server 100. And as ID node A 2220a continues to move through structure 2200, ID node A 2200a may arrive at the exit point as shown in FIG. 22C, where the node locations and association data are updated once again on the server 100.

Those skilled in the art will appreciate how such principles may be applied to further movements of an ID node as it is handed off (e.g., via active/passive associations and disassociations) between other master nodes and keeping track of these associations and node locations on the server 100. Additionally, as server 100 tracks and monitors associations, disassociations, and contextual environmental operations, server 100 essentially learns how to better use context information better track nodes, manage power used by ID nodes, and enhance accuracy for locations.

Those skilled in the art will also appreciate the general tradeoff with a level of RF power level and accuracy of location. If a node's RF power level is set high, it may advertise and connect with other nodes a longer distance away. But at such a high power level setting, the ability for the system to discriminate between and locate different nodes may be a challenge.

Association Management within a Wireless Node Network

As explained above in general, management of nodes may rely upon associations created and tracked between nodes (or between a node and another entity, such as a person, object, facility, piece of equipment, and the like). In some embodiments, the association relied upon may be an active association where the server expressly authorizes an active connection between nodes. In other embodiments, the association relied upon may be a passive association where the master node (a type of managing node) is associated with the other node, but not actively connected to the other node. By virtue of the passive association, the server may be able to keep track of and manage the other node without requiring an active association. Thus, those skilled in the art will appreciate that in still other embodiments, associations relied upon by the server for managing a wireless node network may include both active and passive associations and may be generally authenticated or, more specially, authorize a secure connection that has a degree of protection for the connection and communications using that connection.

Figure 23:
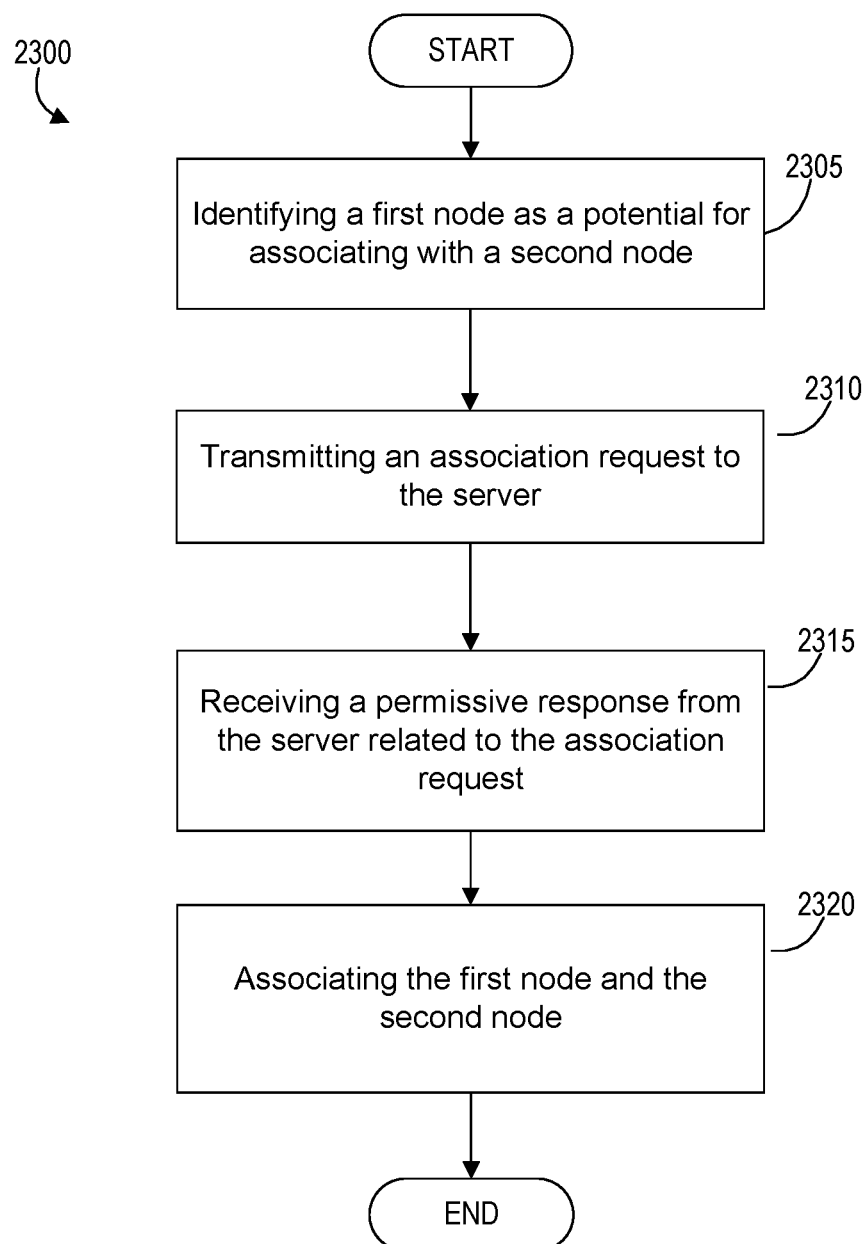
FIG. 23 is a flow diagram illustrating an example method for association management of a wireless node network in accordance with an embodiment of the invention.
Figure 24:
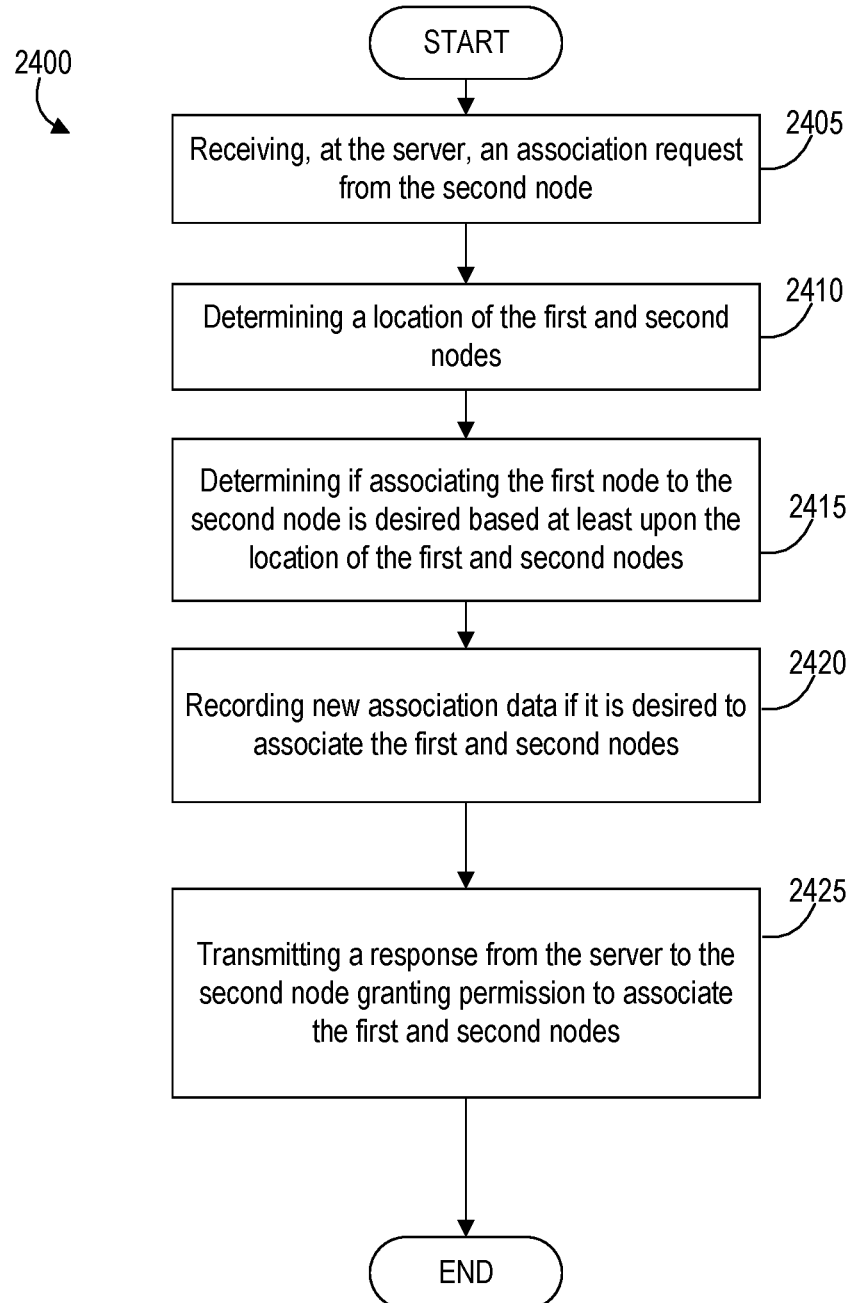
FIG. 24 is a flow diagram illustrating another example method for association management of a wireless node network in accordance with an embodiment of the invention.
Figure 25:
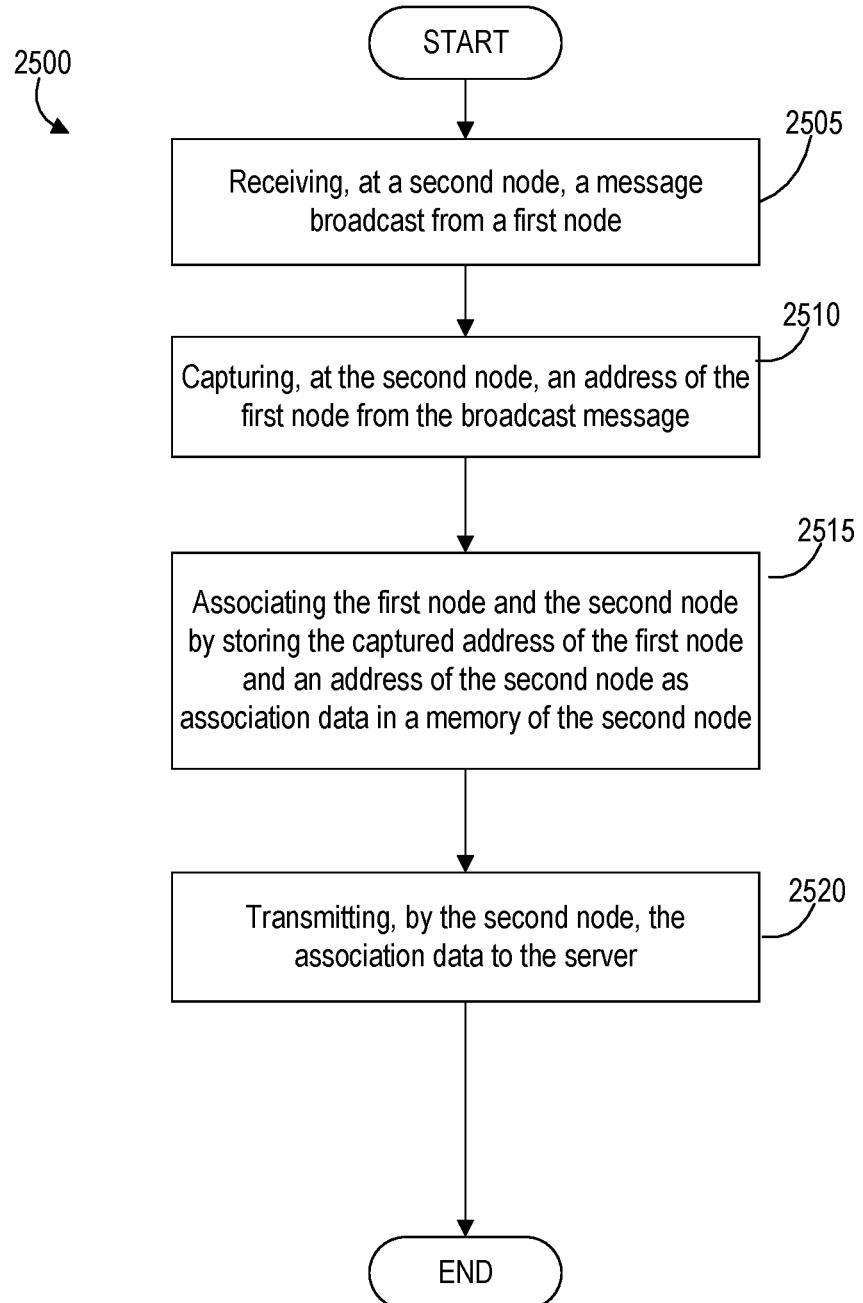
FIG. 25 is a flow diagram illustrating yet another example method for association management of a wireless node network in accordance with an embodiment of the invention.

FIGS. 23-25 provide flow diagrams of exemplary methods for association management of a wireless node network having at least a plurality of nodes and a server in accordance with different embodiments of the present invention involving active and passive association examples. Those skilled in the art will appreciate that each of these exemplary methods for association management of a wireless node network may be implemented by instructions stored on a non-transitory computer-readable medium, which when executed perform the steps of the respective methods described below (e.g., methods 2300, 2400, and 2500) and the described variations of those methods.

Referring now to FIG. 23, method 2300 begins by identifying a first node as a potential for actively associating with a second node at step 2305. In one example, identifying the nodes for association may involve reviewing a message sent by the first node to determine status information related to the first node, and analyzing the status information to determine whether the first node should be associated with the second node. In a further example, the status information may comprise one of a plurality of different status levels indicating whether the first node is requesting a connection to the second node when at that particular status level.

Next, an association request is transmitted to the server in step 2310. In one example, the association request may identify the first node and second node to be associated and may request transmission of one or more appropriate security credentials (e.g., PIN credentials, security certificates, keys, and the like) that may be used by the nodes to enable the first and second node to securely connect and share data as part of associating. An embodiment may request only one credential as an authorization credential from the server. Other embodiments may use two credentials where one may be later uses as a credential with which to reply to challenges. For example, if an ID node is challenged, the ID node may send a reply authorization credential so that the master node can confirm the response and supply the ID node with the appropriate security credential for the authorized association. In some cases, an ID node may have been supplied with such a reply authorization credential (also generally referred to as a key) by the server.

At step 2315, the second node receives a permissive response from the server related to the association request. In an example, the permissive response may include receiving a first authorization credential and a second authorization credential from the server (which may be stored on the nodes). As such, the first authorization credential and the second authorization credential may be created by the server as a type of security data, and may be provided to authorize connecting the first node and the second node and securely sharing information between the first node and the second node.

With this authorization from the server, the first node and second node may be associated at step 2320. In one example, the method 2300 may associate the nodes by establishing an authorized connection from the second node to the first node based upon the authorization credential. And the method 2300 may securely provide shared data between the first node and the second node according to a profile established by the server after the first and second nodes are associated.

In an embodiment, the method 2300 may also comprise having the second node gaining responsibility for a task after the second node is associated with the first node when responsibility for the task was previously with the first node. For example, when the second node is powered by an external power source and the first node is powered by a battery, this may advantageously shift the responsibility to a node that is better suited to perform the task (e.g., has more power available or has a power source that does not need recharging or replacing).

FIG. 24 is a flow diagram illustrating another example method for association management of a wireless node network in accordance with an embodiment of the invention from the perspective of the server. Referring now to FIG. 24, method 2400 begins with the server receiving an association request sent from a second of the nodes at step 2405. The association request asks for permission to associate a first of the nodes to the second node.

At step 2410, the server determines a location (actual or relative) of the first node and second node. In one embodiment, the server may receive location data for the second node. For example, when the second node is a master node, the location data for the second node may be GPS coordinates for the current location of the master node, which provides this to the server. And in an embodiment, the server may determine a location of the first node using at least one of a plurality of location methods available to the server for locating the first node, such as those discussed in detail above (or a combination of such methods so that a more refined location of the first node is determined).

At step 2415, the server determines if associating the first node to the second node is desired based at least upon the location of the first node and the location of the second node. In one embodiment, it may be determined if associating is desired by determining if associating the first node to the second node is anticipated based upon context data. In another embodiment, it may be determined if associating is desired by identifying a current mode of filtering that limits potential nodes to be associated, and granting the permission to associate the first node to the second node only if the current mode of filtering allows the first node to be associated with the second node. For example, this may involve granting the permission only if the current mode of filtering defines that the second node is within a locational range of the first node consistent with the current mode of filtering. This may be defined by a particular filtering mode, such as a local, regional, or global filtering mode that operates to restrict nodes that may associate with other nodes. As such, the method may alter the current mode of filtering to another mode of filtering that allows the first node to be associated with the second node as a sort of override of the current filtering mode (e.g., depending upon an alert status of the first node).

At step 2420, the server records new association data if it is desired to associate the first node with the second node at step 2420. At step 2425, the server transmits a response to the second node granting the permission to associate the first node to the second node. In an embodiment, the server may first generate an authorization credential that authorizes connecting the first node and the second node and sharing information between the first node and the second node. This may be by looking up the credential information or by going through a process to create specific an authorization credential that allows the two nodes to actively pair and share data. With the authorization credential, the server may transmit them as the response.

In another example, the server may have pre-staged an authorization credential related to the second node and a third node if the server anticipates the second node will disassociate with the first node and later request to associate with the third node. For example, this may be done if the context indicates the second node (e.g., a master node) may be placed in a container and need to connect with the third node in the future when the second node may lose its connection to the server.

Method 2400 may also include the server receiving shared data from the second node. The shared data may originate from the first node or may have parts that originate from both the first and second nodes. For example, the second node may have received the permission to associate, and actively paired with the first node in a secure manner. The first node may have indicated it has data to upload (e.g., sensor data), and the second node may receive the data from the first node. Subsequent to that sharing, the second node may upload the shared sensor data from the first node by transmitting it to the server.

The method may further comprise instructing the second node to take over responsibility for a task previously performed by the first node after the second node is associated with the first node. For example, when the second node is powered by an external power source and the first node is powered by a battery, the responsibility for certain tasks may be taken over by the node with a more robust power supply (e.g., the node powered by an external power source).

In more detail, the responsibility for certain tasks may be established, tracked and changed with a programmable profile. For example, in one embodiment, the server may establish a profile for how long the task responsibility would change. In some cases, the profile may define a period of time for how long a node having this profile would have responsibility for a certain task before it would revert back to a default node. In another example, a node (such as a master node) may have a default condition trigger (like a low power situation or when it cannot communicate with the server) that can override such a profile so that it does not take on more responsibilities under particular conditions.

Furthermore, an embodiment may have the master node deciding what other node may take on responsibility for certain tasks. This may be helpful in situations where access to the server may be limited (e.g., an airborne environment). However, managing such a profile may be more easily accomplished in other embodiments with easier access to more types of context data on the server level.

In an embodiment that implements association management as a system, such an exemplary system for association management of a wireless node network may comprise a first node, a second node, and a server. The second node includes a node processing unit, a node volatile memory coupled to the node processing unit, a first communication interface coupled to the node processing unit, and a second communication interface coupled to the node processing unit. The first communication interface provides a short-range communication path between the first node and the second node and the second communication interface provides a longer range communication path between the second node and the server.

The server includes a server processing unit, a server volatile memory coupled to the processing unit, and a third communication interface that provides a longer range communication path between the server and the second communication interface of the second node.

The node volatile memory maintains at least a first program code section (e.g., master control and management code 425 or parts thereof) while the server volatile memory maintains at least a second program code section (e.g., server control and management code 525 or parts thereof).

When executing the first program code section resident in the node volatile memory, the node processing unit of the second node is operative to identify the first node as a potential for associating with the second node, transmit an association request over the second communication interface to the server, receive an association response (having at least authorization information generated by the server) over the second communication interface from the server, provide the authorization information to the first node, and associate the first node and the second node.

In one example, the node processing unit may be further operative to review status information related to the first node to determine whether the first node desires association with the second node. In another example, the node processing unit may be further operative to securely provide shared data between the first and second node after the first and second node are associated and in accordance with a sharing profile provided by the server. The sharing profile may define types of information to be securely shared between particular nodes.

When executing the second program code section resident in the server volatile memory, the server processing unit is operative to determine a location of the first node and second node, determine if associating the first node to the second node is desired based at least upon the location of the first node and the location of the second node, store new association data in the server volatile memory if it is desired to associate the first node with the second node, and transmit the authorization response to the second node granting the permission to associate the first node to the second node.

In one embodiment, the second node in the system may take over responsibility of a task previously handled by the first node after the second node is successfully associated with the first node. For example, when the second node is powered by an external power source and the first node is powered by a battery, the system may be more effectively and efficiently managed by reassigning a task (especially a task that involves a significant expenditure of power, a series of operations over a significant period of time, or both) to another node, such as the second node, which has more power available than the first node.

In another embodiment, the server processing unit may be further operative to set a current mode of filtering that limits potential nodes to be associated, and grant the permission to associate the first node to the second node only if the current mode of filtering allows the first node to be associated with the second node. In a further embodiment, the server processing unit may be further operative to alter (e.g., override) the current mode of filtering to a different mode of filtering. In this way, the server may adapt how nodes are managed and allow the first node to be associated with the second node if it is desired, such as then the first node is in an alert status level and urgently is requesting connection to a larger group of nodes than permitted under the current mode of filtering.

While the exemplary methods illustrated in FIGS. 23 and 24 focus on active associations, FIG. 25 is a flow diagram illustrating an example method for association management of a wireless node network having at least a plurality of nodes and a server in accordance with an embodiment, but from the perspective of a node that is to be passively associated with another node. Referring now to FIG. 25, method 2500 begins with a second of the nodes receiving a message broadcasted from a first of the nodes at step 2505. At step 2510, the second node captures an address of the first node from the message. At step 2515, the first node and the second node are associated by storing the captured address of the first node and an address of the second node as association data in a memory of the second node. At step 2520, the second node transmits the association data to the server.

At some point, the server may be updated by the second node with updated association data when the second node does not receive an additional message broadcast from the first node. For example, the second node and the first node may stay associated and securely connected for a period of time, but eventually the first node may move such that the connection is no longer viable or the first node may move closer to another node along the anticipated path it is traveling (e.g., an anticipated shipping path along a conveyor within a structure from an entry point of the structure but now closer to an exit point of the structure). As the first node travels on the conveyor, it may get closer to another node near the exit point and is better managed by an association with that other node near the exit point. Thus, the updated association data reflects that the first node is disassociated from the second node.

Method 2500 may further include having the second node determining a location of the first node, and updating the server with a current location of the second node and the determined location of the first node. Additionally, method 2500 may include receiving location information from the server that defines a refined location of the first node.

In an embodiment that implements passive association management as a managing node (e.g., a master node) in a wireless node having at least another node and a server, such an exemplary managing node comprises a processing unit, a first and second communication interface each coupled to the processing unit, a volatile memory coupled to the processing unit, and a memory storage coupled to the processing unit. The first communication interface provides a first communication path to the other node, can receive a message broadcast from the other node, and provide the message to the processing unit. The second communication interface providing a second communication path to the server.

The memory storage may maintain at least a node association manager module as program code to be executed by the processing unit. When the processing unit loads the module into volatile memory and executes instructions of the module, the processing unit is operative to receive the message from the first communication interface, capture an address of the another node from the message, store the captured address of the another node and an address of the managing node as part of association data in the memory storage, and transmit the association data to the server through the second communication interface.

In one example, the memory storage also maintains a location manager module and, when the processing unit also loads the location manager module into volatile memory and executes instructions of that module, the processing unit is operative to determine a location of the other node, determine a current location of the managing node (e.g., via GPS location signals), and update the server with the current location of the managing node and the determined location of the other node.

The managing node may be further operative to update the server with updated association data when the first communication interface does not receive an additional message broadcast from the other node. The updated association data may reflect that the other node is disassociated from the managing node.

Context Management within a Wireless Node Network

As explained above in general, management of nodes may rely upon the contextual environment of the nodes. As shown in FIG. 5, server 100 has access to a wide variety of different context data 560. Context data, such as data 560, may include a wide variety of data that generally relates to the environment in which the nodes are operating and may be used to advantageously provide enhanced node management capabilities in accordance with embodiments of the present invention. As such, the use of such context data provides a data foundation in an embodiment so that the server may better and more efficiently implement management tasks related to nodes in the network, and adjust such tasks to account for relevant context data as nodes move within the network (e.g., as an ID node moves with an item being shipped along an anticipated or predicted transit path from an origin to a destination). For example, the server take advantage of its ability to rely upon relevant context data to advantageously alter how it instructs a node operate, how it associates a node with the another node, how it can better locate a node, and how it can more efficiently track and respond to requests to report the location of the node.

Figure 26:
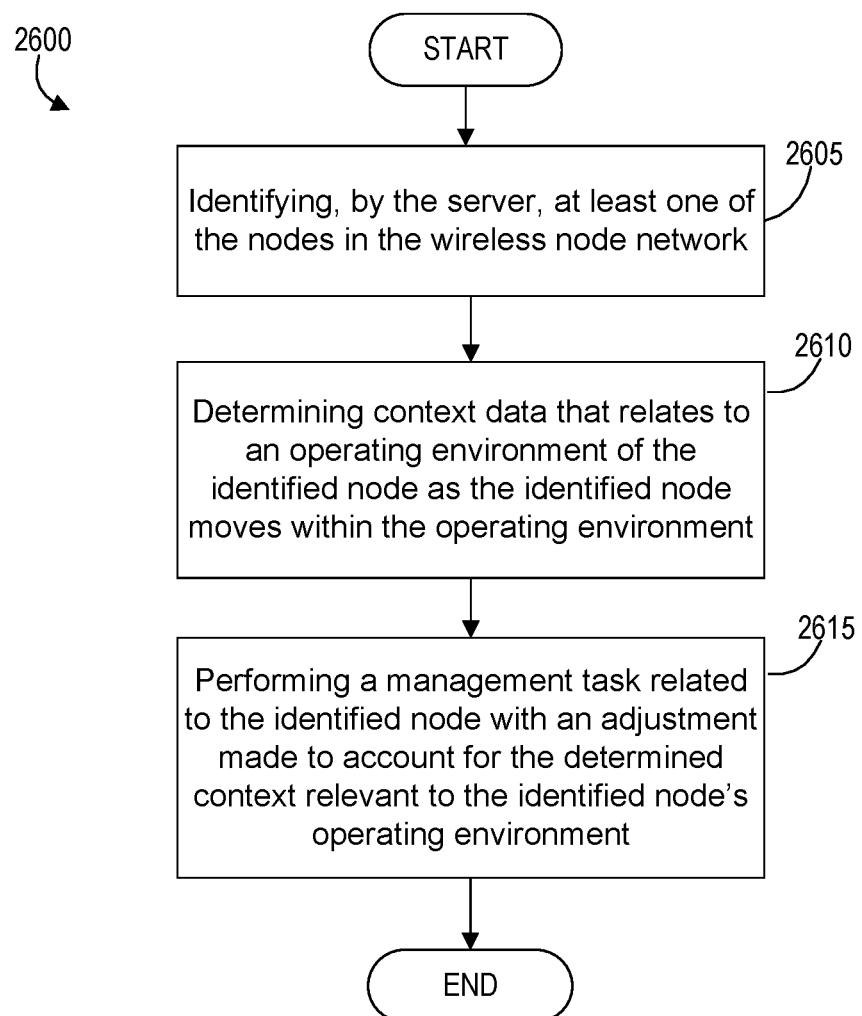
FIG. 26 is a flow diagram illustrating an exemplary method for context management of a wireless node network in accordance with an embodiment of the invention.

FIG. 26 is a flow diagram illustrating an exemplary method for context management of a wireless node network in accordance with an embodiment of the invention. Referring now to FIG. 26, method 2600 begins at step 2605 by identifying, by the server, at least one of the nodes. In one example, such as that shown in FIG. 22a, server 100 may identify ID node A 2220a as part of communications received from master node M1 2210a. At step 2610, the server determines context data that relates to an operating environment of the identified node as the identified node moves within the operating environment.

In one embodiment, the context data may include one or more types of data, such as scan data, historic data, shipment data, RF data, and layout data. For the example shown in FIG. 22a, server 100 may access context data 560 (which may be kept in context database 565) to determine parts of the context data 560 that relate to the operating environment of ID node A 2220a. Such context data 560 may include, in this example, shipment data that relates the item being shipped that is connected to ID node A 2220a, scan data for when the item connected to ID node A 2220a was scanned upon entering structure 2200, historic data for how long it takes a node to traverse the conveyor located within structure 2200, and layout data on dimensions of structure 220. Those skilled in the art will appreciate that context data may include operational environment information created within the wireless node network or created by a third party (e.g., weather information related to the operating environment of ID node A 2220*a*).

While the server determines context data that relates to an operating environment of the identified node in one embodiment, such a current or anticipated operating environment for a node in a more detailed embodiment may include one or more types of environments. For example, the current or anticipated operating environment for a node may include an electronic communication environment, a physical environment of an anticipated path along with a node moves, a conveyance environment related to how a node moves, and a density environment related to the density of nodes within an area near a particular node identified by the server.

Back at step 2610, the determining step may involve determining the context data that relates to an anticipated operating environment of the identified node as the identified node moves in a predicted path towards a location of another node. In another example, the determining step may involve determining the context data that relates to the anticipated operating environment of the identified node and an anticipated operating environment of the another node as the identified node moves in the predicted path towards the another node for an expected association with the another node At step 2615, the server performs a management task related to the identified node with an adjustment made to account for the determined context data. When the determined context data (such as RF signal degradation information) indicates that no adjustment is actually needed when performing the task, no adjustment is made given the determined context data. Thus, those skilled in the art will appreciate that an adjustment may be made when needed contextually and is not required at all times.

In one embodiment, performing the management task may comprise generally instructing the identified node to alter its operation based upon the determined context data. For example, server 100 may perform the management task of instructing ID node A 2220*a* to change its connectable and non-connectable intervals as it approaches master node M1 (which server 100 knows from context data, such as scan data generated when node A entered structure 2200). Thus, in this example, server 100 is able to leverage enhanced visibility of ID node A 2220*a* based upon context data and advantageously alter the operation of node A to increase the node's chance of successfully associating with master node M1 2210*a*.

In other embodiment, performing the management task may comprise associating the identified node with another node with the adjustment made to alter an associating parameter based upon the determined context data. In other words, context data may be helpful as part of associating nodes. In one example, the associating parameter may include at least one altered timing interval related to associating the identified node with the other node, such as an alert interval or connectable interval. These intervals are parameters that may be altered as part of adjustments made when a server associates two nodes and, for example, sets the intervals to more appropriate time durations in order to enhance the chance and opportunity the nodes have to actively pair and securely share data as needed.

In yet another embodiment, performing the management task may comprise locating the identified node with an adjustment made to a power setting based upon the determined context data. In one example, the power setting adjustment is done to a master node in direct communication with the server. In another example, the power setting adjustment may be done to an ID node, which is passed this operational adjustment information from another node. In one embodiment, the power setting itself may comprise an output power level adjusted to account for an adverse condition in the operating environment of the identified node (e.g., a master node with an adjusted RF output signal level). The adverse condition may be, for example, an adverse RF communication environment where structure attenuates or otherwise impedes normal RF communications. In another example, the adverse condition may be a highly dense population of nodes close to the identified node.

In more detail, the output power level may be adjusted to account for a shielding condition in the operating environment of the first node. Such a shielding condition may be caused, for example, by one or more of packaging, package contents, proximate package, proximate package contents, and physical infrastructure in the operating environment of the first node. For example, if the identified node is located near a metal container, it is operating in an adverse RF communications environment where it may have its output power level increased based on this context data in order to better deal with the adverse shielding condition.

In still another embodiment, performing the management task may comprise providing the location of the identified node in response to a request received by the server related to a status of the identified node. For example, if server 100 receives a request from user access device 205 about the status of ID node A 2220*a*, server 100 is able to provide the location of node A as being within structure 2200, but refined as being close to the entry of the structure given the adjustment to account for contextual data, such as scan data related to the item being shipped with node A 2220*a*.

Those skilled in the art will appreciate that method 2600 as disclosed and explained above in various embodiments may be implemented on a server, such as server 100 illustrated in FIGS. 5 and 22A, running one or more parts of server control and management code 525 (e.g., the context based node manager). Such code may be stored on a non-transitory computer-readable medium such as memory storage 515 on server 100. Thus, when executing code 525, the server's processing unit 500 may be operative to perform operations or steps from the exemplary methods disclosed above, including method 2600 and variations of that method.

Node Location Determination Methodologies

As part of managing and operating a wireless node network in accordance with one or more embodiments of the invention, such as tracking ID node A 2220*a* in FIGS. 22A-C, determining a node's location is performed. As explained above, an exemplary ID node may be directly or indirectly dependent on a master node to determine its location. In the embodiments discussed and described herein, a location of a node may generally encompass a current or past location. For example, an embodiment that determines a node's location may be a current location if the node is not moving, but may necessarily determine the location as a past location should the node be in a state of motion.

Likewise, the term location alone may include a position with varying degrees of precision. For example, a location may encompass an actual position with defined coordinates in three-dimensional space, but use of the term location may also include merely a relative position. Thus, the term location is intended to have a general meaning unless otherwise expressly limited to a more specific type of location.

Determining node location may done by a master node alone, the server alone, or the master node working together with the server. And on such devices, embodiments may use one or more methodologies to determine a node's location and further refine the location. Such example methodologies may include, but are not limited to, determining node location may relate to controlling an RF characteristic of a node (e.g., an RF output signal level and/or RF receiver sensitivity level), determining relative proximity, considering association information, considering location adjustments for context information and an RF environment, chaining triangulation, as well as hierarchical and adaptive methods that combine various location methodologies. A more detailed description of these exemplary node location determination techniques is provided below.

Location Through Proximity

In one embodiment, a signal strength measurement between two or more nodes may be used to determine the proximity of the nodes. If neither node's actual location is known, one embodiment may infer a location relationship of the two nodes through proximity.

Proximity when Varying Power Characteristics

For example, an exemplary method of determining a node's location in a wireless node network of nodes may involve varying a node's power characteristic, such as the output power of one of the nodes. Generally and as explained with reference to FIG. 13, the power characteristic may be varied to identify closer ones of the nodes to the node broadcasting. The node broadcasting may transmit one or a series of signals while other nodes may report receiving one or more of the signals. Those other nodes that receive at least one signal broadcast from the transmitting node may be deemed part of a close group of nodes. And as the power characteristic is varied (increased or decreased or both), a closest group of nodes (or single node) may be identified as the smallest group of nodes of those that receive at least one signal from the broadcasting node. Accordingly, while not absolute, a type of location for the broadcasting node may be determined based on the closest one or group of nodes. This may be repeated for neighboring nodes to yield a set of closest node information for each of the nodes. In more detail, an exemplary set of closest node information for each of the nodes may include which nodes are closest (via the lowest power characteristic) and more robustly supplement this information with which other nodes are incrementally further away (via increasingly larger power characteristics). Thus, the set of closest node information provides the basis for a determination of how close the nodes in the network are to each other, which provides a type of location determination for each node.

Additionally, context data may be referenced in certain embodiments to further enhance determining how close the nodes are to each other. For example, combining the set of closest node information with context data, such as scan information that registers when an item changes custodial control in a delivery system, may further refine how to determine the location of the nodes. Scan and other context information will help determine if one or more of the nodes, for example, are known to be in the same container, vehicle or moving on a belt together. Thus, this type of context data may be integrated into a further step of refining how close the nodes are to each other based upon the context data.

Figure 28:
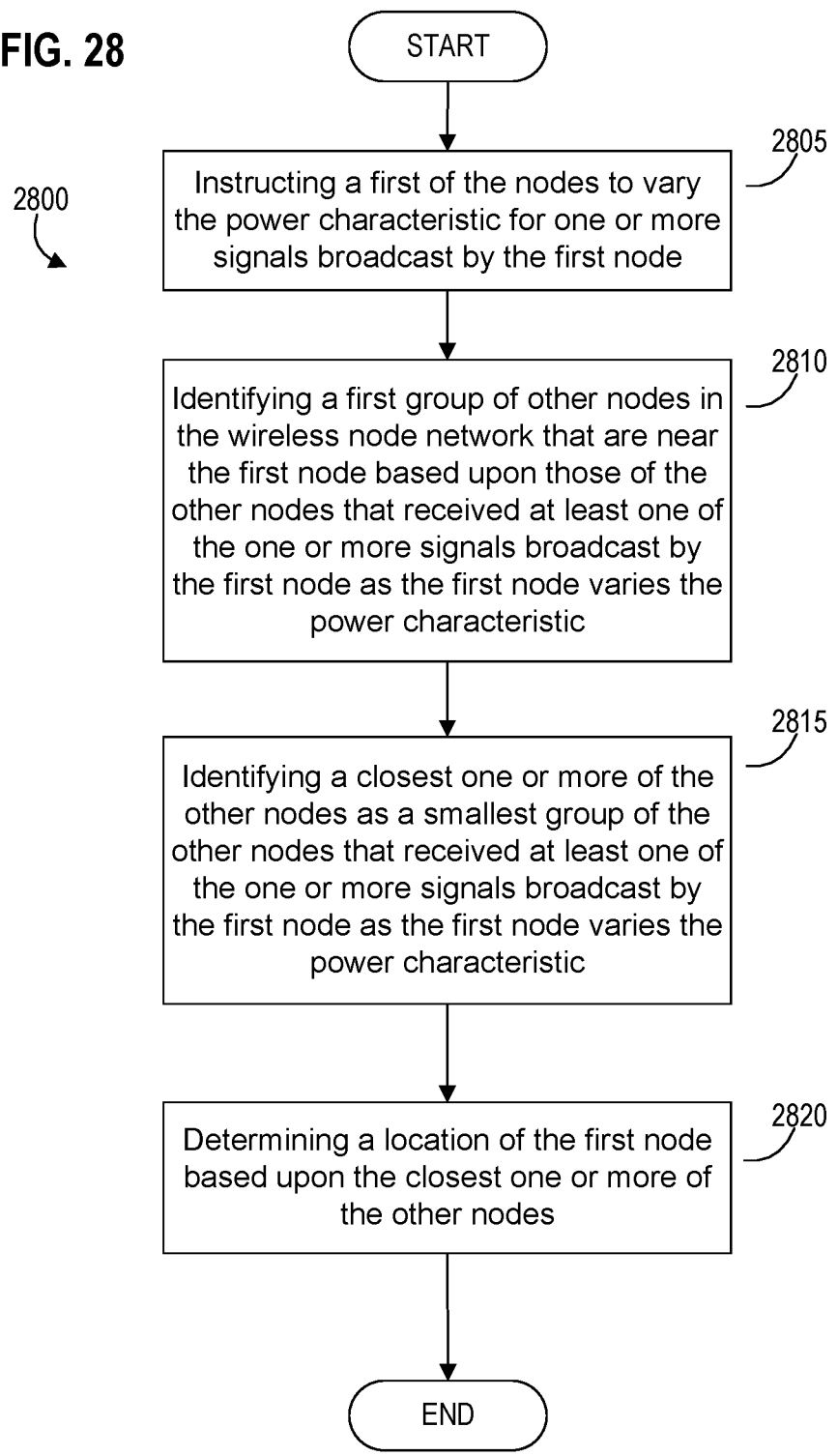
FIG. 28 is a flow diagram illustrating an exemplary method for location determination by varying a power characteristic of nodes in a wireless node network in accordance with an embodiment of the invention.

In general, a location of a node based upon proximity may be determined when a power characteristic of nodes is changed or varied in a wireless node network. FIG. 28 is a flow diagram illustrating an exemplary method for location determination by varying a power characteristic of nodes in a wireless node network in accordance with an embodiment of the invention. Referring now to FIG. 28, method 2800 begins by at step 2805 by instructing a first of the nodes to vary the power characteristic for one or more signals broadcast by the first node. In a more detailed embodiment, such an instruction may cause the first node, for example, to incrementally decrease or incrementally increase the power characteristic (such as an output power level) between values.

At step 2810, method 2800 continues by identifying a first group of other nodes in the wireless node network that are near the first node based upon those of the other nodes that received at least one of the signals broadcast by the first node as the first node varies the power characteristic. In a further embodiment, step 2810 may incrementally identifying which of the first group of other nodes are receiving at least one of the broadcast signals as the first node incrementally varies the output power level of the signals broadcast. The incrementally identified nodes may be deemed a set of increasingly close nodes to the first node.

At step 2815, method 2800 continues by identifying a closest one or more of the other nodes as a smallest group of the other nodes that received at least one of the one or more signals broadcast by the first node as the first node varies the power characteristic.

At step 2820, method 2800 concludes by determining a location of the first node based upon the closest one or more of the other nodes. Thus, as the power characteristic is varied, the group of nodes that have received at least one of the signals broadcast by the first node may change and the smallest such group being a closest group of nodes (even if just one node) to the first node. In a more detailed embodiment, step 2820 may comprise determining the location of the first node based upon the closest one or more of the other nodes and the set of increasingly close nodes to the first node as the set of increasingly close nodes provides more detailed proximity information for a refined location determination.

Figure 14:
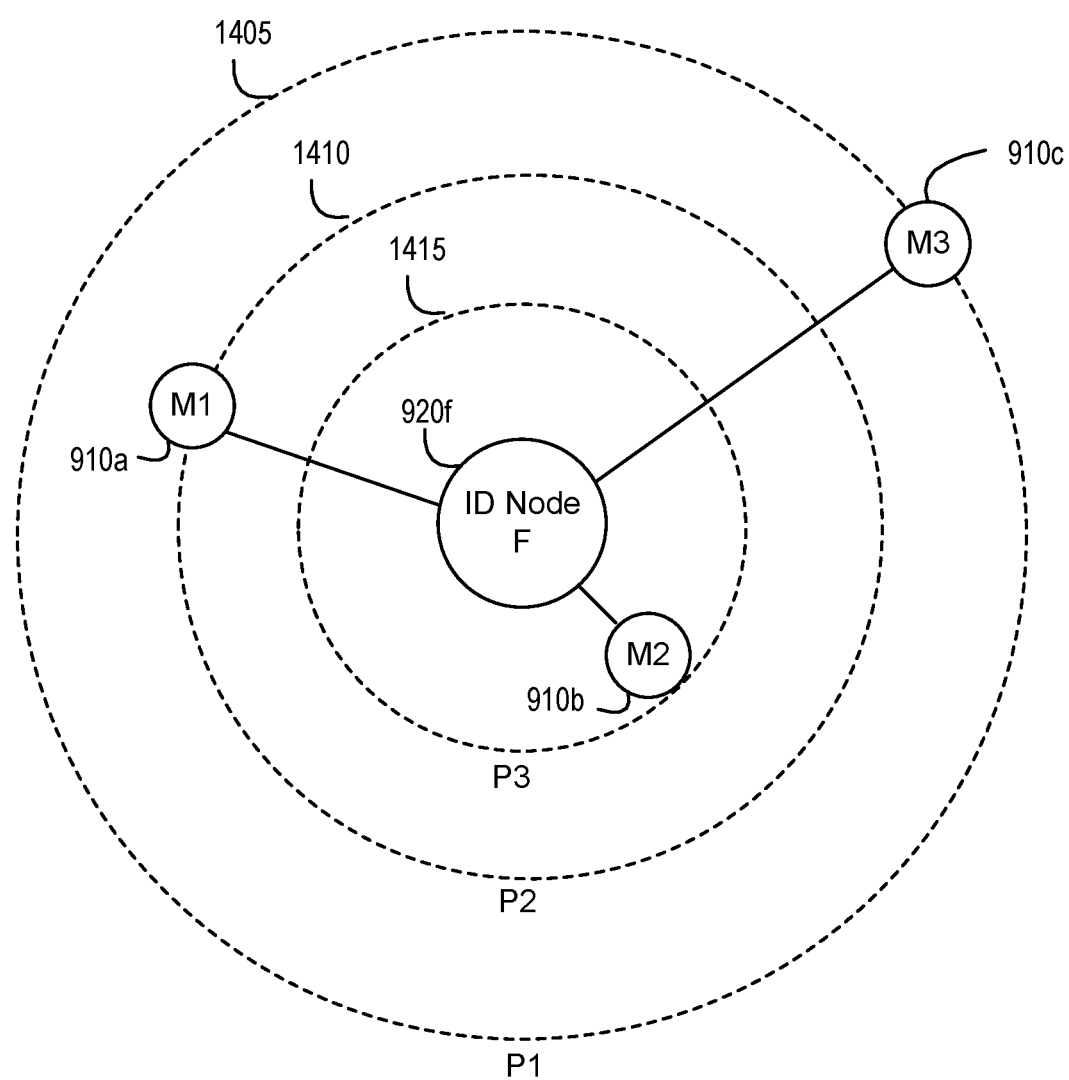
FIG. 14 is a diagram illustrating an exemplary location determination using ID node advertise in accordance with an embodiment of the invention.

For example, referring to FIG. 14, the set of increasingly close nodes to the ID node F 920f may include node M3 as being farthest away and M1 being closer than M3. When the power characteristic of ID node F incrementally decreases, and its output power level changes from P1 to P2, M3 can no longer receive the signal, but M1 and M2 still do. And as the power characteristic of ID node F continues to incrementally decrease, and its output power level is changed from P2 to P3, M1 can no longer receive the signal, but only M2 does as the last of the nodes closest to ID node F. Thus, in this example, determining the location of ID node F may be based upon the fact that M2 is the closest node and the set of increasingly close nodes include M1 and M3 with M1 being closer than M3.

In another embodiment, one or more further refinements to the first nodes location may be performed. In one example, steps 2805-2820 may be repeated where a second of the nodes is instructed to vary the power characteristic for one or more signals broadcast by the second node, and then method 2800 may further refine the location of the first node based upon a location of the second node. In a more detailed example, steps 2805-2820 may be repeated where a second of the nodes is instructed to vary the power characteristic for one or more signals broadcast by the second node, and then method 2800 may further the location of the first node based upon a location of the second node and a set of increasingly close nodes to the second node. With this increasingly cross-related information on what nodes are closer to other nodes and to what degree, which may be further repeated for additional nodes, embodiments may further refine the location of the first node within the network.

Method 2800 may further include determining context data related to the first node, and refining the location of the first node based upon the context data. In an embodiment where the power characteristic is output power level, the incremental changes in the output power level of the broadcast signal in steps 2805-2815 may be set according to the context data.

Method 2800 may also determine the context data to be related to the closest node to the first node, and refine the location of the first node based upon the context data. In still another example, method 2800 may determine the context data to be related to the incrementally identified nodes in the set of increasingly close nodes to the first node, and refining the location of the first node based upon the context data. For example, the closest node and the set of increasingly close nodes may have scan data that indicate they are within the same container. This exemplary context data may be used to further refine the location of the node being located, which may help efficiently determine that node is near the container. As such, those skilled in the will appreciate that context data for the node being located as well as nodes identified to be close to that node may provide relevant input to advantageously help further refine the location of the node.

Those skilled in the art will appreciate that method 2800 as disclosed and explained above in various embodiments may be implemented on a server apparatus, such as server 100 illustrated in FIGS. 5 and 22A, running one or more parts of server control and management code 525 (e.g., the location manager). Such code may be stored on a non-transitory computer-readable medium such as memory storage 515 on server 100. Thus, when executing code 525, the server's processing unit 500 may be operative to perform operations or steps from the exemplary methods disclosed above, including method 2800 and variations of that method.

An embodiment of such a server apparatus may include a server (such as server 100) operative to communicate with a plurality of nodes in the wireless node network. As explained with respect to FIG. 5, the server generally includes a server processing unit, a server volatile memory, a server memory storage, and at least one communication interface. In this embodiment, the volatile memory, memory storage, and communication interface are each coupled to the processing unit. The memory storage maintains at least a program code section and location data related to a location of one or more of the nodes. The communication interface provides a communication path operatively coupling the server with the nodes.

The server processing unit, as mentioned above, is operative when running the program code section, to perform the steps and operations as described above relative to method 2800 and variations of that method described above.

Proximity when Observing Signal Patterns and Strengths Over a Time Period

In another embodiment, an improved method for determining a node's location through proximity may include analyzing the signal patterns and strengths between an advertising node and a listening node. In one embodiment, a threshold may be set for association based on an observed message count and/or recorded signal strength within a specific time period may improve the ability to locate a node (e.g., an ID node) to that of another node (e.g., a master node). In some embodiments, the observed message count may be implemented as an averaged count over a repeated time periods. Further still, other embodiments may filter outlying observations in the observation data set to help improve the quality of data relied upon for setting a threshold for association and, as a result, determine a node's location.

In a more detailed example, an improved method for determining a node's location through proximity may show captured advertising message counts as a component for a node's location and determining a node's direction of travel. In this example, two exemplary master nodes (e.g., master node M1 910a and M2 910b) may capture advertising messages from one ID node (e.g., ID node A 920a). Master node M1 may observe and capture (e.g., record information related to the observation) 60 messages from ID node A within a 2 minute period, while master node M2 only observes and captures 7 advertising messages from ID node A within that same period. Based upon the difference in how often messages are observed from ID node A by master node M1 compared to those observed by master node M2, the system is able to determine that ID node A would more proximate to master node M1, and it's known location.

In a further embodiment, comparing the average time stamp of the captured records may allow the system can make a more accurate determination of location. For example, if the average captured message found on master node M2 is increasingly growing larger (e.g., taking longer for messages to go from ID node A to master node M2), this indicates ID node A is moving away from master node M2. If the average captured message found on master node M2 is growing increasingly larger while the average captured message found on master node M1 is increasingly growing smaller, this indicates ID node A is moving away from master node M2 and toward master node M1. Thus, over a number of observed time periods, the change in message timing (transmission to reception) may also be relied upon to enhance or refine a node's location.

In yet another embodiment, the observed signal strength may be a component in location determination and estimating direction of travel and may allow the system can make a more accurate determination of location. For example, two master nodes (M1 910a and M2 920b) may be capturing advertising messages from a node (ID node A 920a). M1 captures 60 messages from ID node A within 2 minutes, while M2 captures only 7 messages. The average signal strength observed for signals from ID node A by master node M1 is higher compared to the average signal strength observed by master node M2. Based upon this observed signal strength information, the system would determine that ID node A to be at M1, but a predicted path may indicate ID node A is heading towards M2. As the master nodes M1 and M2 continue to capture records, the system (e.g., management code 524 operating on server 900, which is in communication with M1 and M2) processes the continued feed of capture records from M1 and M2. With this observed signal strength information, the server 900 would expect that the count and average signal strength of messages from ID node A over the time period observed (2 minutes) to increase for observations at M2 and to decrease for observations at M1 when ID node A is physically moving closer to M2 and away from M1. Thus, the change in observed powers levels and in how often messages are observed may indicate actual node movement in an embodiment.

Basing node proximity location and node directional determinations on observed signal patterns and characteristic strengths over a period of time has the advantage of reducing the likelihood of unwanted and spurious signal anomalies causing an ID node's location to be incorrectly determined. And the above exemplary methods for determining movement characteristics of a node (e.g., moving closer to one node, moving closer to one but away from another, etc.) as part of refining the node location may be applied in combination with the various embodiments for determining node location described herein.

Figure 27:
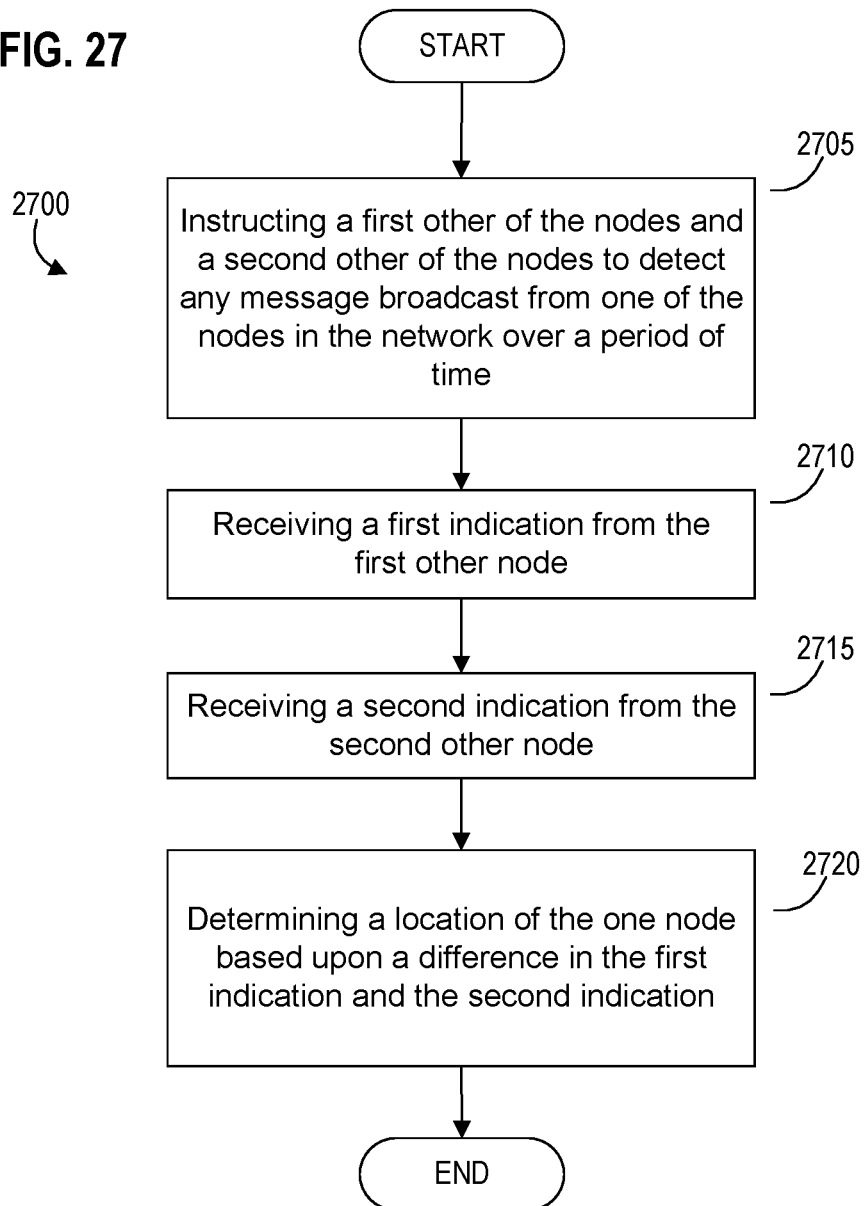
FIG. 27 is a flow diagram illustrating an exemplary method for locating a node in a wireless node network based upon observed signal patterns and characteristic indications over a period of time in accordance with an embodiment of the invention.

FIG. 27 is a flow diagram illustrating an exemplary method for proximity locating a node in a wireless node network based upon observed signal patterns and characteristic indications over a period of time in accordance with an embodiment of the invention. Referring now to FIG. 27, method 2700 begins at step 2705 by instructing a first and a second other nodes to detect any message broadcast from the one node over a period of time. The period of time may be set based upon a variety of factors, such as context data. In more detail, the period of time may be dynamically changed based upon context data as the one node moves into different contextual environments.

Method 2700 has the server receiving a first indication from the first other node at step 2710 and receiving a second indication from the second other node at step 2715. Finally, the method 2700 determines a location of the one node based upon a difference in the first indication and the second indication at step 2720.

The first indication is related to a characteristic of messages broadcast from the one node that are detected by the first other node during the period of time. Likewise, the second indication is related to the characteristic of messages broadcast from the one node that are detected by the second other node during the period of time. These indications may include, for example, a count of messages received by the respective other nodes, a transit time factor (e.g., an average transit time for a message to be detected after broadcast), and an average signal strength.

In one embodiment, the first indication may be a first count of messages broadcast from the one node that are detected by the first other node during the period of time, and the second indication may be a second count of messages broadcast from the one node that are detected by the second other node during the period of time. As such, determining the location of the one node may be the location that is closer to the first other node than the second other node when the first count is greater than the second count. Additionally, the method 2700 may further include determining an actual node movement direction for the one node based upon comparing the first count and the second count over a plurality of time periods. For example, the method 2700 may repeat observations over several of these time periods and track the first count and second count over time to determine which is increasing, which is decreasing, and determine movement of the one node based upon these measurements over time.

In another detailed embodiment, the first indication may be a first time factor of messages broadcast from the one node that are detected by the first other node during the predetermined time period, and the second indication may be a second time factor of messages broadcast from the one node that are detected by the second other node during the period of time. And an actual node movement direction for the one node may be based upon comparing the first time factor and the second time factor. In a more detailed embodiment, the first time factor may be an average transit time for a message detected at the first other node to go from the one node to the first other node, and the second time factor is an average transit time for a message detected at the second other node to go from the one node to the second other node. As such, determining the location of the one node may be that the location is closer to the first other node than the second other node when the first time factor is less than the second time factor.

In yet another embodiment, the first indication may be a first average signal strength of messages broadcast from the one node that are detected by the first other node during the period of time, and the second indication may be a second average signal strength of messages broadcast from the one node that are detected by the second other node during the period of time. As such, determining the location of the one node may be that the location is closer to the first other node than the second other node when the first average signal strength is greater than the second average signal strength.

The method 2700 may also include, in an embodiment, observing a degree of change in the first average signal strength and a degree of change in the second average signal strength over repeated time periods, and determining an actual node movement direction for the one node based upon comparing the degree of change in the first average signal strength and the degree of change in the second average signal strength.

In another embodiment, the method 2700 may also refine the determined location of the one node. In this embodiment, the method 2700 may further comprise refining the location of the one node based upon at least one of a first updated location received from the first other node and a second updated location received from the second other node. For example, when first other node is a mobile master node and it is the closer of the two nodes to the one node being located, the embodiment can take advantage of the location signaling onboard the first other node that provides the current location of the first other node. That current location data may be transmitted by the first other node to the server to update the server in its calculation of the location for the one node.

In still another embodiment, the method 2700 may layer context data with the determined location to refine the location of the node. Context data related to the one node may be determined by the server, and so the location of the one node may be refined based upon that context data. In another example, context data related to the closer of the first other node and the second other node when compared to the location of the one node. For example, the server may be aware that a particular master node is closer to the one node compared to a second master node, and that the particular master node is within a container. With this additional context data related to the particular master node, the server may refine the location of the one node based upon the context data. Other exemplary types of relevant context data may be relied upon when refining the location of the one node, such as context data of a particular shielding associated with the environment near the particular master node (e.g., a particular type of ULD having known RF shielding characteristics, etc.)

Additionally, the method 2700 may involve looking to see if the one node is behaving as expected. More specifically, a further embodiment of the method 2700 may further compare the location of the one node to a predicted path of the one node to determine if the one node is located outside the predicted path. This may allow the server to use learned, historic data when creating a predicted path, and keep track of the one node relative to being within an acceptable range associated with this predicted path. The method may also generate a notification if the one node is outside the predicted path. In this manner, actionable tasks can then be taken to locate the one node—e.g., changing filter mode options for nodes in that general area, etc.

Those skilled in the art will appreciate that method 2700 as disclosed and explained above in various embodiments may be implemented on a server, such as server 100 illustrated in FIGS. 5 and 22A, running one or more parts of server control and management code 525 (e.g., the location manager). Such code may be stored on a non-transitory computer-readable medium such as memory storage 515 on server 100. Thus, when executing code 525, the server's processing unit 500 may be operative to perform operations or steps from the exemplary methods disclosed above, including method 2700 and variations of that method.

Association Driven Locating with Variable RF Characteristics

As noted above, a signal strength measurement between two or more nodes may be used to determine relative distance between nodes. If one of the nodes has a known location (such as master node M1 910*a*), a relative location of one or more nodes within a range of the known location node is generally a function of how accurate the system may determine a distance between the node with known location and associated nodes. In other words, an embodiment may identify a relative location of an item and its related node by relying upon association-driven variable low-power RF output signals to determine a distance the node is from a known location.

Location Determination Through Master Node Advertise

Figure 13:
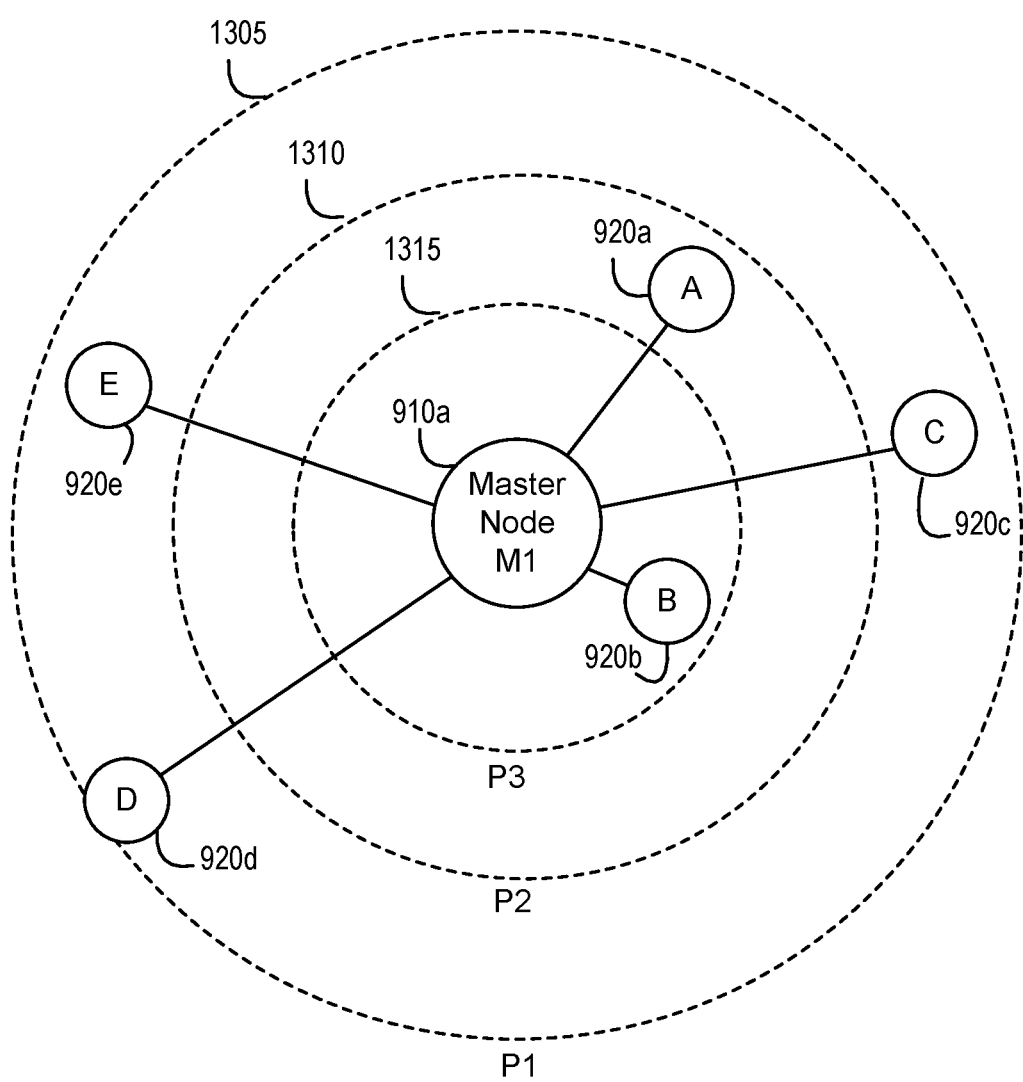
FIG. 13 is a diagram illustrating an exemplary location determination using master node advertise in accordance with an embodiment of the invention.

As generally mentioned above, determining node location may relate to controlling an RF characteristic of a node (e.g., an RF output signal level and/or RF receiver sensitivity level) and, more specifically, may involve aspects of controlling master node advertising. FIG. 13 is a diagram illustrating an exemplary location determination using master node advertise in accordance with an embodiment of the invention. In the illustrated embodiment shown in FIG. 13, a master node, such as master node M1 910*a*, with a known location is broadcasting an advertising message at varying RF output power levels. FIG. 13 illustrates the exemplary different RF output power levels as concentric ranges 1305-1315 about master node M1 910*a*. Thus, master node M1 910*a* may broadcast at a maximum power P1, related to range 1305, but may control the RF output power level and dynamically change the RF output power level to P2 and broadcast at a smaller range 1310, or to P3 and broadcast to an even smaller range 1315.

In the illustrated embodiment, receiving ID nodes A-E 920*a*-920*e* are in query (scan) mode and can each use the received signal at different levels to determine how far away from the transmitting M1 they are located. Those skilled in the art will appreciate that while the illustrated embodiment shown in FIG. 13 has the receiving nodes all as ID nodes, other embodiments may have receiving nodes be either master or ID nodes or a mixture.

In the exemplary embodiment of FIG. 13, the location for nodes A-E may be determined based upon the known location of master node M1 910*a*. That location, plus a range measurement when each of respective receiving nodes A-E last receives a signal from node M1, and factoring in a confidence factor of the range measurement, provides a location determination for the nodes according to variable RF signal power. Depending on a quality of the range measurement, the individual receiving nodes may or may not have an individually calculated location. In yet another embodiment, if third party or context data, such as scan information, is available, a refined location may be determined using such data as an additional confidence factor. As the communication range of M1 is limited from P1 to P3, the accuracy of location by association goes up.

In the illustrated example of FIG. 13, an exemplary method of determining a node's location may be described that uses master node advertising. First, when the master node M1's variable power short range communication interface 480 is set to P1, its maximum output, master node M1 910*a* is seen by each of ID nodes A-E 920*a*-920*e*. Based upon analytics or historic measurements, the open air performance (optimal range) of the radio in M1's variable power short range communication interface 480 at P1 power level may have been previously been found to be approximately 30 feet. Thus, without the need to examine RSSI levels from the individual ID nodes A-E 920*a*-920*e* and without the need for active calibration phases, the system may know that ID nodes A-E are within 30 feet of master node M1 910*a*.

Next, when the master node M1's variable power short range communication interface 480 is set to P2, a medium output level in this example, master node M1 is seen by nodes A and B. From previous analytics or historic measurements, it was determined the open air performance (optimal range) of the master node M1's variable power short range communication interface 480 running at P2 power level is approximately 15 feet. Thus, without the need to examine RSSI levels from the individual nodes, we know ID nodes A 920*a* and B 920*b* are within 15 feet of master node M1. Furthermore, we know the ID nodes no longer receiving the broadcasted RF signal from master node M1 910*a* (e.g., ID nodes C 920*c*, D 920*d*, and E 920*e*) are somewhere within 30 feet of master node M1 910*a*, but probably more than 15 feet away from M1.

And when the master node M1's variable power short range communication interface 480 is set to P3, its minimum output level in this example, it is seen by ID node B 920*b*. From previous analytics or historic measurements, it was determined the open air performance (optimal range) of the master node M1's variable power short range communication interface 480 running at P3 power level is approximately 5 feet. Thus, without the need to examine RSSI levels from the individual ID nodes, we know the location of ID node B 920*b* is within 5 feet of the known location of master node M1 910*a*.

The ranging steps, as discussed in the example above, may then be repeated for any of the identified nodes in order to build a more accurate picture of the relative location of each node. The granularity of RF characteristic settings (e.g., the RF output signal power level setting) will provide more granularity of location differentiation when performing the ranging steps. In one embodiment, the ranging steps may be performed over a set of gross RF characteristics settings (e.g., few settings over a wide range), and similar steps may then be performed over more select ranges for the RF characteristics settings.

Figure 29:
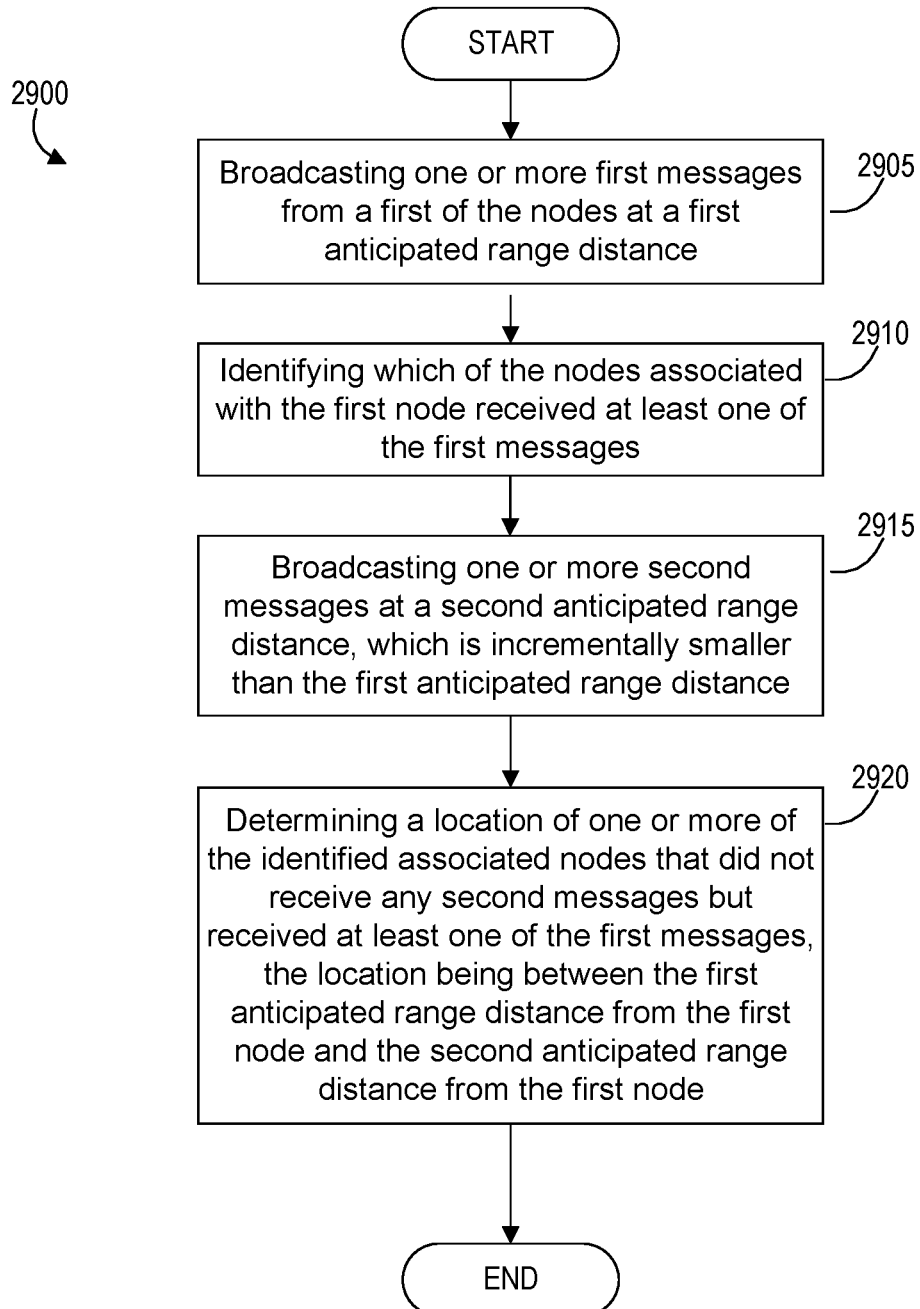
FIG. 29 is a flow diagram illustrating an exemplary method for location determination using one or more associations of nodes in a wireless node network in accordance with an embodiment of the invention.

FIG. 29 is a flow diagram illustrating an exemplary method for location determination using one or more associations of nodes in a wireless node network in accordance with an embodiment of the invention. Referring now to FIG. 29, method 2900 begins at step 2905 where a first of the nodes broadcasts one or more first messages at a first anticipated or predicted range distance. In one embodiment, the first anticipated range distance is an optimal range for the first node. For example, the first node's radio in its communication interface may have a maximum setting to allow the node to broadcast at maximized range assuming a clear environment. Such a setting provides a known anticipated range distance. In the example of FIG. 13, master node M1 910*a* may be broadcasting at a maximum power level P1 that reaches a first range distance from node M1. However, if node M1 is known to be within an adverse RF shielding environment, the first anticipated range distance may be a distance adjusted to account for the contextual environment of such shielding (e.g., a type of context data). Anticipated range distances may be adjusted depending upon one or more types of relevant context (e.g., one or more types of context data related to how an RF output signal from the node may be impeded).

At step 2910, method 2900 identifies which of the nodes associated with the first node received at least one of the first messages. In one embodiment, the first node may be able to access and review association data in its onboard memory storage as part of identifying which are the nodes associated with it. In one example, the associations with the first node may be passive associations (e.g., not actively paired and securely connected) or active associations (e.g., actively paired and able to securely connect and share data), or a combination of both types of associations.

Next, at step 2915, the first node broadcasts one or more second messages at a second anticipated range distance, which is incrementally smaller than the first anticipated range distance. In the example of FIG. 13, master node M1 910*a* may be the first node and now is broadcasting at a medium power level P2 that reaches a second anticipated range distance from node M1. By incrementally changing the RF power level in this manner, master node M1 910*a* now no longer can reach nodes C-E as shown in FIG. 13.

At step 2920, method 2900 concludes by determining a location of one or more of the identified associated nodes that did not receive any of the second messages but received at least one of the first messages, where the location is between the first and second anticipated range distances from the first node. Again, in the example of FIG. 13, master node M1 910*a* may determine the location of nodes C-E (given they did not receive the message sent out the second anticipated range distance at RF power level P2) to between the first anticipated range distance (when master node M1 was broadcasting at power level P1) and the second anticipated range distance (when master node M1 was broadcasting at power level P2) from the known location of master node M1.

In one embodiment, the method 2900 may also have the first node broadcasting one or more third messages at a third anticipated range distance (incrementally smaller range than the second anticipated range distance), and determining a location of one or more of the identified associated nodes that did not receive any of the third messages but received at least one of the second messages, where the location is approximately near the second anticipated range distance from the first node. Again, in the example of FIG. 13, by incrementally changing the power level down to P1 and broadcasting a third message at an anticipated range distance for that P1 level, the master node M1 can determine the location of node A (as node A received the second message but did not receive the third message) to be approximately near the anticipated range distance for P2 from the location of master node M1.

Additional embodiments of method 2900 may also refine such determined locations by updating the location of the first node. In one embodiment, the first node may be a mobile node. As such, refining may involve determining a current mobile location of the first node, and refining the location of the one or more of the identified associated nodes that did not receive any of the second messages but received at least one of the first messages based upon the current mobile location of the first node. Thus, as the first node moves and updates its own location (e.g., via GPS signals received by location circuitry 475 on a master node), the first node is able to leverage its own updated location and advantageously refine the location of nodes associated with it.

And, in some embodiments, the refined location of associated nodes may be transmitted to a server. This provides an update to the server, and aids in tracking and managing the location of nodes in the network. Again, referring back to the example of FIG. 13, master node M1 910*a* may take advantage of such a method for locating associated nodes, such as the locations of ID nodes A-E 920*a*-920*e*, and update server 100 with this new location data related to the current location of node M1 and any of the nodes associated with node M1.

Those skilled in the art will appreciate that method 2900 as disclosed and explained above in various embodiments may be implemented on a node (e.g., master node 110*a* in FIG. 4, master node M1 910*a* in FIG. 13, or master node M1 2210*a* in FIG. 22A) running one or more parts of master control and management code 425 (e.g., the location aware/capture module). Such code may be stored on a non-transitory computer-readable medium, such as memory storage 415 on master node 110*a*. Thus, when executing code 425, the master node's processing unit 400 may be operative to perform operations or steps from the exemplary methods disclosed above, including method 2900 and variations of that method.

In another embodiment, a node apparatus is described in a wireless node network that uses location determination by association as described with reference to the steps related to method 2900. As mentioned above, such as node apparatus may be implemented with a master node having a node processing unit, a node volatile memory, a node memory storage, and a first and second communication interface. Each of the memories and communication interfaces are coupled to the node processing unit. Further, the node memory storage maintains at least a program code section, association data, and location data and, at times, shipping information. The first communication interface provides a first communication path operatively coupling the node with a plurality of other nodes in the network, while the second communication interface provides a second communication path operatively and separately coupling the node with a server in the network.

In this embodiment, the node processing unit is operative to transmit one or more first messages via the first communication interface at a first anticipated range distance, and identify which of the others nodes that are associated with the first node received at least one of the first messages. In one embodiment, the node processing unit may be operative to access the association data in the node memory storage when identifying which of the nodes associated (e.g., passive, active, or both types of associations) with the first node received at least one of the first messages.

The first anticipated range distance may be an optimal transmission range for the first communication interface and, in a more detailed example, may be adjusted based upon context data (e.g., RF shielding inherent from the surrounding environment of the node). In yet another embodiment, the first anticipated range distance and the second anticipated range distance may be adjusted based upon one or more types of context data related to how an RF output signal transmit from the first communication interface may be impeded by an environment of the node.

The node processing unit is also operative to transmit one or more second messages via the first communication interface at a second anticipate range distance (incrementally smaller than the first anticipated range distance) and determine a location of one or more of the identified associated nodes that did not receive any of the second messages but received at least one of the first messages. That location is between the first anticipate range distance from a known location of the node and the second anticipated range distance from the known location of the node. In a further example, the node processing unit may be operative to store the determined location in the node memory storage as part of the location data.

The node processing unit may also be operative to transmit one or more third messages via the first communication interface at a third anticipated range distance (incrementally smaller range than the second anticipated range distance) and determine a location of one or more of the identified associated nodes that did not receive any of the third messages but received at least one of the second messages, where the location is between the second anticipated range distance from the known location of the node and the third anticipated range distance from the known location of the node.

In another embodiment, the node may be mobile and the node processing unit may be further operative to refine the location of the one or more of the identified associated nodes that did not receive the second message but received the first message by updating a location of the first node. In more detail, the node processing unit may be operative to determine a current mobile location of the first node (e.g., check with location circuitry onboard the node for valid GPS signals and a location lock based on such signals), and refine the location of the one or more of the identified associated nodes that did not receive any of the second messages but received at least one of the first messages based upon the current mobile location of the first node. The node processing unit may also be operative to transmit the refined location to the server over the second communication interface.

Location Determination through ID Node Advertise

While FIG. 13 provides an example of location determination through master node advertising, FIG. 14 focuses on location determination through ID node advertising. In particular, FIG. 14 is a diagram illustrating an exemplary location determination using ID node advertise in accordance with an embodiment of the invention. In the illustrated embodiment shown in FIG. 14, exemplary ID node F 920*f* is in an advertising mode but is without a known location. As with FIG. 13, FIG. 14 illustrates the exemplary different RF output power levels from ID node F 920*f* as concentric ranges 1405-1415 about ID node F 920*f*. Thus, ID node F 920*f* may broadcast at a maximum power P1, related to range 1405, but may control the RF output power level and dynamically change the RF output power level to P2 and broadcast at a smaller range 1410, or to P3 and broadcast to an even smaller range 1415. Master nodes M1-M3 910*a*-910*c* are disposed in various known locations relatively near ID node F 920*f*, which has an unknown location. As such, ID node F 920*f* may take advantage of the ability to adjust an RF characteristic, such as RF output signal power level, of its own short-range communication interface as part of how the system may determine location of ID node F through ID node advertising.

In the illustrated embodiment, an RF output signal power level of ID node F 920*f* may be varied or dynamically adjusted via programmable settings (such as profile settings or parameters) related to operations of variable power short range communication interface 375. Additionally, while an actual communication range may vary with the surrounding environment, a maximum anticipated communication range of the ID node's transmitter at each power level is known assuming an optimal operating environment or no substantial RF shielding or interference. Thus, a particular power level setting for a broadcasting node is inherently associated with a corresponding anticipated range distance.

In an exemplary method of determining a nodes location using ID node advertising, the RF output signal power level may be varied across multiple power levels to improve location through master node association. In more detail, when the ID node F's variable power short range communication interface 375 is set to P1, its maximum output, ID node F 920*f* is seen by each of master nodes M1-3 910*a*-910*c*. The anticipated open air performance or range distance (optimal range, or range based upon analytics or historic measurements) of the radio in ID node F's variable power short range communication interface 375 at P1 power level may have been previously been found to be approximately 30 feet. Thus, without any examination of RSSI levels from the individual master nodes, the system knows ID Node F is within 30 feet of master nodes M1-M3.

Next, when the ID node F's variable power short range communication interface 375 is set to P2, a medium output level in this example, ID node F 920*f* is seen by master nodes M1 910*a* and M2 910*b*. The anticipated open air performance or range distance (optimal range, or range based upon analytics or historic measurements) of the radio in ID node F's variable power short range communication interface 375 at running at P2 power level is approximately 15 feet. Thus, without any examination of RSSI levels from the individual nodes, we know master nodes M1 910*a* and M2 910*b* are within 15 feet of ID node F 920*f* in this example. Furthermore, we know the master node no longer receiving the broadcasted RF signal from ID node F 920*f* (e.g., master node M3 910*c*) is somewhere within 30 feet of ID node F 920*f*, but probably more than 15 feet away from node F in this example.

And when ID node F's variable power short range communication interface 375 is set to P3, its minimum output level in this example, ID node F 920*f* is seen by only master node M2 910*b*. The anticipated open air performance or range distance (optimal range, or range based upon analytics or historic measurements) of the radio in ID node F's variable power short range communication interface 375 at P3 power level is approximately 5 feet. Thus, without any examination of RSSI levels from the master nodes, we know the location of ID node F 920*f* is within 5 feet of the known location of master node M2 910*b* in this example.

The ranging steps with respect to the changed RF characteristics of an advertising ID node, as discussed in the example above, may then be repeated for any of the identified nodes in order to building a more complete picture of the relative location of each node.

Furthermore, the timing between such ranging steps may vary dynamically depending upon whether the node is moving. Those skilled in the art will appreciate that when moving, a quicker flow through such ranging steps will help to provide better accuracy given the movement of nodes. Thus, the time interval between instructing a node to broadcast one or more messages at a particular power level and then instructing that node to broadcast one or more messages at a different power level may be desired to be shorter when the node is moving, which can be determined based upon context data. For example, the context data may indicate the node is within a node package an on a moving conveyor system. As such, the node is moving relative to fixed master nodes that may be positioned along the conveyor system.

Thus, server may have the first node perform the ranging steps where power is varied in relative quick succession compared to a situation where the context data indicates the node is not moving or is substantially stationary.

Figure 30:
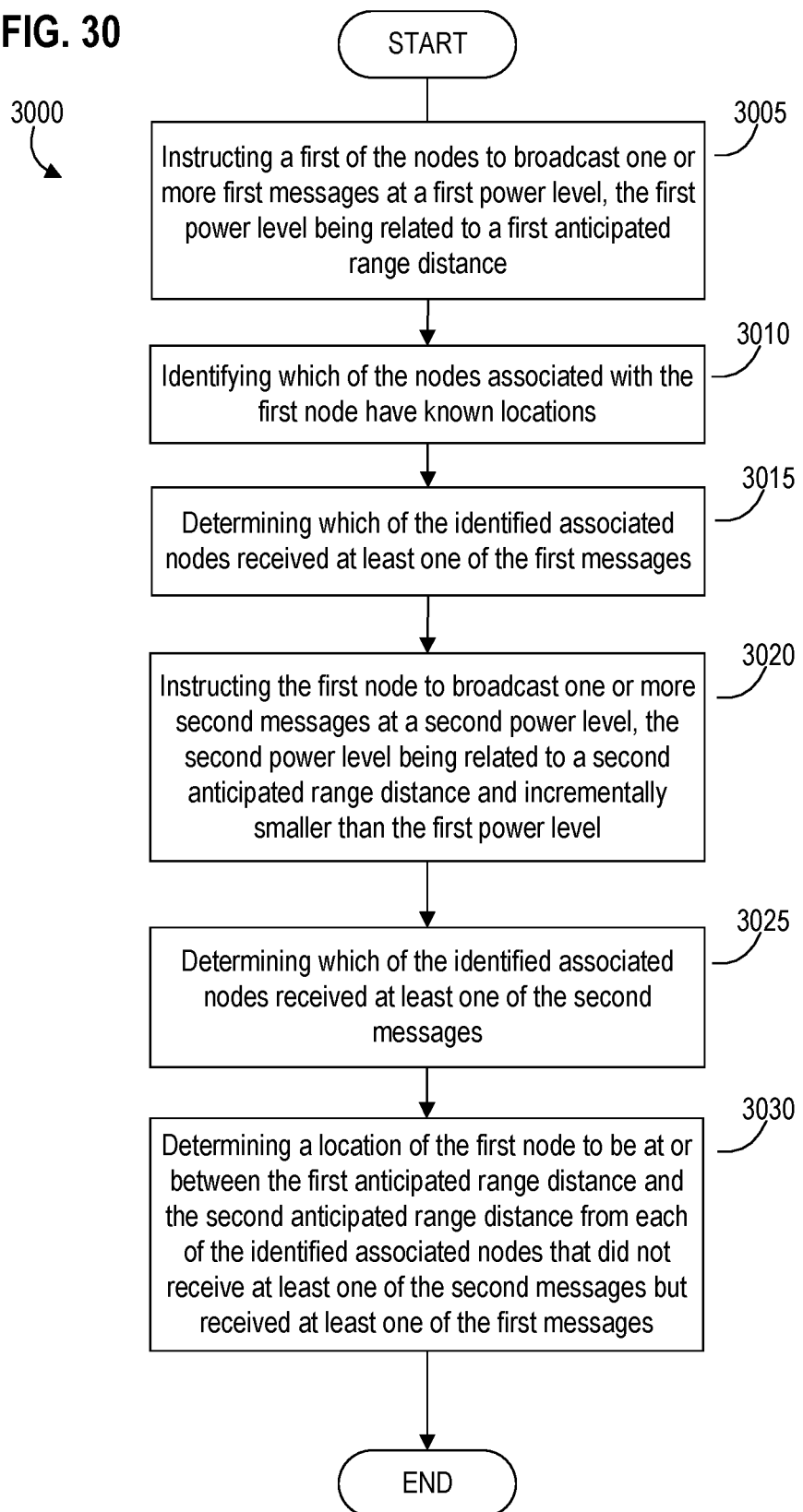
FIG. 30 is a flow diagram illustrating another exemplary method for location determination using one or more associations of nodes in a wireless node network in accordance with an embodiment of the invention.

FIG. 30 is a flow diagram illustrating another exemplary method for location determination using one or more associations of nodes in a wireless node network in accordance with an embodiment of the invention. Referring to FIG. 30 and how it explains a particular way to locate a node using associations and master node one or more master node advertising techniques, method 3000 begins at step 3005 by instructing a first of the nodes to broadcast one or more first messages at a first power level, the first power level being related to a first anticipated range distance. In one example, the first anticipated range distance may be an optimal range for the first of the nodes (e.g., a transmission range that assumes there are no obstructions and a clear signal path between nodes). In another example, the first anticipated range distance may be an optimal range for the first node adjusted based upon context data (e.g., data related to the surrounding RF environment of the first node).

At step 3010, the method 3000 identifies which of the nodes associated with the first node have known locations at step 3010. For example, this type of identification may be accomplished by reviewing association data that indicates which of the nodes are associated with the first node (e.g., via passive association, via active association, or via a combination of both), determining which of the nodes are associated with the first node based upon the reviewed association data, and identifying which of those associated nodes have known locations.

The method 3000 continues at step 3015 by determining which of the identified associated nodes received at least one of the first messages. Next, the method 3000 instructs the first node at step 3020 to broadcast one or more second messages at a second power level, where the second power level is related to a second anticipated range distance and the second power level incrementally smaller than the first power level. In a further example, the first anticipated range distance and the second anticipated range distance may be adjusted based upon one or more types of context data related to how an RF output signal from the first node may be impeded.

At step 3025, method 3000 determines which of the identified associated nodes received at least one of the second messages. Method 3000 concludes at step 3030 where the method determines a location of the first node to be at or between the first anticipated range distance and the second anticipated range distance from each of the identified associated nodes that did not receive at least one of the second messages but received at least one of the first messages.

As mentioned above, determining the node's location may be improved when accounting for movement. As such, an embodiment of method 3000 may instruct the first node to broadcast the one or more second messages within a time interval after instructing the first node to broadcast the one or more first messages. The time interval may be predetermined in some implementations, but also may be a dynamically set parameter in other implementations based upon context data related to the first node. In more detail, the time interval may be reduced from a prior value when the context data related to the first node indicates the first node is moving, but may be increased from a prior value when the context data related to the first node indicates the first node is substantially stationary.

In another embodiment, method 3000 may further include instructing the first node to broadcast one or more third messages at a third power level. Such a third power level is related to a third anticipated range distance and incrementally smaller range than the second anticipated range distance. Thereafter, the method may determining the location of the first node to be at or between the second anticipated range distance and the third anticipated range distance from each of the identified associated nodes that did not receive any of the third messages but received at least one of the second messages.

In another embodiment, method 3000 may comprise refining the location of the first node with an updated location of one or more of the identified associated nodes that did not receive at least one of the second messages but received at least one of the first messages. For example, if the first node is associated with a mobile master node, the location of the first node may be refined with an updated location of the mobile master node (which may be closer to the first node than previously determined).

In a further embodiment, the first node in the operation of method 3000 may not be self-aware of its own location. In another embodiment, the first node in the operation of method 3000 may have been previously self-aware of the location of the first node but may no longer be self-aware of the location of the first node prior to broadcasting the one or more first messages. In more detail, the first node may no longer be self-aware of the location of the first node prior to broadcasting the first message because of a change in the environment surrounding the first node. Such a change in the environment may be, for example, when the first node has moved inside a structure (e.g., building, vehicle, aircraft, container, etc.) that blocks location signals from being received by the first node.

Those skilled in the art will appreciate that method 3000 as disclosed and explained above in various embodiments may be implemented on a node (e.g., master node 110a in FIG. 4) running one or more parts of master control and management code 425 (e.g., the location aware/capture module) to control operations of an ID node (such as ID node F in FIG. 14) as part of location determination via ID node advertising. Such code may be stored on a non-transitory computer-readable medium, such as memory storage 415 on master node 110a. Thus, when executing code 425, the master node's processing unit 400 may be operative to perform operations or steps from the exemplary methods disclosed above, including method 3000 and variations of that method.

From an apparatus perspective, an exemplary node apparatus in a wireless node network that uses location determination by association may comprises a node processing unit, node memory coupled to and used by the node processing unit (e.g., a node volatile memory and a node memory storage). The node memory storage maintains at least a program code section, association data, and location data. The node apparatus further includes a first communication interface that provides a first communication path coupled to the node processing unit and operatively coupling the node with a plurality of other nodes in the network. For example, the master node 110 illustrated in FIG. 4 includes such types of operational structure.

The node processing unit (e.g., processing unit 400 of master node 110a), when executing at least the program code section resident in the node volatile memory, is operative to perform specific functions or steps. In particular, the node processing unit is operative to communicate an instruction to a first of the other nodes (e.g., an ID node or master node temporarily operating as an ID node) via the first communication interface to cause the first other node to broadcast one or more first messages at a first power level, where the first power level is related to a first anticipated range distance.

The first anticipated range distance may be an optimal range for the first of the nodes and, in more detail, an optimal range for the first of the nodes adjusted based upon context data. In even more detail, the first anticipated range distance and the second anticipated range distance may be adjusted based upon one or more types of context data related to how an RF output signal broadcast from the first node may be impeded.

The node processing unit is also operative to identify which of the nodes associated with the first node have known locations. To do this, the node processing unit may access and review association data stored on the node memory storage (e.g., data indicating what nodes are passively or actively associated with the first other node), may determine which of the remaining other nodes are associated with the first other node based upon the reviewed association data, and may identify which of the remaining other nodes determined to be associated with the first other node have known locations.

The node processing unit is also operative to determine which of the identified associated nodes received at least one of the first messages, and to communicate another instruction via the first communication interface to the first node to cause the first node to broadcast one or more second messages at a second power level, where the second power level being is to a second anticipated range distance and incrementally smaller than the first power level.

Finally, the node processing unit is operative to determine which of the identified associated nodes received at least one of the second messages, and then determine a location of the first node to be at or between the first anticipated range distance and the second anticipated range distance from each of the identified associated nodes that did not receive at least one of the second messages but received at least one of the first messages.

In a further embodiment, the node processing unit may be operative to communicate a third instruction via the first communication interface to the first node to cause the first node to broadcast one or more third messages at a third power level. The third power level is related to a third anticipated range distance and incrementally smaller range than the second anticipated range distance. Additionally, the node processing unit may then be operative to determine the location of the first node to be at or between the second anticipated range distance and the third anticipated range distance from each of the identified associated nodes that did not receive any of the third messages but received at least one of the second messages.

In still another embodiment, the node processing unit is able to account for movement of the first node with a time interval between instructions sent to the first node. In particular, the node processing unit may be further operative to communicate another instruction via the first communication interface to the first node to broadcast the second messages within a time interval after instructing the first node to broadcast the first messages. In a more detailed example, the time interval may be dynamically set based upon context data related to the first node. In even more detail, the time interval may be programmatically reduced from a prior value when the context data related to the first node indicates the first node is moving (e.g., the first node is on a moving conveyor system) and/or the time value of the interval may be increased from a prior value when the context data related to the first node indicates the first node is substantially stationary (e.g., the node is within a node package recently placed in a storage area).

The node processing unit, in a further embodiment, may be operative to refine the location of the first other node with an updated location of one or more of the identified associated nodes that did not receive at least one of the second messages but received at least one of the first messages, and cause a second communication interface (e.g., medium/long range communication interface 485 coupled to processing unit 400) to transmit the refined location to the server.

Figure 31:
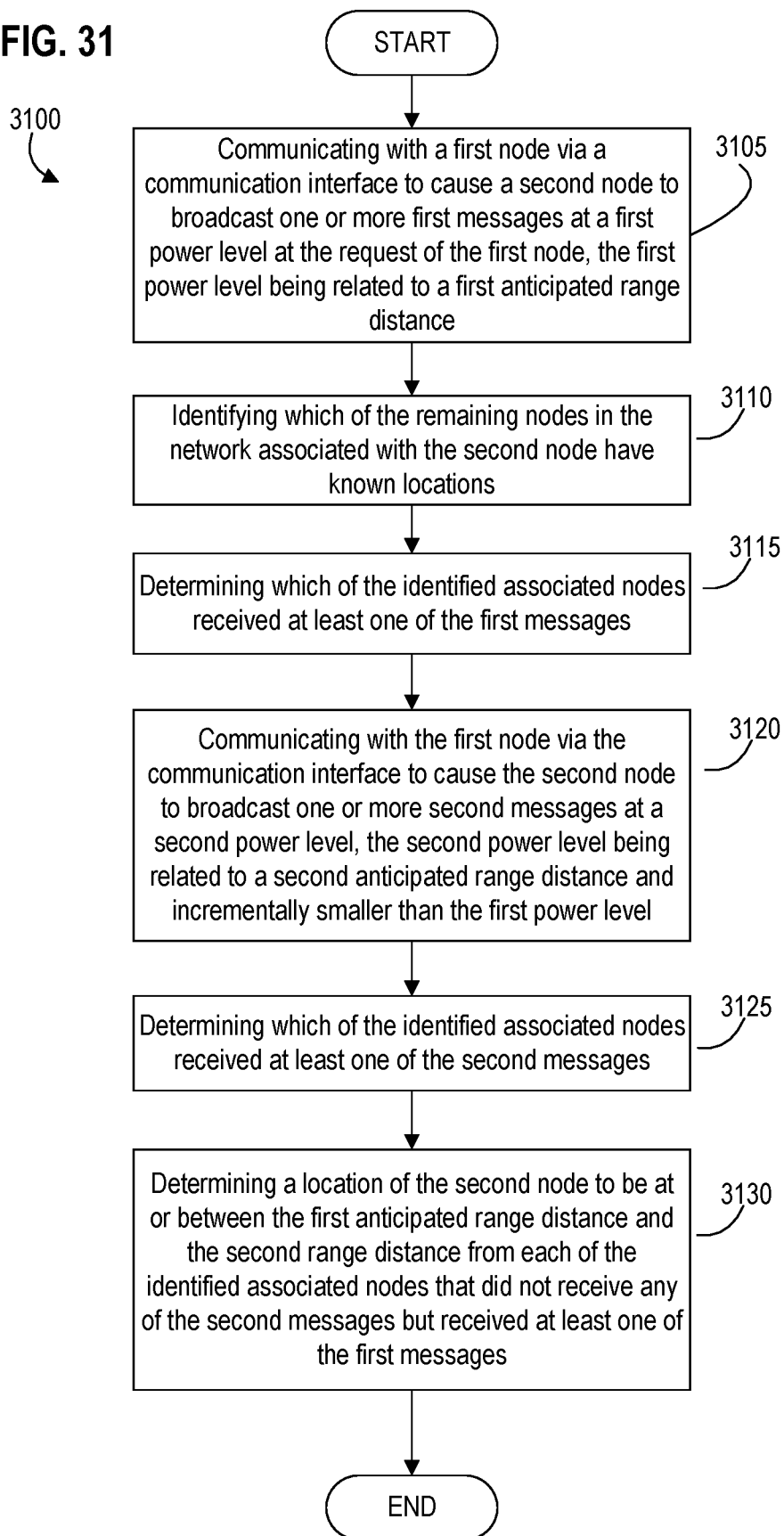
FIG. 31 is a flow diagram illustrating yet another exemplary method for location determination using one or more associations of nodes in a wireless node network in accordance with an embodiment of the invention.

From a server perspective, FIG. 31 is a flow diagram (similar to FIG. 30) illustrating yet another exemplary method for location determination using one or more associations of nodes in a wireless node network in accordance with an embodiment of the invention. Those skilled in the art will appreciate that while a server may operate to implement the steps as laid out in method 3000 and discussed above, FIG. 31 provides more details as to how a server processing unit (such as processing unit 500 running server code 525) may implement such a method at that level of the network via method 3100. In this more detailed embodiment, the server is communicating directly with a master node (e.g., a first node) to direct and control how the master node interacts with and causes operations to be undertaken on the ID node (e.g., a second node). Thus, step 3105 is similar to step 3005 but more precisely calls for communicating with a first node via a communication interface to cause a second node in the network to broadcast one or more first messages at a first power level at the request of the first node, where the first power level is related to and corresponds with a first anticipated range distance. Likewise, step 3120 is similar to step 3020 but more precisely calls for communicating with the first node via the communication interface to cause the second node to broadcast one or more second messages at a second power level at the request of the first node, the second power level being related to a second anticipated range distance and incrementally smaller than the first power level. The other steps of method 3100 are similar to those illustrated and explained above relative to method 3000, and that the similar principles will apply to method 3100.

Those skilled in the art will appreciate that method 3100 as disclosed and explained above in various embodiments may be implemented on a server (e.g., server 100 in FIG. 5) running one or more parts of server control and management code 525 to direct a master node to control operations of an ID node (such as ID node F in FIG. 14) as part of location determination via ID node advertising. Such code may be stored on a non-transitory computer-readable medium, such as memory storage 515 on server 100. Thus, when executing code 525, the server's processing unit 500 may be operative to perform operations or steps from the exemplary methods disclosed above, including method 3100 and variations of that method.

And similar to the node apparatus described above, one embodiment includes an exemplary server apparatus in a wireless node network that uses location determination by association. The exemplary server apparatus generally comprises a server processing unit, server memory coupled to and used by the server processing unit (e.g., a server volatile memory and a server memory storage). The server memory storage maintains at least a program code section, association data, and location data. The server apparatus further includes a communication interface coupled to the server processing unit and that provides access to a communication path operatively coupling the server with at least a first node in the network.

The exemplary server processing unit, when executing at least the program code section resident in the server volatile memory, is operative to perform specific functions or steps. In particular, the server processing unit is operative to communicate with the first node via the communication interface to cause a second node in the network to broadcast one or more first messages at a first power level at the request of the first node, where the first power level is related to a first anticipated range distance; identify which of the remaining nodes in the network associated with the second node have known locations; determine which of the identified associated nodes received at least one of the first messages; communicate with the first node via the communication interface to cause the second node to broadcast one or more second messages at a second power level at the request of the first node, where the second power level is related to a second anticipated range distance and incrementally smaller than the first power level; determine which of the identified associated nodes received at least one of the second messages; and determine a location of the second node to be at or between the first anticipated range distance and the second anticipated range distance from each of the identified associated nodes that did not receive any of the second messages but received at least one of the first messages. And in a further embodiment, the server apparatus' processing unit may be further operative to store the determined location in the server memory storage as part of the location data.

In another embodiment, the server apparatus' processing unit may be operative to communicate with the first node via the communication interface to cause the second node to broadcast the one or more second messages within a time interval after communicating with the first node to cause the second node to broadcast the one or more first messages. As previously mentioned, this type of time interval may dynamically set based upon context data related to the second node. Context data may also be used as set forth above with respect to the node apparatus but applied here to the second node—such was where the first anticipated range distance is the optimal range for the second node adjusted based upon context data.

Master Node Location Determination through Advertise

In another embodiment, a master node may no longer know its location. For example, such a situation may occur when a master node determines it's current location via GPS location circuitry 475, but the master node finds itself without access to an adequate number of GPS signals (e.g., it cannot determine a location due to the lack of a sufficient number of GPS signals from diverse GPS satellites). Such a situation may happen when the master node moves indoors is proximate to a structure that interferes with the location signals.

In an exemplary embodiment where a master node attempts to determine its own location via advertising techniques, the master node may detect a loss of location confidence (e.g., upon a loss of detected GPS signals; upon detecting a separate signal to processing unit 400 indicating the master node's location is unknown; when processing unit 400 senses movement (e.g., via accelerometers (not shown) or the like) but cannot confirm that the location circuitry 475 is providing updated location information for the node, etc.). In other words, the master node becomes aware that it no longer has a known location.

Next, the master node responds by beginning to broadcast one or more advertising messages in a similar way as ID node F 920*f* is described as doing with respect to FIG. 14. This is done so that the master node having an unknown location can advantageously leverage off the known locations of nearby other nodes. As such, an embodiment may allow a type of leveraged chaining effect whereby known locations of particular types of nodes may be used to extend location information to other nodes that do not know their locations (e.g., ID nodes) or nodes that have detected a loss of location confidence (e.g., master nodes). Thus, such an embodiment may be used to determine an indoor location of a master node (including equipment equipped with master node functionality) in cases where signals for the conventional onboard location circuitry 475 are not available.

Referring back to the exemplary method 3000 and FIG. 30, method 3000 may be such that the first node is not self-aware of the location of the first node. This may happen when the first node (e.g., an ID node) is actually a master node that was previously self-aware of its own location (e.g., via received GPS signals) but is no longer self-aware of its location (e.g., when the GPS signals can no longer be received), which has the master node changing operation to operate as an ID node prior to broadcasting the first message. In other words, the master node may no longer be self-aware of its location and begin operating as an ID node for purposes of location determination prior to broadcasting the first message because of a change in the environment surrounding the master node, such as when the master node has moved inside a structure that blocks location signals from being received by the master node. Thus, an embodiment may advantageously allow a node to adaptively alter operations when moving from a clear outdoor environment to an indoor environment. And a server may interact with such a master node while that master node is operating, for location purposes, as an ID node, temporarily.

Location with Improved RSSI Measurements

In another embodiment, a signal strength measurement between two or more nodes may be used to determine the proximity of the nodes by using one or more improvements to conventional RSSI measurements. In conventional RSSI measurements, such as with Bluetooth 4.0, those skilled in the art will appreciate that adaptive frequency hopping as part of spread spectrum techniques may cause undesirably cause the signal strength to fluctuate. In other words, the advantage of using frequency hopping and spread spectrum for security and avoidance of interference may have a negative impact on using such signals for stable proximity-based location determinations. Thus, it may be desired to emphasize stability of a signal and limits to fluctuation for purposes of location determination.

In one embodiment, a type of improvement for RSSI measurements may include reducing the number of channels and/or a corresponding frequency range in use during advertising from nodes. For example, a node may have processing unit 300/400 adaptively control variable power short range communication interface 375/480 to reduce the number of channels and/or the frequency range used during node advertising. Such a dynamic change may be implemented, in some embodiments, by altering the content of a particular type of profile data 330/430, such as an RF profile data that effectively defines RF characteristics of a node (e.g., frequency, power level, duty cycle, channel numbers, channel spacing, alternative fluctuation modes, etc.). In one further embodiment, a first fluctuation mode may be defined that provides a default or more standard communication protocol, such as the conventional frequency hopping, spread spectrum, and channel allocations for Bluetooth® communications. Other alternative modes (one or more) may be defined that alter one or more RF characteristics to provide increasingly more stable and less fluctuations of the RF output signal from a node. Thus, a node may be dynamically placed into one or more modes regarding such RF characteristics that increasingly emphasize stability of the node's RF output signal and limits fluctuation for purposes of enhanced location determination using RSSI measurements.

In another embodiment, a type of improvement for RSSI measurements may include ensuring visibility to and advantageously managing automatic gain control (AGC) circuitry (not shown) that may cause the RF output signal to vary for a node. For example, a node may include a type of AGC circuitry as part of variable power short range communication interface 375/480. This type of AGC circuitry may allow node processing unit 300/400 or other logic circuitry that is part of variable power short range communication interface 375/480 to limit fluctuations under certain conditions (e.g., when attempting to use RSSI location determination techniques). In this example, different AGC circuitry settings may be defined in exemplary RF profile data that effectively defines RF characteristics of a node (e.g., frequency, power level, duty cycle, channel numbers, channel spacing, alternative fluctuation modes, etc.). This is yet another example of how a node may be dynamically placed into one or more modes regarding such RF characteristics (including AGC circuitry settings) that increasingly emphasize stability of the node's RF output signal and limits fluctuation for purposes of enhanced location determination using RSSI measurements.

Location with Adjustments for Environmental Factors in RF Signal Quality

In general, those skilled in the art will appreciate that environmental factors may cause a communication signal, such as an RF signal, to fluctuate or be transmitted and received in a manner that undesirably varies depending upon a signal path environment. Passive physical interference factors (e.g., forms of electronic signal shielding) may be substantially close and cause drops in signal strength across the output ranges of the nodes. Additionally, active radio interference factors may vary across the RF output ranges of the nodes depending upon other active devices in the reception vicinity. Thus, the proximate environment of a node may have a multitude of adverse factors that impact communications and, as a result, the ability to locate the node.

In one embodiment, making location determinations may be enhanced by a data analytics type of approach that may adjust and account for different RF environmental factors for a similar type of node in a similar type of situation. For example, the quality of the RF output signal of a particular type of node and the corresponding physical range of that signal to a receiver of known sensitivity may be determined for a given environment. In this example, the system defines a maximum range of that signal based on a predetermined condition, such as open-air connectivity. This may assume an environment with no signal degradation due to interference or physical shielding. However, both interference and physical shielding may diminish the range of the RF output signal of a node. In a dynamically adaptive and learning manner, the system may collect information on how a particular type of node may operate in a particular environment under certain settings (e.g., reported signal strengths and corresponding settings for RF output signal power levels). This analysis of a similar environment may be repeated. In other words, through such data analytics of an anticipated environment to be faced by a similar node, signal loss information can be generated and applied as a type of context data (i.e., RF data) for a node in a similar environment to refine location determination. Thus, an exemplary embodiment may refine location determinations with adaptive signal loss characteristics based on a contextual appreciation of an anticipated environment (e.g., physical shielding such as packaging, package contents, proximate package, proximate package contents, and physical infrastructure causing signal variance) without requiring a calibration phase.

And advantageously combining those data points with $3^{rd}$ party data describing the physical environment, in which the node was located in at that time, may refine location even further. Such information may be used as RF data (a type of context data) in future efforts to manage and locate a similar type of node anticipated to be in a similar environment.

In more detail, in an embodiment that refines a location determination based upon context and data analytics to adjust for known RF impediments, the maximum physical range of a node's RF output signal relative to a receiver of known RF sensitivity is determined. In one example, this first range value may be referred to as a theoretical or nominal open-air range of a similar type transmitter-receiver node pair in a similar environment but with substantially no physical shielding or signal interference negatively impacting the signal range. A second range value, which may be considered an actual RF range value, may be the observed range of the signal in a similar environment but where there are contextual factors reducing the communication range, including physical shielding due to factors like packaging, package contents, proximate package, proximate package contents, physical infrastructure, interference from other radio sources, or shipper specific information such as vehicle or facility layout information. Through access to prior data analysis of the differing range values and with knowledge of the operational environment of the transmitting node was in (e.g., a similar environment to the proximate environment of the node), a refined location may be determined using an approximation of an actual RF output range that intelligently adjusts what may be anticipated to be the RF environment of the node. In other words, by knowing the appropriate contextual environment related to a node (such as signal degradation information on how a similar node operates in a similar environment), an improved location determination may be made to make intelligent yet efficient adjustments (such as communication distance adjustments) that provide a refined location of the node.

In one example, such as the example shown in FIG. 2, master node 110b is outside of a container (such as a Uniform Load Device (ULD) container 210 known to be used for transporting groups of items on aircraft) that has an ID node inside the container. A first or theoretical range value between master node 110b and ID node 120b may be determined to be 10 feet at a specific RF output power level when the package (and related ID node) may be known to be less than 10 feet away from the scanning node (e.g., master node 110b). A second range value at similar distances with similar types of nodes, but with incident RF signal loss as a result of communicating through the wall of the container 210, may be between 4 and 5 feet. If context data, such as $3^{rd}$ party information or scan data, indicates the transmitting node is within the ULD container 210, the system would expect the transmission range to be limited according to the data analytics associated with this known RF impediment (e.g., characteristics for transmitting through ULD container 210), thus reducing the possible scanning nodes that may see the broadcasting node within the ULD container, or require the transmitting node to increase its RF output power to be heard.

Figure 32:
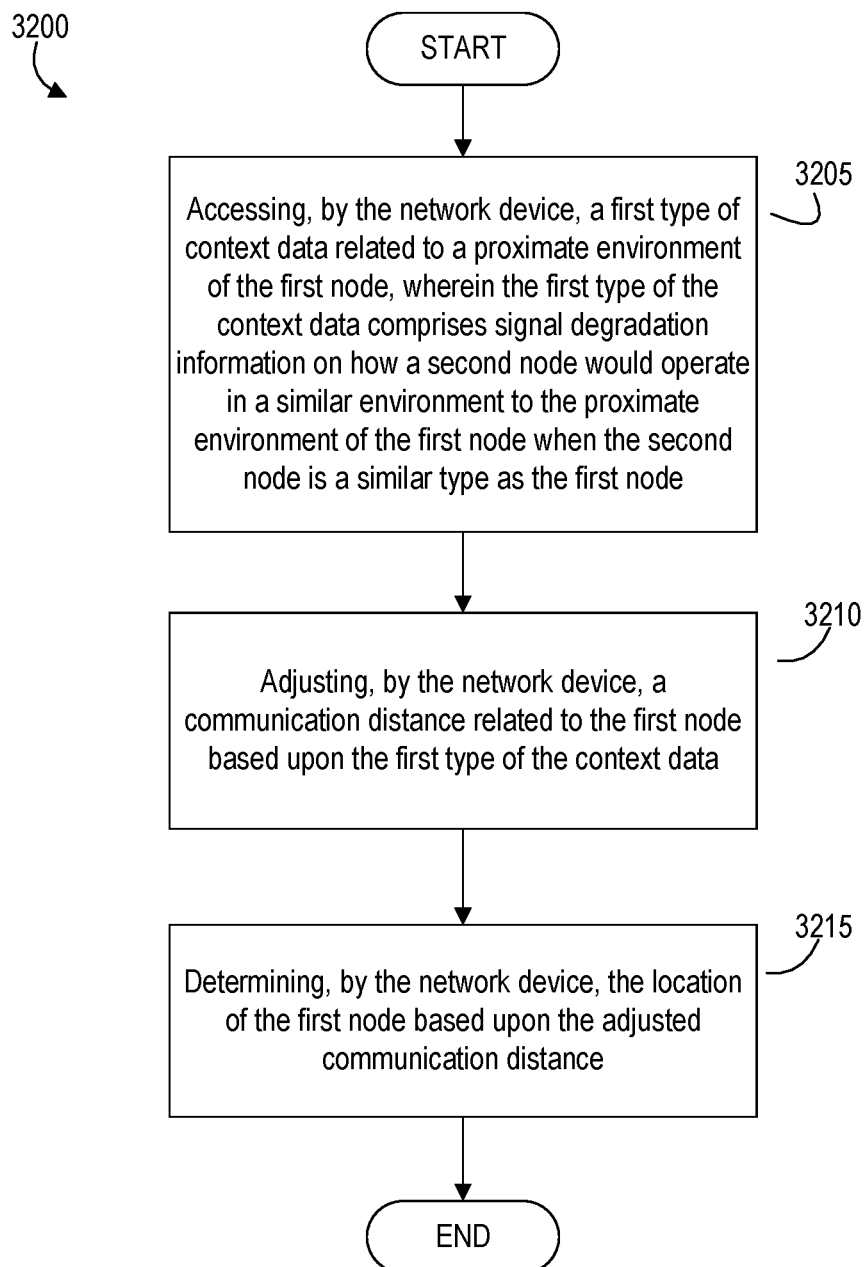
FIG. 32 is a flow diagram illustrating an exemplary method for location determination of a first node in a wireless node network based on context data in accordance with an embodiment of the invention.

FIG. 32 is a flow diagram illustrating an exemplary method for location determination of a first node in a wireless node network based on context data in accordance with an embodiment of the invention. Referring now to FIG. 32, method 3200 begins at step 3205 with a network device (such as a master node or server) accessing a first type of the context data related to a proximate environment of the first node.

The first type of context data comprises signal degradation information on how a second node would operate in a similar environment to the proximate environment of the first node when the second node is a similar type as the first node. Thus, rather than calibrating with an actual measurement relative to the current proximate environment of the first node, the signal degradation information provides compensation information on what may be generally anticipated in a more general proximate environment based on how a similar type of node may operate in a similar environment. As the similar environment of the similar node is generally an approximation for what is anticipated to be the proximate environment of the first node, this advantageously avoids the need for an actual calibration of the proximate environment. In one embodiment, the signal degradation information may be based upon a difference in how the second node communicates when exposed to an adverse communication environment (such as a similar environment to the proximate environment of the first node) compared to how the second node would communicates when exposed to a nominal communication environment (such as an environment that is unencumbered by shielding and interference factors). Those skilled in the art will appreciate that a nominal communication environment need not be perfectly clear of all influences that shield or interfere with communications.

The types and aspects of signal degradation information may vary depending on a wide variety of factors. In one embodiment, the signal degradation information may be related to at least one of shielding and interference. Thus, signal degradation information may include both passive and active factors that impact the communication environment.

In another embodiment, the signal degradation environment may be based upon a degraded operation of the second node when the similar environment is an adverse communication environment. In more detail, the signal degradation information may be based upon a difference in how the second node communicates when exposed to the adverse communication environment compared to how the second node communicates when exposed to a substantially normal communication environment, such as an open air environment.

In still another embodiment, signal degradation information may relate to at least shipment data for one or more items being shipped (e.g., currently shipped or shipped in the past) and located in the proximate environment of the first node. For instance, a package near the first node may include metallic materials that may impede or block RF signals and the signal degradation information may relate to such information about close packages being shipped near the first node. In another example, the signal degradation information may relate to at least layout data for one or more physical structures in the proximate environment of the first node. In more detail, the layout data may be for one or more physical structures (e.g., walls, machinery, enclosures, and conveyances) in the proximate environment of the node near a predicted path for the first node. In yet another example, the signal degradation information relates to at least historic data on one or more analyzed prior operations of the second node.

At step 3210, the network device, such as a master node or server, may adjust an anticipated communication distance related to the first node based upon on the first type of the context data. In one example, the anticipated communication distance may be a theoretical broadcast distance based upon parameters of the device's radio. Such an anticipated communication distance is known as it is an estimate of the radio's range. In one example, the adjusted communication distance comprises an anticipated reduced range distance for a transmission from the first node. In another example, the adjusted communication distance comprises an anticipated reduced receiver sensitivity distance for the first node.

In yet another example, adjusting the communication distance may be accomplished by adaptively adjusting, by the network device, the communication distance based upon the signal degradation information and a second type of the context data. In other words, the communication distance may be adjusted based upon signal degradation information considered along with other types of context data, such as how the first node is being moved (such as an anticipated movement of the first node along a predicted transit path for the first node) or a density of other nodes near the first node.

At step 3215, the network device determines the location of the first node based upon the adjusted communication distance. In a further embodiment, the method may also update the adjusted communication distance by the network device based upon movement of the first node, and may refine the location of the first node with an updated adjusted communication distance. This may happen with the first node is a mobile master node capable of self-determining its own location.

Those skilled in the art will appreciate that method 3200 as disclosed and explained above in various embodiments may be implemented on a network device (e.g., exemplary master node 110a in FIG. 4 or server 100 in FIG. 5) running one or more parts of their respective control and management code to perform steps of method 3200 as described above. Such code may be stored on a non-transitory computer-readable medium, such as memory storage 415 on master node 110a or memory storage 515 on server 100. Thus, when executing such code, the respective network device's processing unit may be operative to perform operations or steps from the exemplary methods disclosed above, including method 3200 and variations of that method.

In more detail, an exemplary network device apparatus for determining a location of a first node in a wireless node network based on context data, the exemplary network device may include a processing unit, a volatile memory coupled to the processing unit, and a memory storage coupled to the processing unit. The exemplary network device further includes a communication interface coupled to the processing unit and that provides a communication path operatively coupling the network device with the first node in the network.

The memory storage for the device maintains at least a program code section and context data having at least signal degradation information. Such signal degradation information, as a type of context data, is information on how a second node would operate in a similar environment to a proximate environment of the first node when the second node is a similar type as the first node. Examples of signal degradation information may include those discussed above relative to step 3205 of method 3200.

When executing at least the program code section when resident in the volatile memory, the processing unit of the network device is operative to perform the steps noted and described above with respect to method 3200. In more detail, the processing unit is operative to at least connect with the memory storage to access the signal degradation information, adjust a communication distance (if needed) related to the first node based upon on the signal degradation information, determine the location of the first node based upon the adjusted communication distance, and store the determined location of the first node as location data on the memory storage.

Adjusting the communication distance by the processing unit may be accomplished as described above with regard to step 3210 of method 3200. And as mentioned above, the processing unit may be further operative to adaptively adjust the communication distance where other types of context data are also considered, such as movement and anticipated node movement as detailed out above.

In a further embodiment, the network device may be a mobile master node that includes location circuitry (such as GPS circuitry 475 of exemplary master node 110*a* shown in FIG. 4). In this embodiment, the processing of the network device may be further operative to determine a location of the network device based upon an output signal from the location circuitry received by the processing unit, and determine the location of the first node based upon the adjusted communication distance and the location of the network device. As such, the first type of the context data related to the proximate environment of the first node is based upon the determined location of the first node.

Those skilled in the art will also appreciate that in some operational environments, the signal degradation information may not require any adjustment to the communication distance in an embodiment. However, in other environments (e.g., adverse RF environments), the signal degradation information may provide a basis for adjusting the communication distance in the embodiment, even if not performed every time. Thus, an adjustment to the communication distance may not be needed in all proximate environments of the first node but may be performed, if needed, based on the proximate environment of the first node. It is the ability of an embodiment to adjust this communication distance when needed and if needed that advantageously allows for locating the first node with more accuracy.

Location Through Triangulation

Figure 15:
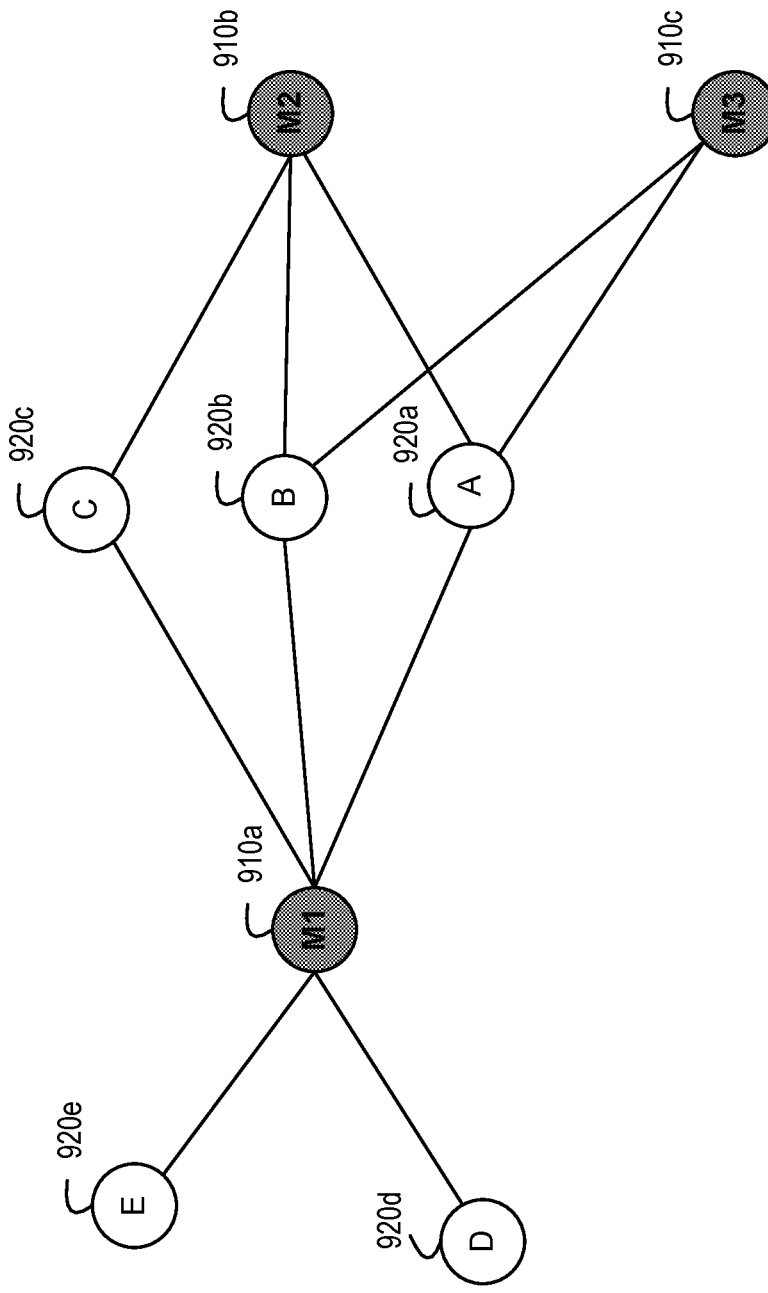
FIG. 15 is a diagram illustrating an exemplary location determination through triangulation in accordance with an embodiment of the invention.

In some embodiments, various methods for determining a node's location may rely upon, at least in part, triangulation techniques. In other words, as the wireless node network collects data on receiver-transmitter pairs, other methods for determining location of the individual nodes that utilize triangulation, at least in part, may become possible. FIG. 15 is a diagram illustrating an exemplary location determination through triangulation within a wireless node network in accordance with an embodiment of the invention. Referring now to the illustrated embodiment of FIG. 15, three exemplary master nodes M1-M3 910*a*-910*c* are shown with each master node having a known location. Exemplary ID nodes A-E 920*a*-920*e* are also shown where they are at least in communication range of one or more of exemplary master nodes MA-M3 910*a*-910*c*.

In this illustrated example, the master nodes M1-M3 may detect and collect advertising messages from ID nodes A-E at varying and known power levels. The captured information is forwarded by the master nodes M1-M3 to the backend server 100, where location determinations may be made. For example, factors like RSSI and visibility of each node at each power level may be used to determine, with a higher degree of accuracy, the location of nodes where sufficient information is available.

For an exemplary system to triangulate a node, three nodes with known locations must have seen the broadcasting node. In this example, two advertising ID nodes, A 920*a* and B 920*b*, were seen by the three nodes having known locations (master nodes M1-M3 910*a*-910*c*). Based upon the captured information, the locations of ID node A 920*a* and ID node B 920*b* are calculated.

Chaining Triangulation

Figure 16:
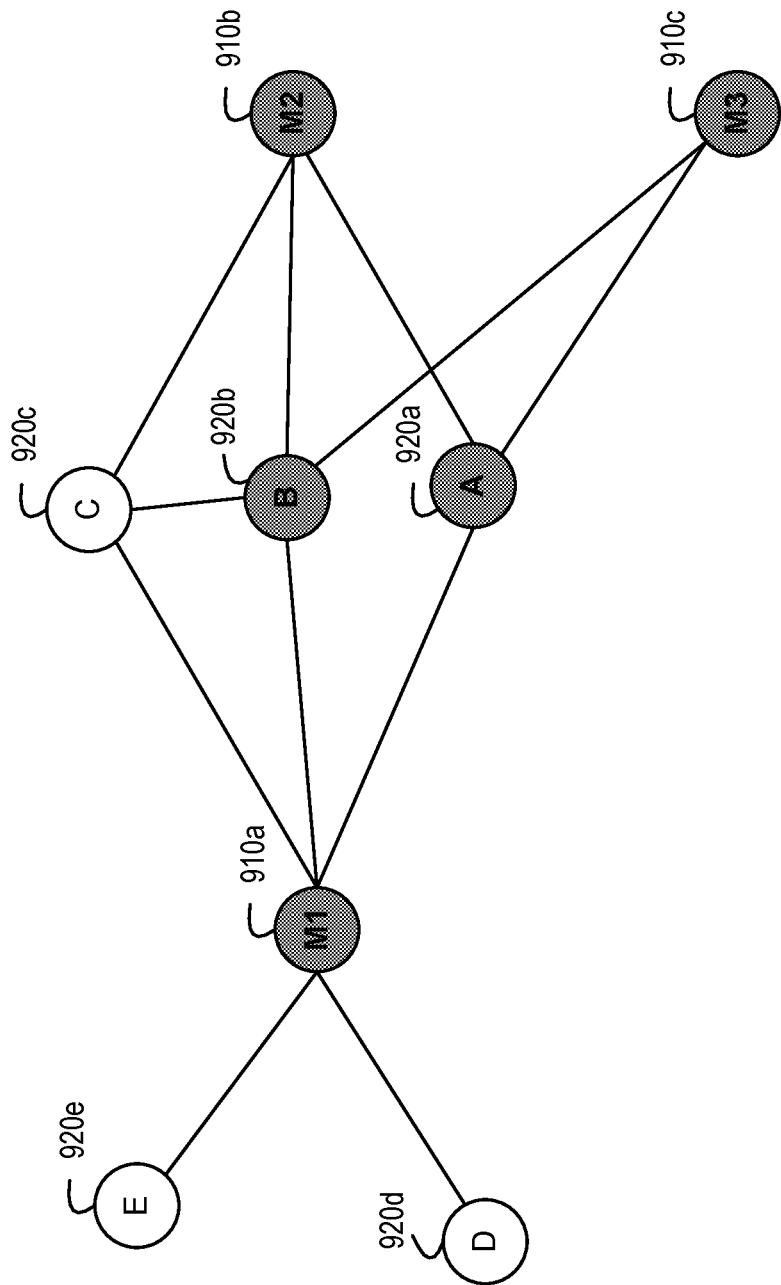
FIG. 16 is a diagram illustrating an exemplary location determination through chaining triangulation in accordance with an embodiment of the invention.

In another embodiment, a node with an inferred location may be used with triangulation techniques to determine a location of another node in a wireless node network. FIG. 16 is a diagram illustrating an exemplary location determination through chaining triangulation in accordance with an embodiment of the invention. The locations of ID nodes A 920*a* and B 920*c* have been determined by triangulating across master nodes M1-M3, as illustrated in the exemplary embodiment shown in FIG. 15. However, as illustrated in FIG. 16, the location of ID node C 920*c* may also be determined according to an embodiment.

For example, an exemplary method of determining a node's location through chaining triangulation begins with determining the calculated location of ID node B 920*b* (as explained with reference to FIG. 15). Next, a node closer to ID node B 920*b* may be used to get the missing third signal point needed for triangulation. This may be accomplished by placing ID node B 920*b* in a query (scan) mode such that it listens for a message from ID node C 902*c*. ID node C is instructed to advertise, thus providing a signal that may be captured by ID node B. After capturing the signal profile of C, ID node B may communicate or share the captured information and forward it along to the backend server 100 through either of the master nodes M1 or M2. The resulting location determination of ID node C 920*c* may have a higher level of position error due to it being partially based on a calculated reference (e.g., the location of ID node B), but the leveraged location determination of ID node C 920*c* may be sufficiently accurate (or be an actionable location) that useful information may be gleaned about ID node C 920*c*. For example, a leveraged or chained location determination of ID node C may indicate, with the help of context data, that nodes M1, M2, and ID node B are all close enough to ID node C that ID node C is determined to be within the same container nodes M1, M2, and ID node B.

Location Through Proximity to Triangulation (LP2T)

In an embodiment where chaining triangulation may determine location through proximity to triangulation (LP2T), a starting point may be determining the relative location of an ID node to a master node based on the proximity method, as explained above. However, when the relative location of the ID node has been determined, a more accurate or refined location of the ID node may be determined based upon the location of all master nodes that can capture the RF output signal broadcast from the ID node, and then triangulating based on observed signal strength of the ID node. In this example, the proximity-based location is used as an input in the triangulation calculation to estimate likely signal deterioration historically observed between a node at the proximity-determined location and scanning master nodes. In a further embodiment, by taking into account historic data on patterns of signal deterioration, a more accurate triangulation may be possible, leading to a more accurate location determination.

Figure 33:
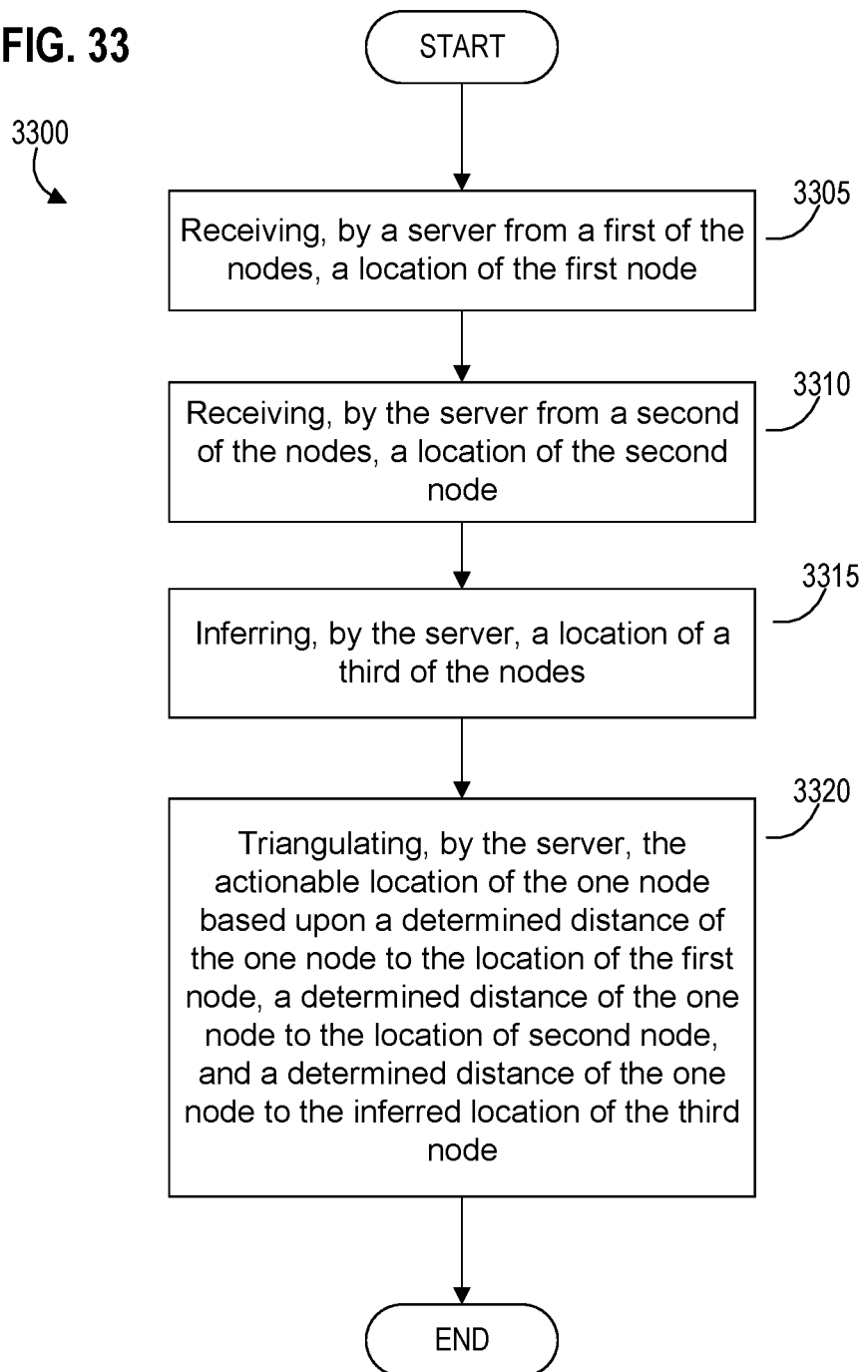
FIG. 33 is a flow diagram illustrating an exemplary method for determining a location using chaining triangulation for one of a plurality of nodes in a wireless node network having a server in accordance with an embodiment of the invention.

FIG. 33 is a flow diagram illustrating an exemplary method for determining a node location using chaining triangulation for one of a plurality of nodes in a wireless node network having a server in accordance with an embodiment of the invention. Such an exemplary node location need not be precise or exacting, but can be sufficiently accurate without absolutes.

Referring now to FIG. 33, method 3300 begins at step 3305 with the server receiving a location of a first of the nodes from the first node. Next, at step 3310, the server receives a location of a second of the nodes from the second node. For example, with reference to the example shown in FIG. 16, master nodes M1 910a and M2 910b may transmit their respective location coordinates from their respective onboard location circuitry to the server so that the server has the current locations of these two master nodes.

At step 3315, the server infers a location of a third of the nodes. For instance, in the example illustrated in FIG. 16, the server may infer the location of ID node B 920b. In one embodiment, inferring may comprise having the server determine a proximate-based location of the third node relative to another of the nodes having a known location, such that the proximate-based location operates as the inferred location of the third node.

In another embodiment, inferring the location of the third node may comprise having the server determine a relative location of the third node to the first node (as the node having a known location) or to the second node (as another node having a known location). Method 3300 may also, in another embodiment, include having the server adjust the inferred location of the third node to determine a refined location of the third node based upon third node context data related to the inferred location of the third node At step 3320, method 3300 concludes with the server triangulating the location of the one node based upon determined distances to each of the first and second nodes, and a determined distance of the one node to the inferred location of the third nodes.

In a more detailed embodiment, method 3300 may triangulate the location of the one node by accessing first node context data related to a contextual environment near the first node and second node context data related a contextual environment near the second node. Such contextual environments may include an environment of being on a conveyor system, or within a particular facility, or next to materials that may degrade or shield signals being received by the one node. Next, the more detailed triangulating may have the server adjust the determined distance of the one node to the location of the first node based upon the first node context data to provide a refined distance of the one node to the location of the of the first node. Then, the server may triangulate the location of the one node based upon the adjusted determined distance of the one node to the location of the first node, the adjusted determined distance of the one node to the location of second node, and a determined distance of the one node to the refined location of the third node.

In a further embodiment, method 3300 may also have the server transmitting an instruction so as to cause the server to transmit an instruction to cause the one node to broadcast a plurality of advertising signals over a period of time. In such an embodiment, the determined distance of the one node to the location of the first node may be based upon captured signals from the one node by the first node over the period of time and reported to the server by the first node. In another embodiment, the determined distance of the one node to the location of the second node may be based upon captured signals from the one node by the second node and reported to the server by the second node.

In still another embodiment, the server may transmit an instruction to cause the one node to broadcast a plurality of advertising signals at different power levels. In such an embodiment, the determined distance of the one node to the location of the first node may be based upon captured signals from the one node by the first node and reported to the server by the first node. In another embodiment, the determined distance of the one node to the location of the second node may be based upon captured signals from the one node by the second node and reported to the server by the second node.

In yet another embodiment, method 3300 may also have the server transmitting the location information out to a requesting entity (e.g., another node, a user access device, etc.) upon receipt of a request for a location of the one node from that entity.

Those skilled in the art will appreciate that method 3300 as disclosed and explained above in various embodiments may be implemented on a server (such as exemplary server 100 as illustrated in FIG. 5) running one or more parts of a control and management code (such as an code 525) to implement any of the above described functionality. Such code may be stored on a non-transitory computer-readable medium (such as memory storage 515 in an exemplary server). Thus, when executing such code, a processing unit of the server (such as unit 500) may be operative to perform operations or steps from the exemplary methods disclosed above, including method 3300 and variations of that method.

A server apparatus is also described in an embodiment for determining a location using chaining triangulation for one of a plurality of nodes in a wireless node network. The server apparatus generally comprises a server processing unit, a server volatile memory, a server memory storage, and a communication interface. The server volatile memory, server memory storage, and communication interface are each configured in the apparatus as coupled to the server processing unit. The server memory storage maintains at least a program code section and location data related to nodes in the network. In some embodiments, the server memory storage may also maintain context data, such as first node context data and second node context data. The communication interface provides a communication path operatively coupling the server with nodes in the network, such as a first and second node.

The server processing unit, when executing at least the program code section resident in the server volatile memory, is operative to perform various functions, such as the functions described in the steps above related to method 3300. In particular, the server processing unit is operative to receive a request over the communication interface for the location of the one node. Based on the request, the server processing unit is then operative to receive the respective locations of the first and second nodes, and store the locations as part of the location data kept on the server memory storage. The server processing unit is further operative to infer a location of a third of the nodes, and store the inferred location of the third node as part of the location data kept on the server memory storage. The server processing unit then is operative to triangulate the location of the one node based upon a determined distance of the one node to the location of the first node, a determined distance of the one node to the location of second node, and a determined distance of the one node to the inferred location of the third node. And finally, the server processing unit is operative to transmit the location information to the requesting entity over the communication interface in response to the request.

In one embodiment, the server processing unit may be further operative to infer the location of the third of the nodes by being operative to determine a proximate-based location of the third node relative to another of the nodes having a known location, where the proximate-based location operates as the inferred location of the third node.

In another embodiment, the server processing unit may be further operative to transmit an instruction over the communication interface to cause the one node to broadcast a plurality of advertising signals over a period of time. In this embodiment, the determined distance of the one node to the location of the first node may be based upon captured signals from the one node by the first node over the period of time and reported to the server by the first node. Alternatively, the determined distance of the one node to the location of the second node may be based upon captured signals from the one node by the second node and reported to the server by the second node.

In another embodiment, the server processing unit may be further operative to transmit an instruction over the communication interface to cause the one node to broadcast a plurality of advertising signals at different power levels. In such an embodiment, the determined distance of the one node to the location of the first node may be based upon captured signals from the one node by the first node and reported to the server by the first node. Alternatively, the determined distance of the one node to the location of the second node may be based upon captured signals from the one node by the second node and reported to the server by the second node.

In yet another embodiment, the server processing unit may be further operative to infer the location of the third node by being operative to determine a relative location of the third node to the first node or, alternatively, to the second node.

In still another embodiment, context data may be relied upon to refine locations. More specifically, the server processing unit may be further operative to adjust the inferred location of the third node to determine a refined location of the third node based upon third node context data related to the inferred location of the third node.

In a more detailed embodiment, the server memory storage may further maintains context data, and the server processing unit may be further operative to triangulate by being operative to access first node context data as part of the context data maintained on the server memory storage, where the first node context data is related to a contextual environment near the first node. Likewise, the server processing unit may be further operative to access second node context data as part of the context data maintained on the server memory storage, where the second node context data is related a contextual environment near the second node. The server processing unit may then be operative to adjust the determined distance of the one node to the location of the first node based upon the first node context data to provide a refined distance of the one node to the location of the of the first node. As such, the server processing unit may be operative to triangulate the location of the one node based upon the adjusted determined distance of the one node to the location of the first node, the adjusted determined distance of the one node to the location of second node, and a determined distance of the one node to the refined location of the third node.

Combined Methods for Determining Node Location

In light of the examples explained above for locating a node, one skilled in the art will appreciate that a further embodiment expressly contemplates using more than one of the above-described location determination techniques when determining a refined location of a node in a wireless node network. For example, such combination embodiments may apply an ordered or prioritized approach whereby a first location technique is applied to generate first location information regarding the location of a node in the wireless network. Thereafter, a second location technique may be selected from a hierarchy or prioritized set of techniques (some of which may work better in certain circumstances and be chosen or dynamically prioritized based upon the contextual environment), and applied to generate second location information regarding the location of the node or refining the location of the node. Other embodiments may apply additional location techniques to generate further refined location information.

In an embodiment, the information in the exemplary hierarchy generally identifies which technique may be preferred to be used initially as well as a ranked grouping or listing of when to apply other location techniques. Such information in the exemplary hierarchy may be fixed (based upon successful historic data and experience) or be dynamically altered over time as nodes may move relative to each other and, for example, based upon context data that provides more information relative to the a current or anticipated contextual environment.

Applying Node Location Determination in a Vehicular Environment

The various exemplary methods and techniques described above for determining the location of a node provide an advantageous way to locate a node. However, further embodiments may advantageously apply such methods and techniques in a vehicular environment when dealing with logistics operations where a node is to be located in a vehicle, moved within a vehicle, or removed for delivery from a vehicle.

Essentially, embodiments may use a package enabled with a node (generally referred to as a node package or node-enabled package) to ship one or more items and such a node package may be advantageously placed, located, moved, or removed for delivery in a vehicle/transportation/shipping/logistics environment. As explained throughout this description, a node package is generally a package to be shipped that is related to a particular node. The node and the related package travel together as part of the shipping process. In a general embodiment, the node may simply be within the package. In another embodiment, the node may be attached to the package (e.g., adhered to an interior portion of the package, fixed to a part of the package where one or more status indicators of the node may be visible through the package, etc.). In another embodiment, the node of the node package may be part of the package or the packaging materials used to comprise an exterior, interior, or separating/cushioning material within the node package. In more detail, the node may be integrated as part of the package or packaging materials (e.g., integrated as part of a pallet, a ULD container, a corrugated fiberboard box, and the like). In still another detailed embodiment, the node of the node package may be fully or partially embedded within the package or packaging materials used to help form a general container, which maintains an item to be shipped along with the node.

Figure 20:
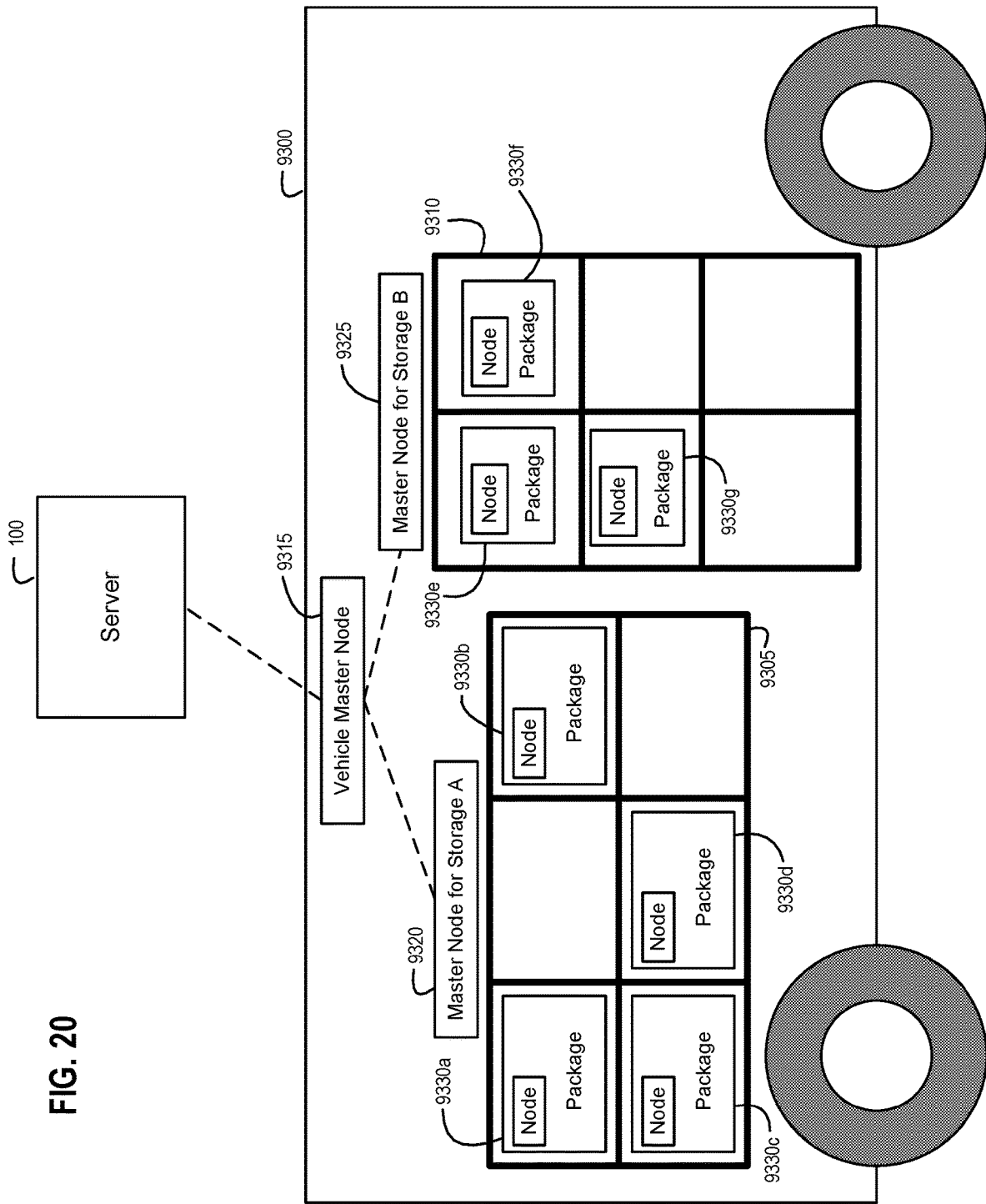
FIG. 20 is a diagram illustrating exemplary node packages located in an exemplary vehicle environment in accordance with an embodiment of the invention.

FIG. 20 is a diagram illustrating exemplary node packages located in an exemplary vehicle environment in accordance with an embodiment of the invention. Referring now to FIG. 20, exemplary vehicle 9300 is illustrated as an example of a general mobile logistics transport or conveyance carrying packages being shipped. Those skilled in the art will appreciate that vehicle 9300 may be implemented as various types of logistics conveyances (e.g., automobile, delivery van, autonomous vehicle, truck, trailer, train, aircraft, marine vessel (ship), etc.). Within exemplary vehicle 9300, packages may be placed, stored, and organized within different storage devices or units, such as storage unit A 9305 or storage unit B 9310. In general, a storage device or unit helps to maintain one or more packages in a configuration that helps to assure save shipment, minimize damage to the packages, and provide a way to organize what is being stored. Different embodiments of a storage unit may store a single package or may storage a wide variety of different types of packages that use different types of packaging materials (e.g., corrugated fiberboard boxes, wooden and non-wooden pallets, containers, etc.) and in large numbers.

Vehicle 9300 includes a vehicle master node 9315—an exemplary implementation of a master node, such as master node 110a shown and described with respect to FIG. 4. Vehicle master node 9315 is shown operative to communicate with server 100 over a longer-range communication interfaces (such as interface 485 on exemplary master node 110a) and operative to communicate with other nodes, such as master node 9320 associated with storage unit A 9305, master node 9325 associated with storage unit B 9310, and other nodes associated with parts of such storage units and node packages stored within the storage units. In more detail, each storage unit may include, in some embodiments, built-in nodes associated with particular shelves, lockers, receptacles, or other parts of the particular storage unit.

Thus, an exemplary storage unit (such as storage unit A 9305) may be a node-enabled storage unit used within a logistics vehicle to safely and intelligently transport node packages. As such, the exemplary storage unit may itself have a hierarchy of nodes (e.g., a master node, and one or more other nodes (ID nodes or other master nodes) assigned to different parts of the unit) and be operative to detect the location of particular node packages via the various location determination methods discussed herein as the node package is placed in a storage location within the unit, moved between storage locations of the unit or between different units, or simply removed from the storage location within the unit.

As shown in FIG. 20, various node packages 9330a-9330d may be kept in different storage locations of storage unit A 9305 within vehicle 9300. Similarly, other node packages 9330e-9330g are kept in portions of storage unit B 9310. Such node packages may be placed into particular storage locations according to shipping information related to the node packages. For example, the node packages may be placed into particular storage locations according to weights of the particular node packages, a planned loading scheme (such as according to an anticipated delivery schedule), to storage capacity of the particular different locations within the storage unit, or according to a storage type for the particular different locations (e.g., one location for storing envelope types of packages, another location for storing boxed container type of packages, another location for storing containerized packages (e.g., ULDs), etc.).

Figure 21:
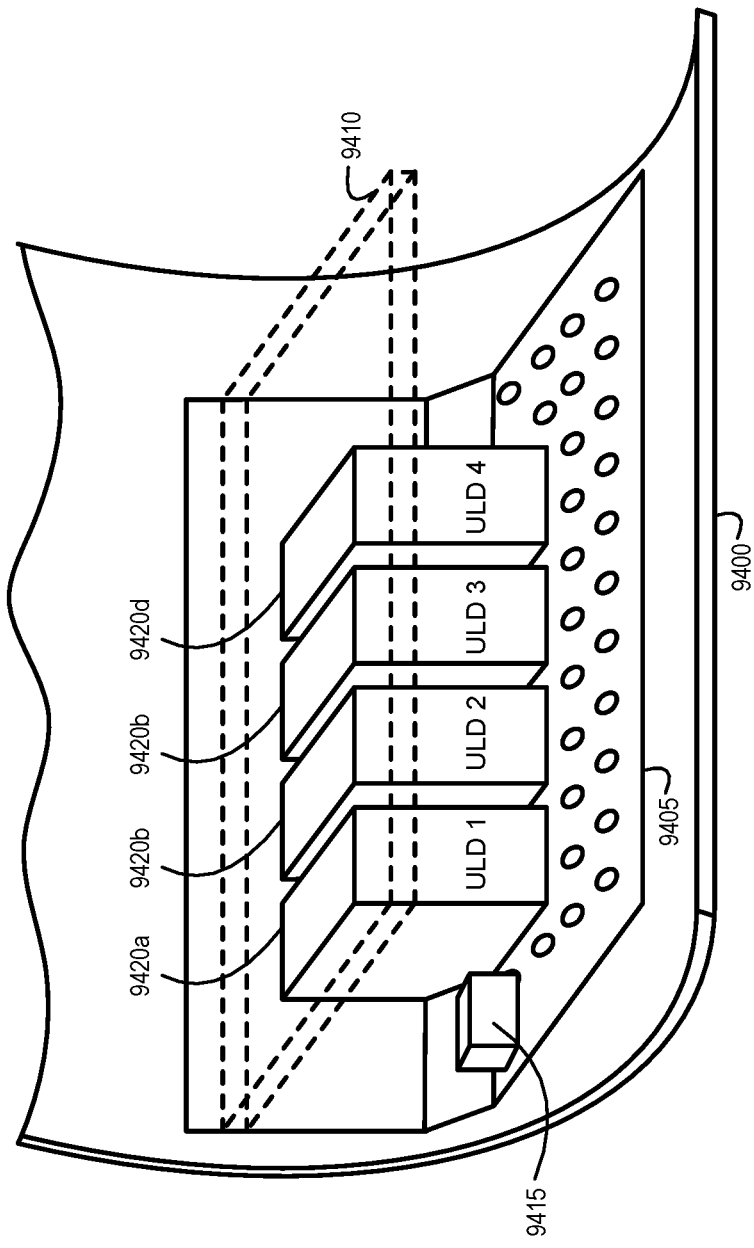
FIG. 21 is a diagram illustrating exemplary mobile storage units, such as ULDs, used as containers that help ship node packages in an exemplary airborne environment in accordance with an embodiment of the invention.

Shipping of containerized groups of packages (e.g., ULD types of containers made to optimize airborne logistics handling of packages) is an example of where a mobile storage unit (such as a movable unit load device (ULD)) may be deployed when shipping node packages in an airborne environment. FIG. 21 is a diagram illustrating exemplary mobile storage units, such as ULDs, used as containers that help ship node packages in an exemplary airborne environment in accordance with an embodiment of the invention.

Referring now to FIG. 21, a cut-away perspective view of an exemplary aircraft fuselage 9400 is illustrated. In particular, an exemplary floor 9405 of a cargo storage area within fuselage 9400 is shown having multiple roller elements that help facilitate movement of cargo within the cargo area. Additionally, while not shown in FIG. 21, the cargo storage area and floor 9405 typically include structure and fastening points to help hold any cargo loaded within fuselage 9400. The cargo storage area within exemplary fuselage 9400 may be split into an upper area and a lower area by an additional floor 9410.

The cut-away perspective example illustrated in FIG. 21 shows a lower cargo area where various ULD containers 9420a-9420d are shown along with an airborne master node 9415, which is (depending on the aircraft's location and communication mode and status) operative to communicate with server 100—much like vehicle master node 9315 does as shown in FIG. 20. In general, the illustrated configuration of ULD containers 9420a-d is used similar to the storage units illustrated and described in FIG. 20. For example, each ULD container 9420a-d may have different storage locations within it and one or more master nodes (not shown) dedicated and attached internally so that they may track, monitor, and communicate with different node packages loaded within the ULD as well as other nodes and a server—much like the master node 9320 for storage unit A 9305 can track, monitor, and communicate with different node packages loaded within the storage unit as well as other nodes and server 100. Node packages within each ULD may communicate with nodes in the ULD and may communicate directly with airborne master node 9415 directly (or indirectly through other master nodes within the ULD). And as such, shipping information may be used when the node packages are placed into particular storage locations within a particular ULD according to weights of the particular node packages, a planned loading scheme for the ULDs (such as according to an anticipated delivery schedule), to storage capacity of the particular different locations within the ULD, or according to a storage type for the particular different locations.

In light of the exemplary vehicular environments shown in FIGS. 93 and 94 showing structure used when initially placing, storing, maintaining, locating, moving, and eventually removing a node package for delivery, those skilled in the art will appreciate that each of the embodiments described above related to methods for locating a node may be further enhanced when applied to an exemplary vehicular environment. For example, in one embodiment, determining a node's location may further comprise determining a location of the node-enabled package within a vehicle to be the location of the node. In a more detailed embodiment, the method that determines a node location may further generate a location message regarding where the node-enabled package is located within the vehicle based upon the determined location of the node. Such a message may be displayed to a user (e.g., logistics personnel that handle packages being shipped) on a user interface of a node or user access device operating as a node (e.g., smartphone or smart wearable device). For example, such a displayed message may be a type of an informed prompt ("Pickup Package X at Storage Location 01 in Storage Unit A") or strategic instruction ("Place Package X in Storage Location 01 in Storage Unit A") or ("Move Package X at Storage Location 01 in Storage Unit A to Storage Location 03 in Storage Unit B"). In some embodiments, the network device or node that determines the node's location may also provide such a display to the user, but in other embodiments, the location message may be transmitted to another node for display to the user.

In another embodiment, an exemplary method that determines a node's location may also access shipping information related to the node-enabled package and generate a relocation message regarding where the node-enabled package may be relocated within the vehicle based upon the determined location of the node and the accessed shipping information. Such a message may be displayed to a user similar to the location message described above—namely, that such a relocation message may be displayed to a user (e.g., logistics personnel that handle packages being shipped) on a user interface of a node or user access device operating as a node (e.g., smartphone or smart wearable device) and that in some embodiments, the network device or node that determines the node's location may provide such a display to the user, but in other embodiments, the relocation message may be transmitted to another node for display to the user.

In more detail, the shipping information may comprise weight information on the node-enabled package that is used in determining where to relocate or initially place the node-enabled package. In another embodiment, such shipping information may be used to create a loading scheme to help organize where to locate or relocate the node-enabled packages. Thus, the location or relocation of the node-enabled package within the vehicle may be determined according to a loading scheme. In more detail, such a loading scheme may be related to an anticipated delivery schedule, where the node-enabled package may be placed within or removed from the vehicle according to the anticipated delivery schedule.

Logistics Applications of a Wireless Node Network

Figure 17:
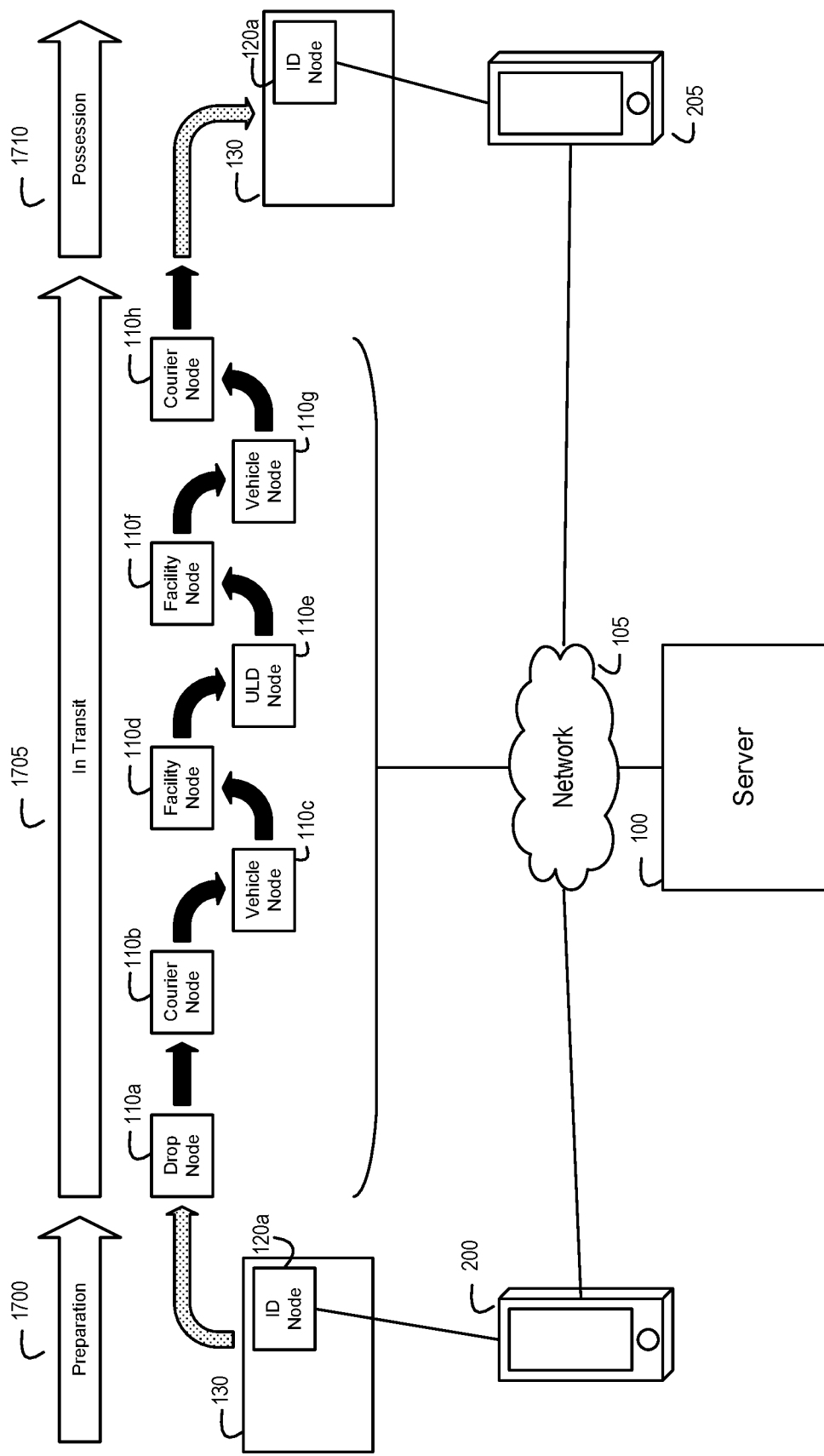
FIG. 17 is a diagram illustrating an example logistics operation using exemplary components of a wireless node network in accordance with an embodiment of the invention.

As described above, an exemplary wireless node network may be useful in a logistics application where an item is to be located. Further, such an exemplary wireless node network may also be useful in logistics applications where the item is moving between locations, and the network provides an enhanced level of visibility and management of the item within such a logistics environment. In other words, an embodiment of an exemplary wireless node network in accordance with one or more principles of the present invention helps enable enhanced logistical operations that manage information when shipping and tracking an item and when the item is being delivered. FIG. 17 is a diagram illustrating an example logistics operation using exemplary components of a wireless node network in accordance with an embodiment of the invention.

Logistics Beyond Pickup and Delivery

Referring now to FIG. 17, an ID node 120a is illustrated as being deployed and associated with an item (e.g., package 130) to be shipped. As the package 130 is being prepared for shipping 1700, and is in transit as part of shipment 1705, and is in the possession of the intended recipient 1710, components of an exemplary wireless node network are deployed to manage information regarding the shipment during these three phases.

In a general example of using a wireless node network for managing logistics related to an item to be shipped, a shipping customer may initially register the item (such as package 130) with a node (such as an ID node) to be shipped from an origin location to a destination location. One or more management hand-offs of the item and node occurs as the item and the ID node collectively transit a path from the origin to the destination. Each hand-off may be based upon an awareness of the shipment path the ID node associated with package 130 will take as it is transferred through a shipping path from its origin to destination. Hand-off of the package 130 and ID node are managed and coordinated with master nodes (such as master nodes 110a-110h), which are managed by server 100, along the anticipated shipment path. During operation along the shipping path, server 100 receives information and updates from nodes, manages and authorizes hand-offs between different nodes, and tracks information related to current associations, shared data, sensor data available, locations of the nodes, and context data that helps to refine the location of nodes. Thus, with the ID node associated with package 130, the visibility of the package 130 may be extended for the customer beyond the conventional custodial control during transit 1705 as the shipping customer prepares the item for shipment 1700 prior to an initial drop-off and after delivery of the item to the recipient 1710.

In a more detailed embodiment, an exemplary method for managing logistics related to an item to be shipped using a wireless node network begins with registering a node with the item to be shipped. For example, the shipping customer may control user access device 200, and use device 200 to initially associate an ID node 120a and package 130 with a tracking number as part of preparing to ship the package 130 (a type of item). In one embodiment, device 200 may use a particular app or other program module resident and operating on device 200 to input the tracking number of the package 130. Device 200 then provides that information back to server 100 via network 105 to associate the tracking number with the package 130 and ID node 120a. Device 200, in some embodiments, may then print a label for the shipment of package 130 (and ID node 120a). In another embodiment, ID node 120a may be a preprogrammed node with pre-existing shipping and payment related information associated with it. Further details of a label-less shipping and payment in another embodiment are described below.

Concurrent with this action, the shipping customer may associate ID node 120a with package 130. For example, the shipping customer may place the ID node 120a within package 130 and, in some cases, physically attach the ID node 120a to a particular part of package 130. In another example, the shipping customer may place an exterior label on package 130 where the label itself includes ID node 120a. Other examples may effectively group ID node 120a with package 130 within a larger package, container, or pallet of items or packages that collectively travel together.

In this manner, device 200 may operate as a type of master node under control of the app or other program module, and be associated with the package 130 and ID node 120a from an association management perspective. For example, device 200 may operate via the app or other program module along with Bluetooth® hardware and software working on device 200 to communicate with ID node 120a. Other embodiments may rely on other short-range communication interfaces for device 200 to communicate with ID node 120a. And in one embodiment, device 200 may receive one or more security credentials from server 100 in order to connect and actively pair or connect with ID node 120a.

With at least the shipping information at the server 100, server 100 may determine a predicted shipping path for the package 130. In one embodiment, server 100 may have historic data indicating an optimal route for shipping an item from point A to point B that uses a particular shipping path (e.g., pick-up near A by a particular courier, transport by vehicle to a particular facility, further transport via aircraft to another facility near point B, and transport by vehicle to facilitate delivery by a courier at point B). In one example, the predicted path may only be for a portion of the route between two points, such as an origin point and a destination point.

In a further example, the predicted path (or part thereof) may be adjusted based on the contextual environment of an item being shipped. For instance, depending on context data (such as weather information, historic data on success for particular transit segments, capacity information for third party carriers, etc.), server 100 may alter the initially predicted shipping path to provide a refined predicted shipping path that is more optimized under the current conditions and context. This allows the server 100 to further anticipate which master nodes may be used along an anticipated shipping path (or refined shipping path), to help efficiently manage shipment of the package 130 to point B. Those skilled in the art will further appreciate that an embodiment may only partially identify what master nodes may be used along the anticipated shipping path (or refined shipping path), and that further master nodes may be identified as the package 130 is actively in route to point B depending on context data (e.g., master node availability, weather information, etc.).

In a more detailed example, server 100 may use sort data analytics to predict an appropriate shipping path along which the package 130 and the ID node 120a will travel, identifying predicted master nodes the ID node 120a will be within range of during its journey. In the example flow illustrated in FIG. 17, nodes 110a-110h refer to different master nodes along an exemplary predicted shipping path, which includes at least a pick-up and drop-off of ID node 120a and package 130 at an origin and destination, respectively.

In one example, the shipping customer may place package 130 and its associated ID node 120a in a drop box or repository for items to be shipped. In the illustrated example of FIG. 17, drop box is represented as drop node 110a. Essentially, drop node 110a may be implemented with a type of master node connected to or integrated into a drop box or locker unit type of logistics repository (more generally referred to herein as a node-enabled logistics receptacle). As the shipping customer physically places ID node 120a into drop node 110a, device 200 may hand-off ID node 120a to drop node 110a, update server 100 with this association information, and disassociate from ID node 120a. In this manner, the system has visibility into the status and location of an item (such as package 130) prior to pick-up from drop node 110a. Further details of an exemplary node-enabled logistics receptacle are described below.

At the drop node 110a, a courier may pick-up the package 130 and ID node 120a. The courier has a courier node 110b, which knows the tracking number and associated ID node 120a at time of pickup, or looks up the ID node 120a MAC address based on a captured tracking number (part of information broadcast or advertised by ID node 110a. Basically, the master node responsibility transfers to or is otherwise handed off to courier node 110b, which now acts as a master node actively connected and associated with ID node 120a (by virtue of communications from courier node 110b back to server that authorizes the association of ID node 110a with courier node 110b and disassociates drop node 110a with ID node 110a).

Similar handoffs occur between different master nodes and ID node 120a occur as package 130 and ID node 120a transit the anticipated shipping path in accordance with instructions sent to different master nodes by server 100. In one embodiment, associations are accomplished during such handoffs with security credentials requested, authorized, and transmitted to the appropriate master node. In another embodiment, associations are merely passive associations that do not require active and authorized pairings. Yet, the passive association still may allow the system to keep track of ID node 120a and package 130 as they transit the anticipated shipping path.

New associations (active and passive) and disassociations are updated to server 100. And server 100 may change programming in different nodes as package 130 and ID node 120a transit the shipping path—such as changing the operation of a master node (such as ULD node 110e) to shift to operating as an ID node while airborne or when GPS signals are lost. In another example, certain mobile types of node may have responsibilities changed to wired types of nodes as a way of preserving the power of a mobile type of node. If ID node 120a fails to associate for a certain interval and needs to be reacquired, ID node 120a may update its status flag to a particular Alert Stage and may attempt to communicate with an increasingly broader range of master nodes in order to be found.

During the transit, server 100 may share information with different nodes, such as context data, timer/clock data, environmental data, etc. Sensor data from the ID node 120a may be gathered via scans from a master node, and then forwarded back to server 100. And as server 100 manages the associations, handoffs, and information going to and coming from ID node 120a (via master nodes), server 100 is able to determine the location of ID node 120a using one or more of the various location determination techniques described above. As such, server 100 is able to provide information related to the ID node 120a and its related package 130 in response to requests for such information.

When package 130 and ID node 120a arrive at the destination (e.g., point B), courier node 110h may update server 100 once ID node 120a is placed at the destination and disassociated with courier node 110h. However, visibility need not end at such a drop-off event (such as arriving at the destination). The recipient customer's user access device 205 may act as another master node, and associate with ID node 120a after delivery. In one example, server 100 is notified by courier node 110h that delivery has been made. Thereafter, server 100 may notify device 205 with this information. In response, an app or other program module on device 205 may cause device 205 to operate as a node and to actively seek association with ID node 120a. When device 205 and ID node 120a connect and are given authorization by server 100 to actively associate, server 100 is notified and may provide further information to device 205 (e.g., sensor data, etc.) and may be able to determined updated location data about ID node 120a and package 130 after delivery has occurred. In another example, active association may not be needed between device 205 and ID node 120a as status information may still be gathered by device 205 via passive association, where the status information provides further visibility regarding the ID node 120 after delivery to the destination.

Figure 18:
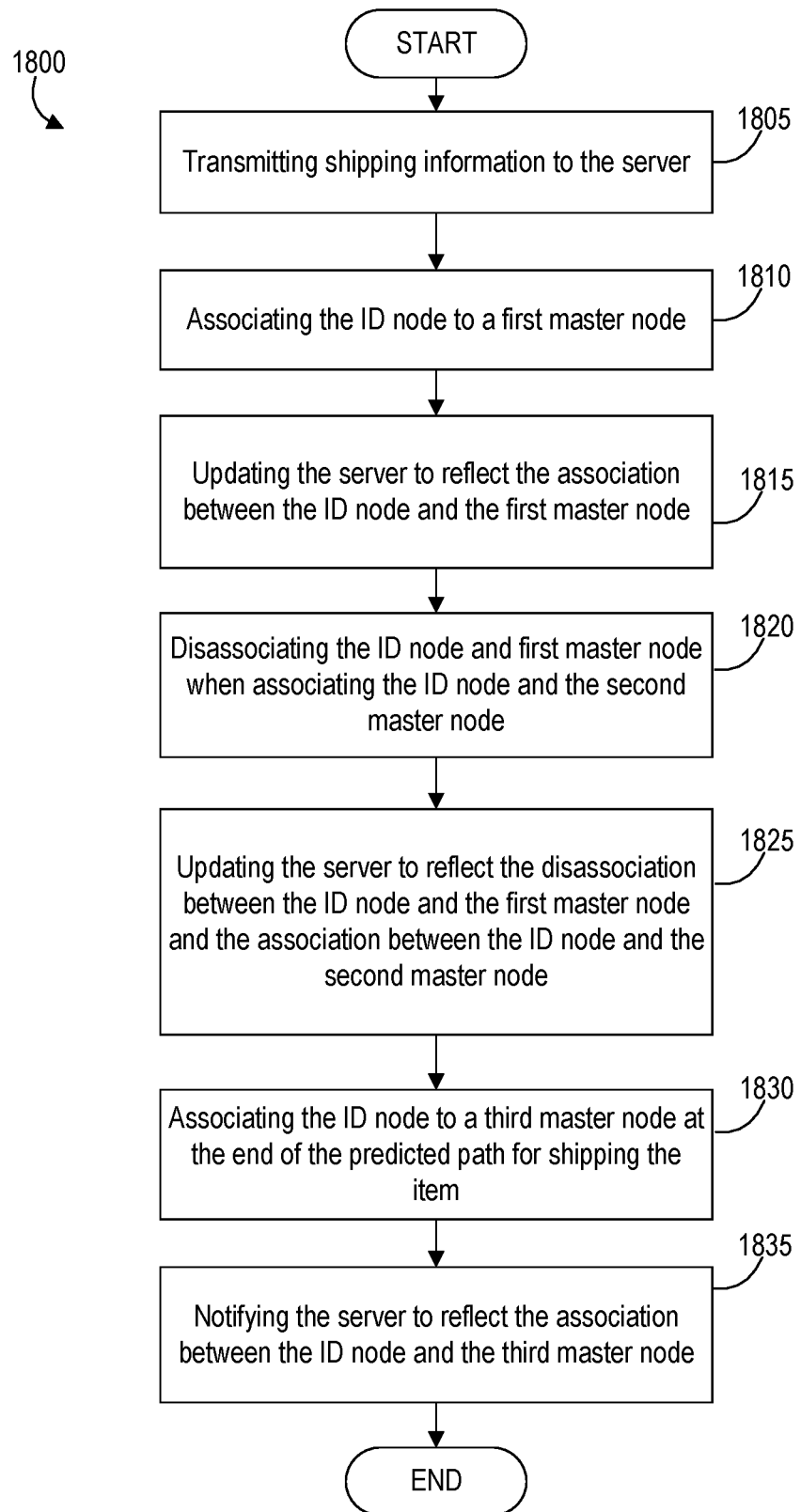
FIG. 18 is a flow diagram illustrating an example method for managing shipment of an item using a wireless node network in accordance with an embodiment of the invention.
Figure 19:
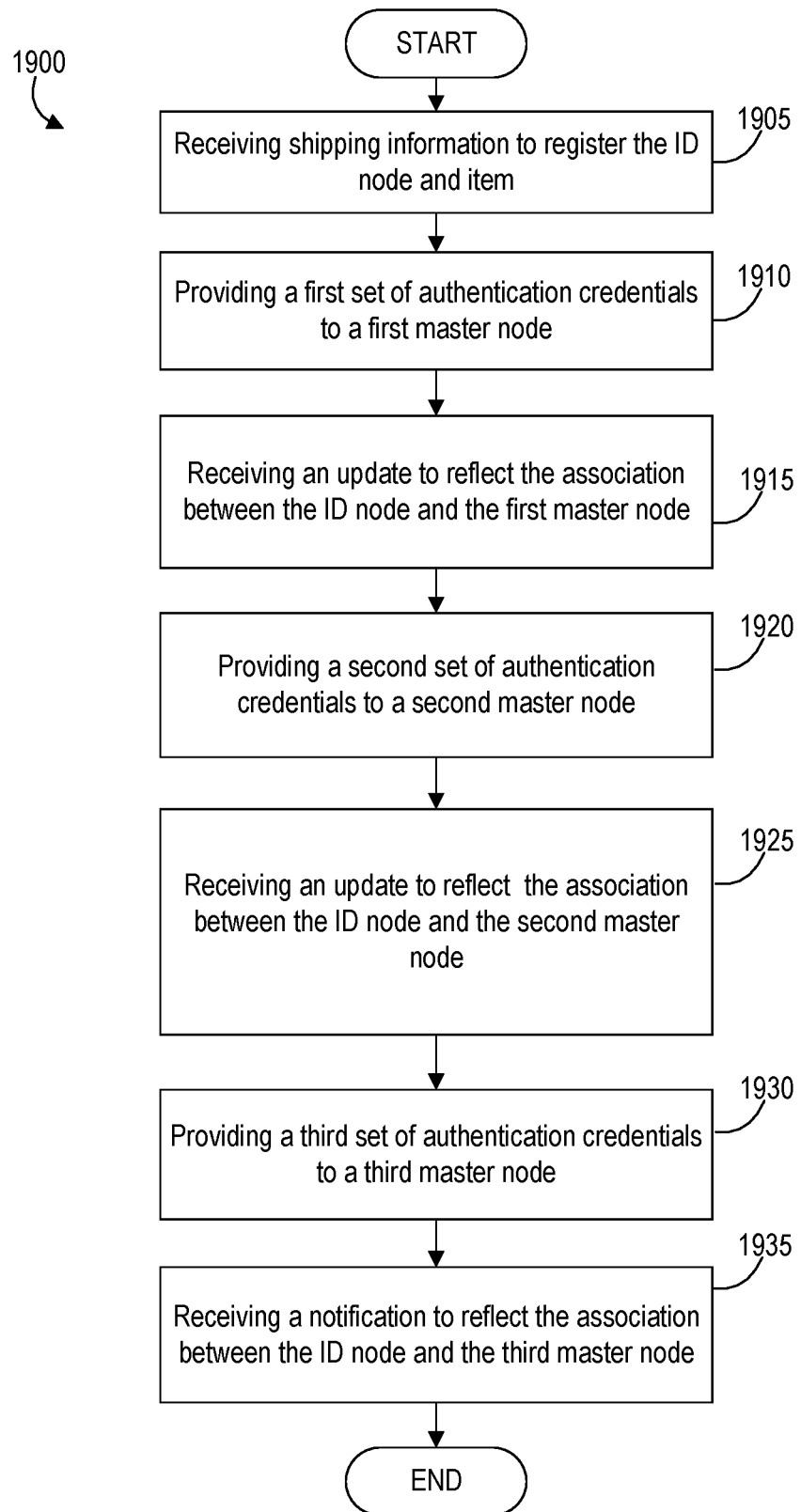
FIG. 19 is a flow diagram illustrating another example method for managing shipment of an item using a wireless node network in accordance with an embodiment of the invention.

FIGS. 18 and 19 are flow diagrams illustrating various exemplary methods for managing a shipment of an item using a wireless node network, such as that illustrated in FIG. 17. Referring now to FIG. 18, exemplary method 1800 begins by transmitting shipping information to the server to register the ID node and the item to be shipped at step 1805 and associating the ID node to a first master node related to a predicted path for shipping the item at step 1810. At step 1815, the server is updated to reflect the association between the ID node and the first master node. Typically, this may come in the form or a communication from the first master node to the server. When the first master node is a user access device (e.g., one of a laptop computer, a desktop computer, a tablet device, a personal area network device, a smartphone device, and a smart wearable device) that is operated by a shipping customer, the server may be updated to become aware that the ID node is associated with the first master node prior to a pick-up event in the predicted path.

For example, a shipping customer may use their smartphone to enter shipping information and register that the ID node and the item (such as package 130) are to be shipped from an origin point to a destination point. Prior to when the item and ID node are picked up by an initial courier (e.g., from a drop box, locker unit, or other receptacle), the shipping customer's smartphone operates as the first master node and is associated with the ID node. As such, and with an update to the server, the server now has visibility into the status and location of the ID node prior to a pick-up event in the predicted shipping path from the origin point to the destination point.

The method 1800 may continue at step 1820 by disassociating the ID node and the first master node when associating the ID node and a second master node related to the predicted path as the ID node transits the predicted path. In one example, the ID node need not disassociate with the first master node commensurate with associating with the second master node. Thus, those skilled in the art will appreciate that the ID node may be associated with one or more master nodes at a given point in time and may be selectively disassociated with certain master nodes depending on the need for the ID node to securely share data with different master nodes.

At step 1825, the server is updated to reflect the disassociation between the ID node and the first master node (if that has occurred yet) and the association between the ID node and the second master node as the ID node continues to transit the predicted path. At step 1830, the method may associate the ID node to a third master node near an end of the predicted path for shipping the item, and then at step 1835 notifies the server to reflect the association between the ID node and the third master node.

In the method 1800, associating the ID node to the third master node in step 1830 may be performed after a drop-off event in the predicted path. The method may also rely upon context data to adjust for an environmental aspect of the predicted path when associating the ID node to any of the first, second, or third master nodes.

For example, after the item and ID node are delivered to or near the destination, the recipient's smartphone may operate as the third master node associated with the ID node. Data, such as sensor data, may be shared with the recipient while the recipient's smartphone operates as the third master node associated with the ID node. As such, and with an update to the server, the server now has visibility into the status and location of the ID node after a drop-off event.

Thereafter, the recipient may unregister the ID node and item given the item is now in the recipient's possession and control. For example, the recipient may remove the ID node from the item (e.g., the package 130), deactivate the ID node to otherwise power down the device, update the server regarding the deactivated status of the ID node (and the disassociation of ID node and the third master node), and then clean up and/or recharge the ID node for future use in shipping another item.

Method 1800 may also include receiving context data related to the predicted path. In one embodiment, such context data may advantageously allow for adjustments due to one or more environmental aspects of the predicted path when associating the ID node to any of the master nodes. For example, the context data may include scan data indicating the type of material in package 130 (the item), which may cause RF shielding issues with the ID node.

Referring now to FIG. 19, exemplary method 1900 is explained from the perspective of the server, which can authorize certain types of node associations. The server may be updated, in some embodiments, with association information when an ID node and a master node are passively associated. In such a situation, the nodes have not established an authorized association where they can securely share data. However, as method 1900 explains in more detail, an embodiment may manage a shipment of an item when active associations are established.

Method 1900 begins with the server receiving shipping information to register the ID node and the item to be shipped in step 1905. The method 1900 then provides a first set of authentication credentials (e.g., security pin information) to a first master node to permit the ID node to associate with the first master node related to a predicted path for shipping the item at step 1910. In one example, the first master node may be a user access device, such as a laptop computer, a desktop computer, a tablet device, a personal area network device, a smartphone device, or a smart wearable device. And step 1920 may be performed prior to a pick-up even in the predicted path.

At step 1915, the server receives an update to reflect the association between the ID node and the first master node. The method 1900 then provides a second set of authentication credentials to a second master node to permit the ID node to associate with the second master node and disassociate the ID node from the first master node as the ID node transits the predicted path at step 1920. At step 1925, the server then receives an update to reflect the association between the ID node and the second master node as the ID node continues to transit the predicted path (or a portion of a predicted path). When the ID node and the first master node disassociate, the server may also be updated.

In some examples, the method 1900 may have the server provide a third set of authentication credentials to a third master node to permit the ID node to associate with the third master node as the ID node reaches an end of the predicted path for shipping the item at step 1930. In some examples, this step may be performed after a drop-off event in the predicted path.

Finally, at step 1935, the server receives a notification that reflects the association between the ID node and the third master node. When the ID node and the second master node disassociate, the server may also be updated.

In method 1900, another embodiment has the server providing any of the master nodes with context data related to an environmental aspect of a part of the predicted path. For example, exemplary context data may include layout data related to a facility in which the ID node is moving between master nodes. In more detail, the received context data may be relied upon to adjust for an environmental aspect of the predicted path when associating the ID node to any of the first, second, or third master nodes.

In still another embodiment, method 1900 may also determining a location of the ID node based upon association information received by the server and location information related to at least one of the first, second, or third master nodes.

As previously discussed, the server may predict a transit route from a first point to a second point along at least a portion of the predicted path for shipping the item. In one example, the first point is an origin and the second point is a destination point with both being identified in the shipping information of the item. However in other examples, the first and second point along a predicted path may merely be interim points without encompassing the originating shipment point or the ultimate destination of the item being shipped. Further, another example may adjust the predicted path as the ID node transits the path. In this way, the server may adapt based upon, for example, context data, so as to optimize or at least account for a changing contextual environment when managing the shipment of an item.

In another embodiment, a non-transitory computer-readable medium is disclosed that contains instructions, which when executed on a processor (e.g., processor 500 of server 100), performs another embodiment of a method for managing a shipment of an item using a wireless node network having at least one ID node, a plurality of master nodes, and a server. In this embodiment, the exemplary method begins with the server receiving shipping information to register the ID node and the item to be shipped. The method predicting a first portion of a transit route for the item from a first point to a second point. For example, a first point may be the origin point and the second point may be the destination point—both of which are identified in the shipping information. In another example, the first and second points are any two points along the transit route. Furthermore, the transit route may be predicted as a series of portions or segments that may use particular types of master nodes during transit (e.g., master nodes used by a particular courier for pick-up, an anticipated vehicle used by the pickup courier, one or more anticipated facilities that may be used by the vehicle, an anticipated air route (e.g., an anticipated departing airport, an anticipated aircraft, anticipated types of containers such as a type of ULD or pallet used on the aircraft, and an anticipated arriving airport), a facility near the anticipated arriving airport, a vehicle used to carry the item, and a courier that may deliver the item at the destination point). Those skilled in the art will realized that some of the potential portions of an exemplary predicted path or transit route may be relatively simple for a local delivery, or may be quite complex from an intermodal perspective when the origin point and destination points are very far away from each other.

Next, the method authorizes a first master node to associate or connect with the ID node near the origin point. This may be done prior to a pick-up event for the ID node and item being shipped. For example, when the first master node is a user access device (e.g., a laptop computer, a desktop computer, a tablet device, a personal area network device, a smartphone device, and a smart wearable device) for the shipping customer, visibility as to the status and location of the ID node may be extended to prior to a pick-up event. In one embodiment, such an authorization is performed by the server 100 when it receives information from the first master node regarding the ID node, determines that the first master node and the ID node should be actively paired and associated, and the server 100 sends the appropriate security pin information as a type of authorization credentials that permit the first master node to actively pair and connect with the ID node. After the first master node is associated with the ID node, the server receives an update reflecting the association.

Next, the server may authorize a second master node to associate with the ID node as management responsibility of the ID node is handed off from the first master node to the second master node at the second point on the predicted transit route. In one embodiment, the method may authorize the first master node to disassociate with the ID node. However, in other embodiments, the first master node may stay associated with the ID node—even after the ID node is authorized to associate with the second master node. The server then receives an update to reflect the association between the ID node and the second master node as the ID node continues on the predicted first portion of the transit route.

The method may further authorize the second master node to disassociate with the ID node and a third master node to associate with the ID node as management responsibility of the ID node is handed off from the second master node to the third master node near the destination point on the predicted transit route. This may be done prior to a pick-up event for the ID node and item being shipped. For example, when the third master node is a user access device (e.g., a laptop computer, a desktop computer, a tablet device, a personal area network device, a smartphone device, and a smart wearable device) for the recipient, visibility as to the status and location of the ID node may be extended to after a drop-off event. After the third master node is associated with the ID node, the server receives a notification to reflect the association between the ID node and the third master node.

And during the method, the server may determine a location of the ID node based upon association information received by the server and location information related to at least one of the first, second, or third master nodes. As discussed above, various techniques are available for locating a node and, in some cases, adjusting for adverse RF environmental conditions with context data to more accurately refine the location of a node. As such, the server keeps track of the location of nodes in the wireless node network, and may provide that information (as well as other types of shared or sensor information) when requested and authorized to do so.

From a system perspective of such a logistics application of a wireless node network, an exemplary system is disclosed for managing a shipment of an item using a wireless node network. With reference to FIG. 17, the exemplary system generally comprises an ID node (such as node 120*a*), a plurality of master nodes (such as nodes 110*a*-110*h*), and a server (such as server 100). The ID node is registered to the item (such as package 130) being shipped. Each of the master nodes are predicted to be located at a different part of an anticipated transit route for the item as the item is shipped from an origin point to a designation point of the anticipated transit route. Each of the master nodes is operative to communicate with the ID node over a short-range communication path, and operative to communicate with other master nodes and the server 100.

The server operates to track and report a location of the ID node and a location of the master nodes. As shown in FIG. 17, server 100 relies on network 105 to communicate with different master nodes (110*a*-110*h*) as well as user access devices 200, 205 that may operate and function as a master node associated with ID node 120*a* at certain times. As previously discussed, server 100 may employ a variety of different techniques (or a combination of different techniques) for determining the location of ID node 120*a* or one of the other nodes in the network.

The server is also operative to facilitate the transfer of management responsibility of the ID node between different master nodes as the ID node moves along the anticipated transit route. For example, as discussed above, nodes communicate via broadcast and scanning methods, and may be associated under control of the server 100 as part of managing the wireless node network. In this way, a first of the master nodes may be associated with the ID node prior to a pick-up event for the ID node and item to be shipped. In one example, user access device 200 may operate as a master node and be associated with ID node 120a prior to being placed into drop node 110a and picked up by a courier from the receptacle related to that drop node 110a.

Later, a second of the master nodes may be associated with the ID node after the ID node is disassociated with the first of the master nodes at an intermediate point of the anticipated transit route. And, a third of the master nodes may be associated with the ID node after a drop-off event for the ID node and item to be shipped. For example, user access device 205 may operate as a master node and be associated with ID node 120a after the ID node 120a and item are dropped off at an intended destination point (e.g., a type of drop-off event).

In an embodiment of the system, each of the master nodes may be operative to update the server upon completing a disassociation or association with the ID node. This provides the server with association information with which it can use to manage and track the nodes in the wireless node network. When associating nodes, the server may be operative to transmit a set of authorization credentials to one of the master nodes and the ID node to authorize a desired association between the master node and the ID node. The server may also be operative to determine the location of the ID node based upon context data, such as information relating to an environmental aspect of a part of the anticipated transit path (e.g., RF shielding aspects of the item being shipped with the ID node or a container holding the ID node, building layout information, etc.).

Those skilled in the art will readily appreciate that operations of such an exemplary wireless node network, as set forth herein, are not limited to tracking just a package, but may be used to manage logistics and tracking of other types of items, such as an object or a person. Indeed, some embodiments provide enhanced capabilities that facilitate better tracking of items, objects, and people as they move to a more restrictive indoor environment, by using a low power ID node in advertising mode in the presence of one or more master nodes.

Enhanced Delivery & Pickup Management

In light of the above description about elements of an exemplary wireless node network and how they may be used to locate and track items, further embodiments may leverage one or more elements of the exemplary wireless node network to help enhance delivery/pickup management of an item via, for example, selective delivery release control implemented with elements of the node network. Further, elements of an exemplary wireless node network may also be useful in improved logistics applications where elements may sense an adverse delivery/pickup condition in a proactive and more timely manner that involves relevant corrective delivery/pickup notifications to address the sensed condition (e.g., when an item has been dropped off or picked up without meeting certain parameters, such as delivery to the intended destination, delivery during an intended time period, being picked up by the right entity, etc.). Further still, elements of an exemplary wireless node network may be deployed to improve how to monitor an item within an inventory not yet shipped and generate a pickup related notification related to an authorized status for release of the item from the inventory to improve how to monitor inventory and automatically identify when an item is not authorized to move from a particular location using such interoperating node elements. The following embodiments that enhance and improve delivery/pickup management of an item may be deployed and implemented using aspects discussed in more detail above (e.g., locating nodes, node association, etc.). FIGS. 34-44 help explain various embodiments that enhance and improve delivery management and particularly useful and proactive delivery notifications using exemplary components of a wireless node network in accordance with an embodiment of the invention.

Selective Delivery Release Control

In various embodiments, an item may be maintained or stored within a type of container, receptacle, repository, or storage unit where a master node is connected to or assembled as part of the unit (generally referred to as a node-enabled logistics receptacle). In general, an exemplary node-enabled logistics receptacle may temporarily maintain custody of one or more items (along with their respective ID nodes should one be present with a particular item). An exemplary node-enabled logistics receptacle may have an entrance opening through which an item may pass (along with its related node) into a storage area of the receptacle. Thus, the storage area maintains the item (and the related node if present) after it is placed within the receptacle.

Further embodiments of an exemplary node-enabled logistics receptacle may be implemented as a secure access type of receptacle (such as a locker type of logistics receptacle) having an entrance opening that is secured with a lockable element (such as a door), as will be explained in more detail below. As such, an item temporarily maintained with the storage area of the receptacle may be secured with the lockable element and released when the lockable element is unlocked.

Figure 34:
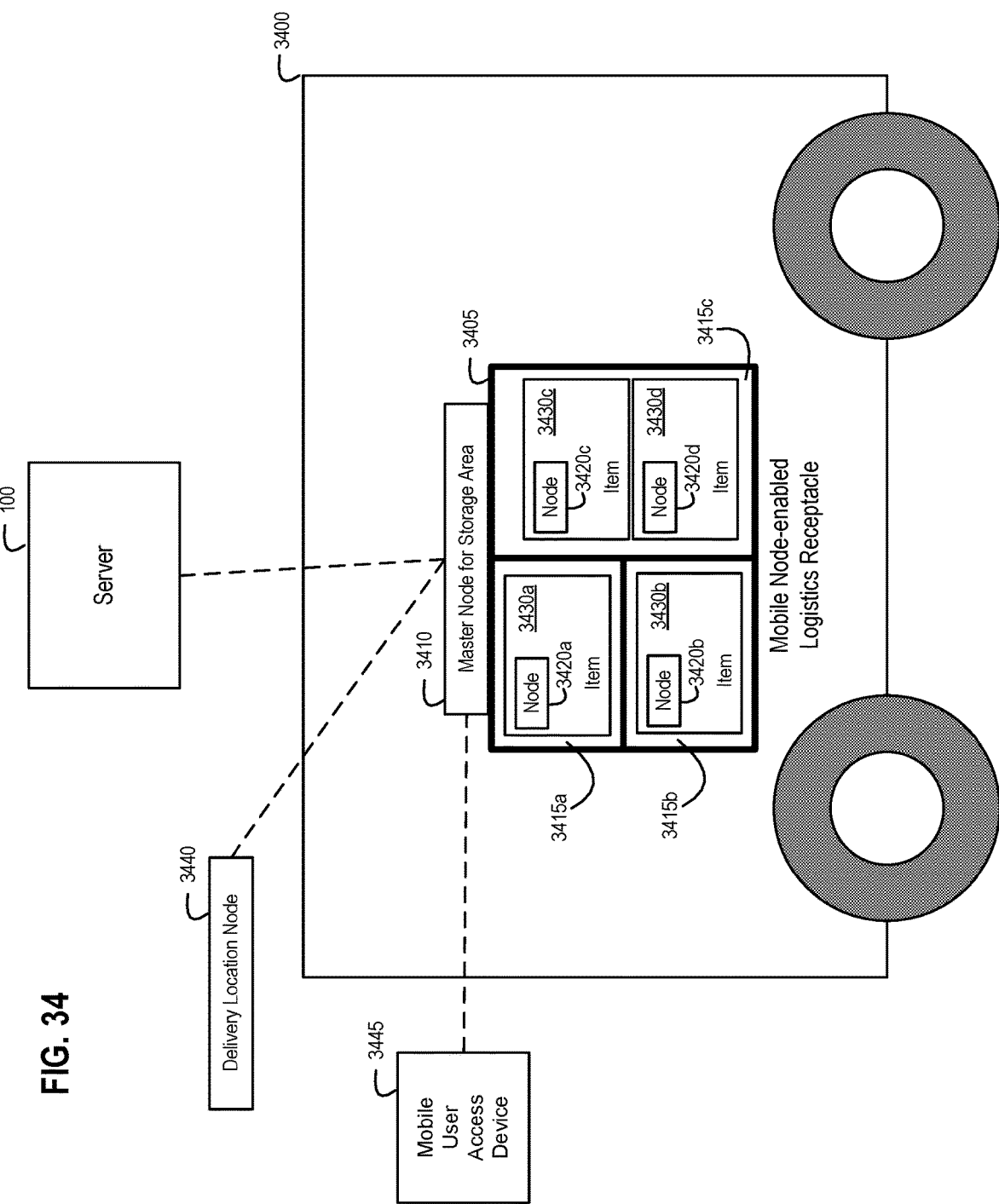
FIG. 34 is a diagram illustrating an exemplary logistics vehicle in accordance with an embodiment of the invention.

FIG. 34 is a diagram illustrating an exemplary logistics vehicle that operates as a type of node-enabled logistics receptacle in accordance with an embodiment of the invention. Referring now to FIG. 34, exemplary logistics vehicle 3400 is illustrated as a general mobile logistics transport or conveyance capable of transporting or carrying one or more item (such as a package, an object, a palletized group of packages, a person, or piece of equipment). Those skilled in the art will appreciate that vehicle 3400 (similar to exemplary vehicle 9300 described above with respect to FIG. 20) may be implemented as various types of logistics conveyances (e.g., automobile, delivery van, autonomous vehicle, truck, trailer, train, aircraft, marine vessel (ship), etc.).

Within exemplary vehicle 3400, one or more items 3430a-3430d may be placed, stored, and organized within a storage unit 3405. In some embodiments, vehicle 3400 itself may operate as storage unit 3405 that can maintain, store, and keep temporary custody of the items 3430a-3430d. While exemplary vehicle 3400 is shown in FIG. 34 with a single storage unit 3405, those skilled in the art will appreciate that other embodiments of vehicle 3400 may include multiple storage units (similar to that shown with exemplary vehicle 9300 in FIG. 20). In general, a storage device or unit, such as storage unit 3405 in logistics vehicle 3400, effectively helps to maintain one or more items in a temporary storage configuration (such as a confined area or in a secure capture configuration where the item is unable to be released from the receptacle). Such a configuration may help to assure safe transport or shipment, minimize damage to the item stored within the unit 3405, and provide a way to organize what is being stored within logistics vehicle 3400. Different embodiments of a storage unit may store a single item (such as items 3430a and 3430b stored in storage areas 3415a and 3415b, respectively), may store multiple items (such as items 3430c and 3430d collectively stored in storage area 3415c), or may store a wide variety of different types of items that may use different types of packaging materials (e.g., corrugated fiberboard boxes, wooden and non-wooden pallets, containers, etc.) and in larger numbers than shown in FIG. 34. Thus, those skilled in the art will appreciate that while the logistics receptacle implemented with storage unit 3405 and vehicle 3400 is a general embodiment, further embodiments may involve larger, more complex, logistics vehicles and storage units disposed within the vehicles to accommodate a desired variety of items depending on the intended use of the embodiment.

In the embodiment shown in FIG. 34, exemplary logistics vehicle 3400 includes a master node 3410 for storage area 3405 (such as exemplary master node 110a shown and described with respect to FIG. 4). In an embodiment where logistics vehicle 340 operates as the storage area 3405 itself, master node 3410 may be considered a vehicle master node (such as exemplary vehicle master node 9315 shown in FIG. 20). However, as shown in FIG. 34, master node 3410 is shown disposed in logistics vehicle 3400 and operative to communicate with server 100 over a longer-range communication interfaces (such as interface 485 on exemplary master node 110a) while also operative to communicate with other nodes, such as nodes 3420a-3420d respectively related to items 3430a-3430d within storage 3405. In one embodiment, for example, server 100 may provide shipping information related to one or more of items 3430a-3430d to master node 3410 on request or as a type of preloading of relevant shipping information into the memory of master node 3410. In another embodiment, one or more of nodes 3420a-3420d may communicate shipping information on their respective related item up to master node 3410. In this way, master node 3410 may operate with awareness of the different intended delivery locations for items 3430a-3430d maintained within storage 3405.

Master node 3410, as associated with storage unit 3405 and disposed within logistics vehicle 3400 (or as the vehicle master node for logistics vehicle 3400), may operate as part of a mobile node-enabled logistics receptacle that can communicate with other nodes, such as a delivery location node 3440 or a mobile user access device 3445 operating as a type of node in an exemplary wireless node network. In some embodiments described in more detail below, master node 3410 may receive signals broadcast by delivery location node 3440 (i.e., a node associated with an intended delivery location for an item) to help verify when it is appropriate to unlock or release a particular item from storage 3405. Such verification or validation may involve receiving such signals over a secure connection, and may involve a preauthorized type of validation that allows for automatic release upon detecting the signal from node 3440 or, in other instances, may involve a prompted interchange between node 3440 and master node 3410 as described in more detail below.

The intended delivery location for an item may be identified as part of shipping information. An exemplary intended delivery location may include coordinates of a location, an address for a location, or a location related to the recipient or an identified recipient node device. For example, an exemplary delivery location node 3440 may be a facility master node associated with a facility mail room that is at the intended delivery location coordinates or address for an item. In another example, an exemplary delivery location node 3440 may be a mobile master node associated with a courier (generally considered to be personnel involved in shipment activities related to an item), a shipping customer (generally an entity that causes the item to be shipped), or a recipient (generally an entity that is to receive the item as a type of hand off or change in temporary custody of the item as the item transits towards an ultimate delivery destination or the final change in custody of the item at the ultimate delivery destination). Thus, those skilled in the art will appreciate that delivery location node 3440 may be stationary/fixed and related a physical location, may be mobile and related to a movable location, and need not be the ultimate delivery destination for an item as the intended delivery location may essentially be considered in some embodiments as a way-point location.

Similar to delivery location node 3440, a mobile user access device 3445 may be operating as a node associated with the intended delivery location for an item in some embodiments where the location of mobile user access device 3445 may be identified as the intended delivery location for an item. Thus, signals from device 3445 may be used, as explained below in more detail, to help verify when it is appropriate to unlock or release a particular item from storage 3405. Embodiments may have mobile user access device 3445 associated with a customer shipping the item or a recipient for the item (whether temporary receipt or as the ultimate recipient of the item). As such, alerts and notifications may be provided to the shipping customer and recipient depending on whether they are associated with node 3440 and/or 3445.

And similar to that described above regarding node 3440, such verification or validation may involve receiving such signals over a secure connection, may involve a preauthorized type of validation that allows for automatic release upon detecting the signal from mobile user access device 3445 or, in other instances, may involve a prompted interchange between mobile user access device 3445 and master node 3410 as described in more detail below.

Figure 35A:
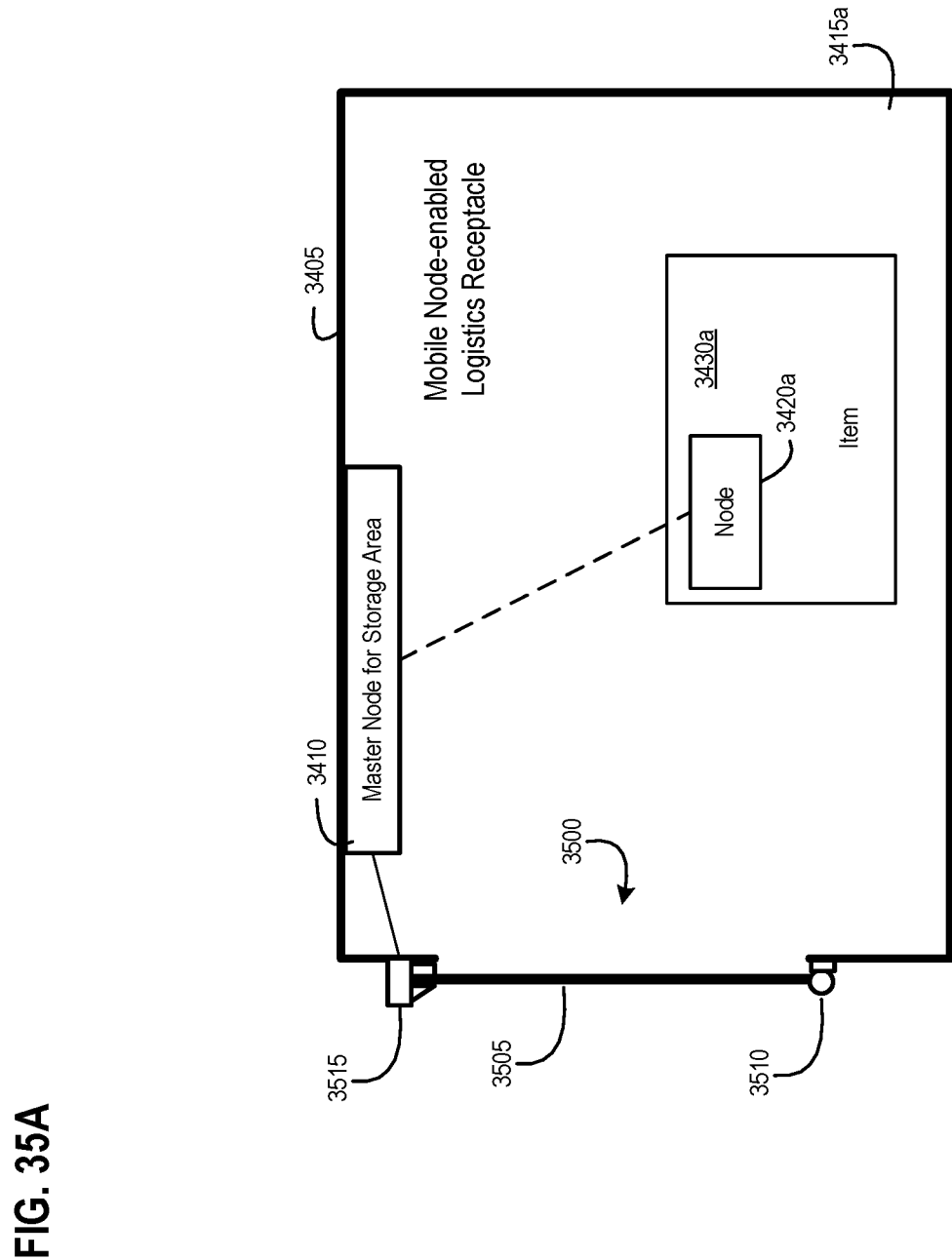
FIGS. 35A-35C are diagrams illustrating an exemplary mobile node-enabled logistics receptacle having a lockable opening in exemplary stages changing from a locked state to an open or unlocked state in order to selectively release an item maintained in a storage area of the receptacle in accordance with an embodiment of the invention.
Figure 35B:
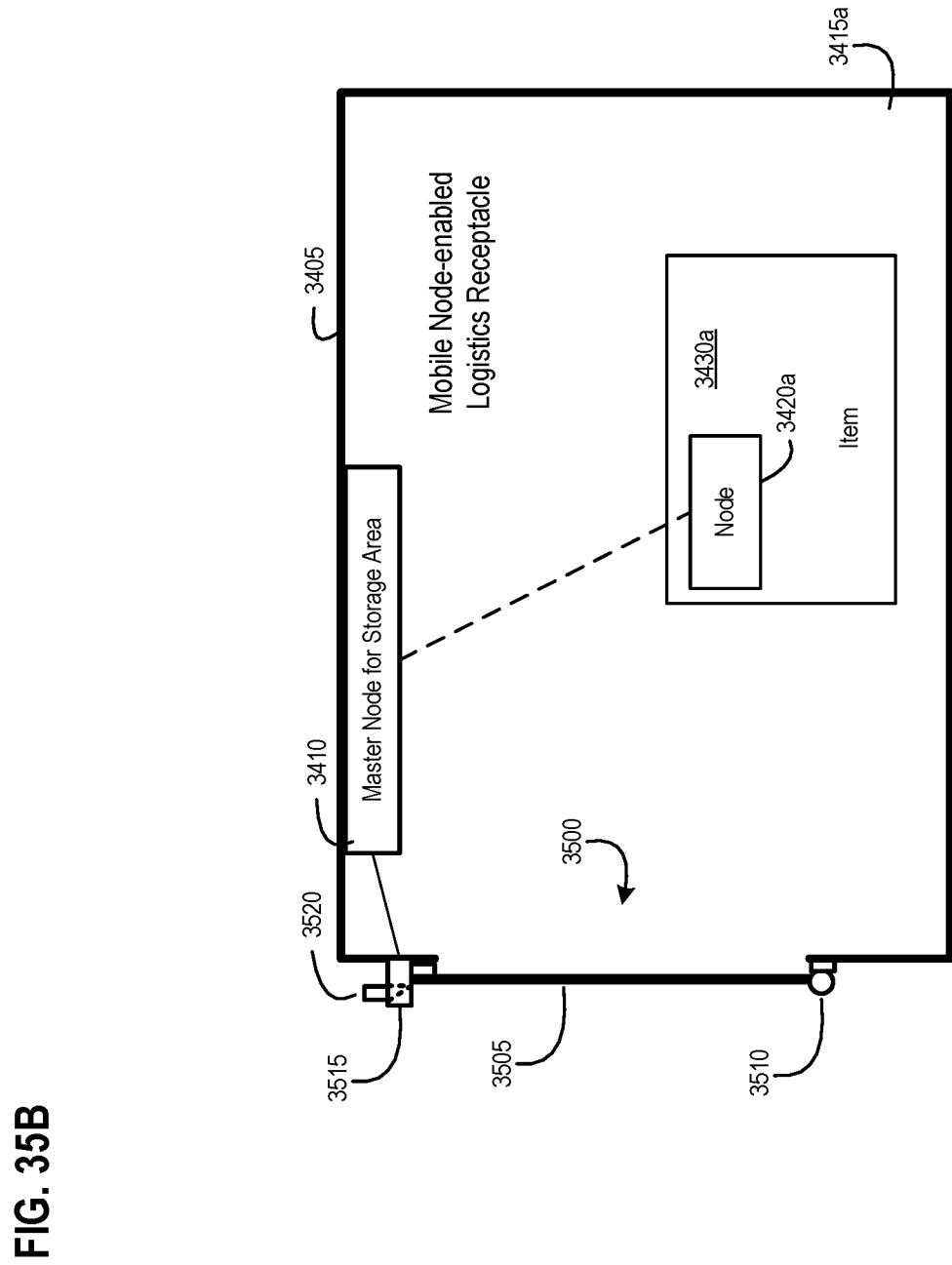
Figure 35C:
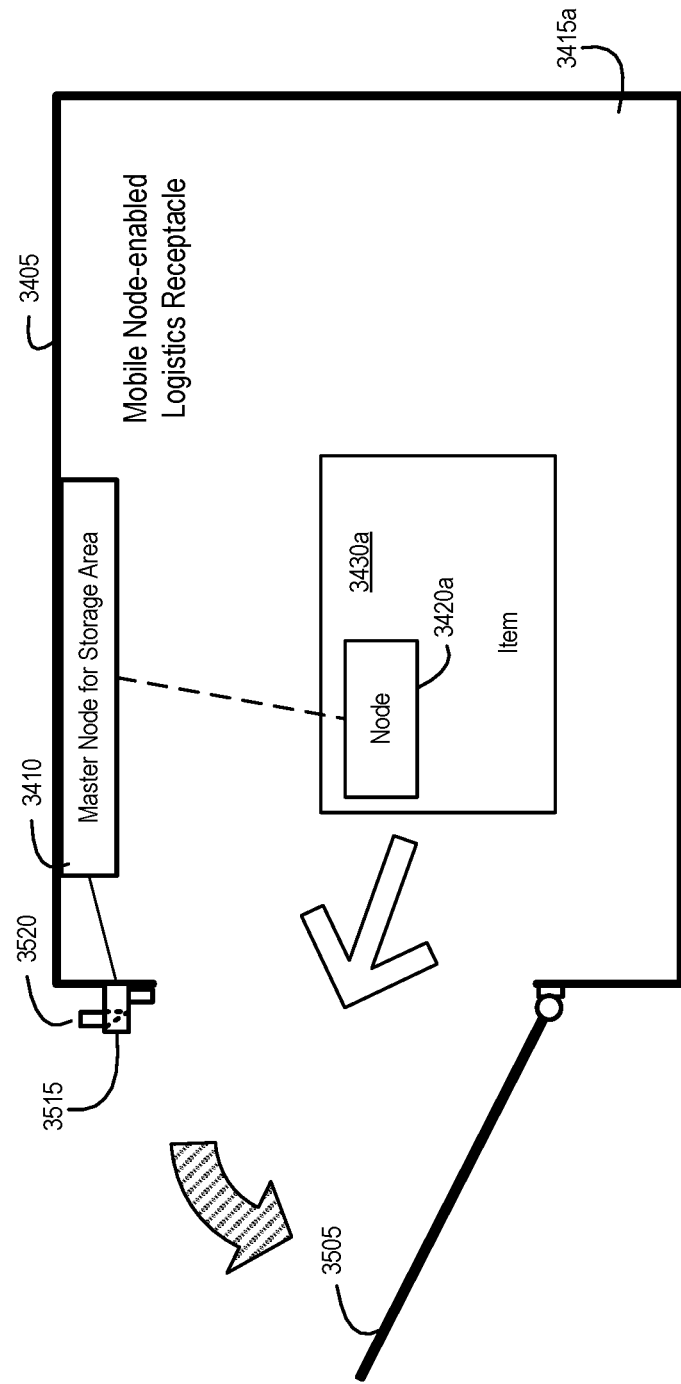

FIGS. 35A-35C are diagrams illustrating an exemplary mobile node-enabled logistics receptacle having a lockable element in exemplary stages changing from a locked state to an open or unlocked state in order to selectively release an item from the receptacle in accordance with an embodiment of the invention.

Referring now to FIG. 35A, an embodiment of storage unit 3405 is shown with master node 3410 as an exemplary mobile node-enabled logistics receptacle in a simplified manner as having a single storage area 3415a. Item 3430a (and related ID node 3420a) as shown been placed within storage area 3415a and maintained there. As such, ID node 3420a may be operative to communicate with master node 3410 to, for example, provide identification information related to item 3430a and/or node 3420a as well as shipping information related to item 3430a.

The exemplary embodiment of storage unit 3405 shown in FIG. 35A includes an exemplary lockable element 3505 that secures an entrance 3500 into storage space 3415a within unit 3405. In general, lockable element 3505 is a release mechanism under electronic locking control, and may include, for example, a door secured by a lock but may include one or more electronically controlled grips or clasps that maintain the item in a secure configuration relative to the receptacle. In the embodiment shown in FIG. 35A, lockable element 3505 may generally be a lockable door, hatch, flap, or other barrier that can be secured in a position to provide either access through entrance 3500 or to prevent access through entrance 3500 to what is maintained within storage space 3415a. As shown in the embodiment illustrated in FIG. 35A, lockable opening 350 is a barrier door with a hinge 3510 pivotally coupling the opening 3505 to the storage unit 3405. In FIG. 35A, lockable element 3505 is shown in a closed or locked state where the side of lockable element 3505 opposing hinge 3510 is secured in place with an electronically actuated locking element 3515.

As shown in FIG. 35B, the electronically actuated locking element 3515 is operatively coupled to master node 3410 and may be operated with signals from master node 3410 to control access to the mobile node-enabled logistics receptacle's storage area 3415a (such as shown being disposed within vehicle 3400 in FIG. 34). As such, electronically actuated locking element 3515 is generally a type of actuator coupled to the master node 3410 and the lockable element 3505. As such, exemplary actuated locking element 3515 may receive a release signal from master node 3410 to actuate element 3515 and change the state of the lockable element 3505 from a closed or locked state to an open or accessible state. More specifically, upon receiving the release signal from master node 3410, electronically actuated locking element 3515 caused pin element 3520 to move to a different position, thus no longer obstructing and preventing lockable element 3505 from swinging open. Thus, as actuated to a non-obstructing position as shown in FIG. 35B, lockable element 3505 is now in the open or accessible state and opening 3505 may be swung open as shown in FIG. 35C to allow for selective release of item 3430a from within storage area 3415a and provide delivery access to item 3430a. The particular condition upon which an embodiment of master node 3410 may provide the release signal is discussed in more detail with respect to FIG. 36 below.

In general, releasing an item from the receptacle in an embodiment selectively allows the item to be transferred from the receptacle. As shown and explained above with respect to FIGS. 35A and 35B, selective release of the item from the receptacle may involve selectively and electronically unlocking a lockable element 3500 (via an actuated locking element) that otherwise obstructs an entrance 3500 to where the item is temporarily maintained. In another embodiment, selectively releasing an item from the receptacle may involve a different type of securing mechanism. For example, releasing an item from the receptacle may involve causing the item to slide out from or drop from the receptacle, causing the item to separate from the receptacle, or causing the item to be deposited from the receptacle at a location. In other words, while selective release of an item from the receptacle in one embodiment may involve simply unlocking element 3505 (e.g., unlocking a door to a particular storage area of a mobile node-enabled receptacle) as shown in FIGS. 35A-35B, other embodiments may selective release the item from the receptacle by having lockable element 3505 implemented with doors that drop open below allowing the item to vertically transfer or move from the receptacle with or without human intervention. Causing the item to slide, drop, separate, or otherwise be deposited out of the receptacle may involve releasing the appropriate securing structure deployed as types of lockable elements (also referred to as electronically controlled securing apparatus elements), such as one or more articulating grips holding the item in place, one or more doors supporting the item in place, one or more belts or straps securing the item in place, and the like. Further, additional articulating members at the control of master node 3410 may be considered exemplary types of lockable elements deposed within the receptacle to facilitate the transfer (such as a tilting support surface to enable sliding out of the item from within the receptacle, or a robotic arm operative to capture the item and transfer the item out of the receptacle from its position within the receptacle). Thus, for example, an embodiment may selectively release an item from an exemplary mobile node-enabled logistics receptacle by autonomously dropping the item from a secure capture configuration with respect to the mobile node-enabled receptacle (e.g., secured in a storage position beneath an autonomous delivery vehicle that includes a mobile master node operating as the node core of the mobile node-enabled logistics receptacle) for an automatic deposit of the item at a particular address or desired location.

Figure 36:
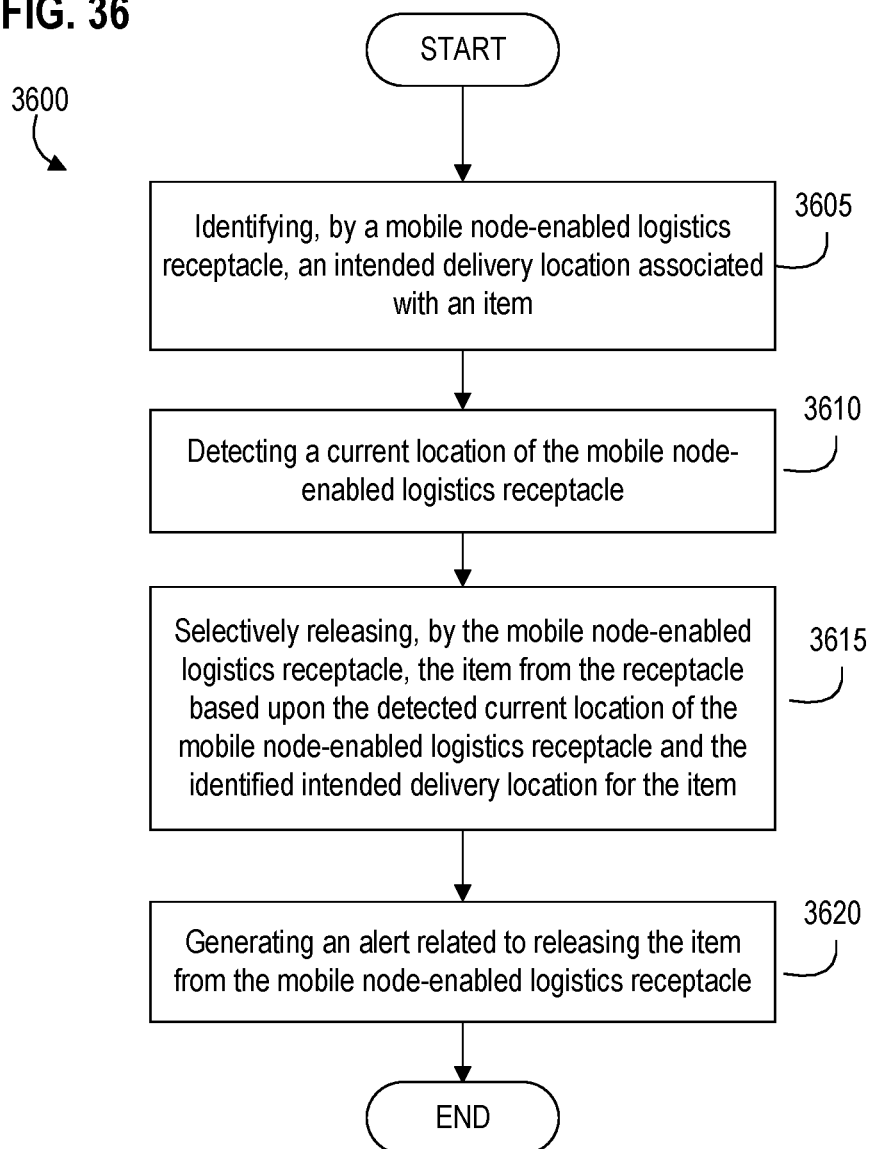
FIG. 36 is a flow diagram illustrating an exemplary method for enhanced delivery management of an item using a mobile node-enabled logistics receptacle in accordance with an embodiment of the invention.

FIG. 36 is a flow diagram illustrating an exemplary method for enhanced delivery management of an item using a mobile node-enabled logistics receptacle in accordance with an embodiment of the invention. Referring now to FIG. 36, method 3600 begins at step 3605 with the mobile node-enabled logistics receptacle (such as storage 3405 and master node 3410) identifying an intended delivery location associated with the item. The intended delivery location associated with the item may come from shipping information for the item that may have been preloaded into the mobile node-enabled logistics receptacle's memory. If not, an embodiment of method 3600 may have the mobile node-enabled logistics receptacle detect a signal broadcast from a node associated with the item, access the item's related shipping information from within the detected signal, and identify the intended delivery location from the shipping information in the detected signal. Such shipping information may be part of, for example, header or other information broadcast as an advertising signal (generally including message content) from node 3420a. In another embodiment, master node 3410 of the mobile node-enabled logistics receptacle may receive the item's related shipping information (including the intended delivery location) from server 100 in response to a request from master node 3410.

Furthermore, in the embodiments described herein, the intended delivery location for an item (and in some embodiments the rest of the shipping information, such as intended delivery time parameters) may share in a secure manner. For example, the shipping information or relevant parts of the shipping information may be encrypted to help protect the integrity and security of such information. Those skilled in the art will recognize various ways to securely encrypt information by a source and to securely decrypt the information by a recipient of the information in a manner that may involve secure identifiers, keys, key pairs, or establishing an active secure communication link between the source and recipient. Sharing of such encrypted information may provide a type of encrypted exchange of the shipping information.

In another example, a secure connection may be established between a source of the shipping information (e.g., a server or an ID node associated with an item) and a recipient for the shipping information. As such, the secure connection may provide that any information exchanged between the source and recipient is an encrypted exchange of information that helps avoid sharing potentially sensitive information with other wireless devices and may help avoid nefarious devices from spoofing what may otherwise appear to the recipient as authentic shipping information.

Thus, the intended delivery location for an item (and in some embodiments the rest of the shipping information, such as intended delivery time parameters) may be received by a node processing unit via an encrypted/secure exchange relative to the detected signal from the source of the shipping information as described herein.

As mentioned, a further embodiment may have the intended delivery location for the item as a recipient location, such as an address for the recipient identified in the shipping information or, for example, a location of a mobile user access device operative to function as a type of node and where the mobile user access device is associated with a recipient for the item as indicated by the shipping information. And as noted above, an embodiment may have the intended delivery location being a type of way-point for a transition of ownership or temporary custody of the item, or an ultimate delivery location for the item. For example, the intended delivery location for purposes of the embodiment may be a facility location (e.g., an address of a mail room) where the item may transfer custody from a courier to a storage receptacle or room at the facility so that other personnel may complete delivery of the item to the ultimate delivery destination (e.g., a specific office within the facility). Another example may have the intended delivery location being a mobile location, such as the location of a courier's delivery van or the location of a courier's mobile master node.

At step 3610, method 3600 continues with detecting a current location of the mobile node-enabled logistics receptacle. In the embodiment illustrated in FIG. 34, master node 3410, as part of a mobile node-enabled logistics receptacle that includes storage unit 3405, may detect its own current location using location circuitry onboard the master node 3410 (such as GPS circuitry 475 as shown in FIG. 4 on exemplary master node 110a). And while those skilled the art will appreciate this option of self-locating by the master node 3410, an alternative embodiment may detect a current location of the mobile node-enabled logistics receptacle by any of the location determination techniques described herein that may involve communicating with other surrounding nodes, varying power levels, triangulating, and the like.

At step 3615, method 3600 proceeds by having the mobile node-enabled logistics receptacle selectively release the item from the mobile node-enabled logistics receptacle based upon the detected current location of the mobile node-enabled logistics receptacle and the identified intended delivery location. In more detail, an embodiment may have the mobile node-enabled logistics receptacle compare the detected current location of the mobile node-enabled logistics receptacle to the identified intended delivery location. Based upon this comparison, the mobile node-enabled logistics receptacle may release the item from a storage area within the mobile node-enabled logistics receptacle. More specifically, the mobile node-enabled logistics receptacle may release the item from the storage area when the comparison of the detected current location of the mobile node-enabled logistics receptacle to the identified intended delivery location indicates the detected current location of the mobile node-enabled logistics receptacle is within a threshold proximity area associated with the intended delivery location. For example, an exemplary threshold proximity area may include a defined delivery area where a courier may drive or have a logistics vehicle somewhere within that defined delivery area to drop off an item. Such a defined deliver area may be a block area near a destination address where the current location of the logistics vehicle is within that block area, which allows for selective release of the item on that condition.

In another embodiment, step 3615 of method may involve a validation to occur as the condition for selective release of the item. In particular, the step may have the mobile node-enabled logistics receptacle selectively release the item by establishing a validation connection with a node associated with the intended delivery location (e.g., delivery location node 3440) to authorize releasing the item, and then releasing the item based upon the detected current location of the mobile node-enabled logistics receptacle and the location of the mobile user access device and after establishing the validation connection. Such a validation connection may involve establishing a secure validation connection between the mobile node-enabled logistics receptacle and the mobile user access device in order to enhance security when authorizing release of the item. In more detail, the validation connection may be implemented via a prompted connection with the node associated with the intended delivery location that may allow for a prompted validation request and receiving a validation confirmation response from the node associated with the intended delivery location. In another embodiment, the validation connection may be implemented to involve a preauthorized connection between the mobile node-enabled logistics receptacle and the node associated with the intended delivery location that essentially has receipt of a signal (such as an advertising signal) from the delivery location node acting as the validation confirmation response without the need to have interactive prompts to request and then receive messages back and forth with the mobile node-enabled logistics receptacle and the delivery location node. In this way, establishing a validation connection (such as a secure validation connection) may provide a type of helpful, timely, and efficient confirmation that the item should be released.

In still a further embodiment, the selectively releasing step 3615 may be implemented with the mobile node-enabled logistics receptacle determining a proximity distance between the detected current location of the mobile node-enabled logistics receptacle and the identified intended delivery location. Based on the determined proximity distance, the mobile node-enabled logistics receptacle may selectively actuate a lockable opening to a storage area on the mobile node-enabled logistics receptacle to release the item. For example, armed with its own self-locating circuitry and the shipping information having the identified intended delivery location, master node 3410 may determine that the current location of the master node 3410 (as its associated storage unit 3405) may be close enough in distance to the identified intended delivery location to actuate electronically actuated locking element 3515. In other words, the mobile node-enabled logistics receptacle may automatically unlock the lockable opening to a storage area on the mobile node-enabled logistics receptacle to release the item when the determined proximity distance is less than a threshold proximity distance.

In a more detailed embodiment where the storage in the mobile node-enabled logistics receptacle includes multiple storage areas (such as that shown in FIG. 34), automatically unlocking to release the item may first involve identifying a portion of the storage area that maintains the item. This may be accomplished based on shipping information known the mobile node-enabled logistics receptacle for items stored within different storage areas of the receptacle. After identifying the portion of the storage area that maintains the item, the mobile node-enabled logistics receptacle may then automatically, unlock an access opening to the identified portion of the storage area (but not other portions of the storage area) to provide enhanced and selective delivery access to the appropriate item when the determined proximity distance is less than the threshold proximity distance. In other words, the remaining part of the storage area not identified as maintaining the item may remain in a locked state.

In yet another embodiment, method 3600 may have the mobile node-enabled logistics receptacle receiving a delivery location signal broadcast from a node associated with the intended delivery location (such as a signal broadcast from delivery location node 3440 in the embodiment illustrated in FIG. 34). As such, step 3615 of method 3600 may have the mobile node-enabled logistics receptacle automatically unlocking an opening to a storage area maintaining the item upon or at least after receiving the delivery location signal. In more detail, automatically unlocking the opening may, when dealing with storage in the mobile node-enabled logistics receptacle that includes multiple storage areas, identifying a portion of the storage area that maintains the item. After identifying the portion, the mobile node-enabled logistics receptacle may then automatically, after receiving the delivery location signal, unlock an access opening to the identified portion of the storage area to provide delivery access to the item and may maintaining a locked state for the remaining portions of the storage area.

In a further embodiment where the intended delivery location is a location of a mobile user access device operative to function as a master node and associated with a recipient for the item (e.g., as indicated by the shipping information for the item), step 3615 of method 3600 may have the mobile node-enabled logistics receptacle establishing a validation connection (such as a secure validation connection that may involve encrypted and secure communications) with the mobile user access device to authorize releasing the item. Accordingly, the mobile node-enabled logistics receptacle may release the item from within the mobile node-enabled logistics receptacle based upon the detected current location of the mobile node-enabled logistics receptacle and the location of the mobile user access device but only after after successfully establishing the validation connection as a further confirmation that the item should be released. In more detail and similar to that described above, the mobile node-enabled logistics receptacle may establish the validation connection by establishing an active prompted connection between the mobile node-enabled logistics receptacle and the mobile user access device. Through the active prompted connection, the mobile node-enabled logistics receptacle may receive a prompted authorization release acknowledgement (e.g., an electronic signature release) from the mobile user access device in order to authorize releasing the item.

Rather than an active prompted connection, the mobile node-enabled logistics receptacle may establish the validation connection in another embodiment by establishing a preauthorized connection between the mobile node-enabled logistics receptacle and the mobile user access device to automatically authorize releasing the item. The preauthorized connection, for example, may be based upon a previously authorized release validation condition that occurs automatically when the mobile node-enabled logistics receptacle detects a signal broadcast as an advertising signal from the mobile user access device related to the recipient of the item. For example, as shown in FIG. 34, an exemplary previously authorized release validation condition may be part of shipping information related to item 3430a and maintained in memory of master node 3410. Such an exemplary previously authorized release validation condition may indicate that detecting an advertising signal broadcast from mobile user access device 3445 suffices as a validation condition. Accordingly, when master node 3410 detects an advertising signal from mobile user access device 3445, the validation connection may be automatically established without prompts between the master node 3410 and the mobile user access device 3445.

At step 3620, method 3600 may proceed with generating an alert related to releasing the item from the mobile node-enabled logistics receptacle. In some embodiments, the alert may be generated as information shown on a user interface of the mobile node-enabled logistics receptacle. For example, the alert may be generated as information shown on a display as part of master node 3410, where the information alerts personnel regarding the released item and may provide location information for the released item to aid in accessing the released item. In another embodiment, the alert may be generated as a transmitted communication to another node device, such as server 100, delivery location node 3440, and/or mobile user access device 3445.

Those skilled in the art will appreciate that method 3600 as disclosed and explained above in various embodiments may be implemented using an exemplary logistics receptacle having a mobile node at its core (such as exemplary master node 110a as illustrated in FIG. 4 and master node 3410 as illustrated in FIGS. 34 and 35A-35C) running one or more parts of a control and management code (such as a delivery release control code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 3600 and variations of that method.

A more detailed embodiment of an exemplary mobile node-enabled logistics receptacle apparatus having enhanced delivery release control related to an item generally comprises a logistics receptacle (such as storage unit 3405) and a node coupled to the logistics receptacle (such as master node 3410). The logistics receptacle includes at least a storage (such as storage 3415a) for maintaining the item, and a lockable opening (such as lockable element 3505) through which the item and a node associated with the item can pass into the storage area.

The node coupled to the logistics receptacle has a node processing unit as well as a node memory storage, location circuitry, an actuator, and a communication interface. The node memory storage, location circuitry, actuator, and communication interface are each coupled to the node processing unit. The node memory storage maintains delivery release control code for execution by the node processing unit and may maintain shipping information related to the item. The location circuitry (such as GPS circuitry) is operative to detect a location of the mobile node-enabled logistics receptacle apparatus.

The actuator is coupled to the lockable opening and controlled by the node processing unit to control access to the storage area by controlling a state of the lockable opening. The actuator, in one embodiment, may be integrated as part of the node. However, in other embodiments, the actuator may still be considered part of the node yet be implemented with a separate physical device outside of a housing for the node and driven by interfacing circuitry disposed within the housing for the node. For example, electronically actuated locking element 3515 is a type of actuator that may be deployed and considered as part of the node yet is a physically separate device attached to storage unit 3405.

The node's communication interface is operative to access a wireless communication path. As noted with respect to FIG. 4, an exemplary communication interface may embody a short-range communication interface (such as interface 480) or a medium/long range communication interface (such as interface 485) or a wireless communication interface capable of handling multiple data communication paths with separate formats (such as one that collectively incorporates both interface 480 and interface 485).

The node processing unit of the mobile node-enabled logistics receptacle apparatus, when executing the delivery release control code maintained on the node memory storage, is operative to at least identify an intended delivery location associated with the item from the shipping information stored in the memory; cause the location circuitry to detect a current location of the mobile node-enabled logistics receptacle apparatus; and selectively cause the actuator to change the state of the lockable opening to an open state to provide delivery access to the item within the storage area based upon the detected current location of the mobile node-enabled logistics receptacle apparatus and the identified intended delivery location.

In a further apparatus embodiment, the communication interface may detect a signal from the node associated with the item. In this situation, the node processing unit may then be further operative to identify the intended delivery location by receiving at least a portion of the detected signal from the communication interface; accessing shipping information within the portion of the detected signal, where the shipping information is related to the item; and identify the intended delivery location from the shipping information. As noted above, the intended delivery location for an item (and in some embodiments the rest of the shipping information) may be encrypted or otherwise provided via a secure connection to help protect the integrity and security of such information.

In another embodiment of the apparatus, the node processing unit may selectively cause the actuator to change to the open state by comparing the detected current location of the mobile node-enabled logistics receptacle apparatus to the identified intended delivery location. Based upon this comparison, the node processing unit may selectively cause the actuator to change the state of the lockable opening to the open state, such as when the comparison indicates the detected current location is within a threshold proximity area associated with the intended delivery location (e.g., a defined delivery area that would include the intended delivery location).

In a further apparatus embodiment, the node processing unit may be operative to establish a validation connection, using the communication interface, with a node associated with the intended delivery location to authorize releasing the item. Such a validation connection may involve establishing a secure validation connection between the node processing unit and the node associated with the intended delivery location in order to enhance security when authorizing release of the item. As such, the node processing unit may then cause the actuator to change the state of the lockable opening to the open state based upon the detected current location of the mobile node-enabled logistics receptacle and the location of the mobile user access device and after successfully establishing the validation connection. Such a validation connection may be, for example, a prompted connection with the node associated with the intended delivery location or a preauthorized connection between the mobile node-enabled logistics receptacle and the node associated with the intended delivery location.

Further still, an embodiment of the mobile node-enabled logistics receptacle apparatus may have the node processing unit being operative to cause the actuator to unlock the lockable opening based upon a proximity distance between the detected current location of the mobile node-enabled logistics receptacle apparatus and the identified intended delivery location. For example, the node processing unit may cause the actuator to automatically unlock the lockable opening to the storage area when the determined proximity distance is less than a threshold proximity distance (such as when the location of the mobile node-enabled logistics receptacle is within 100 yards of an intended delivery location for an item).

In another embodiment, the node processing unit may receive a delivery location signal from the communication interface, where the delivery location signal is being broadcast from a node associated with the intended delivery location. In such a situation, the node processing unit may cause the actuator to automatically unlock the lockable opening after receiving the delivery location signal. As such, receipt of the delivery location signal may indicate that the mobile node-enabled logistics receptacle apparatus sufficiently near the intended delivery location. Such a node associated with the intended delivery location may be a mobile node associated with the intended delivery location (such as mobile user access node 3445 when it shipping information for the item identified the location of node 3445 as the intended delivery location) or a fixed node associated with the intended delivery location (such as a facility centric fixed delivery location node (e.g., node 3440)).

Embodiments of the mobile node-enabled logistics receptacle apparatus may also generate and provide an alert when selectively releasing the item. In more detail, an embodiment may have the node processing unit generating an alert related to release of the item from the mobile node-enabled logistics receptacle. For example, the node processing unit may cause the communication interface to transmit the alert to a node associated with the intended delivery location. In another example, the node processing unit may display the generated alert on a user interface coupled to the node processing unit of the mobile node-enabled logistics receptacle apparatus. In a further example, the user interface may implement a speaker and the node processing unit may generate the alert by playing an auditory alert with the speaker.

As noted above, the intended delivery location may comprise a recipient related location, such as a location of a mobile user access device identified in the shipping information and associated with a recipient for the item (e.g., mobile user access device 3445 show in the embodiment illustrated in FIG. 34). In such an embodiment, the node processing unit may establish a validation connection (such as a secure validation connection using the communication interface for an encrypted exchange of information) with mobile user access device to authorize releasing the item and cause the actuator to change the state of the lockable opening to the open state based upon the detected current location of the mobile node-enabled logistics receptacle and the location of the mobile user access device and after successfully establishing the validation connection. In more detail, the validation connection may be established with an active prompted connection between the mobile node-enabled logistics receptacle apparatus (e.g., the node part of the apparatus) and the mobile user access device over the wireless communication path to receive a prompted authorization release acknowledgement from the mobile user access device in order to authorize releasing the item. In another example, the validation connection may have the node processing unit establishing a preauthorized connection between the mobile node-enabled logistics receptacle apparatus and the mobile user access device over the wireless communication path to automatically authorize releasing the item without the need for interactive prompts. Such a preauthorized connection may allow the node processing unit to automatically cause the actuator to release the item based upon a previously authorized release validation condition that occurs automatically when the mobile node-enabled logistics receptacle detects a signal broadcast as an advertising signal from the mobile user access device related to the recipient of the item.

The above description of an exemplary mobile node-enabled logistics receptacle apparatus may be extended to a system embodiment where the logistics receptacle may be implemented with a logistics vehicle. In more detail, an exemplary node-enabled logistics vehicular system having enhanced delivery release control related to an item comprises a logistics vehicle and a master node disposed on the logistics vehicle. The logistics vehicle (such as vehicle 3400 shown and explained with reference to FIG. 34) includes a first storage area for maintaining the item and a first lockable opening through which the item and a node related to the item can pass into the storage area. Such a lockable opening acts a barrier or obstruction that helps prevent unintentionally removing an item from the storage area.

In this exemplary system embodiment, the master node disposed on the logistics vehicle comprises a node processing unit, a node memory storage, location circuitry, a first actuator, a first communication interface, and a second communication interface. The node processing unit is operatively coupled to each of the node memory storage, location circuitry, first actuator, first communication interface, and second communication interface. In more detail, the node memory storage maintains an embodiment of delivery release control code for execution by the node processing unit and may also include shipping information related to the item (e.g., shipping information that has been preloaded or actively provided to the master node by a server or provided by the node related to the item). The location circuitry on the master node (such as GPS circuitry and antenna 475 on exemplary master node 110a) is operative to detect a location of the logistics vehicle given the logistics vehicle and the mobile nature of the logistics vehicle. The first actuator (similar to the actuator discussed above relative to the mobile node-enabled logistics receptacle apparatus) is coupled to the node processing unit and the first lockable opening, and controls access to the first storage area by controlling a state of the first lockable opening.

The master node further includes the first communication interface that can communicate with at least the node related to the item over a first wireless communication path and the second communication interface that can communicate with a server over a second wireless communication path. As discussed, the first communication interface may be a short range interface, such as a Bluetooth® Low Energy type of radio interface, while the second communication interface may be a longer range interface, such as a Wi-Fi or cellular wireless radio interface.

As part of this exemplary system embodiment, the node processing unit of the master node, when executing the delivery release control code maintained on the node memory storage, becomes specially adapted and operative to at least identify an intended delivery location associated with the item from the shipping information stored in the memory; cause the location circuitry to detect a current location of the logistics vehicle; and selectively cause the first actuator to change the state of the first lockable opening to an open state to provide delivery access to the item within the first storage area based upon the detected current location of the logistics vehicle and the identified intended delivery location.

In some further system embodiments, the first communication interface may be able to detect a signal broadcast from the node related to the item. As a result, the node processing unit may operate to identify the intended delivery location by identifying the intended delivery location based upon a portion of the detected signal, where the portion of the detected signal includes broadcast data indicating the shipping information for the item. As noted above, the intended delivery location for an item (and in some embodiments the rest of the shipping information) may be encrypted or otherwise provided in an encrypted exchange of the shipping information via a secure connection to help protect the integrity and security of such information.

In a more detailed system embodiment, the node processing unit may selectively cause the first actuator to change to the open state when the detected current location of the logistics vehicle is within a proximity service area associated with the intended delivery location. In another system embodiment, the node processing unit may selectively cause the first actuator to change the state of the first lockable opening to the open state by being further operative to cause the first actuator to unlock the first lockable opening when a proximity distance between the detected current location of the logistics vehicle and the identified intended delivery location is less than a threshold proximity distance.

In still another system embodiment, the node processing unit may receive a delivery location signal from the first communication interface or from the second communication interface. The delivery location signal is broadcast from a node associated with the intended delivery location and the format and communication path used by the broadcasting node will dictate which of the communication interfaces may detect the delivery location signal and provide it to the node processing unit (or notify the node processing unit about detecting the delivery location signal). Upon or after receiving the delivery location signal, the node processing unit may then cause the first actuator to automatically unlock the first lockable opening. Thus, receipt of the delivery location signal in this embodiment operates as a condition for appropriately releasing the item from the vehicle's storage area. The broadcasting node may, for example, be a mobile node associated with the intended delivery location or a fixed node associated with the intended delivery location.

In a further system embodiment, the node processing unit may be operative to cause the second communication interface to transmit an alert to a node associated with the intended delivery location (such as delivery location node 3440 or mobile user access device 3445 operating as a node). Such an alert relates to the delivery access to the item based upon the open state of the first lockable opening.

In yet another system embodiment, the logistics vehicle may have multiple storage areas. More specifically, an embodiment of the logistics vehicle may further comprises a second storage area and a second lockable opening through which to access the second storage area (such as that shown in FIG. 34 with multiple storage areas 3415a-3415c). In such an embodiment, the master node in the system may further comprise a second actuator operatively coupled to the second lockable opening and controlled by the node processing unit, so that the second actuator controls access to the second storage area by controlling a state of the second lockable opening. With these additional elements, the node processing unit of the master node may then be further operative to selectively cause the first actuator to change the state of the first lockable opening to the open state to provide delivery access to the item within the first storage area based upon the detected current location of the logistics vehicle and the identified intended delivery location while causing the second actuator to maintain the state of the second lockable opening in a closed state to prevent access to what is stored within the second storage area.

Enhanced Delivery Notifications

As mentioned above, elements of an exemplary wireless node network may be deployed in improved logistics applications where elements may sense an adverse delivery condition in a proactive and more timely manner that involves relevant and enhanced corrective delivery or pickup notifications to address the sensed condition (e.g., when an item has been dropped off or picked up without meeting certain delivery parameters, such as delivery to or pickup from the intended destination, pickup by incorrect logistics personnel, or delivery/pickup during an intended time period, or a combination of such conditions). The use of enhanced delivery notifications may involve a mobile master node involved in the pickup or delivery of an item (such as courier's mobile master node) and may involve a master node at a particular location (such as a mailroom facility master node or a mobile user access device operating as a type of master node (e.g., a smartphone associated with a shipping customer having an item picked up from the particular location or a smartphone associated with a recipient of the item that is waiting for the item to be dropped off at the particular location)). Both perspectives of how enhanced delivery related notifications may be generated and used with these types of master nodes are described in more detail below with respect to the diagrams of such nodes shown in FIGS. 37A-37C and in the flow diagrams that provide further detail in FIGS. 38-42.

Figure 37A:
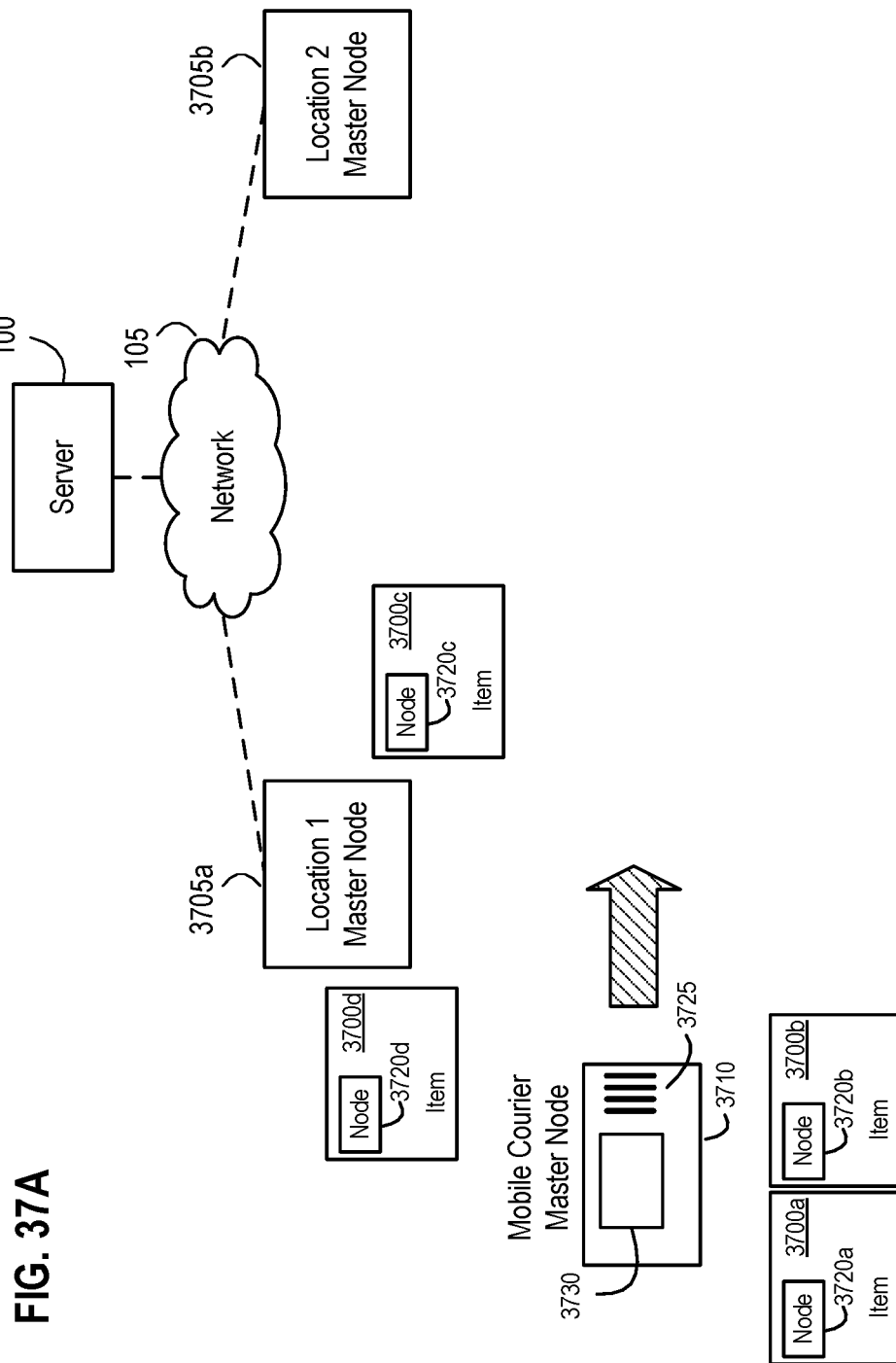
FIGS. 37A-37C are diagrams illustrating an exemplary mobile courier master node moving between locations with items for pickup or delivery in accordance with various embodiments of the invention.
Figure 37B:
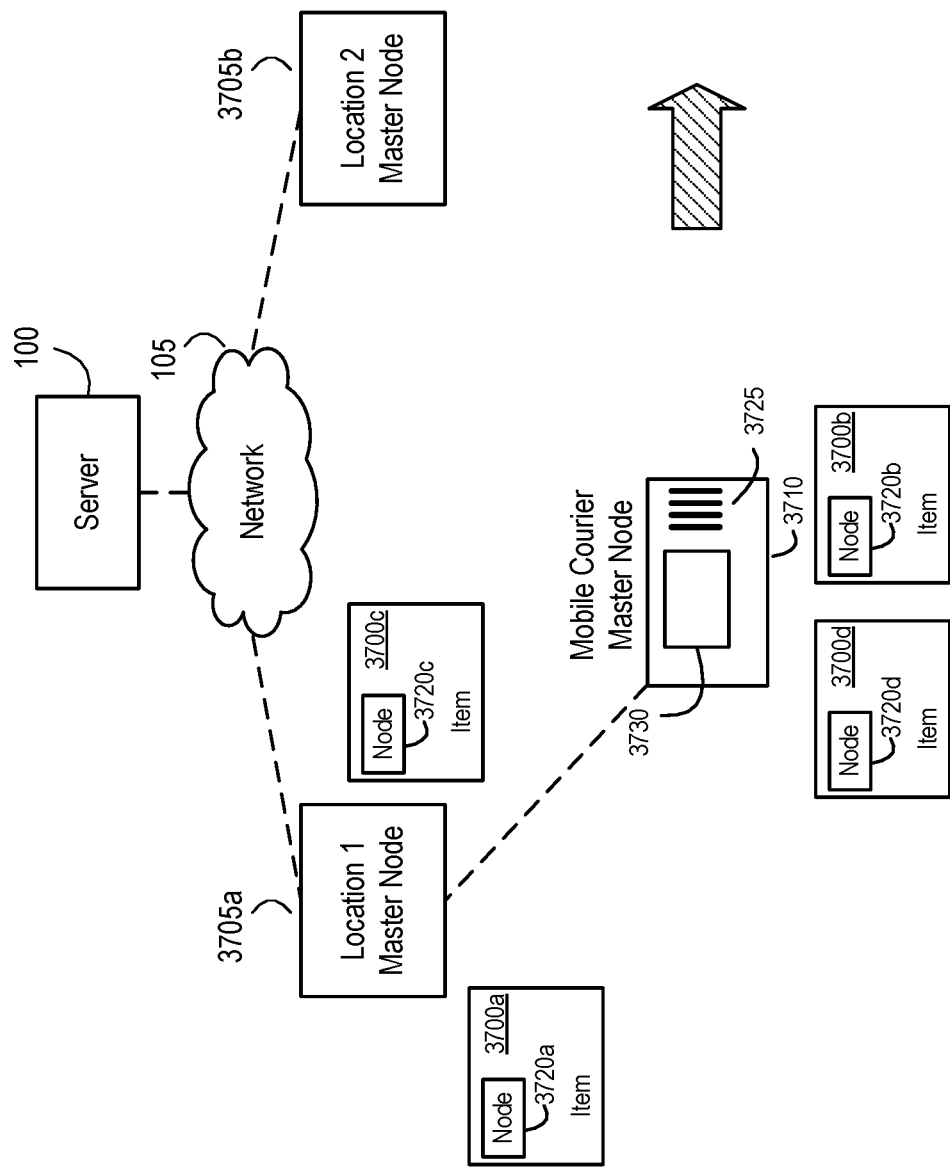
Figure 37C:
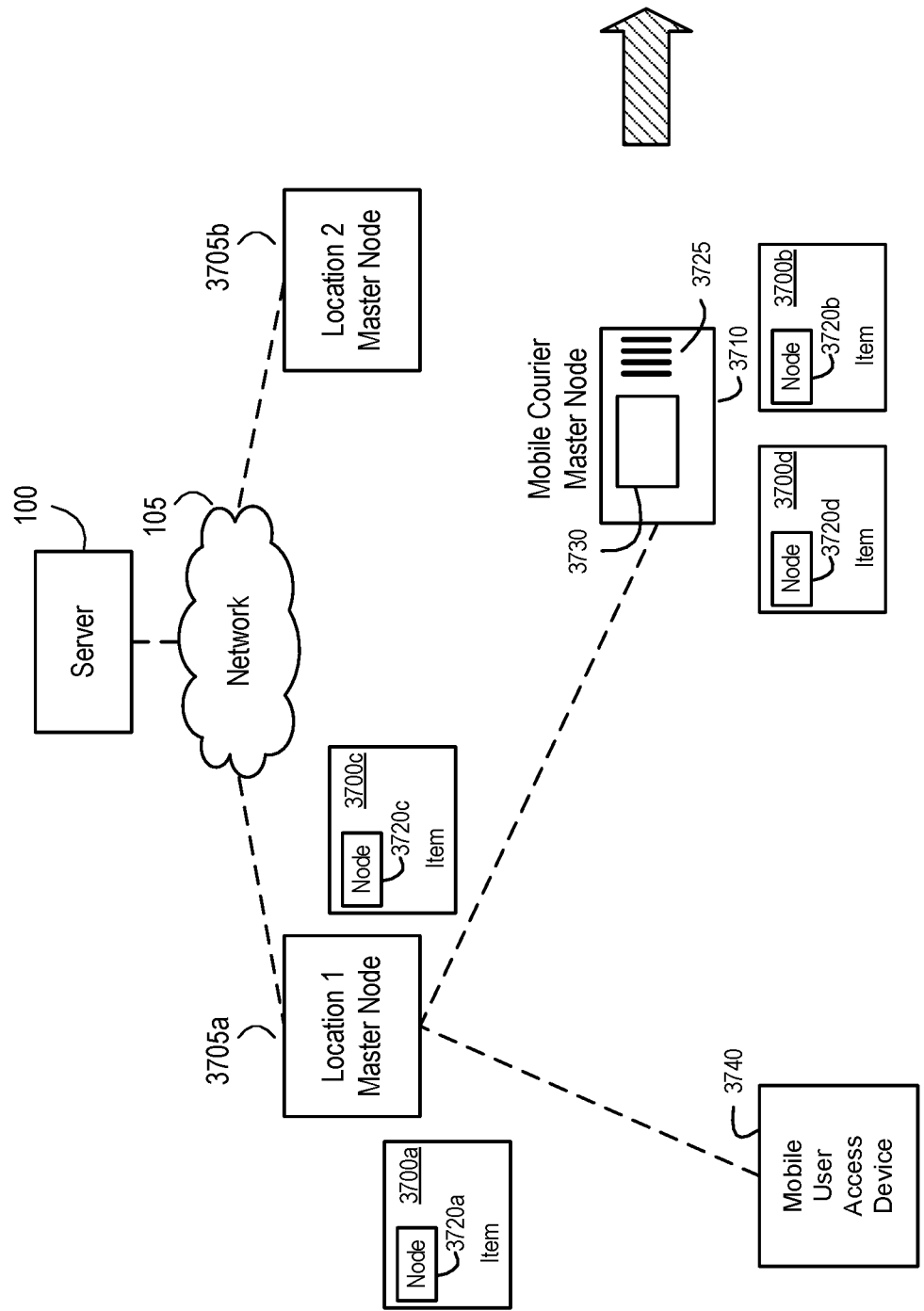

FIGS. 37A-37C are diagrams illustrating an exemplary mobile courier master node moving between locations with items for delivery or pickup in accordance with embodiments of the invention. Referring now to FIG. 37A, server 100 is shown connected to network 105 (similar to that shown in FIG. 1). In more detail, server 100 is coupled through network 105 to various master nodes disposed at different physical locations. Master node 3705a is at location 1 and master node 3705b is at location 2. For example, location 1 may be an office mailroom location and master node 3705a may be a facility type of master node associated with the office mailroom or a mobile user access device operating as a master node and associated with a shipping customer for an item to be shipped from location 1 or a recipient for an item to be delivered to location 1. Location 2 may be a residential location and master node 3705b may be a mobile user access device operating as a type of mobile master node associated with a recipient living at the residential location.

In the contextual environment of these two different locations, the embodiment shown in FIG. 37A also includes a mobile courier master node 3710 involved in delivering items 3700a and 3700b and picking up item 3700c. Consistent with exemplary master node 110a shown and described in FIG. 4, mobile courier master node 3710 is shown including a user interface having a speaker 3725 and a display 3730 (such as an electronic ink display or ruggedized touchscreen display). As will be explained in more detail below, such a user interface may present exemplary corrective delivery notifications generated by the mobile master node 3710 and/or master nodes at particular physical locations (such as master node 3705a and 3705b).

While items 3700c and 3700d are initially located at location 1 near master node 3705a as shown in FIG. 37A, items 3700a and 3700b initially accompany mobile courier master node 3710. For example, mobile courier master node 3710 may be a handheld node device (e.g., a ruggedized tablet type of device) associated with particular logistics personnel responsible for delivering items 3700a and 3700b to their respective intended delivery locations. As previously noted, an exemplary intended delivery location may be considered as a transition point for transition of custody (such as a mailroom type of way-point location that will receive custody of an item, sort and process the item, and further transition custody of the item to other personnel for further delivery operations) or an ultimate delivery location for the item. As previously noted, an exemplary intended delivery location may also be identified as a physical address or location (such as a residential address or office address) or may be identified with reference to a current location of a specific mobile user access device or other node. Thus, the items 3700a and 3700b may move with mobile courier master node 3710 toward different locations where an item may be dropped off, subject to a custody transfer, or be personally delivered to a particular recipient.

FIG. 37B shows a further snapshot of items 3700a-3700d and mobile courier master node 3710 after mobile courier master node 3710 has moved past location 1 and is moving towards location 2. In FIG. 37B, item 3700a has been dropped off and item 3700d has been picked up with respect to mobile courier master node 3710. More specifically, as shown in FIG. 37B, item 3700a is dropped off at location 1 and no longer accompanies mobile courier master node 3710. Thus, item 3700a remains stationary with respect to location 1 where master node 3705a is disposed. In other words, item 3700a (and its related ID node 3720a) may be considered to have been left in location 1 rather than continue to accompany mobile courier master node 3710 and item 3700b (and its related ID node 3720b) as they continue to move towards location 2 where master node 3705b is disposed.

Item 3700d has been picked up from location 1 and is now accompanying mobile courier master node 3710. As such, where item 3700c remains stationary with respect to location 1 where master node 3705a is disposed, item 3700d is now moving as it accompanies mobile courier master node 3710 towards location 2 where master node 3705b is disposed.

In a delivery/pickup situation, an adverse delivery or pickup condition may be sensed by one or more of the master nodes shown in FIGS. 37A-37C. In general, an exemplary adverse delivery condition is a sensed condition that creates a current or potential issue inconsistent with proper delivery of an item. For example, an exemplary adverse delivery condition may be location related, such as an item being at an incorrect location for delivery (e.g., where the item may be mistakenly delivered to the wrong location or is approaching a location that is not its intended delivery location), or an item moving away from its intended delivery location (e.g., where the item may have missed being delivered to the correct location). An exemplary adverse pickup condition may also be location related, such as for an item staying at a location when it was supposed to transition custody to an intended pickup master node that left the location (e.g., where the item pickup was missed), or an item moving away from its intended pickup location after transitioning custody to mobile courier master node that does not correspond to the intended pickup master node (e.g., where the item was incorrectly picked up and may be heading out of a warehouse unexpectedly).

An exemplary adverse delivery condition may also involve a time related condition, such as a delivery deadline or a delivery time range. Further exemplary adverse delivery conditions may involve a combination of location related conditions and time related conditions that may be sensed and, in response, have an appropriate corrective delivery notification generated and, in some instances, transmitted to another node where appropriate. FIGS. 38 and 39 explain exemplary methods of how different master nodes (such as those shown in FIGS. 37A and 37B) may react by automatically sensing a type of adverse delivery condition and generating a corrective delivery notification accordingly in different embodiments as described in more detail below.

FIG. 38 is a flow diagram illustrating an exemplary method for generating a corrective delivery notification related to an item by a mobile master node involved with delivery of the item in accordance with an embodiment of the invention. Referring now to FIG. 38, exemplary method 3800 begins at step 3805 by identifying an intended delivery location related to an item by a mobile master node involved with a delivery of the item (such as a mobile courier master node). The intended delivery location may be identified from shipping information related to the item. In some embodiments, the mobile master node may detect a signal broadcast from an ID node associated with the item and then accessing the shipping information from within the detected signal. In this manner, the intended delivery location may be identified from the shipping information. In other embodiments, the mobile master node may receive shipping information from a server (such as in a preloading message coming from the server or in a response from the server to a shipping information request from the mobile master node). The intended deliver location for the item may then be identified from the shipping information received from the server, which may be received as encrypted information and/or via a secure communication path established with the server.

For example, as shown in FIG. 37A, mobile courier master node 3710 may identify an intended delivery location for each of items 3700*a* and 3700*b*. Server 100 may provide shipping information that identifies the respective intended delivery locations for each of items 3700*a* and 3700*b* or mobile courier master node 3710 may identify the respective intended delivery locations from signals broadcast from ID nodes 3720*a* and 3720*b* (such as via encrypted shipping information and/or via an appropriate secure connection between mobile courier master node 3710 and the source of the shipping information—e.g., server 100 or ID nodes 3720*a* and 3720*b*). Such signals may be short range advertising signals broadcast in a Bluetooth® format and have shipping information (including data that reflects the intended delivery location) as part of the respective packets in the signals. Thus, mobile courier master node 3710 may be made aware of the respective intended delivery locations for items 3700*a* and 3700*b* that accompany master node 3710.

At step 3810, method 3800 continues with location circuitry within the mobile master node detecting a current location of the mobile master node. As noted with respect to FIG. 4, an exemplary master node 110*a* includes location positioning circuitry 475, such as GPS circuitry, that allows the master node to self-locate its current location. Those skilled in the art will appreciate that the location circuitry on a master node may also involve other techniques for locating the master node by itself or with the assistance of other nodes, as described in more detail above.

At step 3815, method 3800 proceeds with the mobile master node automatically sensing an adverse delivery condition related to the item based upon the intended delivery location and the current location of the mobile master node. As generally noted above, an adverse delivery condition may be considered a condition that creates a current or potential issue inconsistent with proper delivery of an item. In a more detailed embodiment, the mobile master node may automatically sense the adverse delivery condition as an incorrect location for delivery of the item based upon a comparison of the identified intended delivery location and the detected current location of the mobile master node. More specifically, the step of automatically sensing the incorrect location may involve comparing the current location of the mobile master node to a proximity distance threshold related to the identified intended delivery location. For example, mobile courier master node 3710 may automatically sense an incorrect location for delivering item 3700*a* if the current location of mobile courier master node 3710 is outside of a proximity distance threshold of 100 yards from the intended delivery location of item 3700*a*. In other words, a comparison of the location of mobile courier master node 3710 to a proximity distance threshold zone around the intended delivery location for item 3700*a* may provide a basis for sensing a type of adverse delivery condition relative to item 3700*a*.

In a further embodiment of method 3800, step 3815 may have the mobile master node sensing the adverse delivery condition as a movement away from the intended delivery location based upon the identified intended delivery location and the detected current location of the mobile master node. In more detail, the mobile master node may automatically sense a movement direction associated with the mobile master node and compare the determined movement direction and the current location of the mobile master node to the intended delivery location. The two locations (i.e., that of the mobile master node and the intended delivery location) as well as the direction the mobile master node is moving allows the mobile master node to identify the adverse delivery condition as whether the mobile master node is moving away from the intended delivery location. For example, mobile courier master node 3710 as shown in FIG. 37B may sense its own movement away from location 1 based upon successive self-location determinations. Mobile courier master node 3710 may then, armed with its direction of movement relative to its current location, automatically sense an adverse delivery condition for item 3700*b* when the intended location for item 3700*b* is location 1.

In still another embodiment of method 3800, step 3815 may also involve an intended delivery time parameter related to an item. The mobile master node may have received the intended delivery time parameter related to the item as part of shipping information related to the delivery of the item (e.g., provided by a server or by an ID node associated with the particular item). As such, the adverse delivery condition may also be based upon the intended delivery time parameter, such as a delivery deadline (e.g., delivery for the particular item is appropriate if done prior to 5 pm or done on a particular day) and a delivery time range (e.g., delivery for the particular item is appropriate if done within a range of times/days). Thus, adverse delivery conditions for each item may be based upon location related conditions, time related conditions, and/or a combination of both.

At step 3820, method 3800 continues with the mobile master node, generating the corrective delivery notification based upon the adverse delivery condition sensed in step 3815. In a further detailed embodiment where the mobile master node may be associated with a courier (generally referring to personnel involved with the delivery of the item), generating the corrective delivery notification may have the mobile master node automatically prompting the courier with the corrective delivery notification. This may be accomplished, for example, by generating an alert sound by the mobile master node (e.g., a sound generated through speaker 3725 of mobile courier master node 3710) and/or generating electronic feedback for the courier on a user interface of the mobile master node. Such user interface feedback may be presented in the form electronic feedback information for the courier on a display on the user interface (e.g., information presented on display 3730 of mobile courier master node 3710).

The corrective delivery notification, for example, may include cautionary and/or instructive feedback relative to the sensed adverse delivery condition. For example, the notification may include an instruction not to deliver the item based upon the adverse delivery condition. This may be appropriate when the mobile master node's current location is inconsistent with the identified intended delivery location (e.g., they do not match up, not within a threshold distance from the intended delivery location, etc.). In another example, the notification may involve a displayed instruction to alter a current direction of movement based upon the adverse delivery condition or, in more detail, to move to a specified location (e.g., an alternative location compared to the mobile master node's current location, a prior location of the mobile master node, the identified intended delivery location (which is not matching up with the mobile master node's current location)).

Those skilled in the art will appreciate that method 3800 as disclosed and explained above in various embodiments may be implemented using an exemplary mobile master node (such as exemplary master node 110a as illustrated in FIG. 4 and mobile courier master node 3710 as illustrated in FIGS. 37A and 37B) running one or more parts of a control and management code (such as a delivery notification code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 3800 and variations of that method.

Another embodiment of an exemplary mobile master node apparatus involved with a delivery of an item and a corrective delivery notification generally comprises a node processing unit, node memory storage, location circuitry, and one or more communication interfaces. The node processing unit is coupled to each of the node memory storage, location circuitry, and communication interface(s). The node memory storage maintains delivery notification code for execution by the node processing unit. The location circuitry is operative to detect a current location of the mobile master node apparatus. The communication interface is operative to access a wireless communication path and may, in some embodiments, include different interfaces to accommodate distinct wireless communication paths to different devices using different ranges and formats for communications. The node processing unit, when executing the delivery notification code maintained on the node memory storage, is specially adapted to become operative to identify an intended delivery location associated with the item from shipping information related to the item; cause the location circuitry to detect a current location of the mobile master node; automatically determine an adverse delivery condition related to the item based upon the intended delivery location and the detected current location of the mobile master node; and generate a corrective delivery notification based upon the determined adverse delivery condition related to the item.

In a further apparatus embodiment, the node memory storage may maintain the shipping information related to the item. In more detail, the shipping information may comprise an intended delivery time parameter related to the item (such as a delivery deadline or a delivery time range as explained above with reference to FIG. 38). As such, the node processing unit may automatically determine the adverse delivery condition based upon the intended delivery location, the detected current location of the mobile master node, and the intended delivery time parameter.

In still another apparatus embodiment, the node processing unit may be further operative to receive the shipping information related to the item from a second node or device, such as an ID node associated with the item (such as ID node 3720a) or a server (such as server 100). In more detail, the ID node may be in operative communication with the mobile master node apparatus over the communication interface (e.g., a short range part of the interface operative to communicate using a Bluetooth® Low Energy radio interface). In another embodiment where the shipping information is provided from the server, such a server may be in operative communication with the mobile master node apparatus over another part of the communication interface (e.g., a longer range part of the interface operative to communicate using a cellular radio interface or Wi-Fi wireless interface).

In yet another apparatus embodiment, the node processing unit may be operative to automatically determine the adverse delivery condition by automatically sensing the adverse delivery condition as an incorrect location for delivery of the item based upon a comparison of the identified intended delivery location and the detected current location of the mobile master node apparatus. More specifically, the node processing unit may compare the current location of the mobile master node apparatus to a proximity distance threshold related to the identified intended delivery location. This may allow the node processing unit to determine if the current location of the mobile master node apparatus is sufficiently close to the identified intended delivery location to avoid generating a warning or notification related to delivery of the item in question.

In a further apparatus embodiment, the node processing unit may be operative to automatically determine the adverse delivery condition by automatically sensing the adverse delivery condition as a movement of the mobile master node apparatus away from the intended delivery location based upon the identified intended delivery location and the detected current location of the mobile master node apparatus. In more detail, the node processing unit may interact with the location circuitry in this further detailed embodiment to determine a movement direction associated with the mobile master node apparatus over a period of time. For example, mobile courier master node 3710 as shown in FIG. 37B may determine it is moving in a direction towards location 2 by taking successive location measurements (e.g., detecting a series of GPS coordinates reflecting movement and a direction of movement for the mobile courier master node 3710). In this manner, the node processing unit may automatically sense movement of the mobile master node apparatus (such as mobile courier master node 3710) away from the intended delivery location based upon a comparison of the determined movement direction and the detected current location of the mobile master node relative to the intended delivery location.

Additional apparatus embodiments may generate and provide the corrective delivery notification in a variety of ways. For example, when the mobile master node apparatus is associated with a courier involved with the delivery of the item, the node processing unit may generate the corrective delivery notification by automatically prompting the courier with the corrective delivery notification. Such prompting may be implemented with a speaker on the apparatus and operatively coupled to the node processing unit, and where the node processing unit may generate an alert sound on the speaker. In another example, such prompting may be implemented using a user interface on the apparatus and operatively coupled to the node processing unit, and where the node processing unit may generate electronic feedback for the courier on the user interface of the mobile master node apparatus. In more detail, the user interface may be implemented with a display and the electronic feedback for the courier may include an instruction not to deliver the item based upon the adverse delivery condition, an instruction to alter a current direction of movement based upon the adverse delivery condition, and/or an instruction to move to a specified location. For example, such a specified location may include an alternative location compared to the mobile master node's current location, a prior location of the mobile master node, or the identified intended delivery location. Thus, the corrective delivery notification allows for automatic cautionary and/or instructive feedback in a timely manner that enhances and improves a monitored delivery process for an item.

While FIG. 38 explains an exemplary method involving a corrective delivery notification from the perspective of a mobile master node (such as mobile courier master node 3710), FIG. 39 is a flow diagram illustrating an exemplary method for transmitting a corrective delivery notification related to an item from the perspective of a master node at a particular location (such as master node 3705a at location 1 in the embodiment shown in FIG. 37B). Referring now to FIG. 39, method 3900 begins at step 3905 with a first master node at a first location receiving shipping information related to the item. The first master node may, for example, receive the shipping information as part of a broadcasted signal from an ID node associated with the item (such as when ID node 3720a associated with item 3700a approaches location 1 and broadcasts an advertising signal that may include shipping information related to item 3700a). In another embodiment, the first master node may receive the shipping information as part of a preloading message from a server in communication with the first master node (such as when server 100 is aware of an anticipated path of item 3700a and its associated ID node 3720a, and server 100 transmits shipping information related to item 3700a to master node 3705a at location 1). In some embodiments, the server may provide or transmit the shipping information to the first master node as a response to a shipping information request from the first master node (such as when master node 3705a detects item 3700a approaching or at location 1 and sends server 100 a shipping information request relative to item 3700a). Requests and receipt of the information from other nodes may be accomplished, in some embodiments, via a secure connection that may deploy encryption to help secure and protect the shipping information as sensitive information and to help avoid issues with improper signals being identified from nodes not intended to be related to delivery or pickup of the item.

At step 3910, method 3900 continues by parsing the received shipping information to identify an intended delivery location related to the item. For example, the shipping information may include a variety of data related to the item, such as an identification of the recipient, a destination address, a description of the item, as well as information on intermediate way-points where custody of the item may be transferred. The first master node at the first location may analyze the received or stored shipping information to sift out and identify an intended delivery location for the item (e.g., the destination address where the item may ultimately be delivered into the custody of the recipient, or an intermediate location where the item may be transferred in custody while being tracked and monitored via the back-end server 100).

At step 3915, method 3900 continues with the first master node automatically sensing an adverse delivery condition related to the item based upon the first location of first master node and the intended delivery location for the item. Thus, step 3915 has a different type of master node sensing the adverse delivery condition and reacting than that described with respect to FIG. 38. In more detail, the first master node may automatically sense the adverse delivery condition by determining a difference between the first master node's location (i.e., the first location) and the intended delivery location for the item when an ID node associated with the item arrives at the first location. Such a determined difference may indicate an incorrect location for delivery of the item as the adverse delivery condition and as viewed by the first master node.

In another embodiment, the first master node may automatically sense the adverse delivery condition by determining the first location does not correspond to the intended delivery location for the item, and then detecting when an ID node associated with the item is proximate and stationary relative to the first master node when the courier master node is moving away from the first location. Here, the detected stationary location of the ID node reflects an incorrect location for delivery of the item as the adverse delivery condition when the courier master node is detected to be moving away from the first master node's location. In such an embodiment, the first master node may request other node's locations (such as the location of the courier master node) and may determine the location of some nodes (such as the location of the first master node and/or the location of the ID node associated the item that is no longer moving with the courier master node).

In still another embodiment, the automatically sensing step may be accomplished when the first master node detects movement of an ID node associated with the item away from the first master node's location as the adverse delivery condition when the first location corresponds to the intended delivery location. For example, master node 3705a may detect movement of ID node 3720b as moving away from location 1 (the location of master node 3705a). Should the intended delivery location of item 3700b correspond to location 1, master node 3705a may thus automatically sense an adverse delivery condition.

In a further embodiment of method 3900, the shipping information may also include an intended delivery time parameter related to delivery of the item (such as a delivery deadline or delivery timeframe) such that the adverse delivery condition may also be based upon whether the intended delivery time parameter is consistent with delivery of the item at that time.

At step 3920, method 3900 continues with the first master node transmitting the corrective delivery notification to a courier master node based upon the adverse delivery condition sensed by the first master node. For example, if master node 3705a senses item 3700a has been left at location 1, which is determined to be an incorrect location for delivery of item 3700a (based upon shipping information related to item 3700a), master node 3705a may transmit a corrective delivery notification to mobile courier master node 3710 identifying item 3700a as being at an incorrect location for delivery.

The exemplary corrective delivery notification transmitted to a courier master node may include cautionary and instructive information that improves and enhances the delivery process. For example, the corrective delivery notification transmitted to the courier master node may include at least an instruction not to deliver the item to the first location of the first master node, which may help proactively avoid an incorrect or inappropriate delivery prior to it occurring. In another example, the corrective delivery notification transmitted to the courier master node may identify the item as not being delivered to the intended delivery location, which may timely inform the courier master node of a missed delivery of the item. In more detail, such a corrective delivery notification may include an instruction to the courier master node to move to a specified location, such as the first location of the first master node, an alternative location, or to the previously identified intended delivery location, to allow for appropriate delivery of the item.

Those skilled in the art will appreciate that method 3900 as disclosed and explained above in various embodiments may be implemented using an exemplary master node (such as exemplary master node 110a as illustrated in FIG. 4 and master nodes 3705a and 3705b as illustrated in FIGS. 37A and 37B) running one or more parts of a control and management code (such as a delivery notification code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 3900 and variations of that method.

Another embodiment of an exemplary master node apparatus disposed at a first location and in communication with a courier master node involves a corrective delivery notification. Such an exemplary master node apparatus generally comprises a node processing unit, node memory storage, location circuitry, and one or more communication interfaces. The node processing unit is coupled to each of the node memory storage, location circuitry, and communication interface(s). The node memory storage maintains delivery notification code for execution by the node processing unit. The location circuitry is operative to detect a current location of the master node apparatus. The communication interface is operative to access a wireless communication path and may, in some embodiments, include different interfaces to accommodate distinct wireless communication paths to different devices using different ranges and formats for communications. The node processing unit, when executing the delivery notification code maintained on the node memory storage, is specially adapted to become operative to receive shipping information via the communication interface, the shipping information being related to the item; store the received shipping information in the node memory storage; parse the received shipping information to identify an intended delivery location for the item; cause the location circuitry to detect the current location of the master node apparatus as the first location; automatically sense an adverse delivery condition related to the item based upon the first location of master node apparatus and the intended delivery location for the item; and cause the communication interface to transmit a corrective delivery notification to the courier master node based upon the adverse delivery condition.

In a further apparatus embodiment, the node processing unit of the master node apparatus at the first location may automatically sense the adverse delivery condition by determining a difference between the first location and the intended delivery location for the item when an ID node associated with the item arrives at the first location. Such a determined difference may indicate an incorrect location for delivery of the item as the adverse delivery condition.

In another apparatus embodiment, the node processing unit of the master node apparatus at the first location may automatically sense the adverse delivery condition by comparing the first location to the intended delivery location to determine if the first location does not correspond to the intended delivery location for the item. The node processing unit may then detect that an ID node associated with the item is proximate and stationary relative to the first master node while also detecting that the courier master node is moving away from the first location. Under monitoring conditions, the node processing unit of the master node apparatus may determine the ID node is in an incorrect location for delivery of the item as the adverse delivery condition when (a) the first location does not correspond to the intended delivery location for the item, (b) the ID node associated with the item is detected to be proximate and stationary relative to the master node apparatus, and (c) the courier master node is detected to be moving away from the first location. This reflects how the first master node may sense an item incorrectly left at its location and be operative to signal the courier master node with a relevant and responsive corrective delivery notification that improves and enhances the monitored delivery process involving the master node apparatus.

Further still, the node processing unit may automatically sense the adverse delivery condition by detecting a movement of an ID node associated with the item away from the first location as the adverse delivery condition when the first location corresponds to the intended delivery location. In other words, when the item's intended delivery location corresponds to the location of the master node apparatus and the item's associated ID node is detected as moving away from the master node apparatus' location, the master node apparatus automatically senses a type of adverse delivery condition reflecting the item was not delivered to the correct location.

The corrective delivery notification to the courier master node may reflect and include cautionary and instructive information. For example, the corrective delivery notification to the courier master node may identify the item as being at an incorrect location for delivery, may include an instruction not to deliver the item to the first location of the master node apparatus, and may identify the item as not being delivered to the intended delivery location. Furthermore, the corrective delivery notification to the courier master node may include an instruction to the courier mobile master node to move to a specified location, such as an alternative location, a prior location of the courier master node, or to reiterate and remind the courier of the item's intended delivery location so that timely corrective delivery action may be initiated.

As with some of the other embodiments, a further embodiment of the master node apparatus may have the node processing unit receiving the shipping information over the communication interface from an ID node associated with the item (or one of the communications interfaces deployed on the master node apparatus capable of closer range communications with the ID node). In this scenario, the ID node may provide the shipping information over the wireless communication path as part of a broadcasted signal from the ID node, such as a Bluetooth® formatted signal. In another embodiment, the node processing unit may receive the shipping information over the communication interface from a server (or one of the communications interfaces deployed on the master node apparatus capable of longer range communications with the server). In this scenario, the server may provide the shipping information in a preloading message from the server or, alternatively, provide the shipping information in response to a shipping information request transmitted to the server. As noted above, the intended delivery location for an item (and in some embodiments the rest of the shipping information) may be encrypted or otherwise provided via a secure connection to help protect the integrity and security of such information.

In still another apparatus embodiment, the shipping information may include an intended delivery time parameter related to the item. As such, the node processing unit may operate to automatically determine the adverse delivery condition based upon the intended delivery location, the first location of the mobile master node apparatus, and the intended delivery time parameter (such as a delivery date, delivery time, or range or dates and/or times that a shipping customer for the item may deem appropriate).

Figure 41:
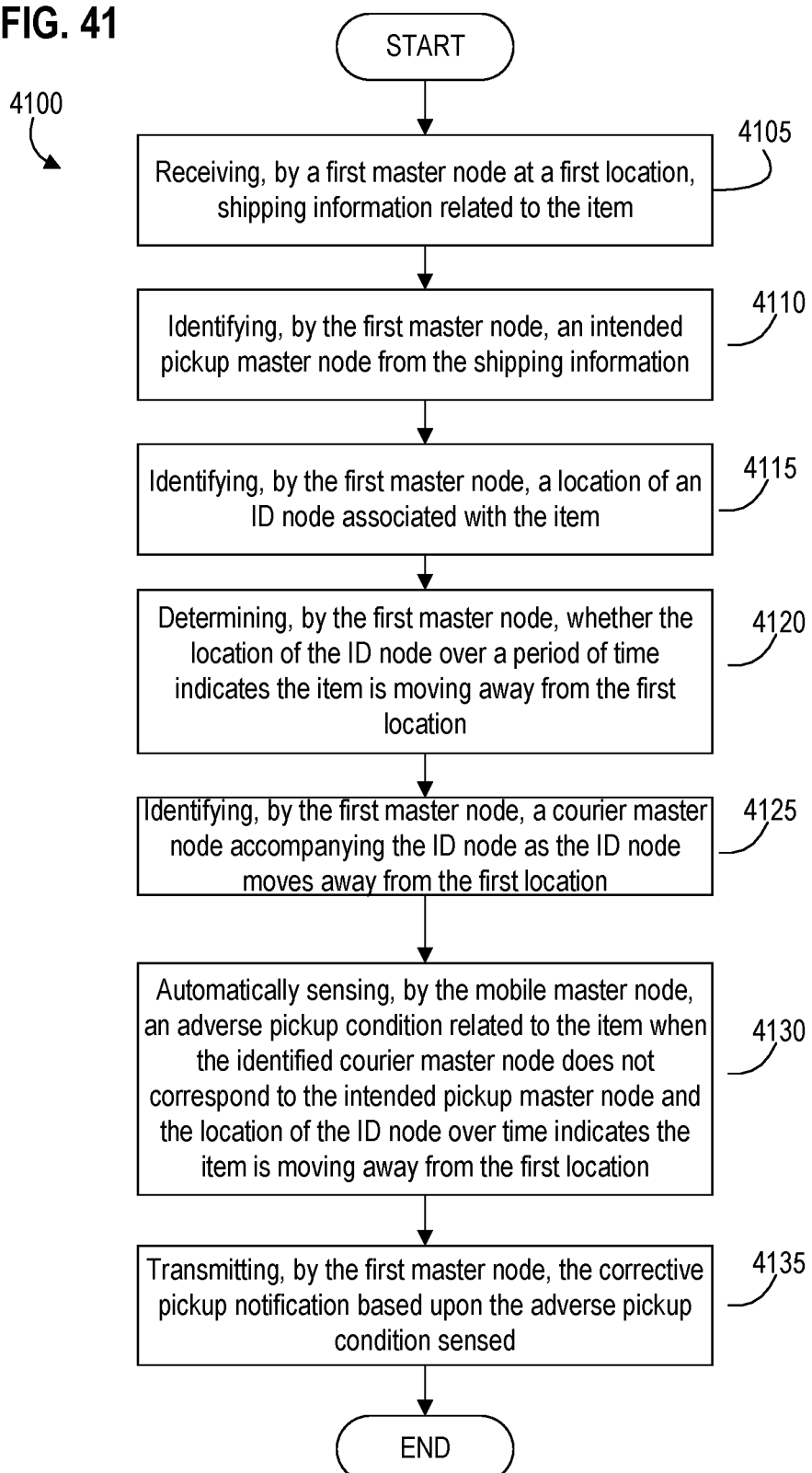
FIG. 41 is a flow diagram illustrating an exemplary method for transmitting a corrective pickup notification related to an item by a master node associated with a location in accordance with an embodiment of the invention.

While FIGS. 38 and 39 describe generating and/or transmitting corrective delivery notifications, FIGS. 40-42 describe embodiments that generate and/or transmit corrective pickup notifications involving similar wireless node elements. Here, embodiments of different types of master nodes are described as interacting with other node devices as they sense adverse pickup conditions relative to an item and then generate and/or transmit timely and useful corrective pickup notifications when, for example, an item was not picked up or was picked up by an incorrect courier master node by mistake. The exemplary corrective pickup notifications provide for improvements where, for example, a costly situation may be avoided when the item was incorrectly picked up and may be heading out of a warehouse unexpectedly, but can be corrected prior to leaving the premises. In further embodiments, the notifications may be provided to a shipping customer directly or indirectly with server 100 operating as an intermediary system that forwards the relevant notification to the shipping customer's server (e.g., where an inventory/warehouse module on that server may be notified and supply levels and inventory counts may be adjusted).

FIG. 40 is a flow diagram illustrating an exemplary method for generating a corrective pickup notification related to an item by a mobile master node in accordance with an embodiment of the invention. Such a mobile master node may be used by personnel involved in picking up the item as part of managing and tracking the item for later delivery. Referring now to FIG. 40, method 400 begins at step 4005 with the mobile master node identifying a location of an ID node associated with the item. At step 4010, method 4000 continues with determining, by the mobile master node, whether the location of the ID node indicates the item is accompanying the mobile master node as the mobile master node moves from a first location to a second location. For example, mobile courier master node 3710 may determine whether the location of the ID node indicates the item is accompanying the mobile master node as the mobile master node moves from a first location to a second location (such as how item 3700d now accompanies mobile courier master node 3710 instead of being located at location 1). In a further embodiment of method 400, step 4010 may have location circuitry on the mobile master node detecting a location of the mobile master node, and comparing the location of the mobile master node to the location of the ID node as the mobile master node moves from the first location to the second location to determine whether the item is accompanying the mobile master node. Such a comparison may provide an indication that the ID node is accompanying the mobile master node when their relative locations over time are relatively close, as opposed to increasingly different and farther apart.

At step 4015, method 4000 continues with the mobile master node receiving shipping information related to the item. As noted in other embodiments where shipping information related to the item may be provided to a master node, the shipping information may be received, for example, the ID node over a secure connection between the ID node and the mobile master node. In another example, the shipping information may be received from a server over a secure connection between the server and the mobile master node. As such, utilizing a secure connection may allow for an encrypted exchange of the shipping information to better protect such sensitive information and prevent spoofing issues previously noted when detecting signals from other nodes.

At step 4020, method 4000 continues with the mobile master node identifying an intended pickup master node from the shipping information. In this embodiment, the shipping information may have information on an anticipated transit path for the item and, as such, may have information on what mobile master node is intended to be tasked with handling a pickup operation involving the item (e.g., where an ID node associated with the item may become associated with the mobile master node and where personnel operating the mobile master node may physically obtain the item as temporary physical custody of the item transfers as a result of the pickup operation).

At step 4025, method 4000 proceeds where the mobile master node automatically senses an adverse pickup condition related to the item based upon the identified intended pickup master node and whether the location of the ID node indicates the item is accompanying the mobile master node. In more detail, the mobile master node may automatically sense the adverse pickup condition related to the item when the intended pickup master node does not correspond to the mobile master node and the location of the ID node indicates the item is accompanying the mobile master node. For example, if the intended pickup master node for item 3700d is not mobile courier master node 3710 and, as shown in FIG. 37C, item 3700d is accompanying the mobile courier master node 3710, then master node 3710 is operative to automatically sense there is a pickup related issue with item 3700d (e.g., the master node 3710 picked up a wrong item—namely, item 3700d).

At step 4030, method 4000 has the mobile master node generating the corrective pickup notification based upon the adverse pickup condition sensed. Thus, the mobile master node, based upon assessing detected and received shipping information and making location measurements and determinations, may quickly identify a pickup issue with this particular item and generate the corrective pickup notification accordingly.

In a further embodiment of method 400, step 4030 may have the mobile master node generating the corrective pickup notification by generating a prompt on the mobile master node, the prompt being related to the adverse pickup condition. Such a prompt may comprise an alert sound generated by the mobile master node (e.g., using a speaker 3725 on master node 3710). In another embodiment, the prompt may comprise electronic feedback on a user interface of the mobile master node (e.g., using display 3730 on master node 3710). In more detail, such electronic feedback may be different types of instructions. For example, the electronic feedback may include an instruction not to deliver the item based upon the sensed adverse pickup condition or an instruction to alter a current direction of movement or move to a specified location (such as a prior location of the mobile master node or an alternative location where the pickup issue may be resolved quickly and efficiently) based upon the sensed adverse pickup condition.

Those skilled in the art will appreciate that method 4000 as disclosed and explained above in various embodiments may be implemented using an exemplary mobile master node (such as exemplary master node 110a as illustrated in FIG. 4 and mobile courier master node 3710 as illustrated in FIGS. 37A-C) running one or more parts of a control and management code (such as a delivery notification code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 4000 and variations of that method.

Where FIG. 40 explains aspects of an exemplary method for generating a corrective pickup notification from the perspective of a mobile master node, FIGS. 41 and 42 explain aspects of exemplary movement-based methods for transmitting an exemplary corrective pickup notification from the perspective of an exemplary master node at a particular location that may monitor movement of nodes associated with items and locations of various other master nodes. In more detail, FIG. 41 is a flow diagram illustrating exemplary method 4100 that begins at step 4105 with a first master node at a first location receiving shipping information related to the item. More particularly, the shipping information may in some embodiments be received from an ID node associated with the item over a secure connection between the ID node and the first master node. In other embodiments, the shipping information may be received from a server over a secure connection between the server and the first master node.

At step 4110, method 4100 has the first master node parsing the shipping information to identify an intended pickup master node from the shipping information. In some embodiments, this may involve decrypting the shipping information or assessing a particular part of the shipping information related to the anticipated transit path of the item and, more specifically, to an anticipated master node that is next in a chain of associated custody related to the item.

At step 4115, method 4100 has the first master node identifying a location of an ID node associated with the item. As described in more detail herein, embodiments may have the first master node identifying the ID node's location by making use of one or more of the locating techniques described above.

At step 4120, method 4100 has the first master node detect or otherwise determine whether the location of the ID node over a period of time indicates the item is moving away from the first location. For example, as shown in FIGS. 37B and 37C, master node 3705a may determine whether the location of node 3720d over time (e.g., such as the time taken to progress from the location shown in FIG. 37B to the location shown in FIG. 37C) indicates item 3700d is moving away from location 1 (i.e., the location of master node 3705a).

At step 4125, method 4100 has the first master node identify a courier master node accompanying the ID node as the ID node moves away from the first location. For example, the master node 3705a may identify the locations of surrounding nodes, including those of ID node 3720d associated with item 3700d and mobile courier master node 3710. With such location information (that may be detected by master node 3705a itself or via information provided by back-end server 100), master node 3705a may identify mobile courier master node 3710 has accompanying ID node 3720d as ID node 3720d moves away from location 1 (i.e., the location of master node 3705a).

At step 4130, method 4100 has the first master node automatically sensing an adverse pickup condition related to the item when the identified courier master node does not correspond to the intended pickup master node and the location of the ID node over the period of time indicates the item is moving away from the first location. In this situation, the identified courier master node may have picked up the item and its related ID node by mistake.

Thus, in response to sensing such an adverse pickup condition, method 4100 continues to step 4135 where the first master node transmits a corrective pickup notification to a second device based upon the adverse pickup condition sensed. In a further embodiment of method 4100, such a second device may include a server, the identified courier master node, a node device associated with a customer shipping the item (such as a customer's mobile user access device operating as a node), or a node device associated a recipient of the item (such as the recipient's smartphone operating as a node).

The corrective pickup notification may identify the item as being a wrong pickup and present one or more electronic instructions on what to do with the wrong pickup item or where to move, such as the location of the first master node or some other specified location. This may allow for timelier drop off where the item was picked up by mistake to allow for appropriate delivery of the item.

Those skilled in the art will appreciate that method 4100 as disclosed and explained above in various embodiments may be implemented using an exemplary master node (such as exemplary master node 110a as illustrated in FIG. 4 and master nodes 3705a and 3705b as illustrated in FIGS. 37A-C) running one or more parts of a control and management code (such as a delivery notification code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 4100 and variations of that method.

Additionally, an exemplary system embodiment may leverage such an exemplary master node at the first location as described above relative to method 4100 and its variants in conjunction with a server (that may provide the shipping information to the master node) and other nodes described above relative to FIGS. 37A-37C that may receive such valued corrective pickup notifications that help improve and enhance a monitored pickup and delivery operation related to the item. Stated another way, those skilled in the art will appreciate that two or more of the interacting node elements shown in FIGS. 37A-37C and described above with respect to method 4100 (and variations of that method) using an exemplary master node apparatus as described relative to embodiments of method 4100 may be deployed to implement such system embodiments with the particular node elements (as described above) interacting in a manner to transmit a corrective pickup notification for a shipped item accompanying an ID node moving with a courier away from the master node apparatus.

FIG. 42 is a flow diagram illustrating an alternative exemplary method for transmitting a corrective pickup notification related to an item by a master node associated with a location in accordance with an embodiment of the invention. Referring now to FIG. 42, method 4200 begins at step 4205 with the first master node at a first location receiving shipping information related to the item. As with the prior embodiment, the shipping information may be received from the ID node over a secure connection between the ID node and the first master node. In another embodiment, the shipping information may be received from a server over a secure connection between the server and the first master node.

At step 4210, method 4200 proceeds with the first master node identifying an intended pickup master node from the shipping information in similar fashion as discussed above in step 4110. Method 4200 proceeds from step 4210 to step 4215 where the first master node detects whether a location of the ID node over a period of time indicates the item is not moving away from the first location over the period of time. In more detail, the first master node may track the location of the ID node over a period of time to determine if the ID node and the item with which it is associated are moving and whether such movement is in a direction away from the first master node. At step 4220, method 4200 proceeds with the first master node determining a location of the intended pickup master node over the same period of time. In this manner, the first master node is able to track and monitor the respective locations of the item through its associated ID node and the intended pickup master node. Armed with this detected information, method 4200 has the first master node automatically sense an adverse pickup condition related to the item when the intended pickup master node is determined to be moving away from the first location while the location of the ID node over the period of time indicates the item is not moving away from the first location.

As a result, at step 4230, method 4200 proceeds with the first master node transmitting the corrective pickup notification to a second device based upon the adverse pickup condition sensed. In more detail, the second device may comprise a server so that the server stays informed of the such an adverse pickup condition for the particular item; the intended pickup master node noting that the intended pickup master node missed picking up the item; a node device associated with a shipper of the item to keep the shipper aware of at least a delayed pickup of the item; and a node device associated a recipient of the item to update the recipient about a potential delay.

In a further embodiment of method 4200, the corrective pickup notification transmitted to the intended pickup master node may identify the item as being not being picked up and, further, may include an instruction to move to a specified location (such as the location of the first master node to allow for appropriate pickup of the item) or to an alternative location where, for example, the item may be found for a second opportunity at pickup of the item.

Those skilled in the art will appreciate that method 4200 as disclosed and explained above in various embodiments may be implemented using an exemplary master node (such as exemplary master node 110*a* as illustrated in FIG. 4 and master nodes 3705*a* and 3705*b* as illustrated in FIGS. 37A-C) running one or more parts of a control and management code (such as a delivery notification code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 4200 and variations of that method.

Generating Inventory Item Pickup Notifications

The notifications generated and/or transmitted in the above described delivery/pickup embodiments are typically used with an item being shipped or that has entered a shipment operation were the item may be on its transit path from an origin to a destination (with one or more hand-off management events along the way as described above with respect to FIG. 17). Further embodiments may leverage elements of a wireless node network when applied in an inventory control type of embodiment and where it may be desired to automatically generate a type of notification when an item may be improperly leaving a particular location, such as a storage facility (e.g., a warehouse that may temporarily house and maintain one or more different types of items). In general, such an embodiment may have a master node associated with the facility or location. The master node may operate to monitor inventory in the facility or location and generate notifications when an inventory item is not authorized to leave the facility.

Figure 43A:
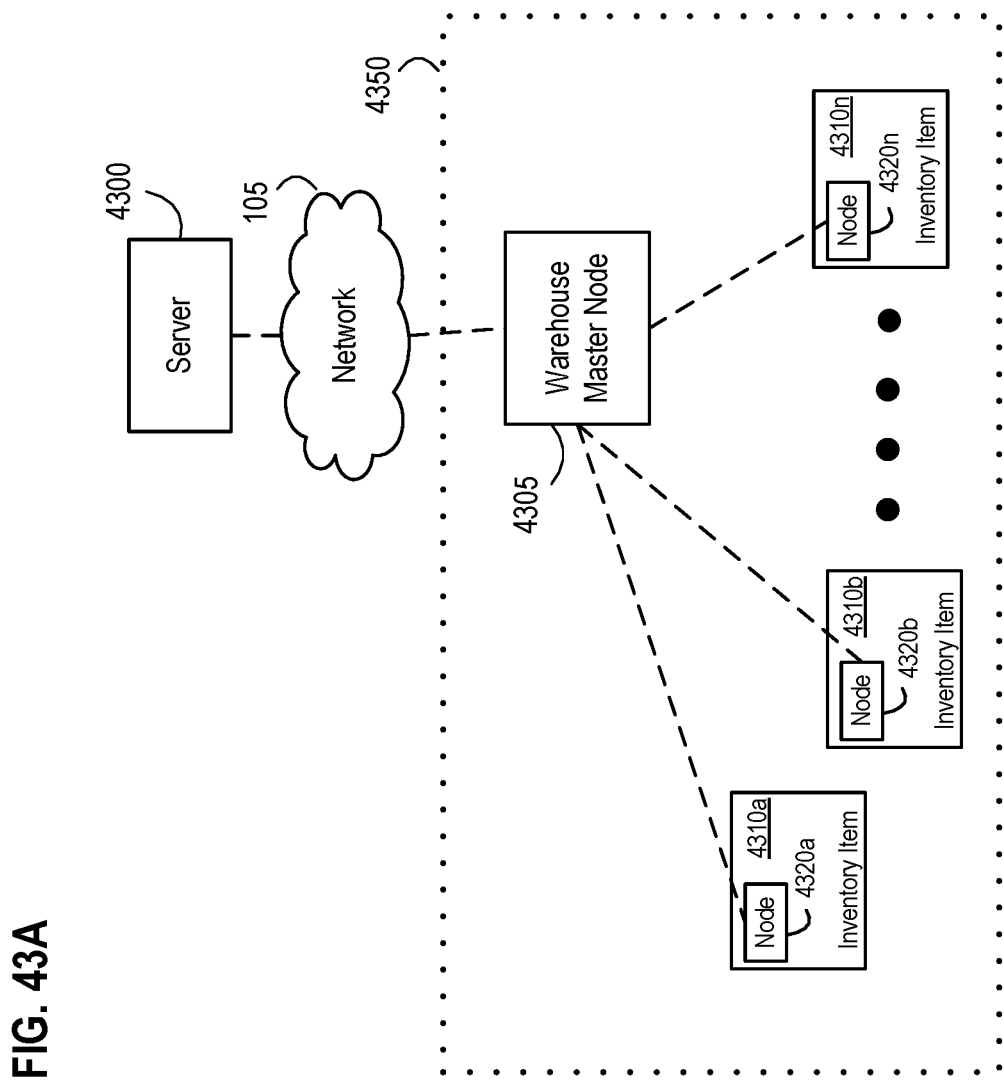
FIGS. 43A-43B are diagrams illustrating an exemplary master node associated with a fixed location that generates a pickup notification related to an inventory item in accordance with an embodiment of the invention.
Figure 43B:
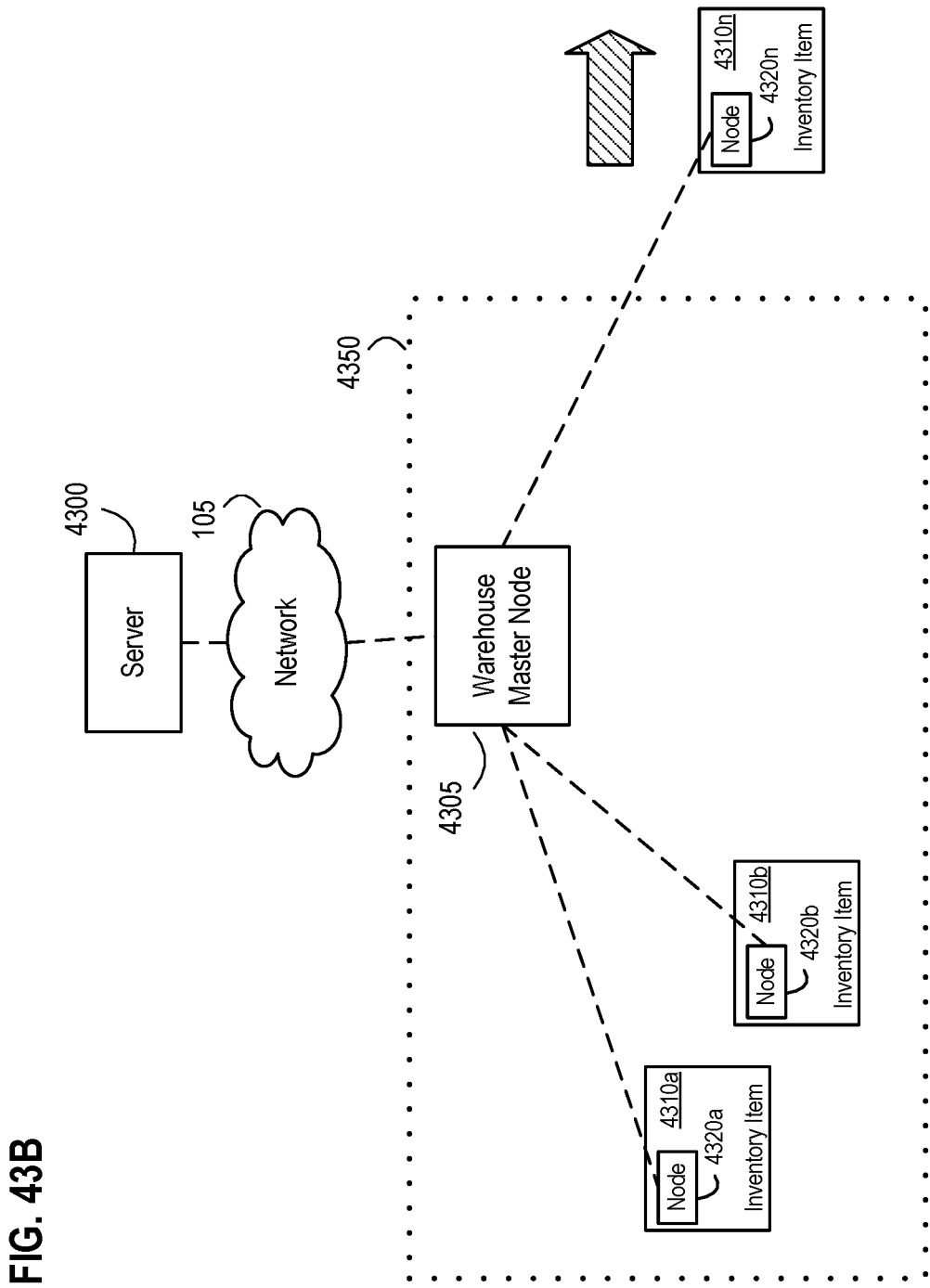

FIGS. 43A and 43B are diagrams illustrating an exemplary master node associated with a fixed location that generates a pickup notification related to an inventory item in accordance with an embodiment of the invention. Referring now to FIG. 43A, server 4300 (referred to as an exemplary inventory control server in some embodiments) is shown connected to master node 4305 via network 105. In the illustrated embodiment, exemplary master node 4305 is deployed as being associated with a particular location 4350 where an inventory of items 4310*a*-4310*n* are maintained. In a more detailed embodiment, location 4305 may be a storage facility or, more specifically, a warehouse. As such, master node 4305 may be associated with location 4305 by being fixed relative to location 4305 or, in some instances, deployed relative to location 4305 but in a non-fixed manner while still being associated with the location. For example, exemplary master node 4305 may be a warehouse master node as shown in FIGS. 43A and 43B and disposed in a convenient position that allows for communication with items 4310*a*-4310*n* while maintained within the inventor. Depending on the density of the warehouse, an embodiment of such a master node may be responsible for all or only a portion of the warehouse location or different storage areas within the warehouse location. In another example, exemplary master node 4305 may be a mobile master node that may move throughout a particular location (such as a mobile master node disposed on an autonomous mobile vehicle that moves as the mobile master node monitors ID nodes associated with inventory items within location 4350).

As shown in FIG. 43A, exemplary master node 4305 may periodically monitor ID nodes 4320*a*-4320*n* respectively associated with inventory items 4310*a*-4310*n* within location 4350. This monitoring may involve gathering and/or generating relevant information from or about the respective ID nodes (such as shared data 445, sensor data 450, location data 455, and the like). As an inventory item may be moved within location 4350, master node 4305 is operative to track the inventory item via its associated ID node. If an inventory item is authorized to be released from location 4350, server 4300 may provide release information to master node 4305 reflecting a level of authorization that includes the particular inventory item (such as a category of items/nodes that may be released or a particular item(s) or ID node(s) authorized for release). Thus, the release information provided by server 4300 essentially provides an approval for one or more inventory items to leave the location 4350 (e.g., leave a warehouse and transition from and inventory item to an item being shipped).

As shown in FIG. 43B, item 4310$n$ is detected by master node 4305 as moving in a direction away from location 4350. Based upon the current release information provided from server 4300 and the detected location/direction of movement of item 4310$n$ (via interactions with related node 4320$n$), master node 4305 may generated a pickup notification relative to item 4310$n$. Such a pickup notification may provide the basis for the master node 4305 to issue, provide, or transmit an alert related to item 4310$n$ as described in more detail below with reference to FIG. 44.

FIG. 44 is a flow diagram illustrating an exemplary method for generating a pickup notification related to an inventory item using an exemplary master node associated with a fixed location in accordance with an embodiment of the invention. Referring now to FIG. 44, method 4400 begins at step 4405 with the master node associated with the fixed location monitoring a location of an ID node associated with the inventory item. For example, in the embodiment of FIGS. 43A and 43B, exemplary master node 4305 is associated with location 4350, which may be a fixed location (such as a storage facility or, more specifically, a warehouse).

At step 4410, method 4400 proceeds with the master node receiving release information from an inventory control server operative to communicate with the master node. For example, server 4300 shown in FIGS. 43A and 43B may have transmitted a message to master node 4305 having release information on what may be authorized to leave location 4350. Such release information may, in some examples, identify a category for inventory release (such as a category of inventory items that are authorized for release or a category of ID nodes that are authorized for release). In another example, the release information may identify one or more specific authorized released nodes (such as one or more of the ID nodes associated with inventory items maintained with location 4350).

At step 4415, method 4400 proceeds with the master node detecting movement of the ID node relative to the fixed location. The master node may implement detecting movement by locating the ID node using one or more of the location determination techniques described herein. As such, and determining the ID node's location over time, the master node may detect movement of the ID node relative to the fixed location.

At step 4420, method 4400 proceeds with the master node generating a pickup notification for the inventory item based upon the release information and the detected movement of the ID node. Armed with the release information from the server and the detected movement of the particular ID node associated with the inventor item, the master node may automatically and efficiently leverage its ability to locate and track nodes, and generate such a pickup notification. In a further embodiment of method 4400, when the release information identifies a category for inventory release, the master node may generate the pickup notification for the inventory item in step 4420 when the detected movement of the ID node reflects movement away from the fixed location and the category for inventory release does not correspond to the inventory item (or, in another embodiment, the ID node associated with the inventory item). In such a situation, the inventory item may not be authorized for release and the pickup notification functions as an automatic type of alert that leverages the hierarchy of the ID node, the master node, and the server aspects of the wireless node network (such as shown in FIGS. 43A and 43B).

In another embodiment of method 4400, when the release information comprises at least one authorized released node, the master node may generate the pickup notification for the inventory item in step 4420 when the detected movement of the ID node reflects movement away from the fixed location and indicated authorized released node(s) from the release information does not include the ID node associated with the inventory item.

In these embodiments, the pickup notification may be generated prior to the inventory item leaving the location. However, in another embodiment of method 4400, step 4420 may have the master node generating the pickup notification for the inventory item when the master node detects a location of the ID node as being beyond a threshold distance away from the fixed location of the master node and the release information received by the master node does not authorize the ID node to leave the storage facility. For example, as shown in FIG. 43B, item 4310$n$ and its associated node 4320$n$ are located outside of location 4350. Should the location of node 4320$n$ be determined as beyond a threshold distance away from location 4350, item 4310$n$ and its associated node 4320$n$ may be considered to have been picked up and outside of location 4350 without authorization. An exemplary threshold distance may be set for a particular implementation considering how difficult locating an ID node is by a facility master node. Other embodiments may dynamically adjust the threshold distance based upon the contextual environment of the ID node and/or the master node (e.g., where certain access entrances to location 4350 have a more robust communication environment due to surrounding structure and potential other radio interference sources or shielding structure when compares other entrances which may be associated with more difficult communication environments).

In a further embodiment, method 4400 may also have the master node provide the pickup notification on a user interface of the master node. As such, the pickup notification as provided via the user interface (e.g., electronic feedback information shown on a display, audio information provided through a speaker, etc.) may indicate the inventory item has been improperly moved (such as improper removal of the inventory item from a storage facility at the location 4350) and allow for corrective action to be initiated.

At step 4425, method 4400 may proceed in some embodiments with the master node transmitting an alert to the inventory control server (or a second node device—such as another master node, or a mobile user access device operating as a node). The transmitted alert relates to the pickup notification and may indicate the inventory item has been improperly moved, and more specifically, may also provide a corrective action relative to the detected movement of the ID node relative to the fixed location.

At step 4430, method 4400 may also proceed in some embodiments with the master node updating inventory control information related to the inventory level of items when the detected movement of the ID node reflects movement of the ID node away from the fixed location and the ID node is authorized to leave the storage facility consistent with the release information. At step 4435, method 4400 may conclude by having the master node transmitting the updated inventory control information to the inventory control server so that the inventory control server may maintain current inventory data relative to the inventory kept at location 4350. For example, server 4300 may receive such updated inventory control information from master node 4305 and maintain such information within memory on or operatively accessible to server 430 (such as memory 520, 525 of exemplary server 100 or a separate database maintained by server 4300 with inventory control information relative to location 4350 and other locations).

Those skilled in the art will appreciate that method 4400 as disclosed and explained above in various embodiments may be implemented using an exemplary master node (such as exemplary master node 110a as illustrated in FIG. 4 and master node 4305 as illustrated in FIGS. 43A-43B) running one or more parts of a control and management code (such as a pickup notification code module) to implement any of the above described functionality. Such code may be stored on a non-transitory computer-readable medium (such as memory storage 415 in an exemplary master node). Thus, when executing such code, a processing unit of the mobile master node (such as unit 400) may be operative to perform operations or steps from the exemplary methods disclosed above, including method 4400 and variations of that method.

A further embodiment of exemplary master node apparatus for generating a pickup notification related to an inventory is set forth in Exhibit 6 is consistent with the above described exemplary master node as explained with reference to method 4400 (and variations of that method).

In still a further embodiment, an exemplary system is disclosed for generating a pickup notification related to an inventory item as set forth in Exhibit 6 that generally comprises an exemplary inventory control server operating in conjunction with a master node associated with a fixed location (also consistent with the above exemplary master node as explained with reference to method 4400 (and variations of that method)). As noted in the system embodiment explained in Exhibit 6, the master node is operative to generate a pickup notification as well as transmit different types of alerts to the inventory control server, which is operative to interact with the master node as set forth.

It should be emphasized that the sequence of operations to perform any of the methods and variations of the methods described in the embodiments herein are merely exemplary, and that a variety of sequences of operations may be followed while still being true and in accordance with the principles of the present invention.

At least some portions of exemplary embodiments outlined above may be used in association with portions of other exemplary embodiments to better manage and locate nodes in a wireless node network or use such nodes and network elements as part of a hierarchical node network that provides particular enhancements and improvements to technical processes, such as logistics monitoring operations. For example, some of the exemplary embodiments involve steps that involve locating a node (such as an ID node, a master node, or a mobile user access device operating as a type of node that interacts with other node elements in the described embodiment of an wireless node network of devices). The various exemplary techniques described herein for locating a node may be deployed in such embodiments. In another example, the various example embodiments involving node associations may be used in conjunction with various other embodiments (such as deploying different types of established and tracked association relationships between a node and a second entity (e.g., another node, a person, an object, a facility, a piece of equipment)). Thus, those skilled in the art will appreciate that at least some of the exemplary embodiments disclosed herein may be used independently from one another and/or in combination with one another and may have applications to devices and methods not disclosed herein.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

Further Particular Embodiments

What follows below is a listing of exemplary sets of particular embodiments focusing on one or more aspects of the different embodiments described above. Each of the different sets of particular embodiments respectively effect improvements to the technology of electronics-based enhanced delivery and/or pickup management of a shipped item using one or more elements of a logistics-centered wireless node network as it relates to selective release of the shipped item, corrective delivery/pickup notifications for the shipped item, and pickup notifications related to an inventory item. As such, within each further embodiment heading are numbered aspects describing a specific technological application of one or more nodes in such a wireless node network that improve or otherwise enhance these technical fields, as explicitly explained and supported by the disclosure above. Each numbered aspect appearing below a particular heading may make reference to other numbered aspects that appear below that particular heading in a dependent relationship.

Further Embodiment A

Improved Methods, Apparatus, and Systems for Generating a Corrective Pickup Notification for a Shipped Item using a Mobile Master Node 1. An improved method for generating a corrective delivery notification related to an item, the method comprising: identifying, by a mobile master node involved with a delivery of the item, an intended delivery location related to the item; detecting, by location circuitry within the mobile master node, a current location of the mobile master node; automatically sensing, by the mobile master node, an adverse delivery condition related to the item based upon the intended delivery location and the current location of the mobile master node; and generating, by the mobile master node, the corrective delivery notification based upon the adverse delivery condition sensed.

2. The method of embodiment 1, wherein the step of automatically sensing further comprises automatically sensing, by the mobile master node, the adverse delivery condition as an incorrect location for delivery of the item based upon a comparison of the identified intended delivery location and the detected current location of the mobile master node.

3. The method of embodiment 2, wherein the step of automatically sensing the incorrect location further comprises comparing the current location of the mobile master node to a proximity distance threshold related to the identified intended delivery location.

4. The method of embodiment 1, wherein the step of automatically sensing further comprises automatically sensing, by the mobile master node, the adverse delivery condition as a movement away from the intended delivery location based upon the identified intended delivery location and the detected current location of the mobile master node.

5. The method of embodiment 4, wherein the step of automatically sensing further comprises: determining, by the mobile master node, a movement direction associated with the mobile master node; comparing, by the mobile master node, the determined movement direction and the detected current location of the mobile master node relative to the intended delivery location; and identifying the adverse delivery condition as whether the mobile master node is moving away from the intended delivery location based upon the comparing step.

6. The method of embodiment 1, wherein the identifying step further comprises:
detecting, by the mobile master node, a signal broadcast from an ID node associated with the item;
accessing, by the mobile master node, shipping information within the detected signal, wherein the shipping information is related to the delivery of the item; and
identifying the intended delivery location from the shipping information.

7. The method of embodiment 1 further comprising establishing a secure connection from the mobile master node to the ID node associated with the item.

8. The method of embodiment 7, wherein the secure connection comprises an encrypted exchange of the shipping information from the ID node to the mobile master node.

9. The method of embodiment 1, wherein the identifying step further comprises: receiving, by the mobile master node, shipping information from a server; and identifying the intended delivery location from the received shipping information.

10. The method of embodiment 9, wherein the receiving step further comprises receiving, by the mobile master node, the shipping information from the server over a secure connection between the mobile master node and the server.

11. The method of embodiment 9 further comprising the step of transmitting a shipping information request to the server by the mobile master node, wherein the shipping information received by the mobile master node is provided by the server in response to the shipping information request and over a secure communication connection between the mobile master node and the server.

12. The method of embodiment 1 further comprising the step of receiving, by the mobile master node, an intended delivery time parameter related to the item as part of shipping information related to the delivery of the item; and wherein the adverse delivery condition is further based upon the intended delivery time parameter.

13. The method of embodiment 12, wherein the intended delivery time parameter is provided by a server over a secure communication connection between the mobile master node and the server, wherein the intended delivery time comprises at least one from a group consisting of a delivery deadline and a delivery time range.

14. The method of embodiment 12, wherein the intended delivery time parameter is provided by an ID node associated with the item over a secure communication connection between the mobile master node and the ID node, wherein the intended delivery time comprises at least one from a group consisting of a delivery deadline and a delivery time range.

15. The method of embodiment 1, wherein the mobile master node is associated with a courier involved with the delivery of the item.

16. The method of embodiment 15, wherein the step of generating the corrective delivery notification further comprises automatically prompting the courier with the corrective delivery notification.

17. The method of embodiment 16, wherein the step of automatically prompting further comprises generating an alert sound by the mobile master node.

18. The method of embodiment 16, wherein the step of automatically prompting further comprises generating electronic feedback for the courier on a user interface of the mobile master node.

19. The method of embodiment 18, wherein the step of generating the electronic feedback for the courier on the user interface further comprises generating a display on the user interface, wherein the display includes at least an instruction not to deliver the item based upon the adverse delivery condition.

20. The method of embodiment 18, wherein the step of generating the electronic feedback for the courier on the user interface further comprises generating a display on the user interface, wherein the display includes at least an instruction to alter a current direction of movement based upon the adverse delivery condition.

21. The method of embodiment 20, wherein the instruction to alter the current direction of movement comprises an instruction to move to a specified location.

22. The method of embodiment 21, wherein the specified location comprises a prior location of the mobile master node.

23. A mobile master node apparatus involved with a delivery of an item, the apparatus comprising: a node processing unit; a node memory storage coupled to the node processing unit, the node memory storage maintaining delivery notification code for execution by the node processing unit; location circuitry coupled to the node processing unit, the location circuitry being operative to detect a location of the mobile master node apparatus; a communication interface coupled to the node processing unit and operative to access a wireless communication path; and wherein the node processing unit, when executing the delivery notification code maintained on the node memory storage, is operative to identify an intended delivery location associated with the item from shipping information related to the item, cause the location circuitry to detect a current location of the mobile master node; automatically determine an adverse delivery condition related to the item based upon the intended delivery location and the detected current location of the mobile master node, and generate a corrective delivery notification based upon the determined adverse delivery condition related to the item.

24. The mobile master node apparatus of embodiment 23, wherein the node memory storage maintains the shipping information related to the item.

25. The mobile master node apparatus of embodiment 24, wherein the shipping information comprises an intended delivery time parameter related to the item; and wherein the node processing unit is operative to automatically determine the adverse delivery condition based upon the intended delivery location, the detected current location of the mobile master node, and the intended delivery time parameter.

26. The mobile master node apparatus of embodiment 25, wherein the intended delivery time parameter comprises at least one from a group consisting of a delivery deadline and a delivery time range.

27. The mobile master node apparatus of embodiment 24, wherein the node processing unit is further operative to receive the shipping information related to the item from a second node.

28. The mobile master node apparatus of embodiment 27, wherein the node processing unit is operative to receive the shipping information over a secure connection established between the second node and the communication interface of the mobile master node apparatus.

29. The mobile master node apparatus of embodiment 28, wherein the secure connection comprises an encrypted exchange of the shipping information from the second node to the node processing unit via the communication interface.

30. The mobile master node apparatus of embodiment 27, wherein the second node comprises an ID node associated with the item and is in operative communication with the mobile master node apparatus over the communication interface.

31. The mobile master node apparatus of embodiment 30, wherein the node processing unit is further operative to identify the shipping information from at least a portion of an identification signal broadcast from the ID node, and determine the intended deliver location from the shipping information.

32. The mobile master node apparatus of embodiment 27, wherein the second node comprises a server in operative communication with the mobile master node apparatus over the communication interface.

33. The mobile master node apparatus of embodiment 23, wherein the node processing unit is operative to automatically determine the adverse delivery condition by being further operative to automatically sense the adverse delivery condition as an incorrect location for delivery of the item based upon a comparison of the identified intended delivery location and the detected current location of the mobile master node apparatus.

34. The mobile master node apparatus of embodiment 33, wherein the node processing unit is operative to automatically sense the incorrect location by being further operative to compare the current location of the mobile master node apparatus to a proximity distance threshold related to the identified intended delivery location.

35. The mobile master node apparatus of embodiment 23, wherein the node processing unit is operative to automatically determine the adverse delivery condition by being further operative to automatically sense the adverse delivery condition as a movement of the mobile master node apparatus away from the intended delivery location based upon the identified intended delivery location and the detected current location of the mobile master node apparatus.

36. The mobile master node apparatus of embodiment 35, wherein the node processing unit interacts with the location circuitry to determine a movement direction associated with the mobile master node apparatus over a period of time; and wherein the node processing unit is operative to automatically sense movement of the mobile master node apparatus away from the intended delivery location based upon a comparison of the determined movement direction and the detected current location of the mobile master node relative to the intended delivery location.

37. The mobile master node apparatus of embodiment 23, wherein the mobile master node apparatus is associated with a courier involved with the delivery of the item.

38. The mobile master node apparatus of embodiment 37, wherein the node processing unit is operative to generate the corrective delivery notification by being further operative to automatically prompt the courier with the corrective delivery notification.

39. The mobile master node apparatus of embodiment 38 further comprising a speaker operatively coupled to the node processing unit; and wherein the node processing unit is operative to automatically prompt the courier with the corrective delivery notification by being further operative to generate an alert sound on the speaker.

40. The mobile master node apparatus of embodiment 38, further comprising a user interface operatively coupled to the node processing unit; and wherein the node processing unit is operative to automatically prompt the courier with the corrective delivery notification by being further operative to generate electronic feedback for the courier on the user interface of the mobile master node apparatus.

41. The mobile master node apparatus of embodiment 40, wherein the electronic feedback for the courier on the user interface further comprises a display on the user interface including at least an instruction not to deliver the item based upon the adverse delivery condition.

42. The mobile master node apparatus of embodiment 40, wherein the electronic feedback for the courier on the user interface further comprises a display on the user interface including at least an instruction to alter a current direction of movement based upon the adverse delivery condition.

43. The mobile master node apparatus of embodiment 42, wherein the instruction to alter the current direction of movement comprises an instruction to move to a specified location.

44. The mobile master node apparatus of embodiment 43, wherein the specified location comprises a prior location of the mobile master node.

Further Embodiment B

Improved Methods, Apparatus, and Systems for Transmitting a Corrective Pickup Notification for a Shipped Item to a Courier Master Node 1. An improved method for transmitting a corrective delivery notification related to an item, the method comprising: receiving, by a first master node at a first location, shipping information related to the item; parsing the received shipping information, by the first master node, to identify an intended delivery location related to the item; automatically sensing, by the first master node, an adverse delivery condition related to the item based upon the first location of first master node and the intended delivery location for the item; and transmitting, by the first master node, the corrective delivery notification to a courier master node based upon the adverse delivery condition sensed by the first master node.

2. The method of embodiment 1, wherein the step of automatically sensing further comprises determining, by the first master node, a difference between the first location and the intended delivery location for the item when an ID node associated with the item arrives at the first location, wherein the determined difference indicates an incorrect location for delivery of the item as the adverse delivery condition.

3. The method of embodiment 1, wherein the step of automatically sensing further comprises: determining, by the first master node, the first location does not correspond to the intended delivery location for the item; and detecting, by the first master node, when an ID node associated with the item is proximate and stationary relative to the first master node when the courier master node is moving away from the first location, wherein the detected stationary location of the ID node indicating an incorrect location for delivery of the item as the adverse delivery condition.

4. The method of embodiment 1, wherein the step of automatically sensing further comprises detecting, by the first mobile master node, a movement of an ID node associated with the item away from the first location as the adverse delivery condition when the first location corresponds to the intended delivery location.

5. The method of embodiment 1, wherein the receiving step further comprises receiving, by the first master node, the shipping information as part of a broadcasted signal from an ID node associated with the item.

6. The method of embodiment 1 further comprising establishing a secure connection from the first master node to the ID node associated with the item.

7. The method of embodiment 6, wherein the secure connection comprises an encrypted exchange of the shipping information from the ID node to the first master node.

8. The method of embodiment 1, wherein the receiving step further comprises receiving, by the first master node, the shipping information as part of a preloading message from a server in communication with the first master node.

9. The method of embodiment 1, wherein the receiving step further comprises receiving, by the first master node, the shipping information as a response from a server to a shipping information request from the first master node.

10. The method of embodiment 1, wherein the receiving step further comprises receiving, by the first master node, the shipping information a server over a secure connection between the first master node and the server.

11. The method of embodiment 1, wherein the shipping information further comprises an intended delivery time parameter related to delivery of the item; and wherein the adverse delivery condition is further based upon the intended delivery time parameter.

12. The method of embodiment 1, wherein the corrective delivery notification to the courier master node identifies the item as being at an incorrect location for delivery.

13. The method of embodiment 12, wherein the corrective delivery notification to the courier master node includes at least an instruction not to deliver the item to the first location of the first master node.

14. The method of embodiment 1, wherein the corrective delivery notification to the courier master node identifies the item as not being delivered to the intended delivery location.

15. The method of embodiment 14, wherein the corrective delivery notification to the courier master node includes at least an instruction to move to a specified location.

16. The method of embodiment 15, wherein the specified location comprises the first location of the first master node to allow for appropriate delivery of the item.

17. A master node apparatus disposed at a first location and in communication with a courier master node, the apparatus comprising: a node processing unit; a node memory storage coupled to the node processing unit, the node memory storage maintaining delivery notification code for execution by the node processing unit; location circuitry coupled to the node processing unit, the location circuitry being operative to detect a current location of the master node apparatus; a communication interface coupled to the node processing unit and operative to access a wireless communication path; and wherein the node processing unit, when executing the delivery notification code maintained on the node memory storage, is operative to receive shipping information via the communication interface, the shipping information being related to the item, store the received shipping information in the node memory storage, parse the received shipping information to identify an intended delivery location for the item, cause the location circuitry to detect the current location of the master node apparatus as the first location, automatically sense an adverse delivery condition related to the item based upon the first location of the master node apparatus and the intended delivery location for the item, and cause the communication interface to transmit a corrective delivery notification to the courier master node based upon the adverse delivery condition.

18. The master node apparatus of embodiment 17, wherein the node processing unit is operative to automatically sense the adverse delivery condition by being further operative to determine a difference between the first location of the master node apparatus and the intended delivery location for the item when an ID node associated with the item arrives at the first location, wherein the determined difference indicates an incorrect location for delivery of the item as the adverse delivery condition.

19. The master node apparatus of embodiment 17, wherein the node processing unit is operative to automatically sense the adverse delivery condition by being further operative to: compare the detected current location of the master node apparatus to the intended delivery location to determine if the first location does not correspond to the intended delivery location for the item; detect that an ID node associated with the item is proximate and stationary relative to the master node apparatus while detecting that the courier master node is moving away from the first location; and determine the ID node is in an incorrect location for delivery of the item as the adverse delivery condition when the first location does not correspond to the intended delivery location for the item and the ID node is detected to be proximate and stationary relative to the master node apparatus while the courier master node is detected to be moving away from the first location.

20. The master node apparatus of embodiment 17, wherein the node processing unit is operative to automatically sense the adverse delivery condition by being further operative to detect a movement of an ID node associated with the item away from the first location as the adverse delivery condition when the first location corresponds to the intended delivery location.

21. The master node apparatus of embodiment 17, wherein the corrective delivery notification to the courier master node identifies the item as being at an incorrect location for delivery.

22. The master node apparatus of embodiment 21, wherein the corrective delivery notification to the courier master node includes at least an instruction not to deliver the item to the first location of the master node apparatus.

23. The master node apparatus of embodiment 17, wherein the corrective delivery notification to the courier master node identifies the item as not being delivered to the intended delivery location.

24. The master node apparatus of embodiment 23, wherein the corrective delivery notification to the courier master node includes at least an instruction to move to a specified location.

25. The master node apparatus of embodiment 24, wherein the specified location comprises the location of the master node apparatus to allow for appropriate delivery of the item.

26. The master node apparatus of embodiment 17, wherein the node processing unit is further operative to receive the shipping information over the communication interface from an ID node associated with the item, the ID node providing the shipping information over a secure connection established over the wireless communication path as part of a broadcasted signal from the ID node, the secure connection being between the ID node and the communication interface.

27. The master node apparatus of embodiment 17, wherein the node processing unit is further operative to receive the shipping information over the communication interface from a server, the server apparatus providing the shipping information over a secure connection between the communication interface and the server in a preloading message from the server.

28. The master node apparatus of embodiment 27, wherein the server apparatus providing the shipping information in response to a shipping information request transmitted by the communication interface to the server.

29. The master node apparatus of embodiment 17, wherein the shipping information comprises an intended delivery time parameter related to the item; and wherein the node processing unit is operative to automatically determine the adverse delivery condition based upon the intended delivery location, the first location of the mobile master node apparatus, and the intended delivery time parameter.

Further Embodiment C

Improved Methods, Apparatus, and Systems for Generating a Corrective Pickup Notification for a Shipped Item Based Upon an Intended Pickup Master Node 1. An improved method for generating a corrective pickup notification related to an item, the method comprising: identifying, by a mobile master node, a location of an ID node associated with the item; determining, by the mobile master node, whether the location of the ID node indicates the item is accompanying the mobile master node as the mobile master node moves from a first location to a second location; receiving, by the mobile master node, shipping information related to the item; identifying, by the mobile master node, an intended pickup master node from the shipping information; automatically sensing, by the mobile master node, an adverse pickup condition related to the item based upon the intended pickup master node and whether the location of the ID node indicates the item is accompanying the mobile master node; and generating, by the mobile master node, the corrective pickup notification based upon the adverse pickup condition sensed.

2. The method of embodiment 1, wherein the step of determining further comprises: detecting, by location circuitry on the mobile master node, a location of the mobile master node; and comparing the location of the mobile master node to the location of the ID node as the mobile master node moves from the first location to the second location to determine whether the item is accompanying the mobile master node.

3. The method of embodiment 1, wherein the step of automatically sensing further comprises automatically sensing, by the mobile master node, the adverse pickup condition related to the item when the intended pickup master node does not correspond to the mobile master node and the location of the ID node indicates the item is accompanying the mobile master node.

4. The method of embodiment 1, wherein the shipping information is received from the ID node over a secure connection between the ID node and the mobile master node.

5. The method of embodiment 1, wherein the shipping information is received from a server over a secure connection between the server and the mobile master node.

6. The method of embodiment 1, wherein the step of generating the corrective pickup notification further comprises generating a prompt on the mobile master node, the prompt being related to the adverse pickup condition.

7. The method of embodiment 6, wherein the prompt further comprises an alert sound generated by the mobile master node.

8. The method of embodiment 6, wherein the prompt further comprises electronic feedback on a user interface of the mobile master node.

9. The method of embodiment 8, wherein the electronic feedback includes at least an instruction not to deliver the item based upon the sensed adverse pickup condition.

10. The method of embodiment 8, wherein the electronic feedback includes at least an instruction to alter a current direction of movement based upon the sensed adverse pickup condition.

11. The method of embodiment 10, wherein the instruction to alter the current direction of movement comprises an instruction to move to a specified location.

12. The method of embodiment 11, wherein the specified location comprises a prior location of the mobile master node.

Further Embodiment E

Improved Methods, Apparatus, and Systems for Transmitting a Corrective Pickup Notification for a Shipped Item Accompanying an ID Node Based Upon Intended Pickup Master Node Movement 1. An improved method for transmitting a corrective pickup notification related to an item, the method comprising: receiving, by a first master node at a first location, shipping information related to the item; identifying, by the first master node, an intended pickup master node from the shipping information; detecting, by the first master node, whether a location of the ID node over a period of time indicates the item is not moving away from the first location over the period of time; determining, by the first master node, a location of the intended pickup master node over the period of time; automatically sensing, by the first master node, an adverse pickup condition related to the item when the intended pickup master node is moving away from the first location while the location of the ID node over the period of time indicates the item is not moving away from the first location; and transmitting, by the first master node, the corrective pickup notification to a second device based upon the adverse pickup condition sensed.

2. The method of embodiment 1, wherein the shipping information is received from the ID node over a secure connection between the ID node and the first master node.

3. The method of embodiment 1, wherein the shipping information is received from a server over a secure connection between the server and the first master node.

4. The method of embodiment 1, wherein the second device comprises at least one from a group consisting of a server, the intended pickup master node, a third node device associated with a shipper of the item, and a fourth node device associated a recipient of the item.

5. The method of embodiment 1, wherein the corrective pickup notification to the intended pickup master node identifies the item as being not being picked up.

6. The method of embodiment 5, wherein the corrective pickup notification to the intended pickup master node includes at least an instruction to move to a specified location.

7. The method of embodiment 6, wherein the specified location comprises the first location of the first master node to allow for appropriate pickup of the item.

Further Embodiment F

Improved Methods, Apparatus, and Systems for Generating a Pickup Notification Related to an Inventory Item 1. An improved method for generating a pickup notification related to an inventory item using a master node associated with a fixed location, the method comprising: monitoring, by the master node, a location of an ID node associated with the inventory item; receiving, by the master node, release information from an inventory control server operative to communicate with the master node; detecting, by the master node, movement of the ID node relative to the fixed location; and generating, by the master node, the pickup notification for the inventory item based upon the release information and the detected movement of the ID node.

2. The method of embodiment 1, wherein the release information identifies a category for inventory release; and wherein the generating step further comprises generating the pickup notification for the inventory item when (a) the detected movement of the ID node reflects movement of the ID node away from the fixed location and (b) the category for inventory release does not correspond to the inventory item.

3. The method of embodiment 1, wherein the release information identifies a category for inventory release; and wherein the generating step further comprises generating the pickup notification for the inventory item when (a) the detected movement of the ID node reflects movement of the ID node away from the fixed location and (b) the category for inventory release does not correspond to the ID node associated with the inventory item.

4. The method of embodiment 1, wherein the release information comprises at least one authorized released node; and wherein the generating step further comprises generating the pickup notification for the inventory item when (a) the detected movement of the ID node reflects movement of the ID node away from the fixed location and (b) the at least one authorized released node does not include the ID node associated with the inventory item.

5. The method of embodiment 1, wherein the master node is associated with a storage facility maintaining an inventory level of items, wherein the current inventory level of items reflects maintaining the inventory item at the storage facility.

6. The method of embodiment 5 further comprising the step of updating inventory control information related to the inventory level of items when the detected movement of the ID node reflects movement of the ID node away from the fixed location and the ID node is authorized to leave the storage facility consistent with the release information.

7. The method of embodiment 6 further comprising the step of transmitting the updated inventory control information to the inventory control server.

8. The method of embodiment 5, wherein the generating step further comprises generating, by the master node, the pickup notification for the inventory item when (a) the master node detects a location of the ID node as being beyond a threshold distance away from the fixed location of the master node and (b) the release information received by the master node does not authorize the ID node to leave the storage facility.

9. The method of embodiment 1 further comprising the step of providing the pickup notification on a user interface of the master node, the pickup notification indicating the inventory item has been improperly moved.

10. The method of embodiment 1, wherein the pickup notification further indicating the inventory item has improperly been removed from a storage facility associated with the master node at the first location.

11. The method of embodiment 1 further comprising the step of transmitting, by the master node to the inventory control server, an alert related to the pickup notification, wherein the alert indicating the inventory item has been improperly moved.

12. The method of embodiment 11, wherein the alert further providing a corrective action relative to the detected movement of the ID node relative to the fixed location.

13. The method of embodiment 1 further comprising the step of transmitting, by the master node to a second node device, an alert related to the pickup notification, wherein the alert indicating the inventory item has been improperly moved.

14. A master node apparatus for generating a pickup notification related to an inventory item, the master node comprising: a node processing unit; a node memory storage coupled to the node processing unit, the node memory storage maintaining pickup notification code for execution by the node processing unit; a first communication interface coupled to the node processing unit and operative to communicate with an ID node associated with the inventory item; a second communication interface coupled to the node processing unit and operative to communicate with an inventory control server; and wherein the node processing unit, when executing the delivery notification code maintained on the node memory storage, is operative to communicate with the ID node over the first communication interface to monitor a location of the ID node associated with the inventory item, receive release information from the inventory control server over the second communication interface and store the received release information in the node memory storage, detect movement of the ID node relative to a fixed location of the master node apparatus, and generate the pickup notification for the inventory item based upon the release information and the detected movement of the ID node.

15. The master node apparatus of embodiment 14, wherein the release information identifies a category for inventory release; and wherein node processing unit is further operative to generate the pickup notification when (a) the detected movement of the ID node reflects movement of the ID node away from the fixed location and (b) the category for inventory release does not correspond to the inventory item.

16. The master node apparatus of embodiment 14, wherein the release information identifies a category for inventory release; and wherein the node processing unit is further operative to generate the pickup notification for the inventory item when (a) the detected movement of the ID node reflects movement of the ID node away from the fixed location and (b) the category for inventory release does not correspond to the ID node associated with the inventory item.

17. The master node apparatus of embodiment 14, wherein the release information comprises at least one authorized released node; and wherein the node processing unit is further operative to generate the pickup notification for the inventory item when (a) the detected movement of the ID node reflects movement of the ID node away from the fixed location and (b) the at least one authorized released node does not include the ID node associated with the inventory item.

18. The master node apparatus of embodiment 14, wherein the inventory item is maintained as part of an inventory of a storage facility, the storage facility being associated with the master node apparatus.

19. The master node apparatus of embodiment 18, wherein the node processing unit is further operative to update inventory control information maintained on the node memory storage, the inventory control information related to a level of the inventory, the updated inventory control information reflecting a revised level of the inventory when the detected movement of the ID node reflects movement of the ID node away from the fixed location and the ID node is authorized to leave the storage facility consistent with the release information.

20. The master node apparatus of embodiment 19, wherein the node processing unit is further operative to cause the second communication interface to transmit the updated inventory control information to the inventory control server.

21. The master node apparatus of embodiment 18, wherein node processing unit is operative to generate the pickup notification when (a) the master node detects the movement of the ID node is beyond a threshold distance away from the fixed location of the master node and (b) the release information received from the inventory control server does not authorize the ID node to leave the storage facility.

22. The master node apparatus of embodiment 14 further comprising a user interface disposed on the master node apparatus and coupled to the node processing unit; and wherein the node processing unit being further operative to provide the pickup notification on the user interface of the master node, the pickup notification indicating the inventory item has been improperly moved.

23. The master node apparatus of embodiment 14, wherein the pickup notification further indicating the inventory item has improperly been removed from a storage facility associated with the master node at the first location.

24. The master node apparatus of embodiment 14, wherein the node processing unit is further operative to cause the second communication interface to transmit an alert related to the pickup notification to the inventory control server, wherein the alert indicating the inventory item has been improperly moved.

25. The master node apparatus of embodiment 24, wherein the alert further providing a corrective action relative to the detected movement of the ID node relative to the fixed location.

26. The master node apparatus of embodiment 14, wherein the node processing unit is further operative to cause the first communication interface to transmit an alert related to the pickup notification to a second device, wherein the alert indicating the inventory item has been improperly moved.

27. A system for generating a pickup notification related to an inventory item, the system comprising: an inventory control server maintaining release information; and a master node associated with a fixed location, the master node comprising a node processing unit; a node memory storage coupled to the node processing unit, the node memory storage maintaining pickup notification code for execution by the node processing unit; a first communication interface coupled to the node processing unit and operative to communicate with an ID node associated with the inventory item; a second communication interface coupled to the node processing unit and operative to communicate with the inventory control server; and wherein the node processing unit, when executing the delivery notification code maintained on the node memory storage, is operative to communicate with the ID node over the first communication interface to monitor a location of the ID node associated with the inventory item, receive release information from the inventory control server over the second communication interface and store the received release information in the node memory storage, detect movement of the ID node relative to a fixed location of the master node apparatus, generate the pickup notification for the inventory item based upon the release information and the detected movement of the ID node, cause the second communication interface to transmit a first alert to the inventory control server based upon the generated pickup notification, wherein the first alert indicating the inventory item has been improperly moved, and cause the second communication interface to transmit a second alert to the inventory control server based upon the generated pickup notification, wherein the second alert indicating the inventory item has been properly moved; and wherein the inventory control server is operative to transmit the release information to the second communication interface, and receive at least one of the first alert and the second alert from the master node.

28. The system of embodiment 27, wherein the inventory item is maintained as part of an inventory of a storage facility, the storage facility being associated with the master node apparatus.

29. The system of embodiment 28, wherein the node processing unit of the master node is further operative to update inventory control information maintained on the node memory storage, the inventory control information related to a level of the inventory, the updated inventory control information reflecting a revised level of the inventory when the detected movement of the ID node reflects movement of the ID node away from the fixed location and the ID node is authorized to leave the storage facility consistent with the release information.

30. The system of embodiment 29, wherein the node processing unit of the master node is further operative to cause the second communication interface to transmit the updated inventory control information to the inventory control server; and wherein the inventory control server is operative to receive the updated inventory control information from the master node.

Further Embodiment G

Enhanced Delivery Management Methods, Apparatus, and Systems for a Shipped Item Using a Mobile Node-Enabled Logistics Receptacle 1. A method for enhanced delivery management of an item using a mobile node-enabled logistics receptacle, the method comprising: identifying, by the mobile node-enabled logistics receptacle, an intended delivery location associated with the item; detecting a current location of the mobile node-enabled logistics receptacle; and selectively releasing, by the mobile node-enabled logistics receptacle, the item from the mobile node-enabled logistics receptacle based upon the detected current location of the mobile node-enabled logistics receptacle and the identified intended delivery location.

2. The method of embodiment 1, wherein the identifying step further comprising: detecting, by the mobile node-enabled logistics receptacle, a signal broadcast from a node associated with the item; accessing, by the mobile node-enabled logistics receptacle, shipping information within the detected signal, wherein the shipping information is related to the item; and identifying the intended delivery location from the shipping information.

3. The method of embodiment 2 further comprising establishing a secure connection to the node associated with the item.

4. The method of embodiment 3, wherein the secure connection comprises an encrypted exchange of the shipping information.

5. The method of embodiment 1, wherein the selectively releasing step further comprises: comparing, by the mobile node-enabled logistics receptacle, the detected current location of the mobile node-enabled logistics receptacle to the identified intended delivery location; and releasing, by the mobile node-enabled logistics receptacle, the item from a storage area within the mobile node-enabled logistics receptacle based upon the comparison of the detected current location of the mobile node-enabled logistics receptacle to the identified intended delivery location.

6. The method of embodiment 5, wherein the releasing step further comprises releasing, by the mobile node-enabled logistics receptacle, the item from the storage area when the comparison of the detected current location of the mobile node-enabled logistics receptacle to the identified intended delivery location indicates the detected current location of the mobile node-enabled logistics receptacle is within a threshold proximity area associated with the intended delivery location.

7. The method of embodiment 1, wherein the selectively releasing step further comprises: establishing a validation connection with a node associated with the intended delivery location to authorize releasing the item; and releasing, by the mobile node-enabled logistics receptacle, the item from within the mobile node-enabled logistics receptacle based upon the detected current location of the mobile node-enabled logistics receptacle and the location of the mobile user access device and after establishing the validation connection.

8. The method of embodiment 7, wherein the step of establishing the validation connection further comprises establishing a secure validation connection with the node associated with the intended delivery location.

9. The method of embodiment 7, wherein the validation connection comprises at least one of a prompted connection with the node associated with the intended delivery location and a preauthorized connection between the mobile node-enabled logistics receptacle and the node associated with the intended delivery location.

10. The method of embodiment 1, wherein the selectively releasing step further comprises: determining, by the mobile node-enabled logistics receptacle, a proximity distance between the detected current location of the mobile node-enabled logistics receptacle and the identified intended delivery location; and actuating, by the mobile node-enabled logistics receptacle, a lockable opening to a storage area on the mobile node-enabled logistics receptacle to release the item based upon the determined proximity distance.

11. The method of embodiment 10, wherein the actuating step further automatically unlocking, by the mobile node-enabled logistics receptacle, the lockable opening to a storage area on the mobile node-enabled logistics receptacle to release the item when the determined proximity distance is less than a threshold proximity distance.

12. The method of embodiment 11, wherein the step of automatically unlocking further comprises identifying a portion of the storage area that maintains the item; and automatically, when the determined proximity distance is less than the threshold proximity distance, unlocking an access opening to the identified portion of the storage area to provide delivery access to the item.

13. The method of embodiment 12, further comprising maintaining a locked state for a remaining part of the storage area that is not identified as the portion of the storage area that maintains the item.

14. The method of embodiment 1 further comprising the step of receiving, by the mobile node-enabled logistics receptacle, a delivery location signal broadcast from a node associated with the intended delivery location; and wherein the selectively releasing step comprises automatically unlocking, by the mobile node-enabled logistics receptacle, an opening to a storage area maintaining the item after receiving the delivery location signal.

15. The method of embodiment 14 further comprising establishing a secure connection to the node associated with the intended delivery location.

16. The method of embodiment 14, wherein the step of automatically unlocking further comprises: identifying a portion of the storage area that maintains the item; and automatically, after receiving the delivery location signal, unlocking an access opening to the identified portion of the storage area to provide delivery access to the item.

17. The method of embodiment 16 further comprising maintaining a locked state for a remaining part of the storage area that is not identified as the portion of the storage area that maintains the item.

18. The method of embodiment 1 further comprising generating an alert related to releasing the item from the mobile node-enabled logistics receptacle.

19. The method of embodiment 1, wherein the intended delivery location comprises a recipient location.

20. The method of embodiment 19, wherein the recipient location comprises a location of a mobile user access device operative to function as a master node, wherein the mobile user access device is associated with a recipient for the item.

21. The method of embodiment 20, wherein the selectively releasing step further comprises: establishing, by the mobile node-enabled logistics receptacle, a validation connection with the mobile user access device to authorize releasing the item; and releasing, by the mobile node-enabled logistics receptacle, the item from within the mobile node-enabled logistics receptacle based upon the detected current location of the mobile node-enabled logistics receptacle and the location of the mobile user access device and after successfully establishing the validation connection.

22. The method of embodiment 21, wherein the validation connection further comprises a secure validation connection with the mobile user access device.

23. The method of embodiment 21, wherein the establishing step further comprises establishing an active prompted connection between the mobile node-enabled logistics receptacle and the mobile user access device to receive a prompted authorization release acknowledgement from the mobile user access device in order to authorize releasing the item.

24. The method of embodiment 21, wherein the establishing step further comprises establishing a preauthorized connection between the mobile node-enabled logistics receptacle and the mobile user access device to automatically authorize releasing the item.

25. The method of embodiment 24, wherein establishing the preauthorized connection further comprises establishing the preauthorized connection between the mobile node-enabled logistics receptacle and the mobile user access device to automatically authorize releasing the item based upon a previously authorized release validation condition that occurs automatically when the mobile node-enabled logistics receptacle detects a signal broadcast as an advertising signal from the mobile user access device related to the recipient of the item.

26. The method of embodiment 1, wherein the step of selectively releasing the item further comprises selectively articulating a lockable element on the mobile node-enabled logistics receptacle to cause the item to separate from the mobile node-enabled logistics receptacle.

27. The method of embodiment 26, wherein the lockable element comprises at least one from the group consisting of one or more doors supporting the item while in a closed state but allowing the item to transfer from the mobile node-enabled receptacle in an open state, and one or more articulating grips holding the item in a secure configuration in the closed state but releasing the item from the secure configuration in the open state.

28. A mobile node-enabled logistics receptacle apparatus having enhanced delivery release control related to an item, the apparatus comprising:
a logistics receptacle comprising a storage area for maintaining the item, and a lockable opening through which the item and a node associated with the item can pass into the storage area;
a node coupled to the logistics receptacle, the node further comprising a node processing unit, a node memory storage coupled to the node processing unit, the node memory storage maintaining delivery release control code for execution by the node processing unit and shipping information related to the item, location circuitry coupled to the node processing unit, the location circuitry being operative to detect a location of the mobile node-enabled logistics receptacle apparatus, an actuator operatively coupled to the lockable opening and controlled by the node processing unit, the actuator controlling access to the storage area by controlling a state of the lockable opening, and a communication interface coupled to the node processing unit and operative to access a wireless communication path; and
wherein the node processing unit, when executing the delivery release control code maintained on the node memory storage, is operative to identify an intended delivery location associated with the item from the shipping information stored in the memory, cause the location circuitry to detect a current location of the mobile node-enabled logistics receptacle apparatus, and selectively cause the actuator to change the state of the lockable opening to an open state to provide delivery access to the item within the storage area based upon the detected current location of the mobile node-enabled logistics receptacle apparatus and the identified intended delivery location.

29. The mobile node-enabled logistics receptacle apparatus of embodiment 28, wherein the communication interface is operative to detect a signal from the node associated with the item; and wherein the node processing unit is further operative to identify the intended delivery location by being operative to receive at least a portion of the detected signal from the communication interface; access shipping information within the portion of the detected signal, wherein the shipping information is related to the item; and identify the intended delivery location from the shipping information.

30. The mobile node-enabled logistics receptacle apparatus of embodiment 28, wherein the node processing unit is further operative to establishing a secure connection over the communication interface to the node associated with the item.

31. The mobile node-enabled logistics receptacle apparatus of embodiment 30, wherein the secure connection comprises an encrypted exchange of the shipping information.

32. The mobile node-enabled logistics receptacle apparatus of embodiment 28, wherein the node processing unit is operative to selectively cause the actuator to change to the open state by being operative to compare the detected current location of the mobile node-enabled logistics receptacle apparatus to the identified intended delivery location; and selectively cause the actuator to change the state of the lockable opening to the open state based upon based upon the comparison of the detected current location of the mobile node-enabled logistics receptacle apparatus to the identified intended delivery location.

33. The mobile node-enabled logistics receptacle apparatus of embodiment 32, wherein the node processing unit is further operative to selectively cause the actuator to change to the open state when the comparison indicates the detected current location is within a threshold proximity area associated with the intended delivery location 34. The mobile node-enabled logistics receptacle apparatus of embodiment 28, wherein the node processing unit is operative to the selectively cause the actuator to change the state of the lockable opening to the open state by being further operative to: establish a validation connection, using the communication interface, with a node associated with the intended delivery location to authorize releasing the item; and cause the actuator to change the state of the lockable opening to the open state based upon the detected current location of the mobile node-enabled logistics receptacle and the location of the mobile user access device and after successfully establishing the validation connection.

35. The mobile node-enabled logistics receptacle apparatus of embodiment 34, wherein the validation connection further comprises a secure validation connection with the node associated with the intended delivery location.

36. The mobile node-enabled logistics receptacle apparatus of embodiment 34, wherein the validation connection comprises at least one of a prompted connection with the node associated with the intended delivery location and a preauthorized connection between the mobile node-enabled logistics receptacle and the node associated with the intended delivery location.

37. The mobile node-enabled logistics receptacle apparatus of embodiment 28, wherein the node processing unit is operative to selectively cause the actuator to change the state of the lockable opening to the open state by being further operative to cause the actuator to unlock the lockable opening based upon a proximity distance between the detected current location of the mobile node-enabled logistics receptacle apparatus and the identified intended delivery location.

38. The mobile node-enabled logistics receptacle apparatus of embodiment 37, wherein the node processing unit is operative to cause the actuator to unlock the lockable opening by being further operative to cause the actuator to automatically unlock the lockable opening to the storage area when the determined proximity distance is less than a threshold proximity distance.

39. The mobile node-enabled logistics receptacle apparatus of embodiment 28, wherein the node processing unit is further operative to receive a delivery location signal from the communication interface, the delivery location signal being broadcast from a node associated with the intended delivery location; and wherein the node processing unit is operative to selectively cause the actuator to change the state of the lockable opening to the open state by being further operative to cause the actuator to automatically unlock the lockable opening after receiving the delivery location signal.

40. The mobile node-enabled logistics receptacle apparatus of embodiment 39, wherein the node processing unit is operative to receive the delivery location signal by establishing a secure connection over the communication interface to the node associated with the intended delivery location.

41. The mobile node-enabled logistics receptacle apparatus of embodiment 39, wherein the delivery location signal is broadcast from a mobile node associated with the intended delivery location.

42. The mobile node-enabled logistics receptacle apparatus of embodiment 39, wherein the delivery location signal is broadcast from a fixed node associated with the intended delivery location.

43. The mobile node-enabled logistics receptacle apparatus of embodiment 28, wherein the node processing unit is further operative to generate an alert related to release of the item from the mobile node-enabled logistics receptacle.

44. The mobile node-enabled logistics receptacle apparatus of embodiment 43, wherein the node processing unit is further operative to cause the communication interface to transmit the alert to a node associated with the intended delivery location.

45. The mobile node-enabled logistics receptacle apparatus of embodiment 43, wherein the node further comprises a user interface; and wherein the node processing unit is further operative to generate the alert by being operative to display the generated alert with the user interface.

46. The mobile node-enabled logistics receptacle apparatus of embodiment 45, wherein the user interface comprises a speaker; and wherein the node processing unit is further operative to generate the alert by being operative to play an auditory alert with the speaker.

47. The mobile node-enabled logistics receptacle apparatus of embodiment 28, wherein the intended delivery location comprises a recipient related location.

48. The mobile node-enabled logistics receptacle apparatus of embodiment 47, wherein the recipient related location comprises a location of a mobile user access device identified in the shipping information, wherein the mobile user access device is operative to function as a master node and associated with a recipient for the item.

49. The mobile node-enabled logistics receptacle apparatus of embodiment 48, wherein the node processing unit is operative to the selectively cause the actuator to change the state of the lockable opening to the open state by being further operative to: establish a validation connection, using the communication interface, with the mobile user access device to authorize releasing the item; and cause the actuator to change the state of the lockable opening to the open state based upon the detected current location of the mobile node-enabled logistics receptacle and the location of the mobile user access device and after successfully establishing the validation connection.

50. The mobile node-enabled logistics receptacle apparatus of embodiment 49, wherein the validation connection further comprises a secure validation connection, using the communication interface, with the mobile user access device.

51. The mobile node-enabled logistics receptacle apparatus of embodiment 49, wherein the node processing unit is operative to establish the validation connection using the communication interface by being further operative to establish an active prompted connection between the mobile node-enabled logistics receptacle and the mobile user access device over the wireless communication path to receive a prompted authorization release acknowledgement from the mobile user access device in order to authorize releasing the item.

52. The mobile node-enabled logistics receptacle apparatus of embodiment 49, wherein the node processing unit is operative to establish the validation connection using the communication interface by being further operative to establish a preauthorized connection between the mobile node-enabled logistics receptacle and the mobile user access device over the wireless communication path to automatically authorize releasing the item.

53. The mobile node-enabled logistics receptacle apparatus of embodiment 52, wherein the node processing unit is further operative to establish the preauthorized connection between the mobile node-enabled logistics receptacle and the mobile user access device to automatically authorize releasing the item based upon a previously authorized release validation condition that occurs automatically when the mobile node-enabled logistics receptacle detects a signal broadcast as an advertising signal from the mobile user access device related to the recipient of the item.

54. A node-enabled logistics vehicular system having enhanced delivery release control related to an item, the system comprising: a logistics vehicle further comprising a first storage area for maintaining the item, and a first lockable opening through which the item and a node related to the item can pass into the storage area; a master node disposed on the logistics vehicle, the master node further comprising a node processing unit, a node memory storage coupled to the node processing unit, the node memory storage maintaining delivery release control code for execution by the node processing unit and shipping information related to the item, location circuitry coupled to the node processing unit, the location circuitry being operative to detect a location of the logistics vehicle, a first actuator operatively coupled to the node processing unit and the first lockable opening, the first actuator controlling access to the first storage area by controlling a state of the first lockable opening, and a first communication interface coupled to the node processing unit and operative to communicate with at least the node related to the item over a first wireless communication path; a second communication interface coupled to the node processing unit and operative to communicate with a server over a second wireless communication path; and wherein the node processing unit of the master node, when executing the delivery release control code maintained on the node memory storage, is operative to identify an intended delivery location associated with the item from the shipping information stored in the memory, cause the location circuitry to detect a current location of the logistics vehicle, and selectively cause the first actuator to change the state of the first lockable opening to an open state to provide delivery access to the item within the first storage area based upon the detected current location of the logistics vehicle and the identified intended delivery location.

55. The node-enabled logistics vehicular system of embodiment 54, wherein the first communication interface is further operative to detect a signal broadcast from the node related to the item; and wherein the node processing unit is further operative to identify the intended delivery location by being operative to identify the intended delivery location based upon a portion of the detected signal, wherein the portion of the detected signal includes broadcast data indicating the shipping information for the item.

56. The node-enabled logistics vehicular system of embodiment 54, wherein the node processing unit is further operative to establishing a secure connection over the first communication interface to the node related to the item.

57. The node-enabled logistics vehicular system of embodiment 56, wherein the secure connection comprises an encrypted exchange of the shipping information.

58. The node-enabled logistics vehicular system of embodiment 54, wherein the node processing unit is further operative to selectively cause the first actuator to change to the open state when the detected current location of the logistics vehicle is within a proximity service area associated with the intended delivery location.

59. The node-enabled logistics vehicular system of embodiment 54, wherein the node processing unit is operative to selectively cause the first actuator to change the state of the first lockable opening to the open state by being further operative to cause the first actuator to unlock the first lockable opening when a proximity distance between the detected current location of the logistics vehicle and the identified intended delivery location is less than a threshold proximity distance.

60. The node-enabled logistics vehicular system of embodiment 54, wherein the node processing unit is further operative to receive a delivery location signal from the first communication interface or from the second communication interface, the delivery location signal being broadcast from a node associated with the intended delivery location; and wherein the node processing unit is operative to selectively cause the first actuator to change the state of the first lockable opening to the open state by being further operative to cause the first actuator to automatically unlock the first lockable opening after receiving the delivery location signal.

61. The node-enabled logistics vehicular system of embodiment 60, wherein the node processing unit is further operative to establish a secure connection to the node associated with the intended delivery location as part of receiving the delivery location signal.

62. The node-enabled logistics vehicular system of embodiment 60, wherein the delivery location signal is broadcast from a mobile node associated with the intended delivery location.

63. The node-enabled logistics vehicular system of embodiment 60, wherein the delivery location signal is broadcast from a fixed node associated with the intended delivery location.

64. The node-enabled logistics vehicular system of embodiment 54, wherein the node processing unit is further operative to cause the second communication interface to transmit an alert to a node associated with the intended delivery location, wherein the alert relates to the delivery access to the item based upon the open state of the first lockable opening.

65. The node-enabled logistics vehicular system of embodiment 54, wherein the logistics vehicle further comprises a second storage area and a second lockable opening through which to access the second storage area; wherein the master node further comprising a second actuator operatively coupled to the second lockable opening and controlled by the node processing unit, the second actuator controlling access to the second storage area by controlling a state of the second lockable opening; and wherein the node processing unit of the master node is further operative to selectively cause the first actuator to change the state of the first lockable opening to the open state to provide delivery access to the item within the first storage area based upon the detected current location of the logistics vehicle and the identified intended delivery location while causing the second actuator to maintain the state of the second lockable opening in a closed state to prevent access to what is stored within the second storage area.

What is claimed is:

1. An improved system for transmitting a corrective pickup notification related to an item being shipped based upon detected node movement, the system comprising:
   a logistics server that maintains a server copy of shipping information related to the item being shipped and an ID node associated with the item being shipped; and
   a first master node disposed at a first logistics location along a transit path for the item being shipped, the first master node being in communication with the logistics server and in communication with the ID node associated with the item being shipped, the first master node comprising,
      a node processing unit,
      a node memory storage coupled to the node processing unit of the first master node, the node memory storage maintaining delivery notification code for execution by the node processing unit and a local copy of the shipping information related to the item being shipped and the ID node associated with the item being shipped,
      location circuitry coupled to the node processing unit of the first master node, the location circuitry being operative to detect a current location of the first master node that is the first logistics location,
      a first communication interface coupled to the node processing unit and operative to access a first wireless communication path connecting the first master node with at least the ID node associated with the item being shipped, and
      a second communication interface coupled to the node processing unit and operative to access a second wireless communication path connecting the first master node with the logistics server, the first wireless communication path being distinct from the second wireless communication path;
   wherein the logistics server is operative to transmit the server copy of the shipping information to the first master node as part of a preloading operation; and
   wherein the node processing unit of the first master node, when executing the delivery notification code, is operative to
      receive the server copy of the shipping information from the logistics server over the second communication interface as part of the preloading operation;
      store the received server copy of the shipping information as the local copy of the shipping information to complete the preloading operation;

identify an intended pickup master node that is distinct from the first master node from the local copy of the shipping information;
incrementally identify a plurality of locations of the ID node over a period of time;
detect whether the locations of the ID node over the period of time indicate the item is moving away from the first logistics location of the first master node;
identify a courier master node accompanying the ID node as the ID node moves away from the first logistics location;
automatically sense an adverse pickup condition related to the item when the identified courier master node does not correspond to the intended pickup master node and the identified locations of the ID node over the period of time indicates the item is moving away from the first logistics location of the first master node; and
transmit the corrective pickup notification to a second logistics related device based upon the adverse pickup condition sensed.

2. The system of claim 1, wherein the node processing unit of the first master node is operative to transmit the corrective pickup notification over the second communication interface to the identified courier master node operating as the second logistics related device.

3. The system of claim 1, wherein the node processing unit of the first master node is operative to transmit the corrective pickup notification over the second communication interface to a second master node associated with a customer shipping the item, the second master node operating as the second logistics related device.

4. The system of claim 1, wherein the node processing unit of the first master node is operative to transmit the corrective pickup notification over the second communication interface to a third master node associated with a recipient of the item being shipped, the third master node operating as the second logistics related device.

5. The system of claim 1, wherein the node processing unit of the first master node is operative to transmit the corrective pickup notification over the second communication interface to the logistics server as the second logistics related device.

6. The system of claim 2, wherein the corrective pickup notification to the identified courier master node identifies the item as being a wrong pickup.

7. The system of claim 2, wherein the corrective delivery notification to the identified courier master node includes at least an instruction to be displayed on the identified courier master node to move to a specified location.

8. The system of claim 7, wherein the specified location comprises the first logistics location of the first master node to allow for appropriate delivery of the item.

9. An improved system for transmitting a corrective pickup notification related to an item being shipped based upon detected node movement, the system comprising:
a logistics server that maintains a copy of shipping information related to the item being shipped and an ID node associated with the item being shipped; and
a first master node disposed at a first logistics location, the first master node being in communication with the logistics server and in communication with the ID node associated with the item being shipped, the first master node comprising,
a node processing unit,
a node memory storage coupled to the node processing unit of the first master node, the node memory storage maintaining delivery notification code for execution by the node processing unit,
location circuitry coupled to the node processing unit of the first master node, the location circuitry being operative to detect a current location of the first master node that is the first logistics location,
a first communication interface coupled to the node processing unit and operative to access a first wireless communication path connecting the first master node with at least the ID node associated with the item being shipped, and
a second communication interface coupled to the node processing unit and operative to access a second wireless communication path connecting the first master node with the logistics server, the first wireless communication path being distinct from the second wireless communication path;
wherein the logistics server is operative to transmit the shipping information to the first master node using a message transmitted over the second wireless communications path; and
wherein the node processing unit of the first master node, when executing the delivery notification code, is operative to
receive the shipping information from the logistics server over the second communication interface;
identify an intended pickup master node that is distinct from the first master node from the shipping information received from the logistics server;
identify a location of the ID node over a period of time;
detect whether the location of the ID node over the period of time indicates the item is moving away from the first logistics location of the first master node;
identify a courier master node accompanying the ID node as the ID node moves away from the first logistics location;
automatically sense an adverse pickup condition related to the item when the identified courier master node does not correspond to the intended pickup master node and the detected location of the ID node over the period of time indicates the item is moving away from the first logistics location of the first master node; and
transmit the corrective pickup notification to a second logistics related device based upon the adverse pickup condition sensed.

10. The system of claim 9, wherein the shipping information is received over the second communication interface from the server using a secure connection established as the second wireless communication path between the server and the first master node.

11. The system of claim 9, wherein the second logistics related device comprises at least one from a group consisting of a server, the identified courier master node, a third node device associated with a customer shipping the item, and a fourth node device associated a recipient of the item.

12. The system of claim 9, wherein the corrective pickup notification is transmitted to the identified courier master node operating as the second logistics related device and wherein the corrective pickup notification identifies the item as being a wrong pickup.

13. The system of claim 12, wherein the corrective delivery notification to the identified courier master node includes at least an instruction to be displayed on the identified courier master node to move to a specified location.

14. The system of claim 13, wherein the specified location comprises the first logistics location of the first master node apparatus to allow for appropriate delivery of the item.

15. A master node apparatus disposed at a first logistics location that transmits a corrective pickup notification related to an item being shipped based upon detected movement, the apparatus comprising:
- a node processing unit;
- a node memory storage coupled to the node processing unit, the node memory storage maintaining delivery notification code for execution by the node processing unit;
- location circuitry coupled to the node processing unit, the location circuitry being operative to detect a current location of the master node apparatus that is the first logistics location;
- a communication interface coupled to the node processing unit and operative to access a first wireless communication path connecting the master node apparatus with at least an ID node associated with the item being shipped; and
- wherein the node processing unit, when executing the delivery notification code maintained on the node memory storage, is operative to
  - receive shipping information related to the item;
  - identify an intended pickup master node that is distinct from the first master node from the shipping information;
  - identify a location of the ID node associated with the item;
  - detect whether the location of the ID node over a period of time indicates the item is moving away from the first logistics location;
  - identify a courier master node accompanying the ID node as the ID node moves away from the first logistics location;
  - automatically sense an adverse pickup condition related to the item when the identified courier master node does not correspond to the intended pickup master node and the detected location of the ID node over the period of time indicates the item is moving away from the first logistics location; and
  - transmit the corrective pickup notification to a second logistics related device based upon the adverse pickup condition sensed.

16. The master node apparatus of claim 15, wherein the shipping information is received via the communication interface from the ID node over a secure connection using the first wireless communication path between the ID node and the master node apparatus.

17. The master node apparatus of claim 15, wherein the communication interface is further operative to access a second wireless communication path connecting the master node apparatus with at least a server; and
   wherein the shipping information is received via the communication interface from the server over a secure connection using the second wireless communication path between the server and the master node apparatus.

18. The master node apparatus of claim 15, wherein the second logistics device comprises at least one from a group consisting of a server, the identified courier master node, a third node device associated with a customer shipping the item, and a fourth node device associated a recipient of the item.

19. The master node apparatus of claim 15, wherein the corrective pickup notification is transmitted to the identified courier master node operating as the second logistics related device and wherein the corrective pickup notification identifies the item as being a wrong pickup.

20. The master node apparatus of claim 19, wherein the corrective delivery notification to the identified courier master node includes at least an instruction to be displayed on the identified courier master node to move to a specified location.

21. The master node apparatus of claim 20, wherein the specified location comprises the first logistics location of the first master node to allow for appropriate delivery of the item.

22. An improved movement-based method for transmitting a corrective pickup notification related to an item being shipped, the method comprising:
- receiving, by a first master node at a first location, shipping information related to the item;
- identifying, by the first master node, an intended pickup master node that is distinct from the first master node from the shipping information;
- identifying, by the first master node, a location of an ID node associated with the item;
- detecting, by the first master node, whether the location of the ID node over a period of time indicates the item is moving away from the first location;
- identifying, by the first master node, a courier master node accompanying the ID node as the ID node moves away from the first location;
- automatically sensing, by the first master node, an adverse pickup condition related to the item when the identified courier master node does not correspond to the intended pickup master node and the detected location of the ID node over the period of time indicates the item is moving away from the first location; and
- transmitting, by the first master node to a second logistics device, the corrective pickup notification based upon the adverse pickup condition sensed.

23. The method of claim 22, wherein the shipping information is received from the ID node over a secure connection between the ID node and the first master node.

24. The method of claim 22, wherein the shipping information is received from a server over a secure connection between the server and the first master node.

25. The method of claim 22, wherein the second logistics device comprises at least one from a group consisting of a server, the identified courier master node, a third node device associated with a customer shipping the item, and a fourth node device associated a recipient of the item.

26. The method of claim 22, wherein the corrective pickup notification is transmitted to the identified courier master node operating as the second logistics related device and wherein the corrective pickup notification identifies the item as being a wrong pickup.

27. The method of claim 26, wherein the corrective delivery notification to the identified courier master node includes at least an instruction to move to a specified location.

28. The method of claim 27, wherein the specified location comprises the first location of the first master node to allow for appropriate delivery of the item.

* * * * *